Aug. 8, 1967  LE ROY J. LANGE ETAL  3,335,407
APPARATUS FOR RECORDING SALES
Filed Aug. 20, 1962  49 Sheets-Sheet 1

INVENTORS
LE ROY J. LANGE
HAROLD C. ROBINSON &
BY GEORGE A. GROTH

ATTORNEYS

Aug. 8, 1967  LE ROY J. LANGE ETAL  3,335,407
APPARATUS FOR RECORDING SALES
Filed Aug. 20, 1962  49 Sheets-Sheet 2

INVENTORS
LE ROY J. LANGE
HAROLD C. ROBINSON
BY GEORGE A GROTH

ATTORNEYS

INVENTORS
LE ROY J. LANGE
HAROLD C. ROBINSON &
BY GEORGE A. GROTH

ATTORNEYS

INVENTORS
LE ROY J. LANGE
HAROLD C. ROBINSON &
BY GEORGE A. GROTH

ATTORNEYS

INVENTORS
LE ROY J. LANGE
HAROLD C. ROBINSON
BY GEORGE A. GROTH

ATTORNEYS

Aug. 8, 1967  LE ROY J. LANGE ETAL  3,335,407
APPARATUS FOR RECORDING SALES
Filed Aug. 20, 1962  49 Sheets-Sheet

INVENTORS
LE ROY J. LANGE
HAROLD C. ROBINSON &
BY GEORGE A. GROTH

ATTORNEYS

Aug. 8, 1967  LE ROY J. LANGE ETAL  3,335,407
APPARATUS FOR RECORDING SALES
Filed Aug. 20, 1962  49 Sheets-Sheet

INVENTORS
LE ROY J. LANGE
HAROLD C. ROBINSON
BY GEORGE A. GROTH

ATTORNEYS

Aug. 8, 1967 LE ROY J. LANGE ET AL 3,335,407
APPARATUS FOR RECORDING SALES
Filed Aug. 20, 1962 49 Sheets-Sheet 10

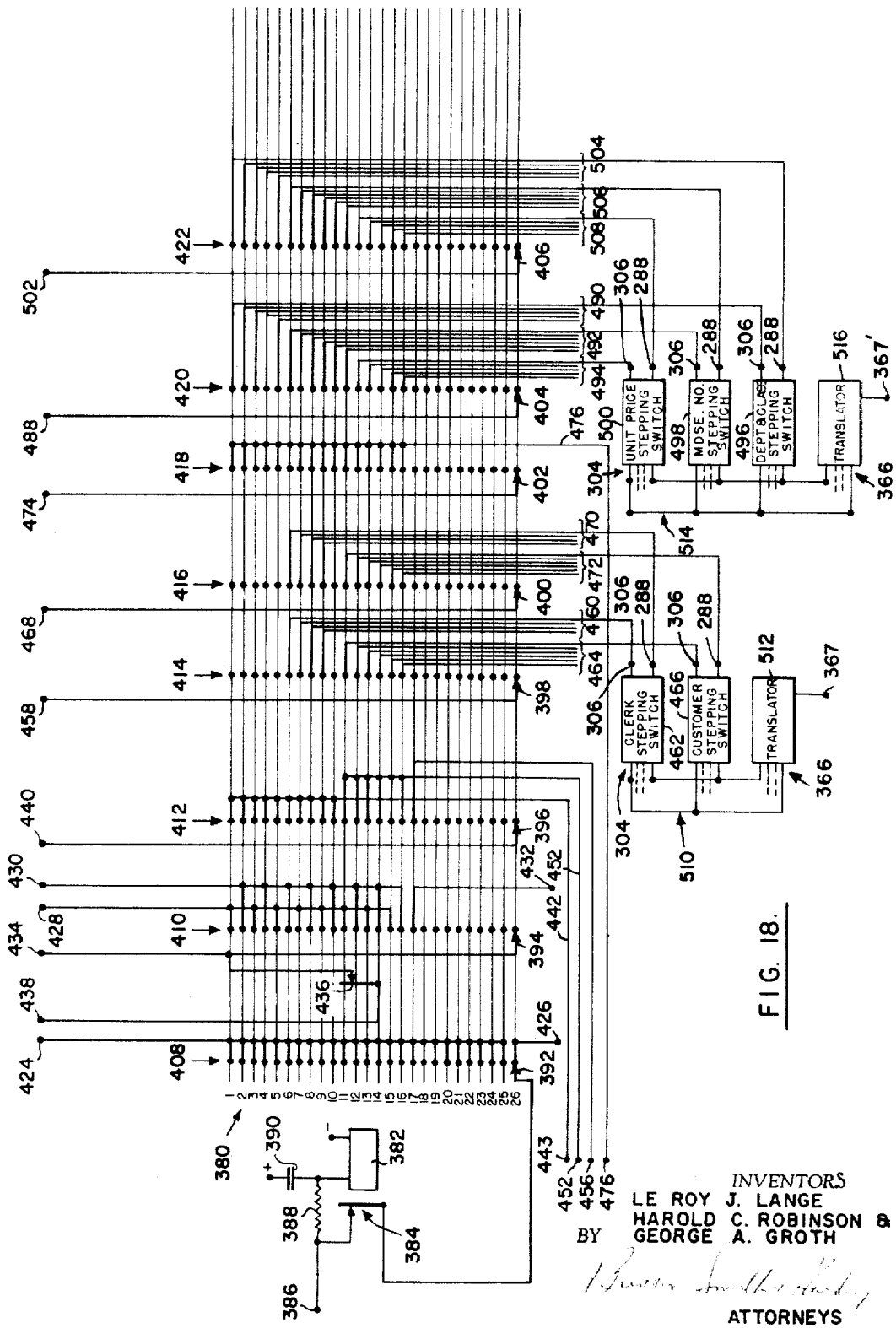

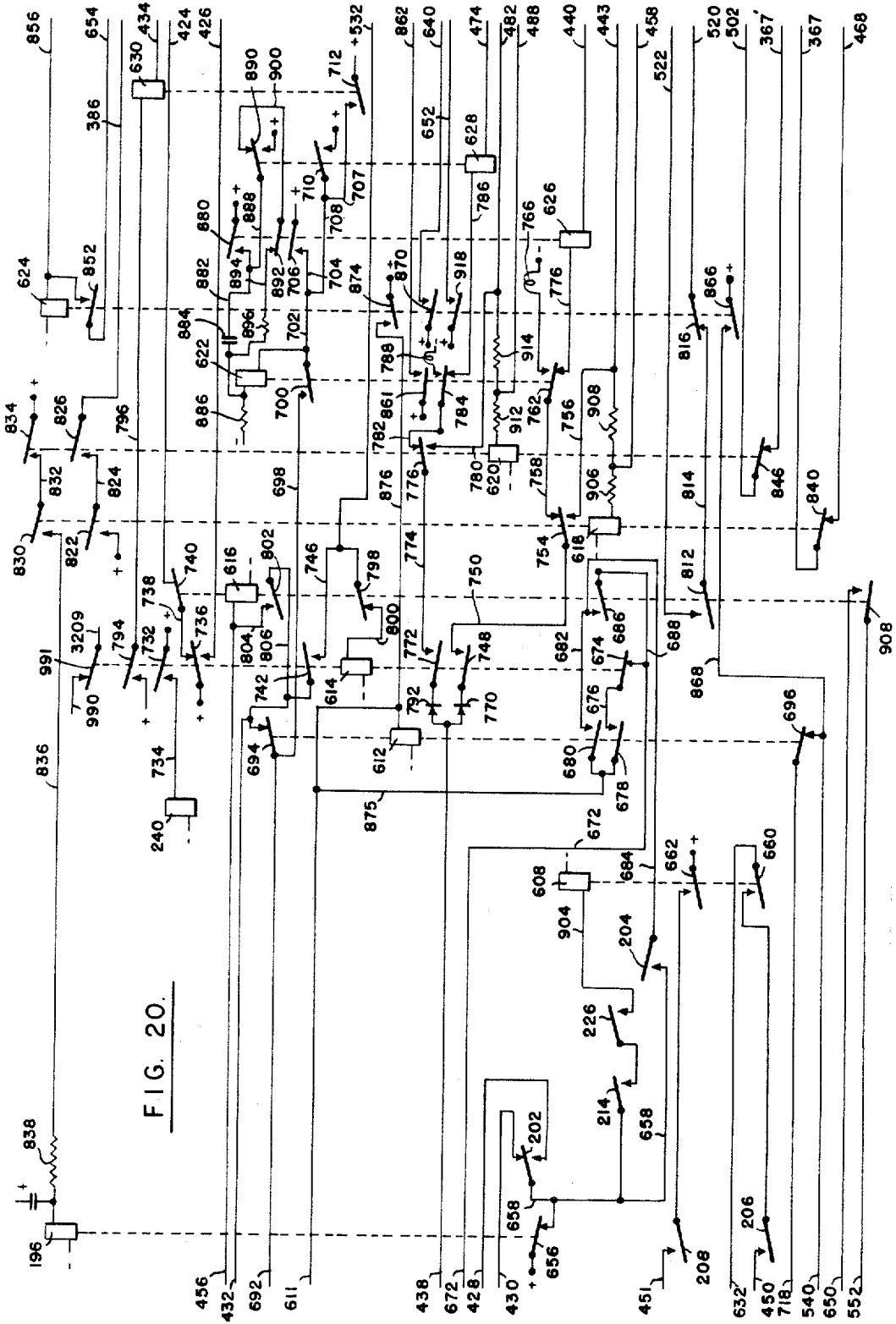

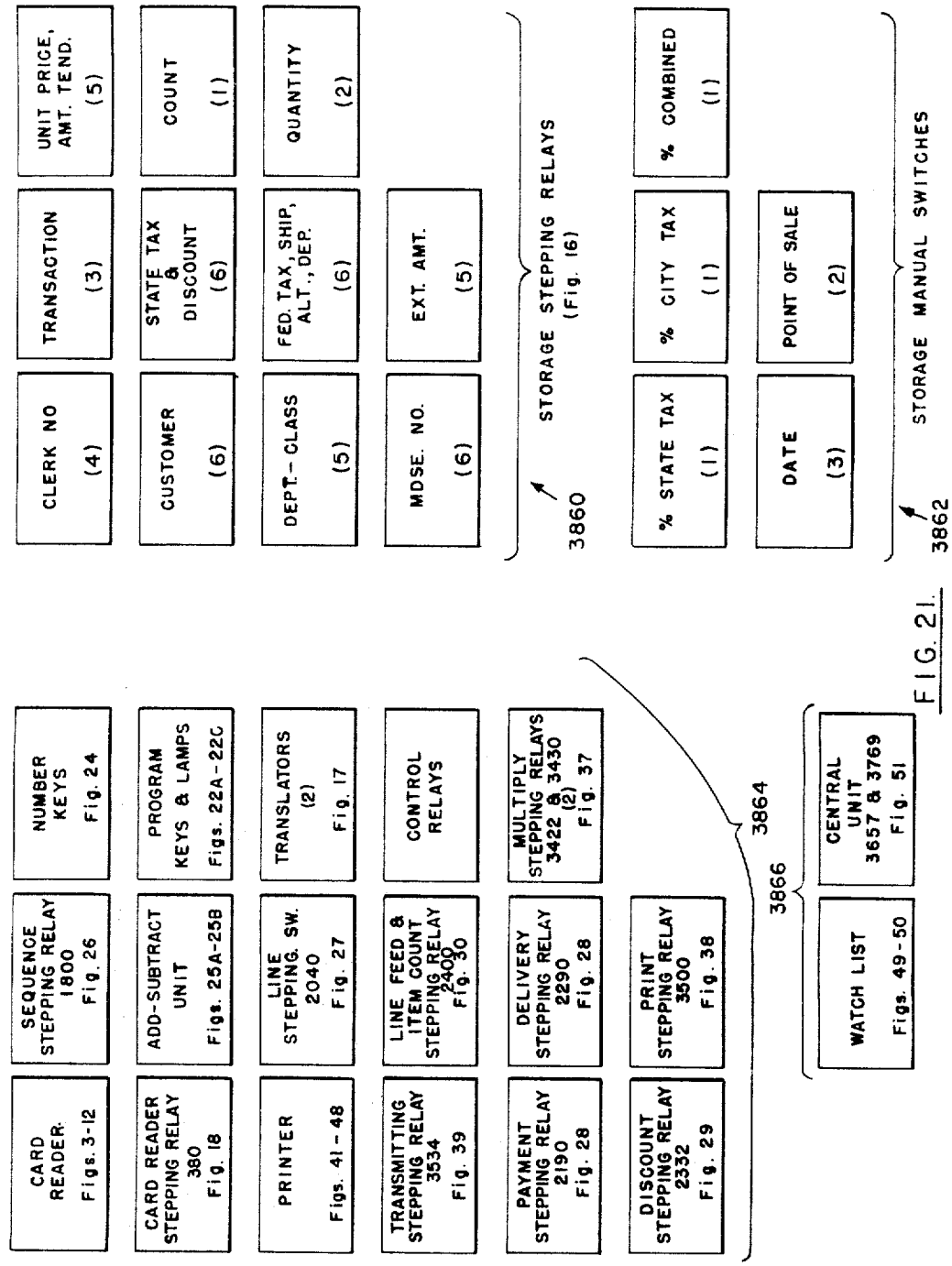

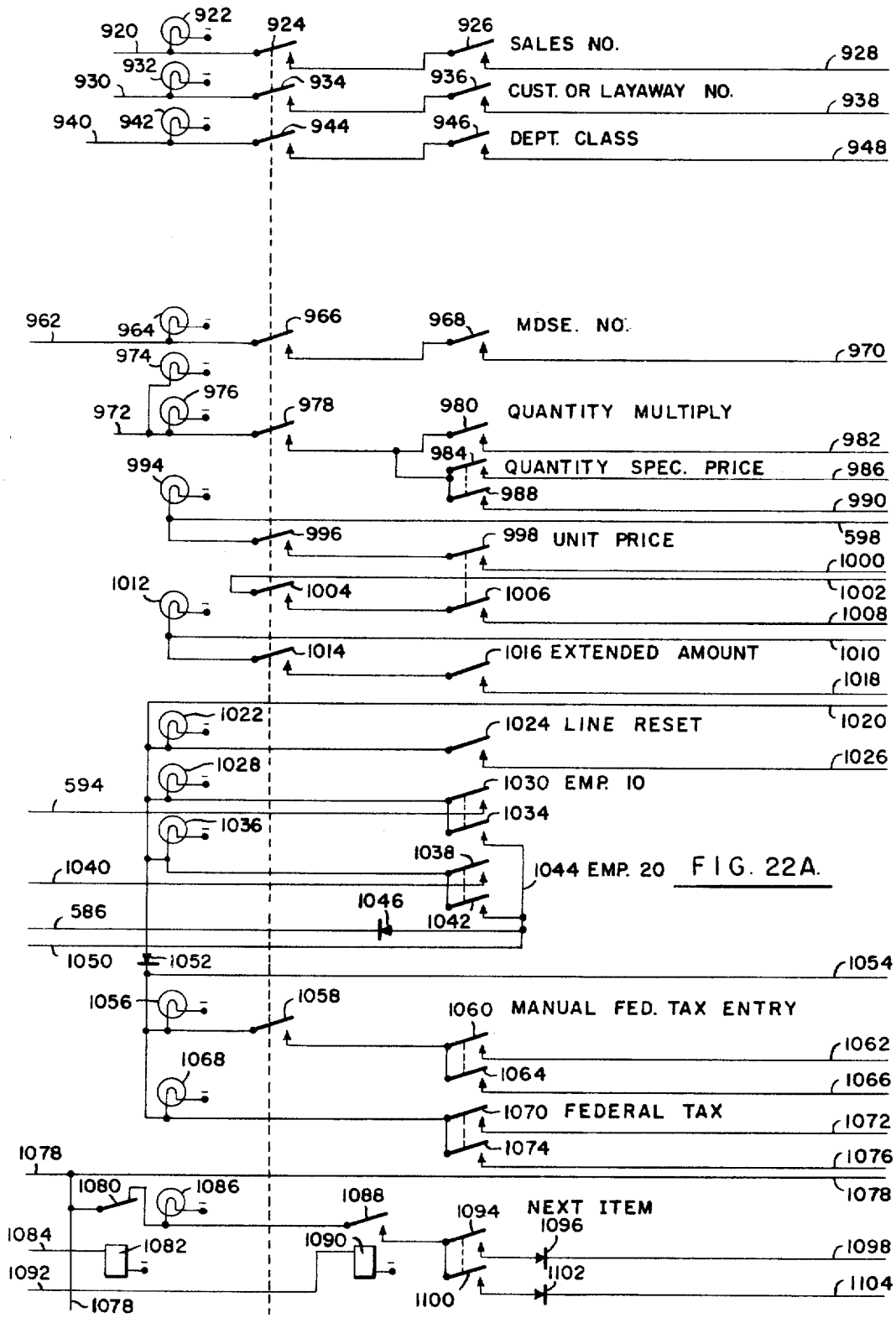

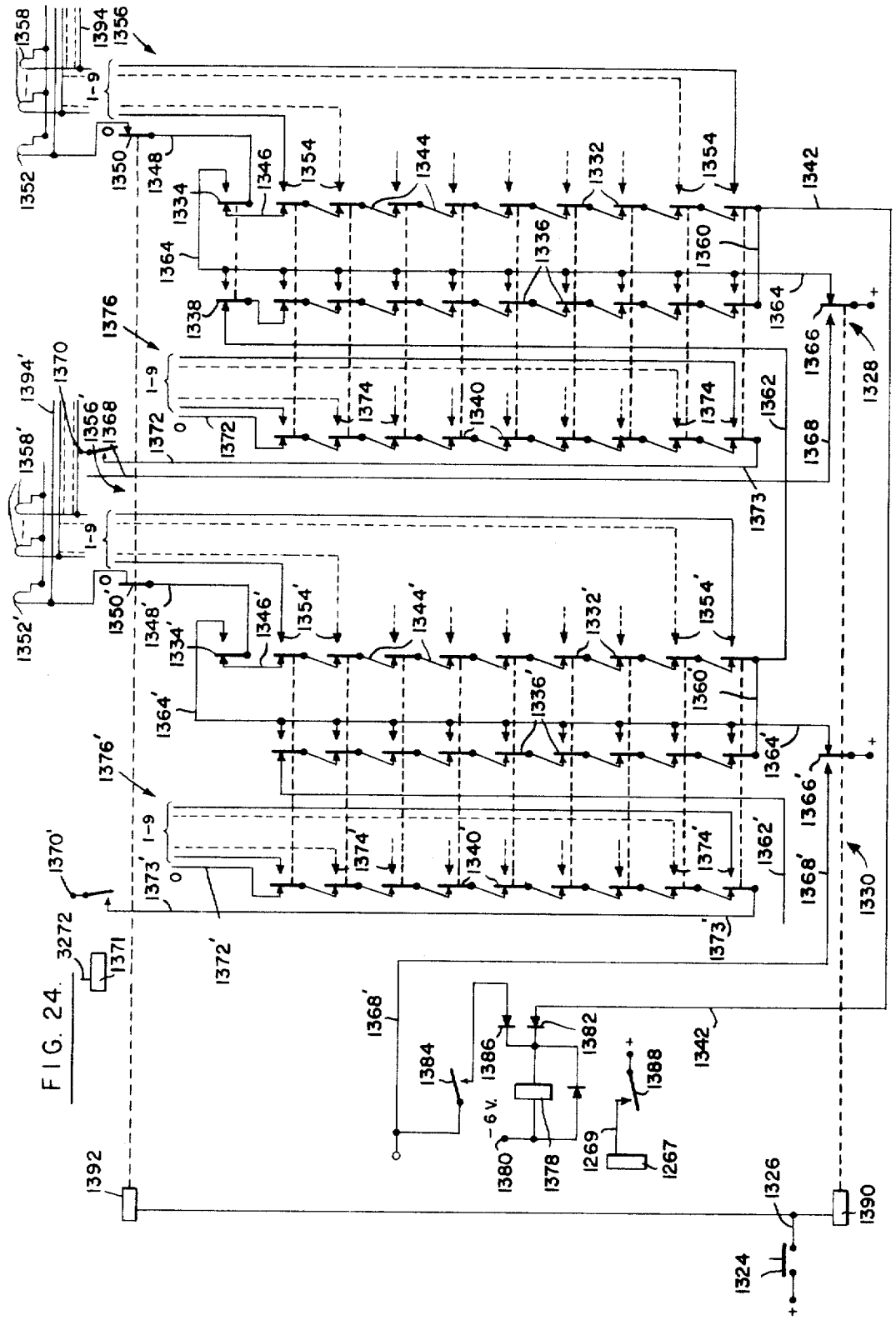

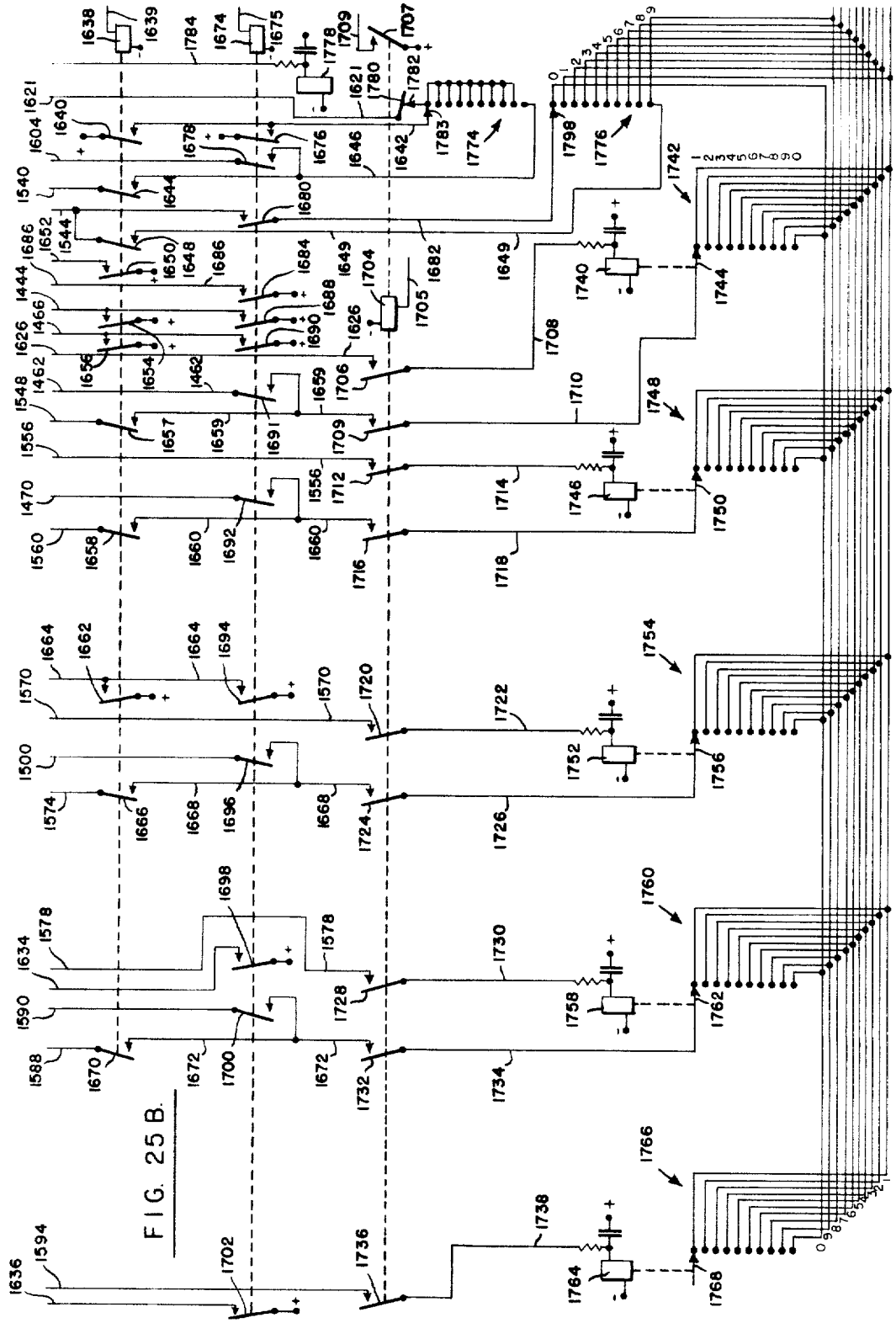

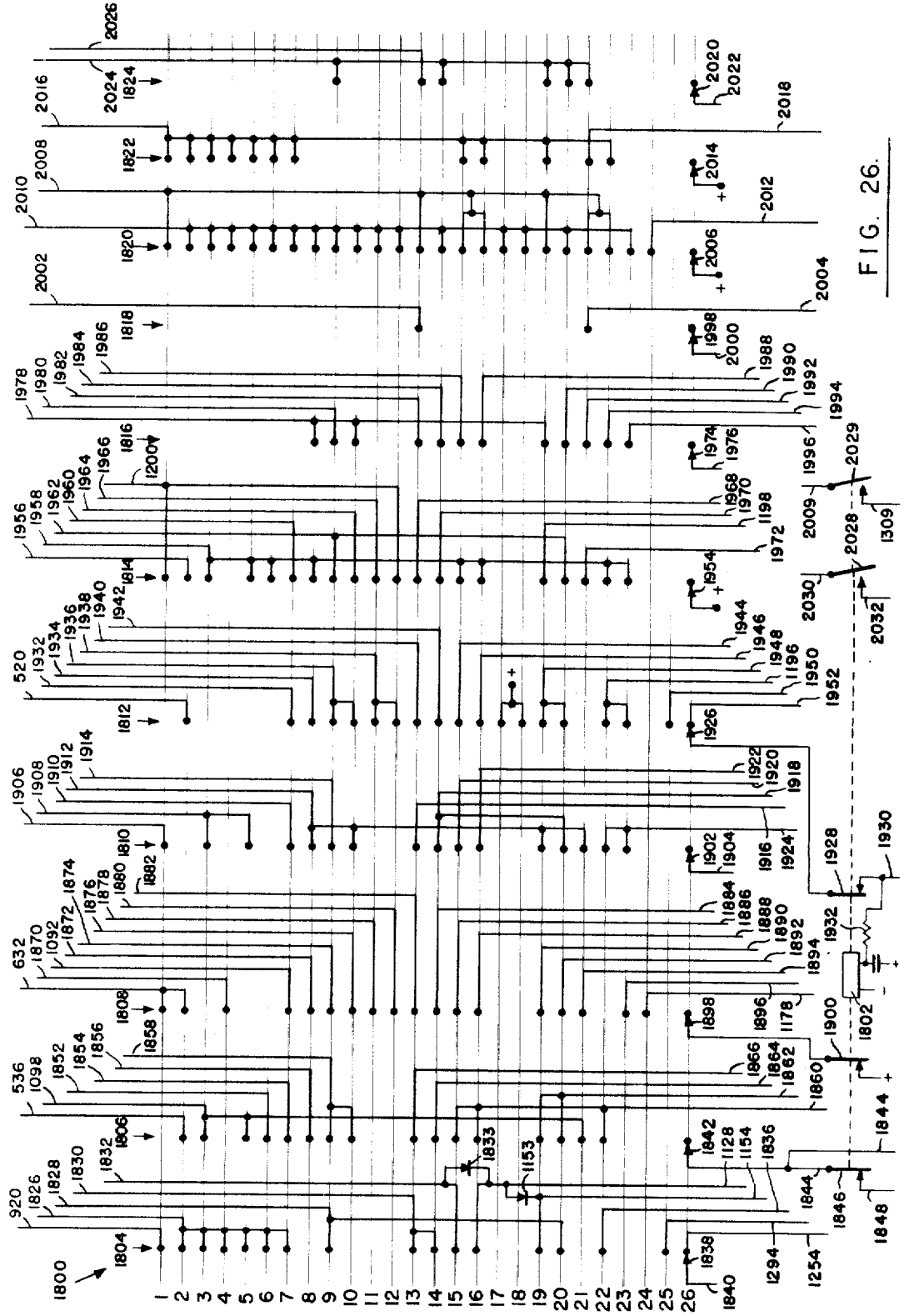

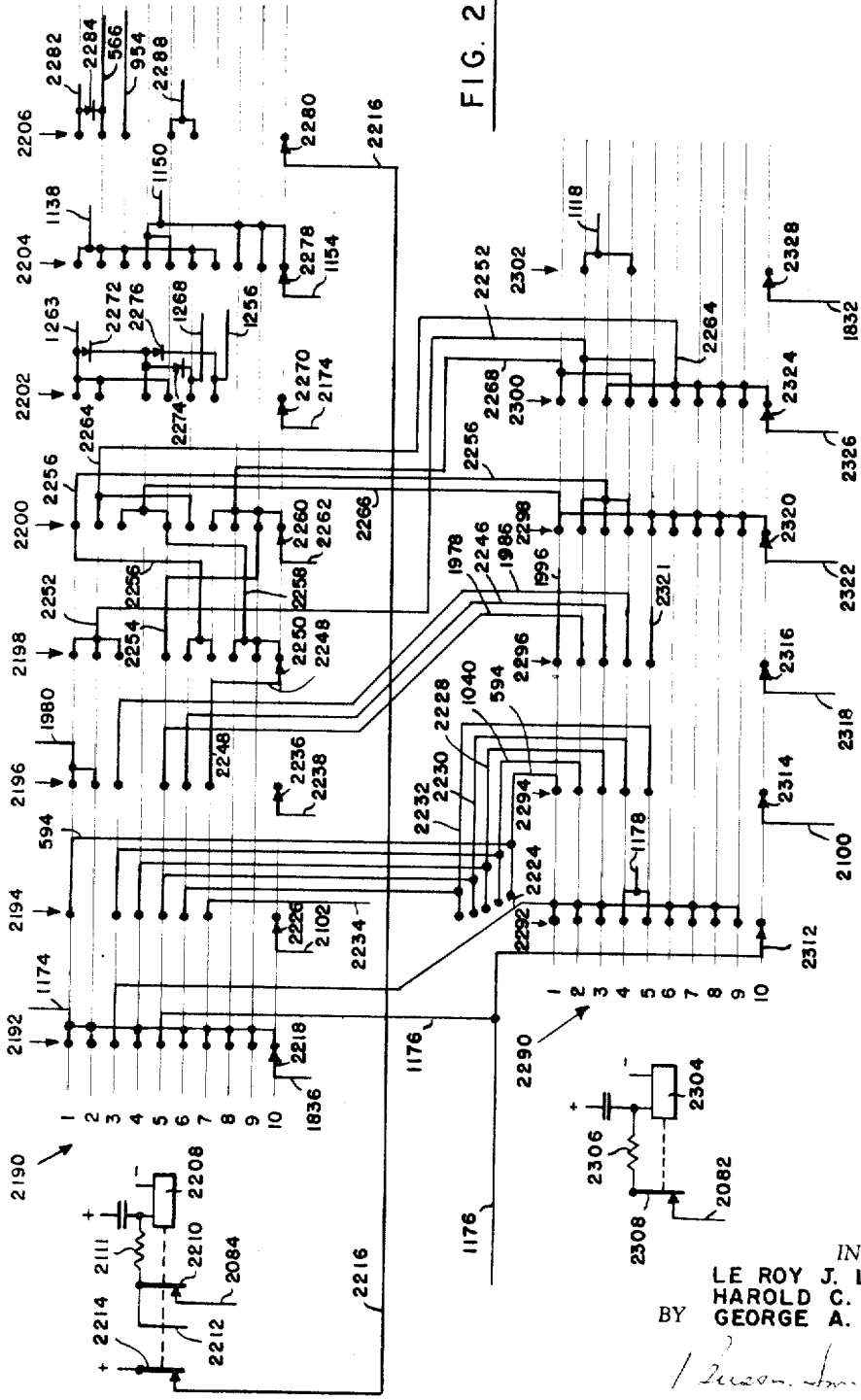

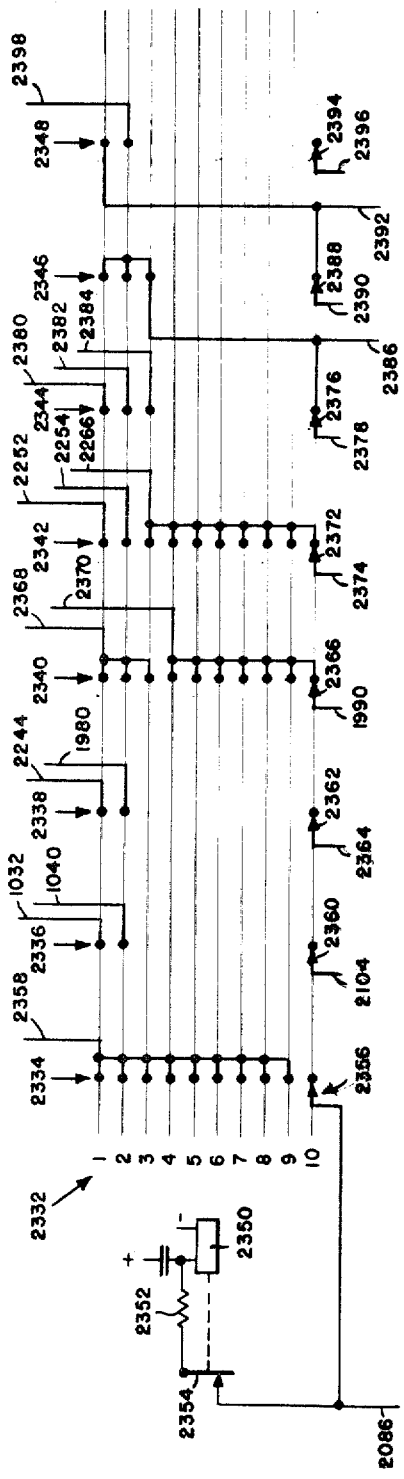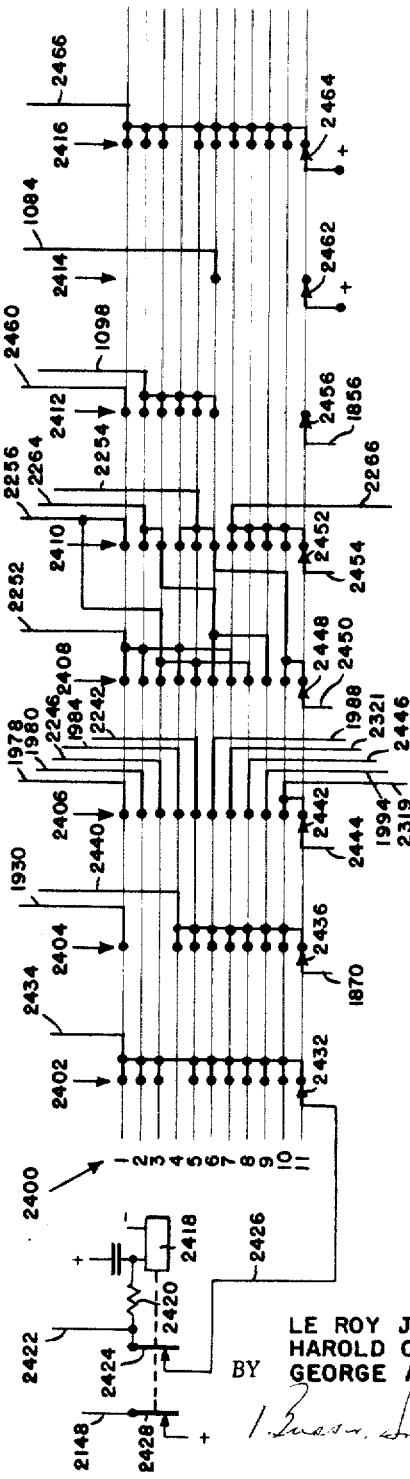

Aug. 8, 1967   LE ROY J. LANGE ETAL   3,335,407
APPARATUS FOR RECORDING SALES
Filed Aug. 20, 1962

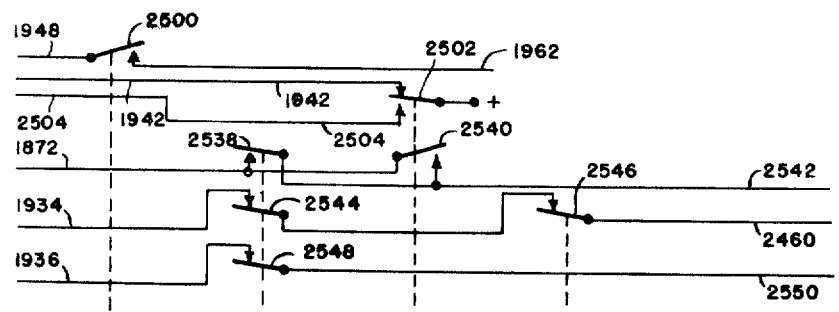
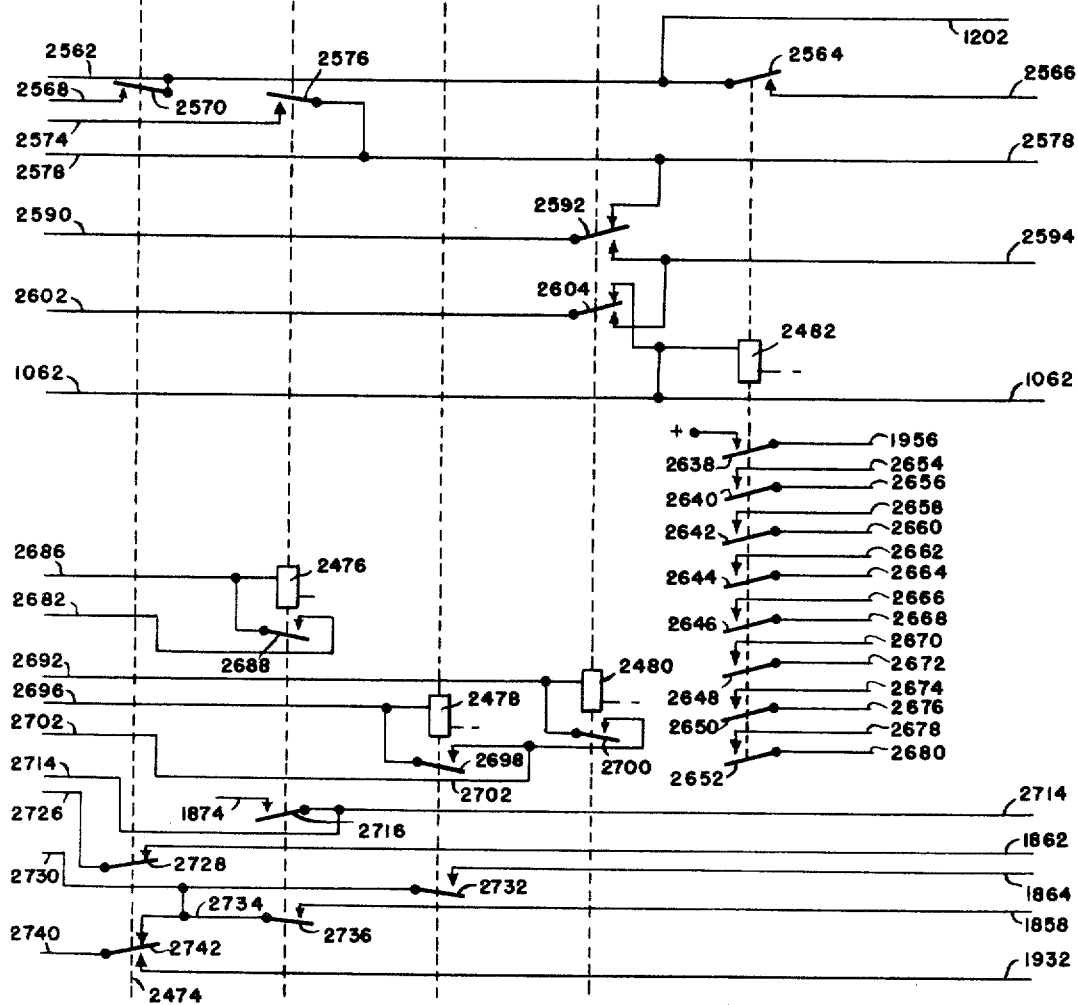
FIG. 31C.

Aug. 8, 1967 LE ROY J. LANGE ETAL 3,335,407
APPARATUS FOR RECORDING SALES
Filed Aug. 20, 1962 49 Sheets-Sheet

INVENTORS
LE ROY J. LANGE
HAROLD C. ROBINSON &
BY GEORGE A. GROTH

ATTORNEYS

INVENTORS
LE ROY J. LANGE
HAROLD C. ROBINSON &
BY GEORGE A. GROTH

ATTORNEYS

Aug. 8, 1967   LE ROY J. LANGE ETAL   3,335,407
APPARATUS FOR RECORDING SALES
Filed Aug. 20, 1962   40 Sheets-Sheet

INVENTORS
LE ROY J. LANGE
HAROLD C. ROBINSON &
BY  GEORGE A. GROTH

ATTORNEYS

Aug. 8, 1967  LE ROY J. LANGE ETAL  3,335,407
APPARATUS FOR RECORDING SALES
Filed Aug. 20, 1962  49 Sheets-Sheet 40

INVENTORS
LE ROY J. LANGE
HAROLD C. ROBINSON &
BY GEORGE A. GROTH

ATTORNEYS

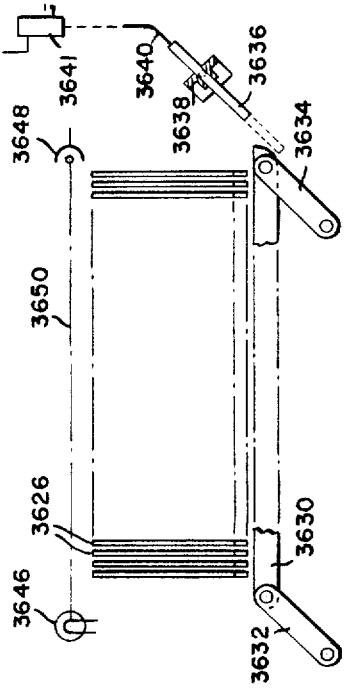
FIG. 50.
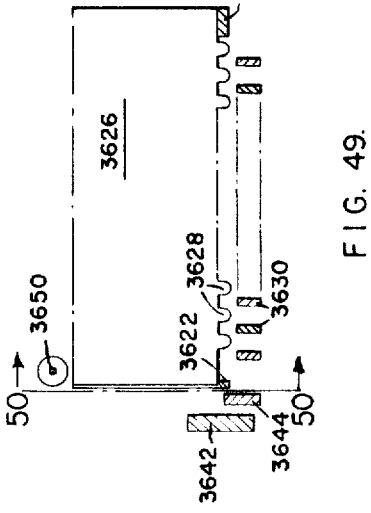
FIG. 49.
FIG. 48.
| 3620→ | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|
| 3618→ | S | | H | | R | | A | | | | | | | | | | | | | | | SUB | D1 |
| | PD | | | | | | | | | | | | | | | | | | | | | DIS | D2 |
| | CH | | | | | | | | | | | | | | | | | | | | | STX | E |
| | COD | | | | | | | | | | | | | | | | | | | | | FTX | |
| | LAY | | | | | | | | | | | | | | | | | | | | | SH | |
| | PMT | | | | | | | | | | | | | | | | | | | | | ALT | GW |
| | CO | | | | | | | | | | | | | | | | | | | | | TOT | BAL |
| | | | | | | | | | | | | | | | | | | | | | | DEP | VAL |
| | | | | | | | | | | | | | | | | | | | | | | AT | |
| | | | T | | | | | | | | | | | | | | | | | | | CG | |
| | REJ | | | | | | | | | | | | | | | | | | | | | VOID | REJ |
| | | — | 2 | 3 | 4 | 5 | 6 | 7 | 8 | 9 | 0 | | | | | | | | | | | |
| | | | 2 | 3 | 4 | 5 | 6 | 7 | 8 | 9 | 0 | — | 2 | 3 | 4 | 5 | 6 | 7 | 8 | 9 | 0 | | |
| | Type of Transaction | | Item | Dept | | Class | | | Quantity | | | Unit Price | | | | Extended Amount | | | | | Code | Code |
INVENTORS
LE ROY J. LANGE
HAROLD C. ROBINSON &
BY GEORGE A. GROTH
ATTORNEYS

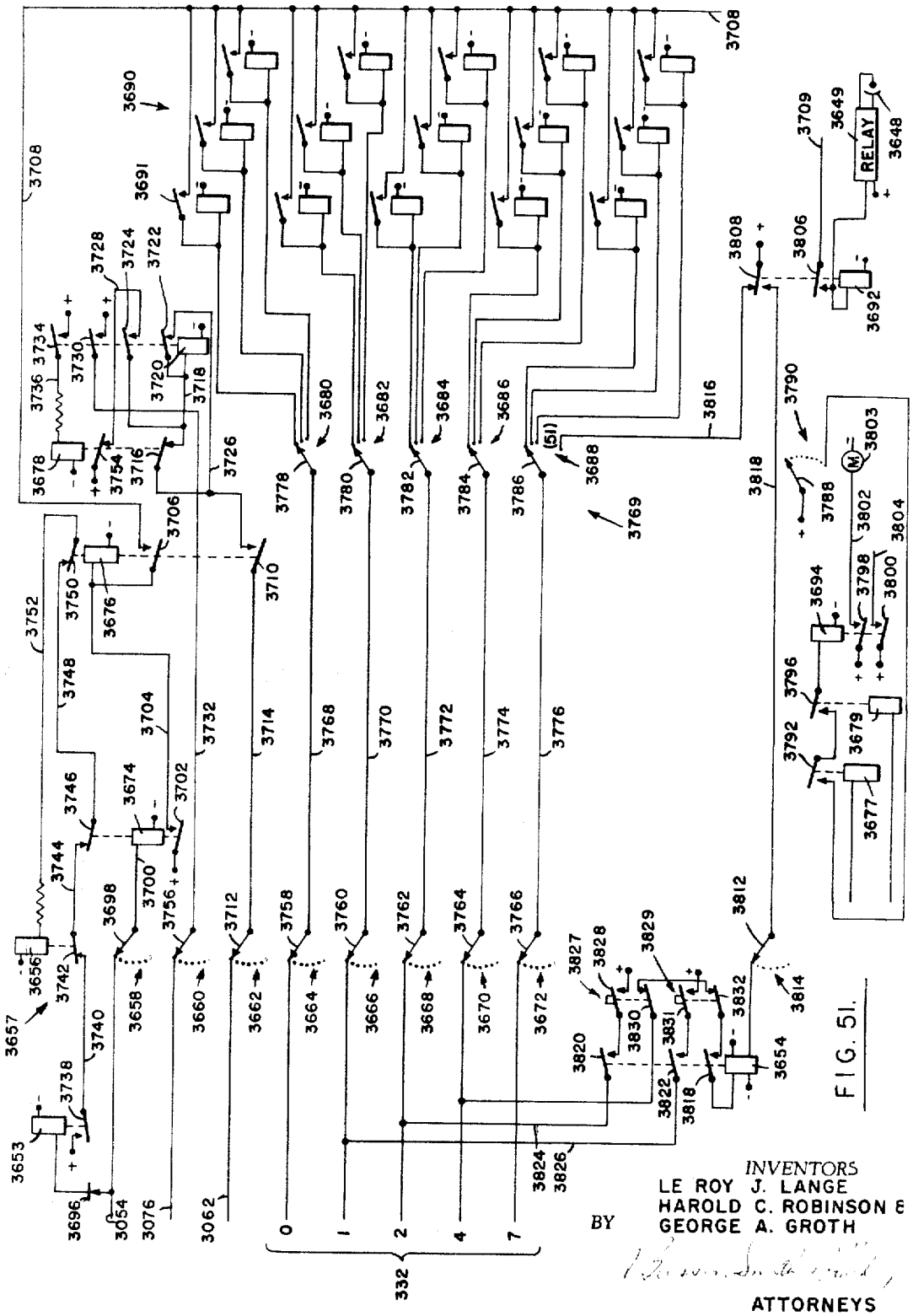

| Sequence Switch 1800 | Line Switch 2040 | Instruction | Operation |
|---|---|---|---|
| 26 | 11 | "Insert sales slip and tokens" | |
| 1 | | "Sales No" | Entry from number keys. Bypassed if clerks token used. |
| 2 | | "Cash" "Charge" "C.O.D." "Layaway" "Payment" | If no token used, selection is of any. If customer token used, but not merchandise token, selection is of "Charge" or "Payment". Bypassed if both customer and merchandise tokens used. |
| | 1 | "Take" "Send" "Hold" "Return" "Adjust" | If "Cash" or "Charge", select any If "C.O.D.", select "Send" If "Layaway" select "Send" "Return" or "Adjust" Bypassed if "Payment". |
| | 2 | "Customer or Layaway No" | Entry from number keys. Bypassed if customer's token used. Token reader operates. |
| Steps independently 3 to 7 | 3 | "Department, Class" | Entry from number keys. Bypassed if merchandise token used. |
| Printing | 4 | "Mdse. No." | Enter from number keys. Bypassed if merchandise token used. |
| | 5 | "Quantity Multiply" "Quantity Spec. Price" | Enter from number keys and select category. |
| | 6 | "Unit Price" "Extented Amount" | If "Quantity Special Price" selected, "Unit Price" not displayed and unit price not read from tag. If merchandise tag used, "Unit Price" not displayed. |

FIG. 53A.

| | | | |
|---|---|---|---|
| ↓<br>↓<br>7<br>(Recycle 3 to 7 if multiple items.) | 7 | "Line Reset"<br>"Emp. 10"<br>"Emp. 20"<br>"Federal Tax"<br>"Manual Fed Tax"<br>"Next Item"<br>"State Tax"<br>"Tax Exempt" | "Line Reset" operated if error was made. Computation made upon selection of discount. |
| | 8 | | If "Federal Tax" selected, automatic calculation. If special federal tax, entry from numercial keys. |
| | 9 | | If "Next Item" depressed, switch 1800 re cycled to 3 and switch 2040 to 3 for repitition for another item. If final item is entered select "State Tax" or "Tax Exempt". Tax compution made. Printing and transmission to central unit. |
| 8 | Inactive<br>↓<br>11 | | Prints sub. total if more than one item. |
| 9 | | | Prints any discount and subtracts from subtotal. |
| 10 | | | If discount prints new subtotal. |
| 11, 12, 13 | | | Calculate, print and add state tax. |
| 14 | | | Print federal tax and add to subtotal. |
| 15 | | "Ship Charge"<br>"Ateration Charge"<br>"Amount of Deposit or Payment"<br>"Total" | If "Send" was selected entry from number keys, print and add shipping charges to subtotal. Bypassed if "Send" not selected. |
| 16 | | | Entry from number keys, if required. |

FIG. 53B.

| | | |
|---|---|---|
| 17, 18 | | Not used. |
| 19 | | "Amt. of Deposit or Payment" illuminated only if "C.O.D.", "Layaway" or "Payment" was selected. Entry from number keys. Total printed if "Total" selected. |
| 20 | | Print deposit or payment, if any. |
| 21 | | Print total, or balance if deposit was made. Transmit all information not previously transmitted. |
| 22 | "Amount Tendered" "No amount tendered" | Only illuminated if "Cash", "Payment" or "Amt. of Deposit or Payment" was previously selected. Entry from number keys. Printed. |
| 23 | | Calculate and print charge. |
| 24 | | Restores parts to normal. |
| 25 | "Remove Sales Slip and Tokens" | Operator removes sales slip and tokens if any. This steps switch 1800 to 26. |

FIG. 53C.

INVENTORS
LE ROY J. LANGE
HAROLD C. ROBINSON &
BY GEORGE A. GROTH

ATTORNEYS

United States Patent Office 3,335,407
Patented Aug. 8, 1967

3,335,407
APPARATUS FOR RECORDING SALES
Le Roy J. Lange, Baltimore County, and Harold C. Robinson and George A. Groth, Towson, Md., assignors to Universal Controls Inc., Towson, Md., a corporation of Maryland
Filed Aug. 20, 1962, Ser. No. 218,064
27 Claims. (Cl. 340—172.5)

This invention relates to apparatus for recording transactions, being particularly adapted for use in department stores involving numerous points of sale. Transactions other than sales may, however, be recorded, involving such matters as handling of materials for shipment or assembly, or the like. But the invention is primarily of use in department stores, and such use will be specifically described.

In brief, the apparatus involves the following:

At each point of sale, by which is meant some location serving as the sales center of a localized department, there is located an electromechanical mechanism, hereinafter referred to as a point of sale machine, which is subject to manipulation by a clerk to effect the recording of pertinent data concerning each sale and to print a multiple-copy sales slip. Each such machine may transmit, and desirably does transmit, information to a central information-receiving apparatus at which permanent records pertaining to each sale are produced. This central apparatus, in accordance with the invention, may include means for printing an immediately visible record of each sale together with a running accumulation of the total sales of the store or of a plurality of stores constituting a store system. The central apparatus, furthermore, may produce other permanent records which may be separately and later translated into billing and inventory records, the last being accomplished by way of production of punched cards, punched tapes, magnetic records, or the like.

Each point of sale machine, furthermore, is arranged to transmit signals to an account "watch list" whenever a credit sale is involved. This watch list may comprise cards individually identified with particular or questionable accounts, or, alternatively may consist of other types of memory devices, and from this watch list signals may be returned to the point of sale machine at which the transaction is being carried out to halt the transaction in the event that the credit of the purchaser is subject to question. The watch list mechanism signals an attendant in the credit department so that by phone there may be discussed with the clerk at the point of sale the matter of extension of credit or rectification of the situation requiring correction.

The point of sale machine is particularly noteworthy in its manner of operation. In a preferred form of the invention disclosed herein, there are provided three elements particularly concerned with the progress of a transaction.

One of these elements is a card or token reader which is capable of reading data from a plurality of tokens as follows:

First, it will read the identification of a customer desiring to utilize a credit card either for the purpose of making a credit purchase or for the purpose of making a payment on account to be credited to the customer's account. The credit card thus used may be of a type in part conventional in carrying, as by embossing, the customer's name, address and account number so that the card may be later used in the transaction to stamp these matters on a multiple sales slip. In accordance with the invention, however, the card is specially provided with coded holes detectable by the card reader to produce electrical signals identifying the account, which signals are temporarily recorded in the point of sale machine to be transmitted to the watch list mechanism and to the central apparatus, as well as to be printed on the sales slip in the point of sale machine itself.

Second, the card reader is adapted to read a portion of a merchandise tag. In accordance with the preferred system each article to be sold desirably carries attached thereto a two-part tag, one part being attached to the goods so as to accompany the goods when delivered to the purchaser and the other part being removable from the first part, as by tearing along a weakened line, so as to be insertible in the card reader. These tags, because of the fact that their respective parts are generally subject, at most, to a single use, may be made of cardboard so as to be quite inexpensive. Each part of the tag is provided, in the same fashion as the customer's credit card, with coded holes which, in general, though not necessarily, may be identical on both parts of the tag. The information thus coded may be as complete as the particular store desires. Generally speaking, the information would include such matters as department and class, a number identifying the particular merchandise in accordance with some system in which the number might well contain in its own coding considerable identification pertinent to inventory, the unit price of the article, together with other information indicative, for example, that the article is sold free of tax, or the like. In carrying out the sales transaction, the free part of the tag is removed and inserted into the card reader wherein its information is read, with temporary recording of the information in the point of sale machine for printing of the sales slip and transmission to the central apparatus wherein the sale of the article may not only be recorded for visual identification but also permanently reproducibly recorded for billing, if desired, or for purposes of inventory, as by the production of a punched card representing the removal of the article from stock. Furthermore, the identification of the article thus transmitted may also be referred to an "availability" watch list particularly if the article is of a type which would not be delivered directly from stock at the point of sale but would be delivered from a warehouse to a customer. The purpose of such a watch list is to determine immediately at the time of sale whether the article is available for prompt delivery, the watch list being capable of signalling back to the point of sale if the stock of the article is exhausted, or even give a warning if the article so sold is the last available so that the sales clerk may take prompt notice of that fact in the event that another customer desires the same article.

At this point there may be noted the purpose of the coded tag remaining with the article when delivered. In case of return for credit or exchange the customer may bring back the article with the remaining part of the tag and by insertion of this in the point of sale card reader a proper credit transaction may be effected identifying the returned article with suitable recording of the return transaction and correction of inventory records.

Third, the card reader may, if desired, read a clerk's token identifying the clerk involved in a sale or return transaction or payment on account. For somewhat greater generality in description, while this clerk's token will be referred to, together with provision for its reading, the system as herein disclosed will assume that in a particular store clerk's tokens are not actually used but that the identification of the clerk will be effected by manipulation of a numerical keyboard. If a clerk's token is used its coded holes will be read in the same fashion as the coded holes of a customer's credit card with appropriate provision for temporary recording in the point of sale machine, printing on the sales slip, and transmission to the central apparatus.

As will shortly appear, the point of sale machine may operate with any of the tokens (cards or tags) referred to missing, the corresponding data being enterable by keyboard manipulation.

The point of sale machine is provided with a keyboard comprising three sets of keys. One of these sets, the purpose of which will become more apparent hereafter, relate to special actions and need not be here described. Keys of a second set are numerical in nature and are utilized for the purpose of registering numerical matters of numerous types as will be apparent immediately.

Keys of the third set are particularly noteworthy but may obviously take various forms and it will be most advantageous to describe at this point their functions rather than their particular arrangement:

What they are designed to effect from this general standpoint is the presentation of directions to the sales clerk and questions to be "answered" by the sales clerk. Depending on the "answer" to each question (involving in some cases compliance in one way or another with a direction) another question is asked, which subsequent question may depend on the answer to the preceding one. In effect, this amounts to guiding a clerk directly and unavoidably to supply all pertinent information and perform all pertinent actions with respect to each transaction no matter how divergent the transaction may be from other possible transactions. Answering is unavoidable in the sense that operation of the machine cannot proceed without an answer. An illustration of the system involved will be informative, and while as will appear hereafter the system may take various physical forms, it will be described as specifically hereafter shown as involving a set of keys which may be selectively illuminated individually or in groups. The associated devices are so arranged that unless a key of an illuminated group is depressed the transaction cannot proceed. For example, at the beginning of a transaction a single key may be illuminated carrying a direction such as "insert sales slip and tokens." (As to the latter, the key may be regarded as asking the question: "Are any tokens to be used?") If a multiple sales slip is properly inserted into the machine, the illumination of this key will cease and there will immediately light up a second key reading, for example, "sales number." This last assumes, as previously stated, that the clerk is not provided with a token to insert in the card reader. This key cannot be depressed until the clerk answers the question which is, effectively, "What is your number?" The answer is given by depressing one or more keys of the keyboard. When the full required complement of numerical keys are depressed, the clerk may then depress the illuminated key whereupon its light will go out and keys, now of a multiple set, will be illuminated.

The keys of this last mentioned set may read, for example, "Cash," "Charge," "C.O.D.," "Layaway," "Payment." The question obviously asked at this time is, "What kind of a transaction is this?" However, the full set of these keys may possibly not be illuminated. For example, if a customer's credit card has been inserted (having been read in the first step of operation of the machine) it may be assumed that the transaction involved is either a charge sale or a payment on account, and of the group of keys referred to there would then be illuminated only the keys designated "charge" and "payment," the answer having already been partially given as to the type of transaction by the mere insertion of the credit card eliminating the ideas of cash, C.O.D. or layaway transactions. This then reduces the possible answers to the question as to the nature of the transaction to only two.

Resuming description of the sequence, the next question that may be asked by the machine would be the nature of the transaction with respect to the goods, this question being effectively asked by calling for selection of an answer by depression of a key of a group reading, for example, "take," "send," "return," "adjust."

Assuming, the answer to have been given by depression of one of the illuminated keys, another question may be asked, but this question will depend upon the information already received by the machine. If no credit card was inserted, but the charge key had been depressed, there would then be illuminated a key which, conveniently, may be common to two different types of transactions, this key being marked "customer or layaway number." If the charge or payment key was depressed this would be asking for the customer's charge number. Assuming that the customer in this case did not have his credit card with him, either from memory or by phone checking of the store's records the number could be obtained and entered in the numerical keyboard, whereupon the illuminated key could be depressed.

If the "layaway" key had been depressed, the question asked by the illuminated key would be the layaway number which would then be entered in the numerical keyboard followed by depression of the illuminated key. On the other hand, if a customer's credit card had been inserted and consequently either the illuminated charge key or the illuminated payment key had been depressed the key asking for an identification number would not be illuminated at all, but a further key or set of keys would be illuminated.

If the merchandise tag part was not inserted, for example if a merchandise tag was missing or damaged, the next question asked would be by illumination of a key reading "department-class." This would ask for the corresponding information numerically enterable. After numerical entry and depression of the key a further key would be illuminated reading "merchandise number," calling for the entry of the merchandise number. However, if a merchandise or article tag had been inserted and available for reading, these keys would not be illuminated at all.

As will appear in the detailed description a check of sufficiency of reading of any inserted token is made automatically by the machine, and if there is a failure of proper reading a "bad tag" key will be illuminated, calling, at the very beginning of the operation, for a check by the operator of the tokens inserted to determine if they were defective.

The foregoing will indicate the general aspects of this questioning procedure which will then continue as to questions as to the quantity of the articles, whether the article has a special price for quantity, its unit price (if not given by reading of a merchandise tag), matters of discount, taxes, shipping charges, alteration charges, amounts of deposits or payments, amounts tendered, or the like. The asking of these questions in each case depends upon whether they are pertinent to previously answered questions.

In brief, in a sequence only pertinent questions are asked, non-pertinent questions being bypassed so as not to impede the transaction or confuse the clerk. In short, the clerk is quite specifically directed to supply that information which is pertinent. If the information requires a numerical entry, the next question will not be asked until an entry on the numerical keyboard is made. In certain cases, as will be obvious from the above a question is answered merely by depression of one of the selective answer keys without the entry of numerical information, and the answer thus completed is followed by a next pertinent question.

The point of sale machine stores temporarily the information fed to it by the answers to the questions, holding this information so long as required. Upon the completion of the entry relative to a single type of article, that portion of the registry pertinent merely to that article is cleared, following sales slip printing and transmission to the central unit, while, however, the machine retains the basic information which would be pertinent to a second sale by the same clerk to the same customer, which basic information is also printed and transmitted.

The point of sale machine, furthermore, makes the necessary computations of various monetary quantities. For example, if several similar articles are simultaneously sold it will multiply the unit price by the number. On the other hand, if there is a special quantity price such a computation will be wiped out by the insertion of the special price. Calculations are also made to take care of discounts and taxes, the latter operations, in the case of state taxes particularly, involve in some instances fairly elaborate calculations as where no tax may be due on a sale amounting to less than a certain amount with percentage taxes on amounts in excess thereof.

As will be evident from the foregoing, the point of sale machine inherently involves the aspects of a cash register though permanent registration of the transactions is transmitted to the central apparatus rather than retained at the point of sale, this, of course, not being any disadvantage. But the point of sale machine may be self sufficient, operating then as a highly advantageous type of cash register in view of its facilitation of transactions as described above. A copy of the duplicate sales slip may constitute the store's record, though printing of the sales slip may be accompanied by simultaneous printing of a permanent tape record stored in the machine.

In accordance with the invention a single central apparatus, rapidly operating, may take care of the transactions at a large number of individual points of sale. To provide for this an information routing system is provided so that the central apparatus may properly receive information from the various point of sale machines without any appreciable delay, the delay always being negligible in comparison with the minimum time in which any transaction could be accomplished.

Where the term "keyboard" is used herein reference is intended to what is equivalent to a keyboard having a mechanical array of depressible keys; e.g., elements selective to produce predetermined operations but requiring no mechanical movement, operating instead by capacitance produced by approach of a finger or by minute current leakage to an operator through finger contact, or the like.

The general objects of the present invention may be stated to be the accomplishment of the various results heretofore described either singly, in various subcombinations, or in a complete combination.

Other detailed objects of the invention will become more readily understood upon reading the following description in conjunction with the accompanying drawings, in which:

FIGURE 18 is a diagram illustrating a progressing stepping switch involved in card reading together with associated elements;

FIGURE 20 is a schematic diagram of further control relays;

FIGURE 21 is a block diagram showing assembly components of the machine and which will also serve as an index of such components by references to other figures and numerical designations;

FIGURES 22A, 22B and 22C are associated schematic diagrams relating particularly to the program selecting keys;

FIGURE 24 is a schematic diagram pertaining to the numerical keys and numerical exhibiting means;

FIGURES 25A and 25B are, jointly, a schematic diagram of an addition-subtraction unit;

FIGURE 26 is a schematic diagram of a stepping switch hereinafter referred to as the "sequence stepping switch";

FIGURE 28 is a schematic diagram of a further pair of stepping switches;

FIGURES 29 and 30 are schematic diagrams of further stepping switches;

Figures 1, 52:
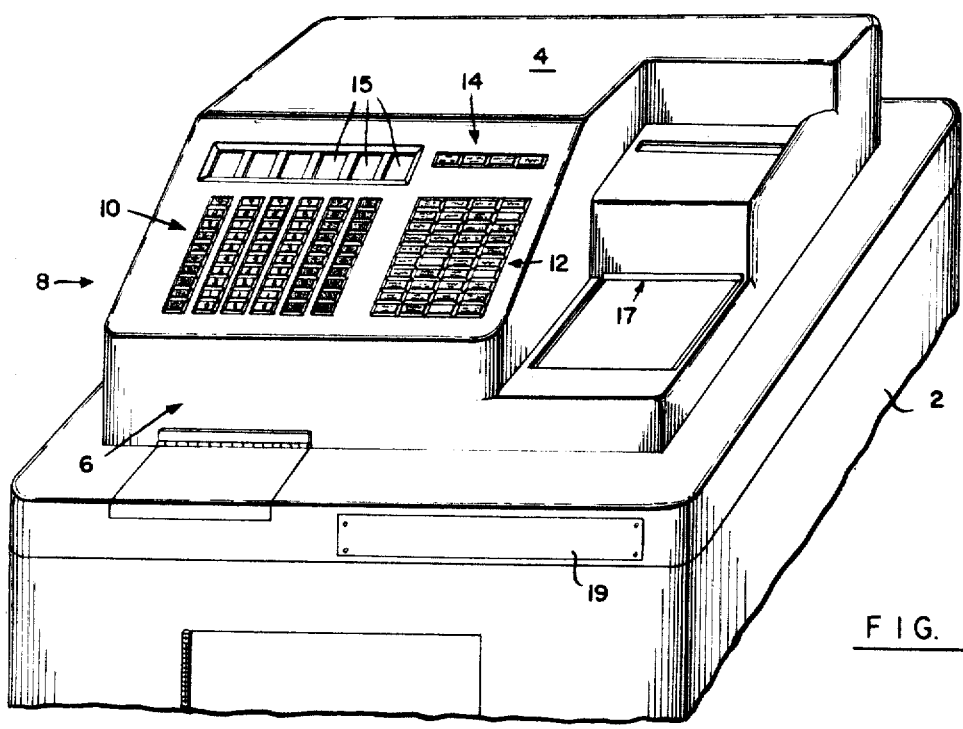
FIGURE 1 is a perspective view of the point of sale machine, the base portion being broken away since it has no mechanical significance, containing only electromechanical elements such as relays and their connections.
Figure 31A:
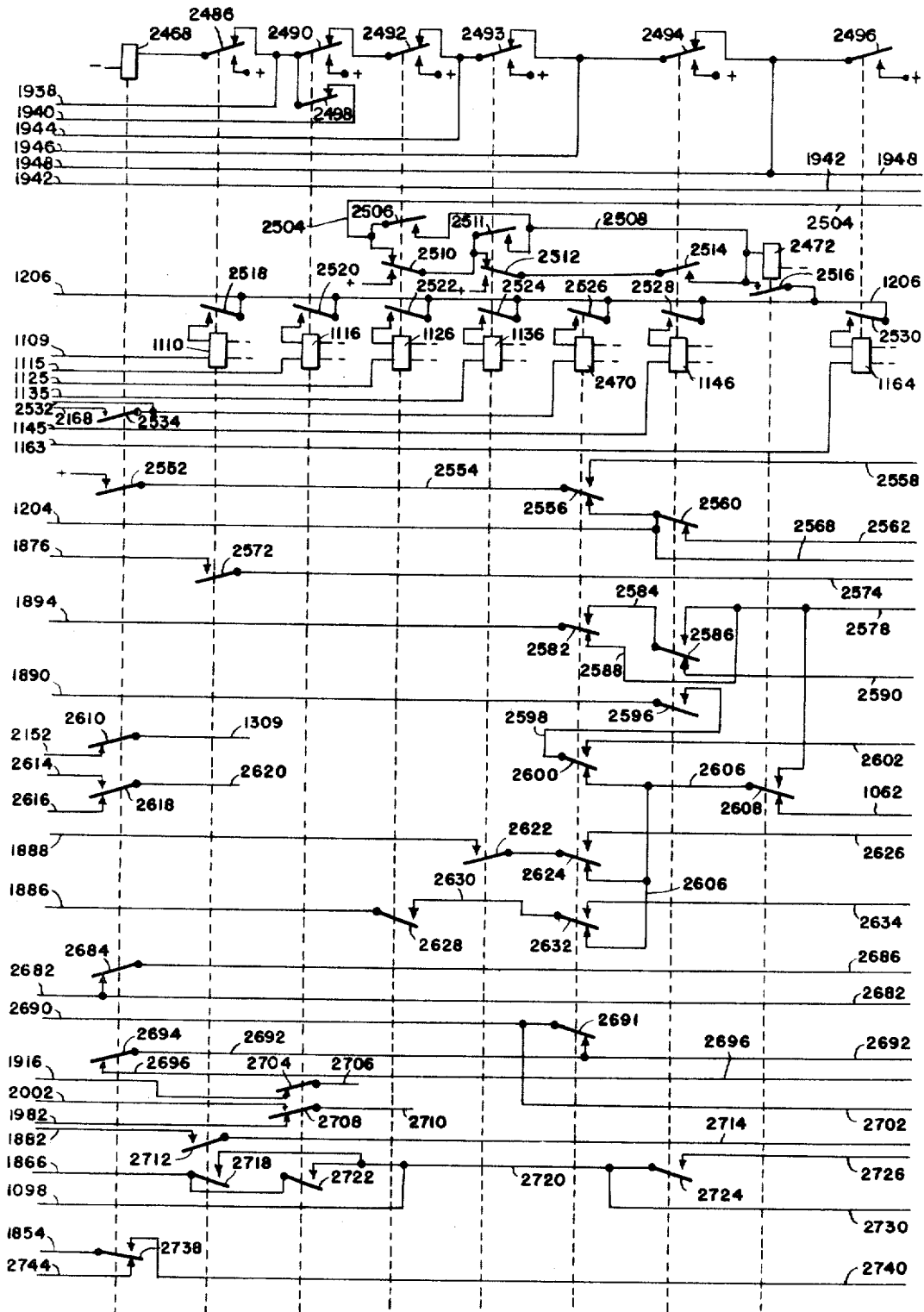
Figure 31B:
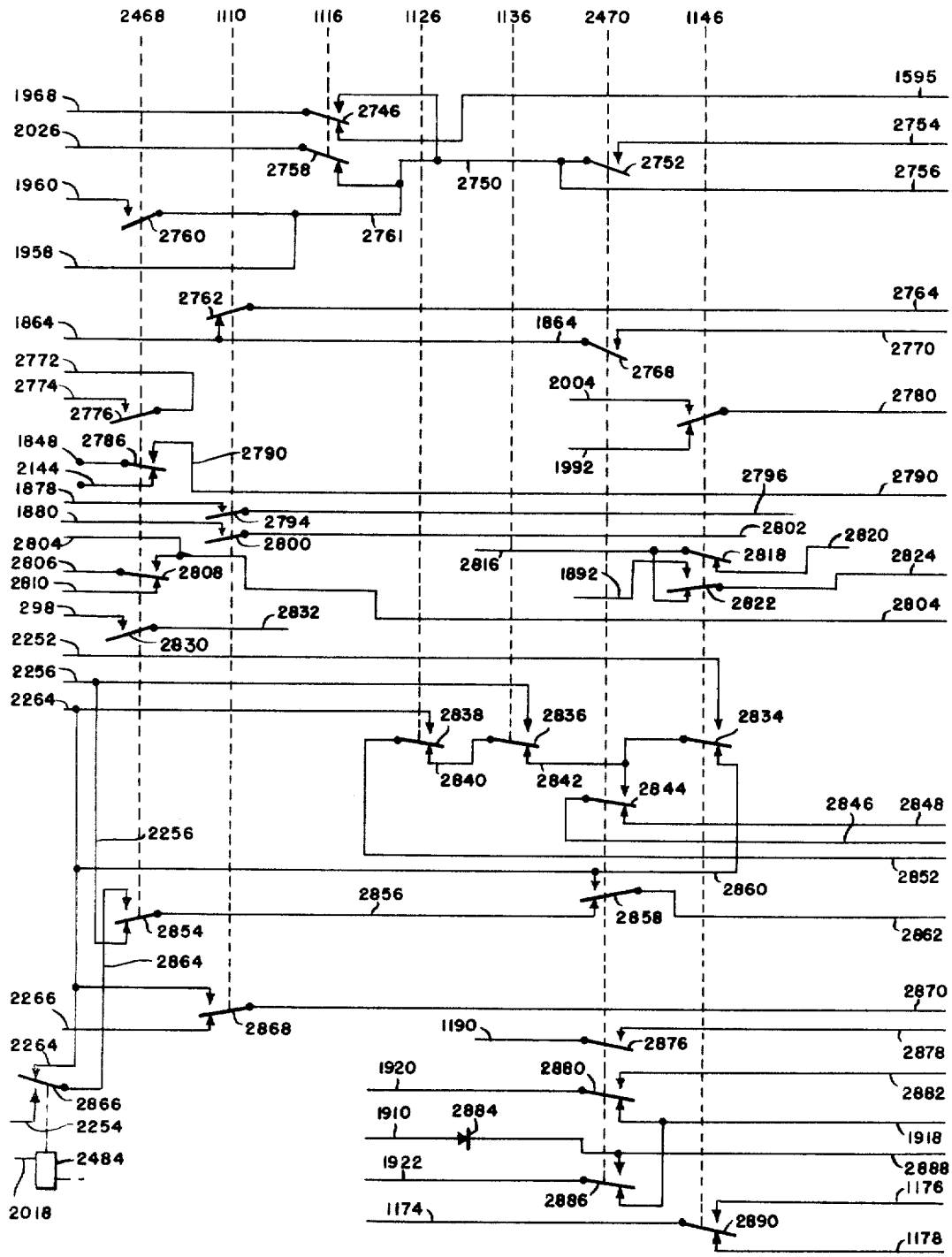
Figure 31D:
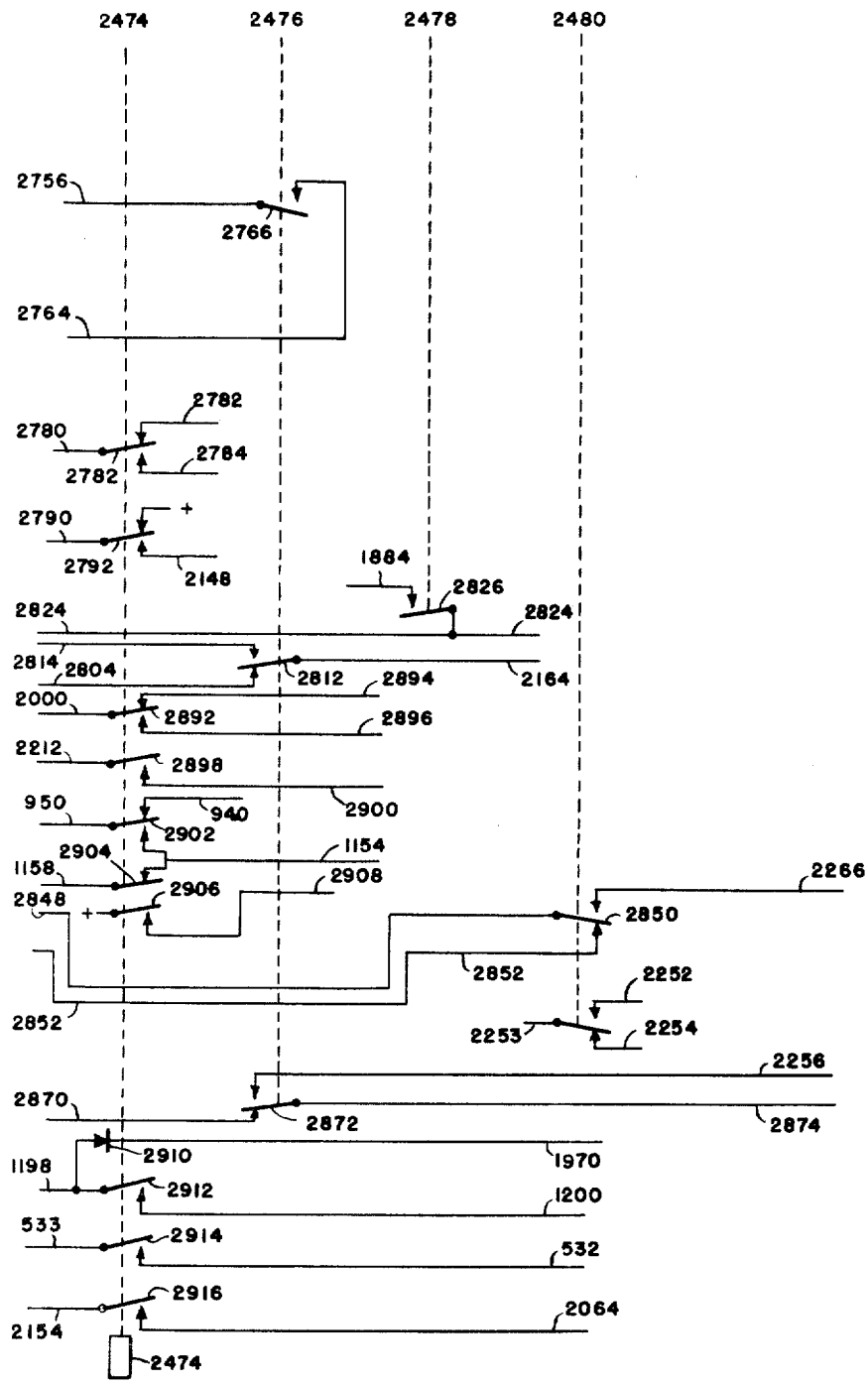
Figure 37:
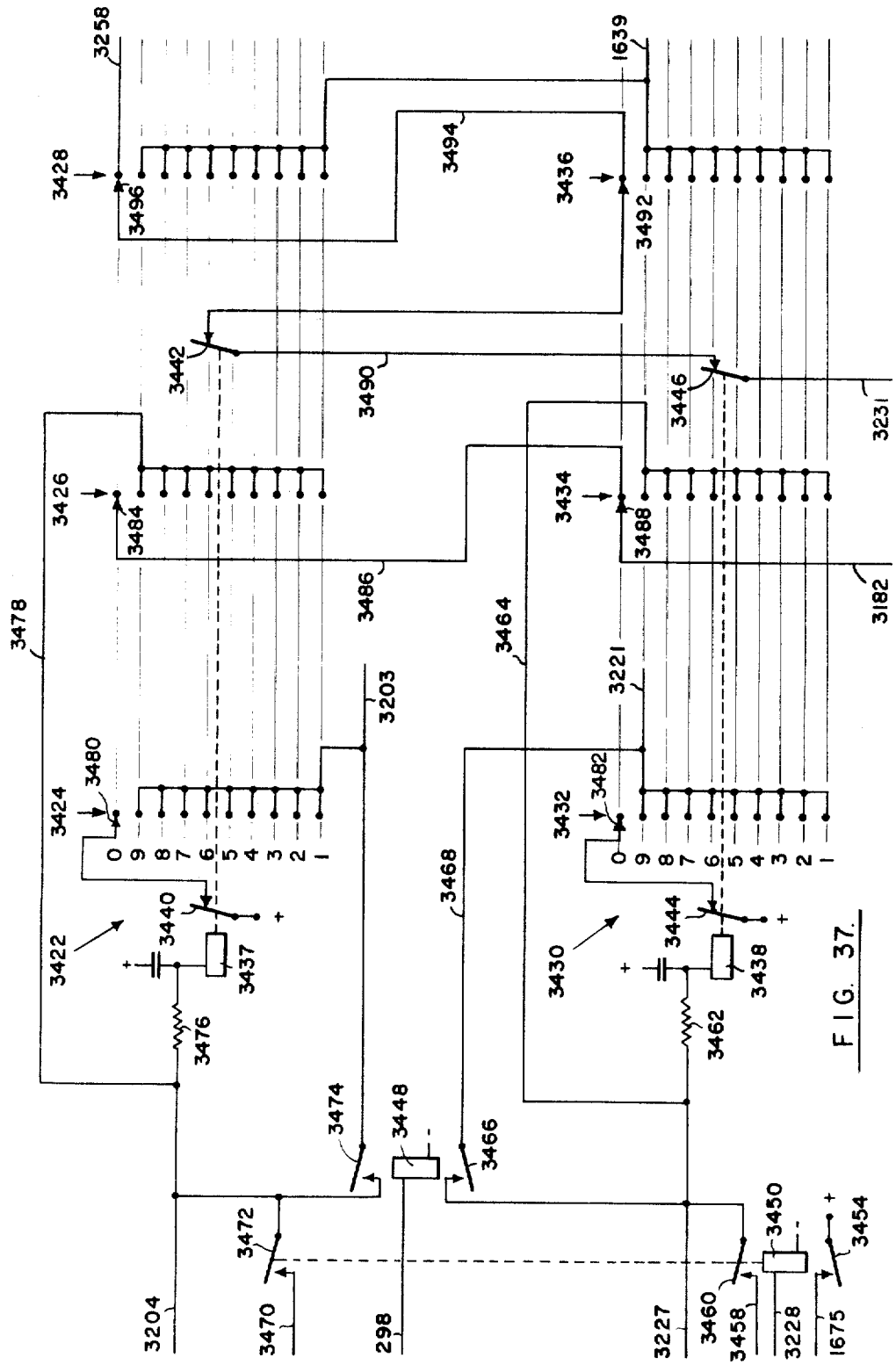
Figure 38:
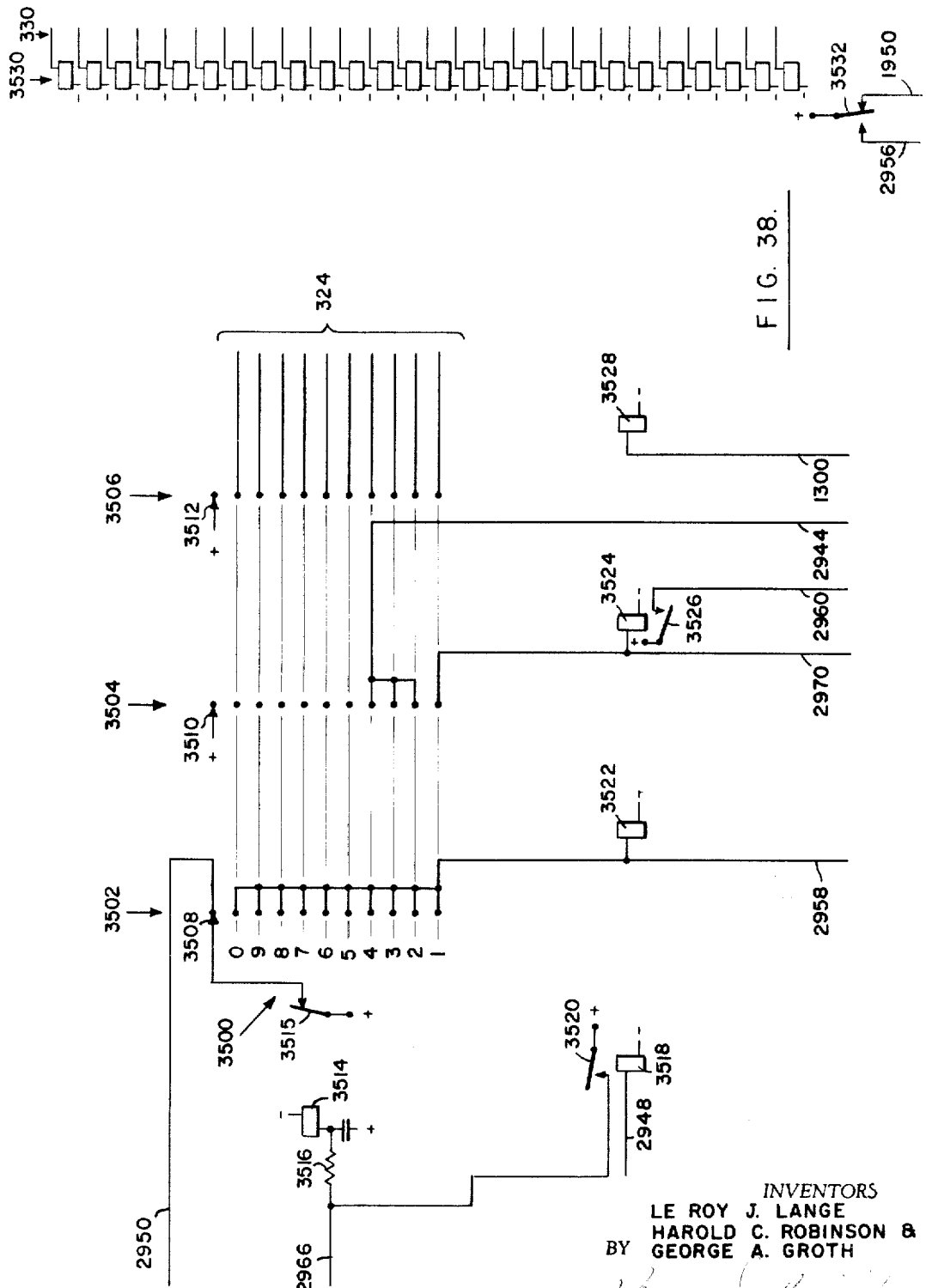
Figure 39:
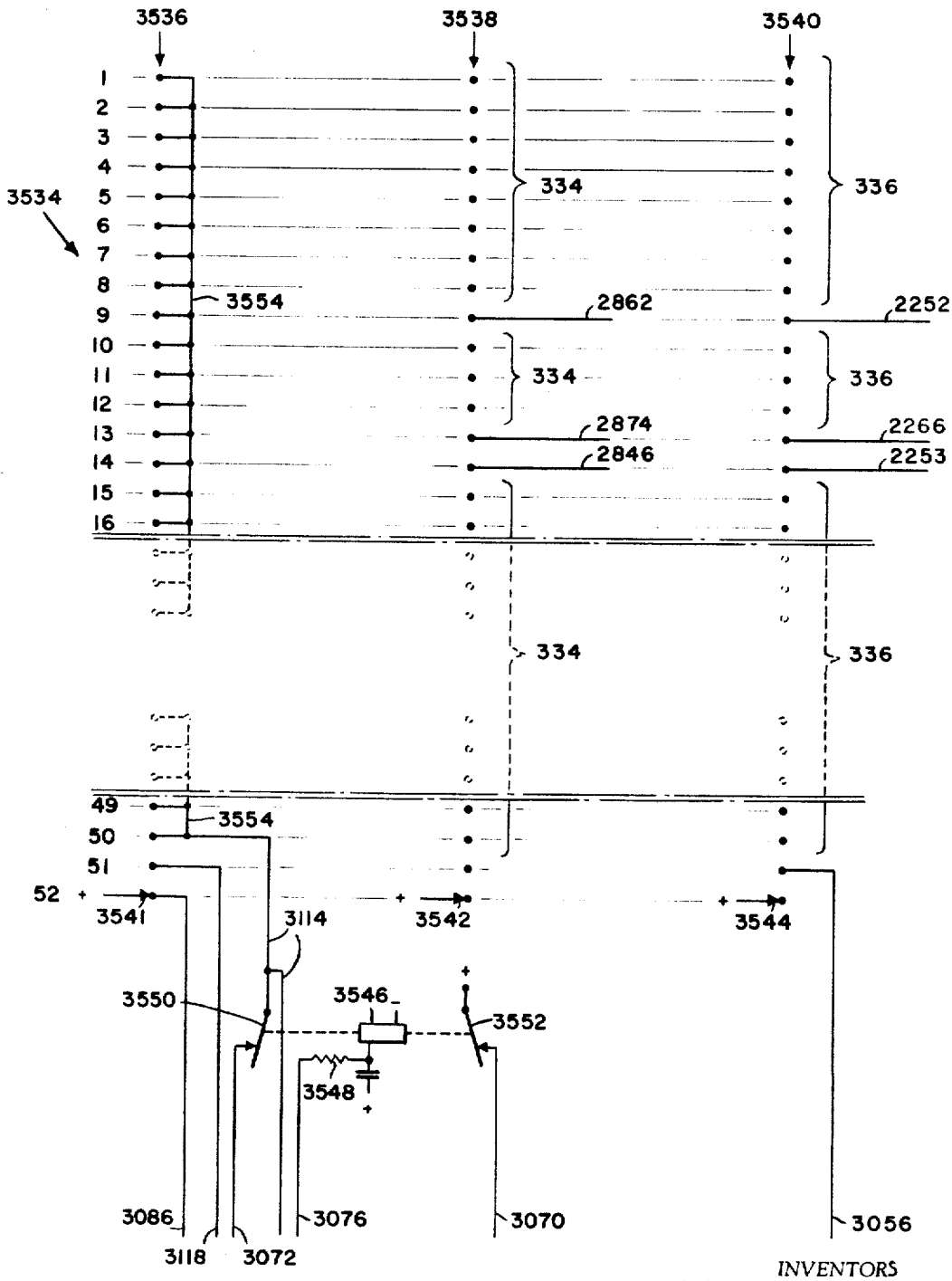
Figure 40:
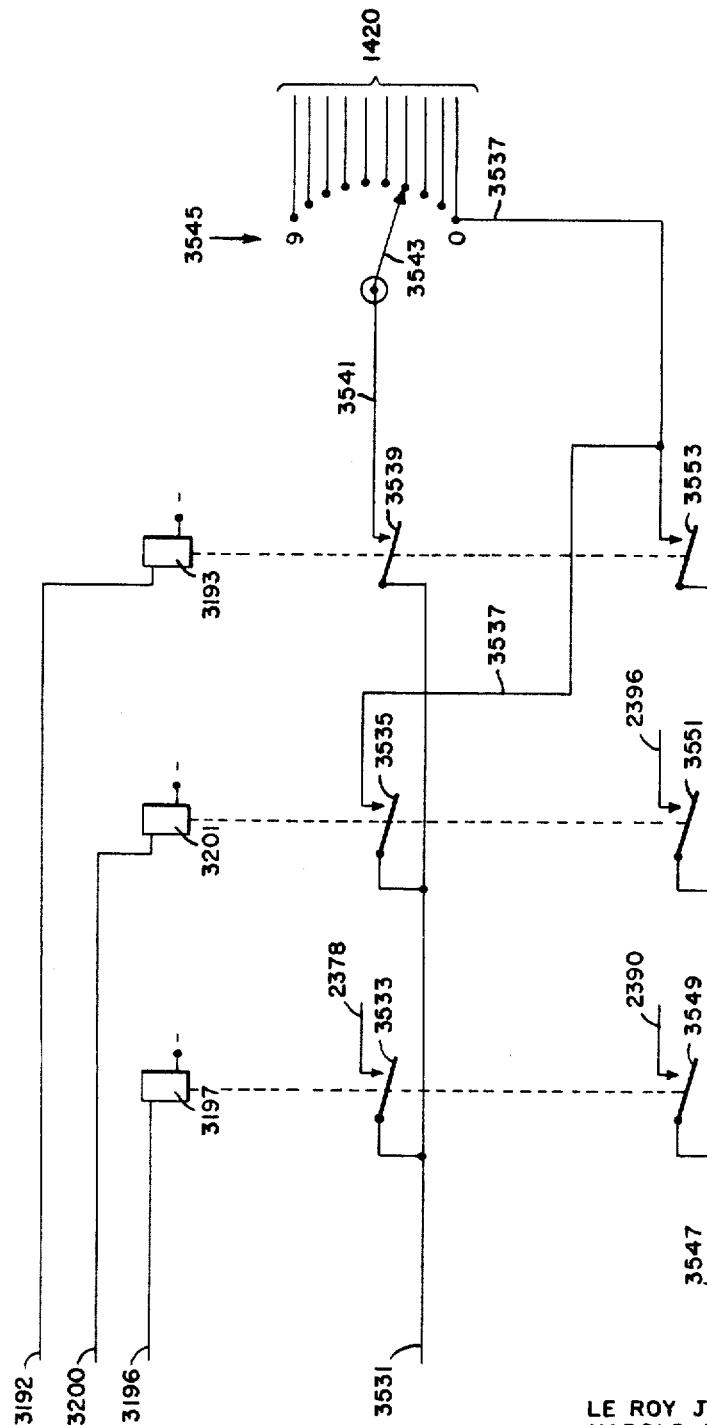
Figure 41:
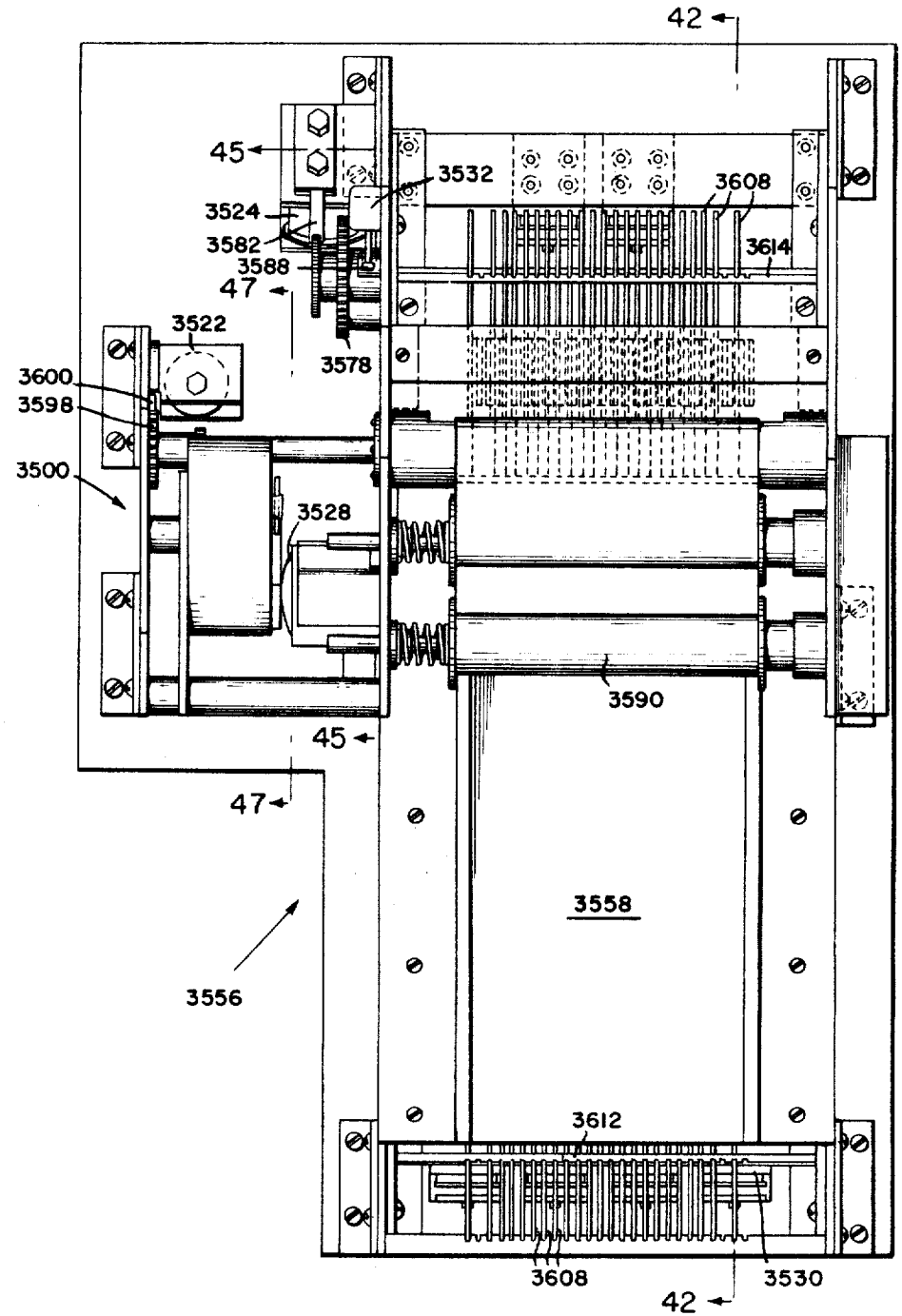
Figure 42:
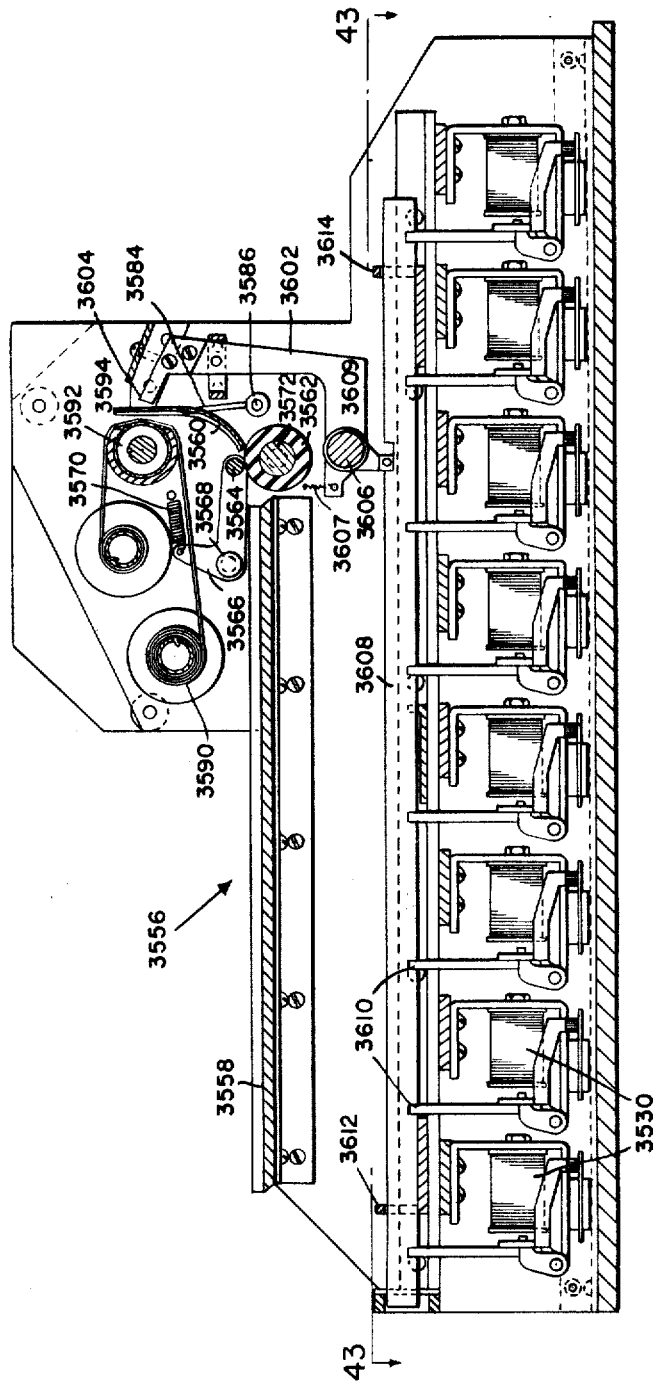
Figure 43:
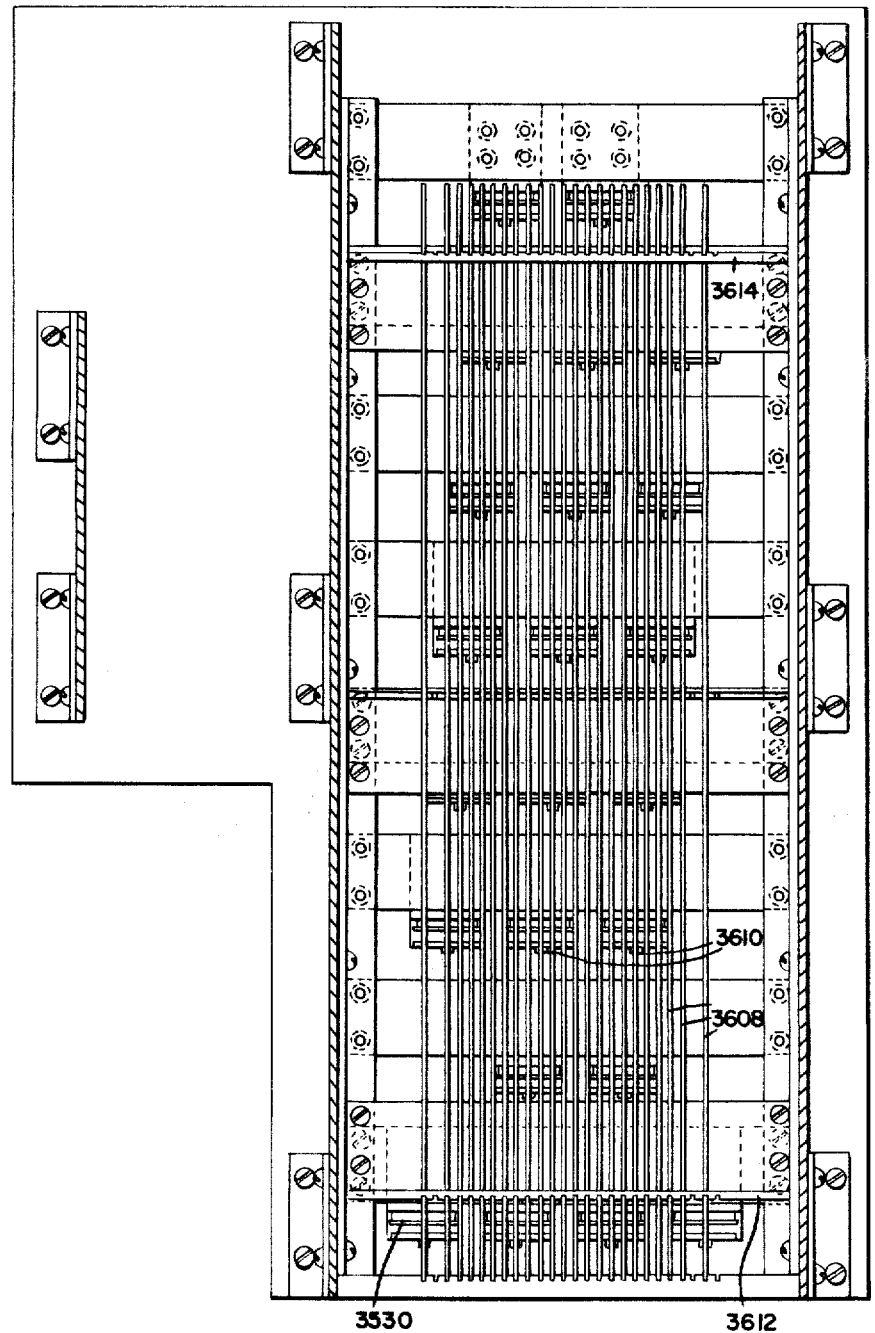
Figure 44:
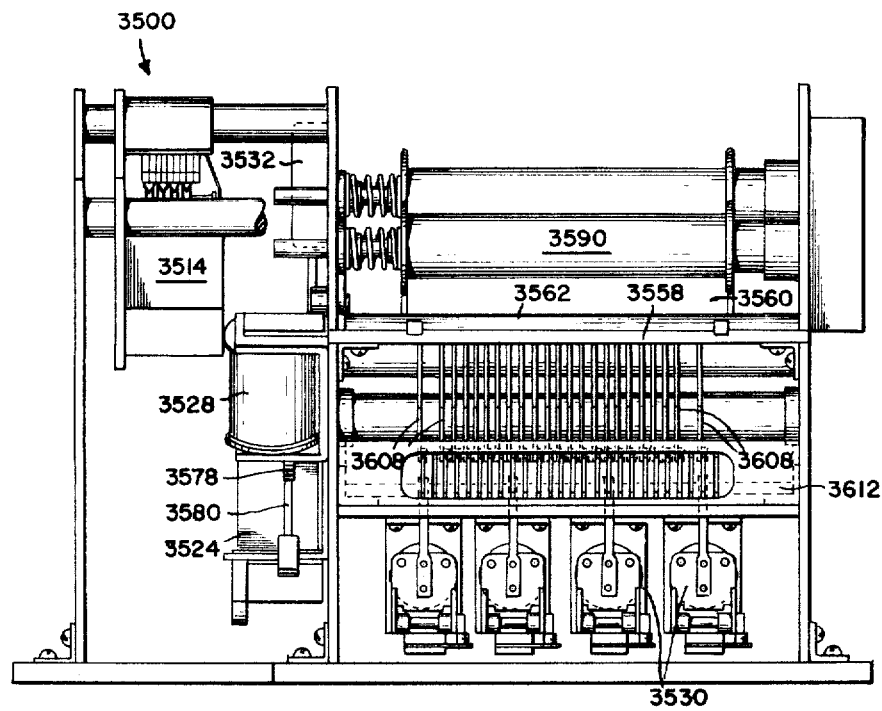
Figure 45:
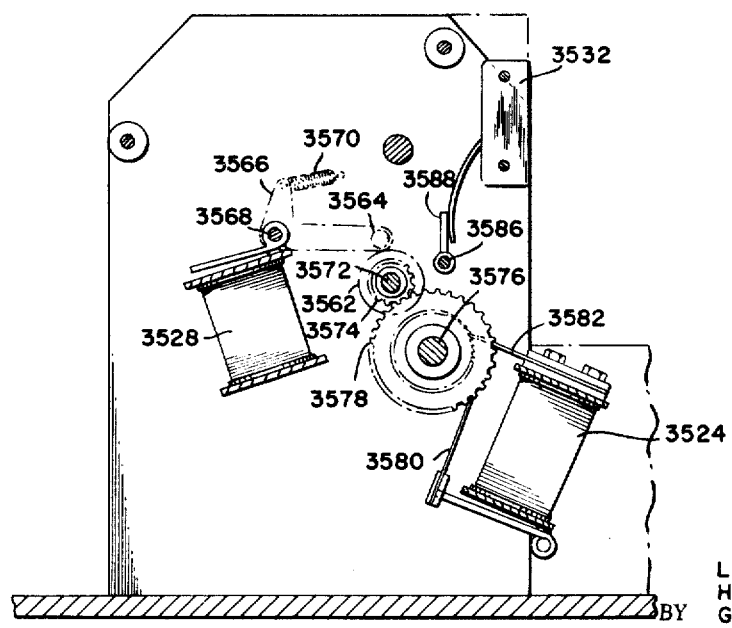
Figure 46:
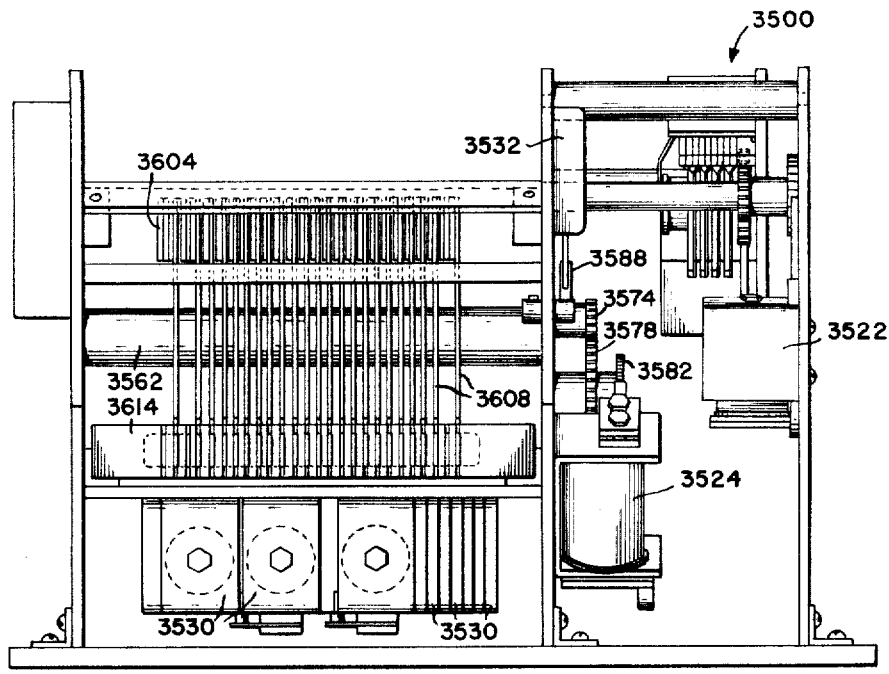
Figure 47:
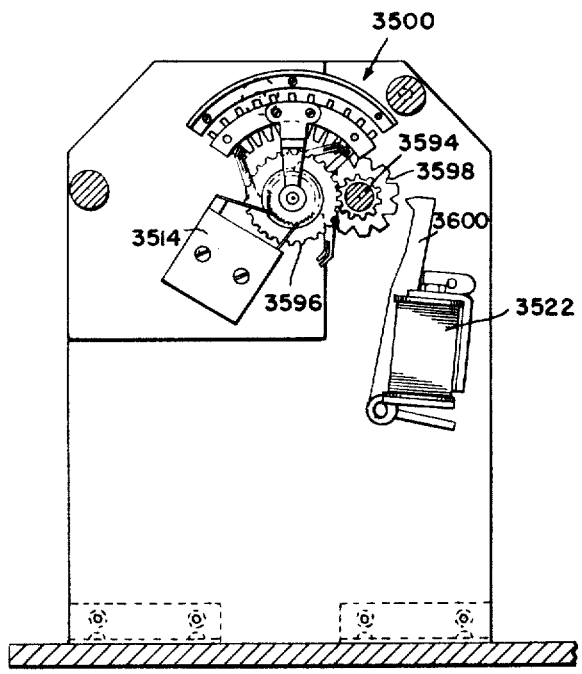
Figure 54A:
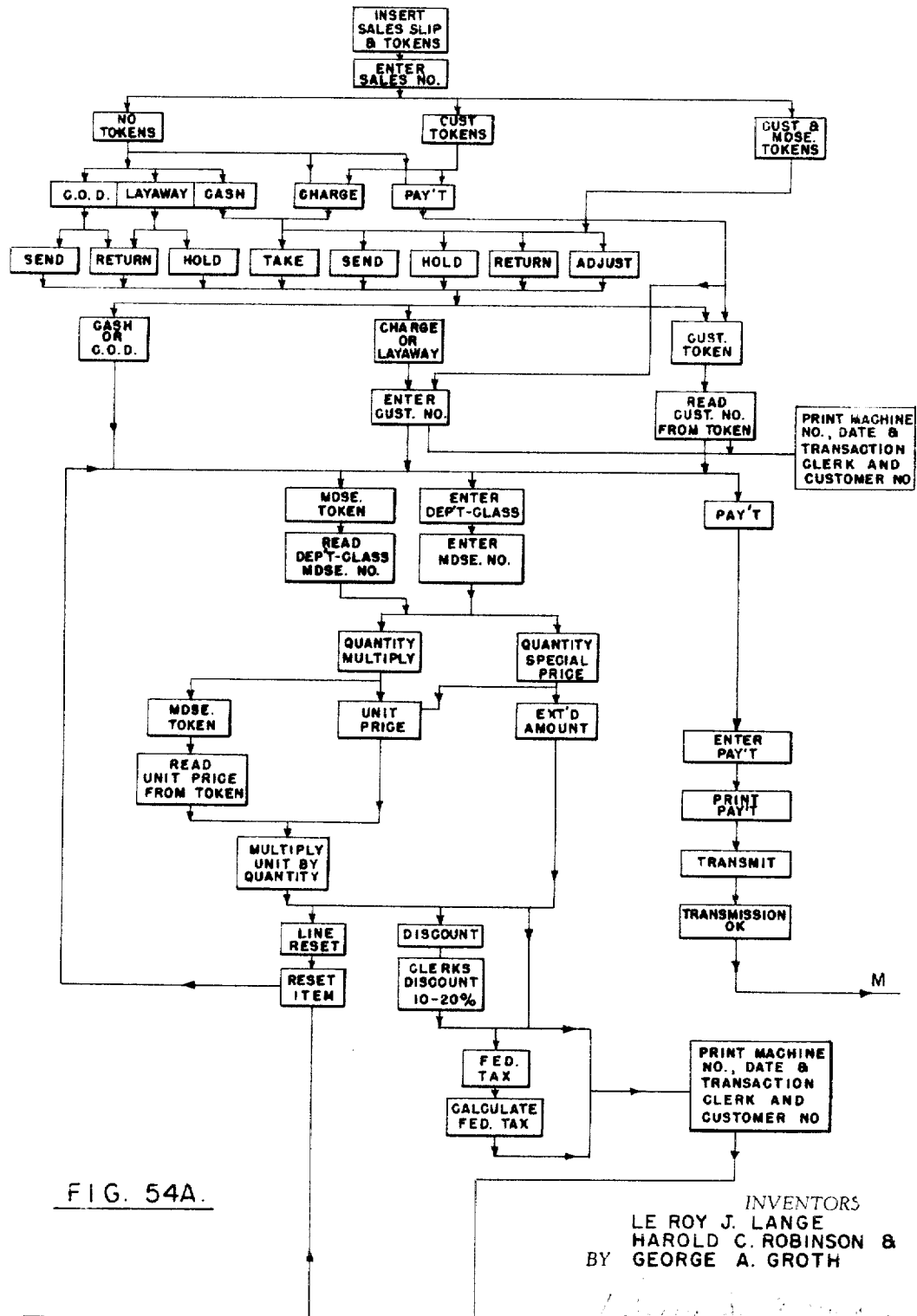
Figure 54B:
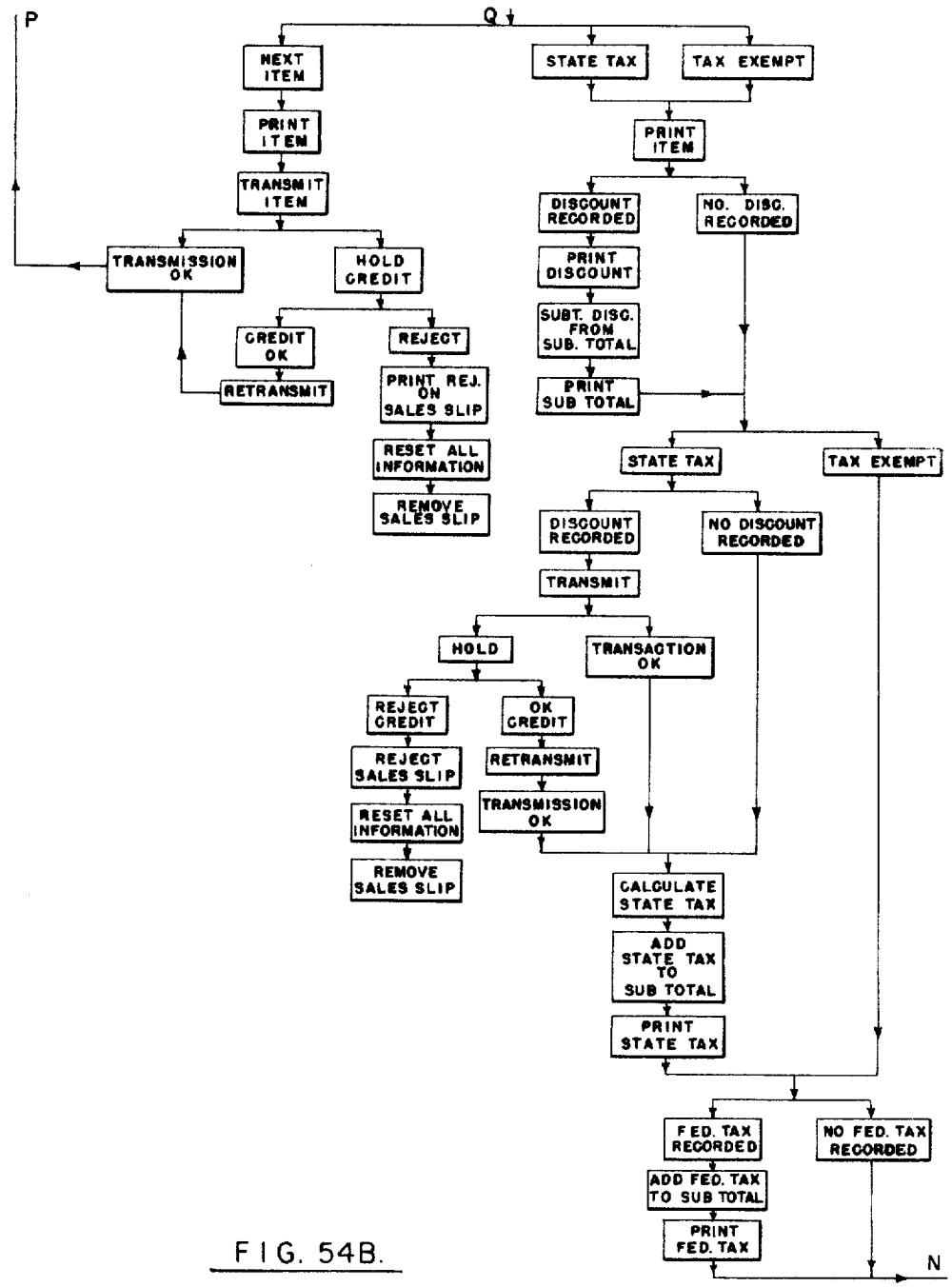
Figure 54C:
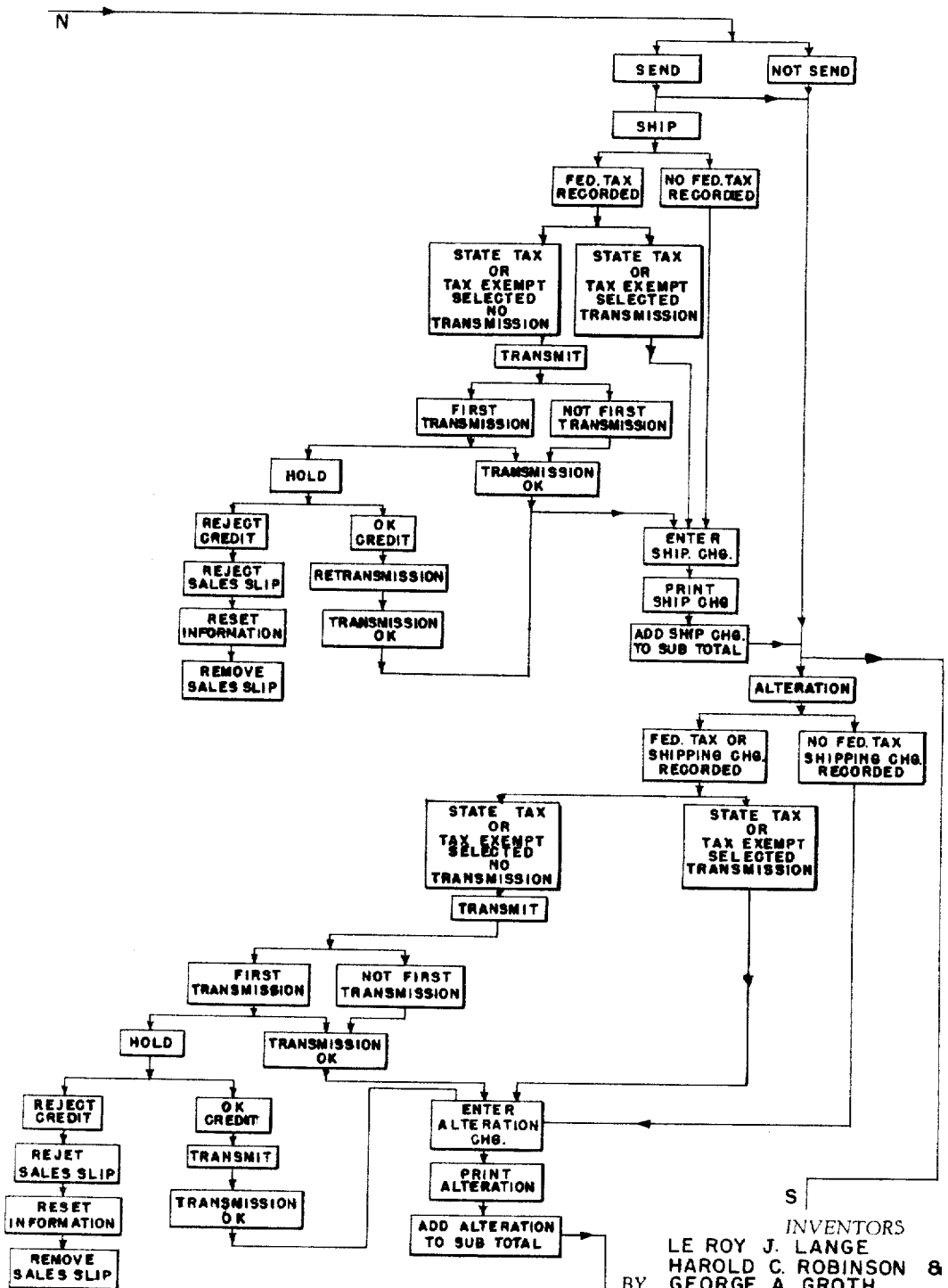
Figure 54D:
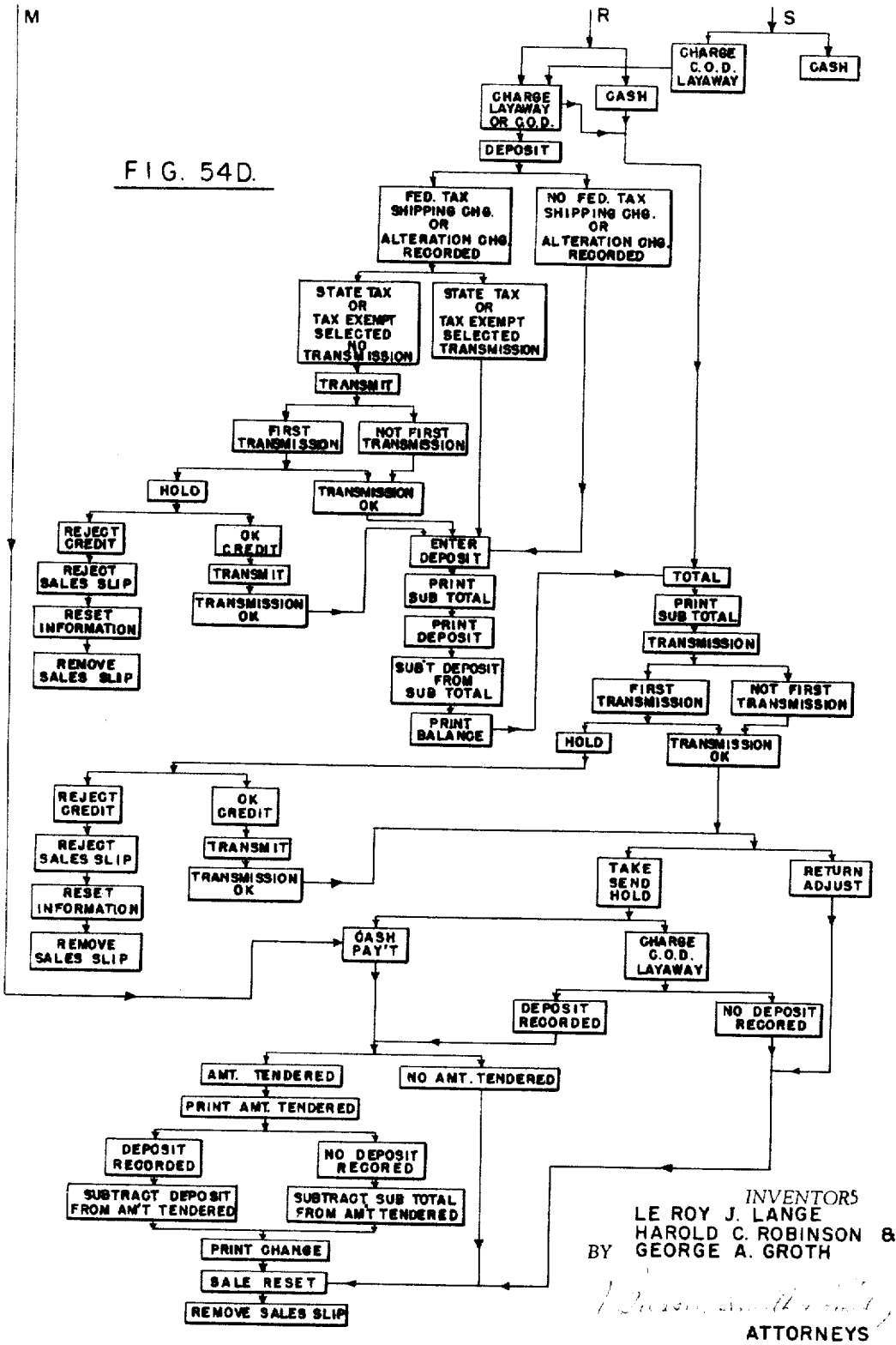

FIGURES 31A, 31B, 31C and 31D jointly constitute schematic diagrams of relays and connections involved in controls, these figures being arranged for reading with FIGURE 31A above FIGURE 31B, and with FIGURES 31C and 31D similarly arranged with respect to each other and to the right of FIGURES 31A and 31B, respectively;

FIGURES 32 to 36, inclusive, are further schematic diagrams of control relays and their connections;

FIGURE 37 is a schematic diagram of a pair of stepping switches and their connections involved in multiplication operations;

FIGURE 38 is a schematic diagram of a stepping switch and associated elements involved in sales slip printing;

FIGURE 39 is a schematic diagram of a stepping switch and its connections involved in transmission of information to a central unit;

FIGURE 40 is a schematic diagram of further control relays and elements;

FIGURE 41 is a plan view of the sales slip printer;

FIGURE 42 is a vertical section taken on the surface indicated at 42—42 of FIGURE 41;

FIGURE 43 is a horizontal section taken on the surface 43—43 of FIGURE 42;

FIGURE 44 is an elevation of the front of the sales slip printer;

FIGURE 45 is a vertical section taken on the surface 45—45 of FIGURE 41;

FIGURE 46 is an elevation of the rear of the sales slip printer;

FIGURE 47 is a vertical section taken on the surface 47—47 of FIGURE 41;

FIGURE 48 is a diagram illustrating the setup of the sales slip printer type;

FIGURES 49 and 50 are diagrammatic vertical secions of the watch list unit together with diagrammatic representations of a photoelectric card detector, FIGURE 50 being a section on the surface 50—50 of FIGURE 49;

FIGURE 51 is a schematic diagram of the connections between the point of sale machines and the central unit;

FIGURE 52 is a fragmentary plan view of a typical sales slip produced in the point of sale machine;

FIGURES 53A, 53B and 53C constitute a chart explanatory of a sequence of operation; and FIGURES 54A, 54B, 54C and 54D constitute a flow sheet representation of alternative operational sequences.

Reference will first be made to mechanical aspects of the point of sale machine. This comprises a housing 2 in the base of which there are electromechanical elements (relays and their connections) which need be described only later in conjunction with wiring diagrams, the electromechanical elements being, in themselves, conventional. The top portion of the machine, beneath, or associated with, a cover 4, comprises various special and novel mechanical elements including a card reader indicated generally at 6, a keyboard section 8 having numerical keys 10 and a bank of indicating and operational keys 12 along with special control keys 14 and numerical indicators 15. Also in the upper portion of the machine is the sales slip printing mechanism 17. A cash drawer may be provided as indicated at 19.

Figure 13:
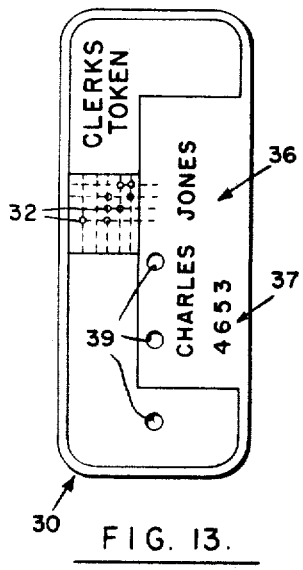
FIGURE 13 is a plane view of a clerk's token which may be used in the point of sale machine.
Figure 14:
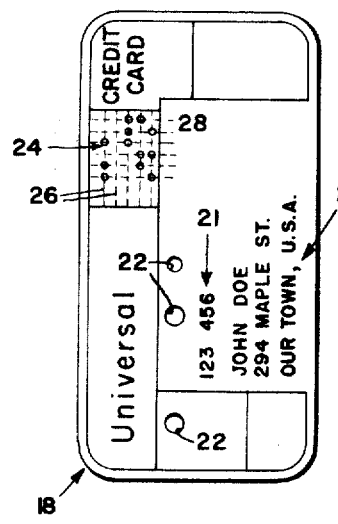
FIGURE 14 is a plan view of a customer's credit card suitable for use in the point of sale machine.
Figure 15:
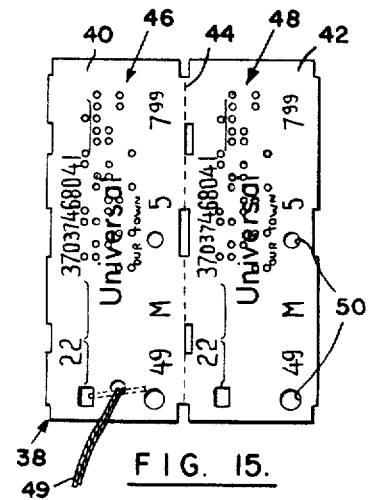
FIGURE 15 is a plan view showing a typical two-part tag suitable for use in the point of sale machine.

The card reader is designed to read three types of cards: a clerk's token (FIGURE 13), a customer's credit card (FIGURE 14), and a portion of a mechandise tag (FIGURE 15). As will appear, in a single transaction all such cards may be present, a combination of any two, a single card, or none, the point of sale machine being capable of handling any of these alternatives.

The customer's credit card 18 may be of stiff plastic of the type commonly used for this purpose, embossed as indicated at 20 with the customer identification including the name and address of the customer. At 21 there is embossed the account number of the customer. These embossings are designed to be reproduced in the usual fashion on sales slips at the end of a credit or payment transaction, and having nothing to do directly with the operation of the present machine.

Alignment openings 22 serve, as will appear later, to locate the credit card in proper position in the machine.

Coded holes indicated generally at 24 and identifying the customer's account number are to be read by the machine. While other codes may be used, it is convenient for optimum operation to provide coding in the "two out of five" system. For this purpose the coded holes are arranged in five longitudinal lines 26 in which holes may selectively appear. The holes are also on transverse lines 28 indicating the several digits in the account number. There may be six of these transverse lines, this number generally sufficing, although, if desired, there may be seven such transverse lines of holes capable of indicating numbers up to 9,999,999. As will appear hereafter, the coding involves for each digit two, and only two, holes in each transverse line, this arrangement being capable of preventing, to a large extent, casual attempts at falsification of account numbers since operation depends upon the existence of two, and only two, holes in a transverse line. In other words, additional perforation of a card will make the card inoperative. The system also provides a check against the use of a damaged card which might lead to erroneous recording of a customer's account number.

A clerk's token indicated at 30 may, except with respect to outline dimensions and location of alignment holes, be similar to a customer's credit card, being also provided with coded openings 32 arranged in the same coding as the openings 24 previously described. As shown, the coded openings in the clerk's token may be located conveniently in a longitudinal position differing from that of the openings in the customer's credit card. This makes it possible to read the cards sequentially rather than in parallel with the advantage that the readings of the customer's credit card and the clerk's token may involve a sharing of some of the registering equipment. This becomes possible because neither the credit card nor token will generally require any large number of digits for identification.

Imprinted on the clerk's token is the name 36 and code number 37. Openings 39 and the size of the token insure that it may be placed only in the proper place in the reader.

A typical sales tag as it may be applied to the goods is indicated at 38 and comprises two portions 40 and 42 adapted to be torn apart along the perforated line 44. On each of these there is imprinted for visual reading the significant data which may include price, size, and such other data as may be desirable for reading by a customer or clerk. Of importance in the present system are the duplicate sets of holes shown at 46 and 48, these being coded and arranged in the same fashion as the holes previously described in the customer's credit card. However, in this case, the number of transverse lines of openings will usually be much greater, and may identify not only the type (by a number) but the price of the merchandise, the pertinent department and class, the size (if apparel), and other items or information which may be significant in a sales transaction or for inventory purposes.

The purpose of the duplicate portions of the tag is because it is desirable to have the tag automatically readable not only at the time of sale but also if the goods are returned. Ordinarily, the portion 40 will be attached to the merchandise, as by a cord 49, or by stapling, and the portion 42 will be torn off at the time of sale and inserted into the card reader, the portion 40 remaining attached to the article. If later the article is returned to the store the portion 40 of the tag may be inserted in the card reader and used to indicate the return transaction, identifying the goods involved to provide an accounting and inventory record. Openings 50 and the size of the tag portions 40 and 42 insure proper placement thereof in the card reader.

The matters of these readable elements will become more significant hereafter in a description of the operation of the point of sale machine.

Reference may now be made to the card reader the mechanical aspects of which are shown particularly in FIGURES 3 to 12, inclusive.

The frame mounting the mechanical parts of the card reader and also mounting certain electromechanical parts is indicated generally at 62 and requires no detailed description. A drawer 64 is provided for the reception of the cards to be read and has vertically extending edge flanges 66 and 68 guided for horizontal movement in grooves in rollers 70. Card receiving areas are provided in the form of slight depressions in the drawer as indicated at 72, 74 and 76. The area 72 is, in the present instance, designed to receive a customer's credit card 18, while the area 74 is designed to receive the portion 40 or 42 of a tag to be read. The area 76 is arranged to receive a clerk's token if that is used. It may be here pointed out again, for consistency of description, that the present machine is illustrated as not involving the use of a clerk's token, the parts to be used for reading such a token being, accordingly, omitted, though it is desirable to construct the machine so that with minor changes in wiring a clerk's token may be used if desired. As will appear hereafter, the identification of the clerk will be inserted in the machine keyboard. It will be apparent, however, that any desired number of cards may be read, merely by extending the drawer to provide additional areas. In some instances, special cards may be inserted to be read to establish different rates of tax, discounts, or the like, instead or using more or less fixedly established computing means as hereafter described.

Alignment pins for the inserted cards are indicated at 78, 80 and 82. These are desirably of rounded tip form so as to guide readily cards into proper position and maintain very accurate alignment thereof with respect to holes 84, 86 and 88 in the drawer, each group of which holes comprises five longitudinal rows of holes and, in the present instance twenty-five transverse rows. As will be immediately obvious, these holes correspond to all possible positions of the holes in the cards to be read, and when cards are properly aligned by the pins the openings in the cards will be lined up with the holes in the drawer. The pins also prevent, in conjunction with the sizes of the cards, tokens and tags, placement thereof in the wrong areas.

Figure 9:
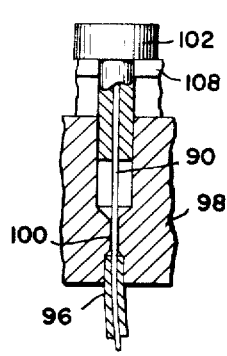
FIGURE 9 is a fragmentary section illustrating an upper detector wire guide and associated parts.
Figure 10:
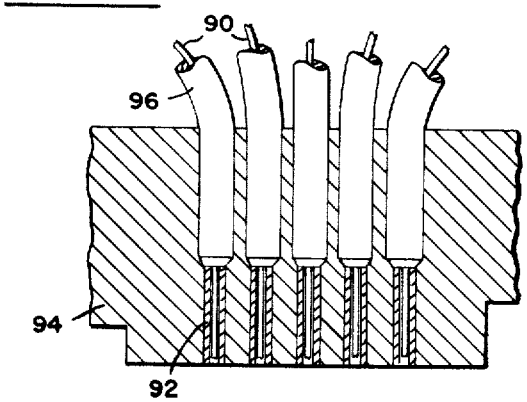
FIGURE 10 is a fragmentary section showing a group of lower detector wire guides and their associated parts.

Arranged to penetrate the holes in the cards and pass into the holes in the drawer or tray, are feeler wires 90 which are shown, in the form of a single group, particularly in FIGURES 9 and 10. At their lower ends these wires 90 pass through accurately located guide sleeves 92 inset in a transverse support 94 to bring the guides into close proximity with the upper surfaces of the cards to be read. The wires 90 extend upwardly through guide tubes 96 which as a group are flared outwardly to provide greater space for cooperating elements at the upper ends of the wires, it being desirable to have the holes in the cards compactly arranged as illustrated. At their upper ends the wires 90 pass through guiding openings 100 in a transverse supporting block 98. To the upper end of each wire 90 there is secured the flanged head 102. Slides 106, one for each group of five wires have laterally extending flanges 108 engageable with the heads 102 and are provided with slots 110 through which the lower portions of the heads extend. As shown most clearly in FIGURE 11, the slides 106 are slotted at 112 and 114 for the reception of headed guide pins 116 and 118, the slides being urged upwardly by springs 120 reacting between the corresponding pins 116 and pins 122 on the slides. Each slide is provided with a pin 124 engageable by the horizontally extending portion 126 of a bell crank 127 pivoted on a rod 128, and having an upwardly extending portion 130 engageable by a pin 132 carried by a depending arm 134 secured to the armature 138 of an electromagnet 140. Because it is desirable to use relatively strong springs at 210 for certainty of operation, there is desirably provided as indicated at 142 a second electromagnet coupled to the first 140 by a connecting link 144.

As will appear hereafter, the electromagnets corresponding to the several slides 106 may be selectively energized to permit lowering of the corresponding groups of wires 90.

Each wire has associated with it an individual switch 146 (FIGURE 8) comprising a lower contact leaf 148 and an upper contact leaf 150 having an extension bearing against the insulated extension 104 of the head 102 of the wire. The spring action of the switch leaf 150 normally urges its wire downwardly so that when the wires are released by the downward movements of the corresponding slides they are urged downwardly either to penetrate an aligned opening in a card or to engage the surface of the card in the absence of a hole therein. If a hole at such time is aligned with the wire, the wire may pass downwardly therethrough into the underlying hole in the tray, in which case contact will be made between the leaves of the corresponding switch 146. On the other hand, if a released wire engages a card at a position where no hole exists the downward movement of a wire is arrested and the corresponding switch does not close. The switch leaves 150 are relatively weak in their spring action so that the wires will not be pressed downwardly sufficiently forcibly to penetrate and punch holes in a cardboard merchandise tag. Relatively thin cardboard may thus be permissibly used for the tags, and even if they have become creased or folded when they are straightened out they may be reliably used. Only if badly damaged do they become unuseable.

A spring 152 (FIGURE 7) of tightly coiled and bent type urges the card-receiving drawer or tray 64 forwardly, permitting it to be readily manually moved rearwardly at the initiation of a machine opeation, thereafter serving to drive it forwardly in step by step fashion as hereafter described.

A pair of racks 154 and 156 are secured to the sides of tray 64 and mesh with corresponding pinions 158 and 160 secured to a shaft 162 mounted in bearings in the frame. The paired arrangement just described insures smooth and uniform movement of the tray, preventing angular deviation and so maintaining in accurate alignment the holes in the tray and the wires 90. At its righthand end the shaft 162 has secured to it the ratchet 164 which is adapted to cooperate with an escapement which includes a lever 166 having a detent 168 engageable with the ratchet teeth. The lever 166 is pivoted on a transverse pin 170 and is provided with a tail portion 172 which is urged upwardly by a spring 174 so as normally to move the detent 168 into position to engage the teeth of the ratchet. A depending portion 176 of the lever 166 has a pivotal connection to the forward end of a link 178 which at its rear end is pivoted to a lever 182 secured to the armature 184 of an electromagnet 186. When this electromagnet is energized the pawl 168 is lifted out of the path of movement of the ratchet teeth against the action of spring 174.

A second lever 188 is also pivoted on the pin 170 and is provided with a laterally extending pin 190 overlying the tail portion 172 of lever 166. A spring 191 urges the lever 188 in a counterclockwise direction as viewed in FIGURE 5. The lever 188 is provided with a detent tooth 193 engageable with the teeth of the ratchet 164. The upper end of the lever 188 is engageable, at the right of pivot pin 170, by the button 192 secured to the pivoted armature 194 of an electromagnet 196. When the electromagnet 196 is energized, it will move clockwise the lever 188 projecting the detent tooth 193 slightly in advance of a tooth of the ratchet 164. Further movement causes the pin 190 to rock the lever 166 releasing the detent 168 from the tooth of the ratchet previously engaged thereby, so that a slight advance of the ratchet takes place with its arrest by the tooth 193. Upon deenergization of the electromagnet 196 the levers 188 and 172 are rocked counterclockwise by their springs 191 and 174 as a unit, effecting, in succession, engagement of detent 168 with the top of the tooth previously held by it but now slightly advanced, release by tooth 193 of the ratchet tooth theretofore engaged by it, and advance of the ratchet with concurrent inward movement of detent 168 under the action of spring 174 to engage and arrest the next ratchet tooth. The result of this is to produce a single step movement of the ratchet and card tray upon each energization of the electromagnet 196, the movement of the ratchet 164 being due to its pinion and rack connection with the card tray which is urged forwardly by the action of spring 152. A step-by-step movement of the tray accordingly takes place, each movement serving to align a next transverse row of openings in the tray and cards with the groups of wires 90.

Various electromechanical devices are associated with the card reader elements already described:

The shaft 162 carries a cam member 198 of insulating material adapted to act upon the movable leaf of a singlepole, double throw switch 202 to throw it to either of two alternative circuit-closing positions. The lobes of the cam member 198 are indexed at twice the angular spacing of the teeth of the ratchet 164, i.e., the number of cam lobes is ½ the number of teeth. As will be made clear hereafter in describing the circuit controls this arrangement insures that for proper operation there is a definite relationship between the steps of the tray and the steps of a stepping relay which latter provides for routing of information.

Figure 5:
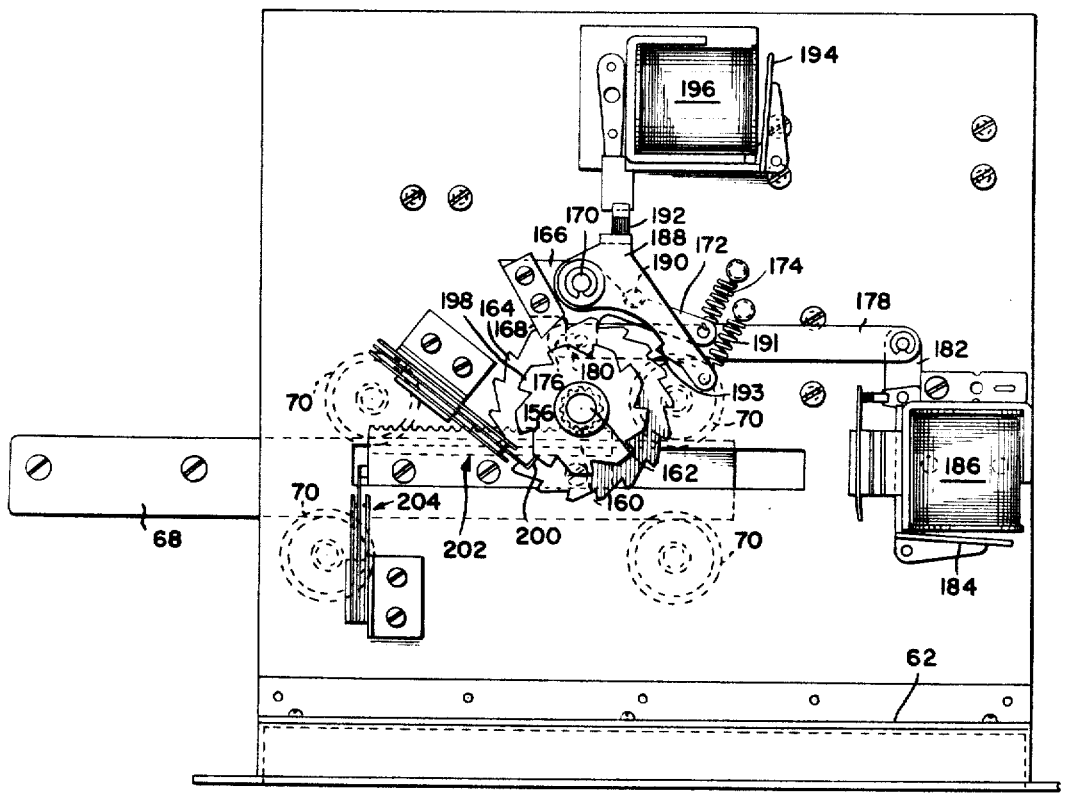
FIGURE 5 is an elevation of the right-hand side of the same.
Figure 12:
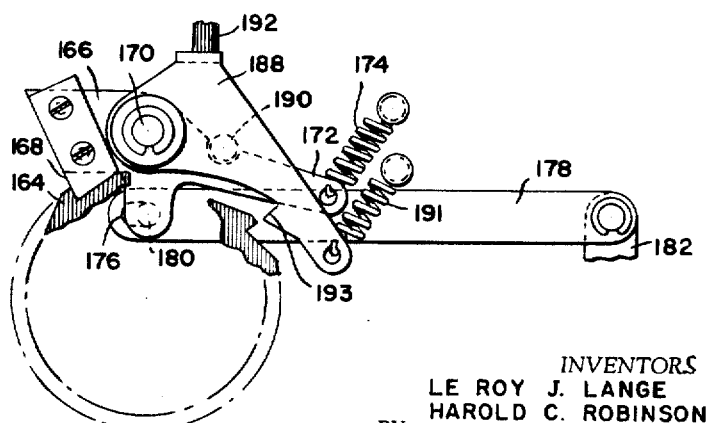
FIGURE 12 is a fragmentary view illustrating the construction of the escapement mechanism.
Figure 6:
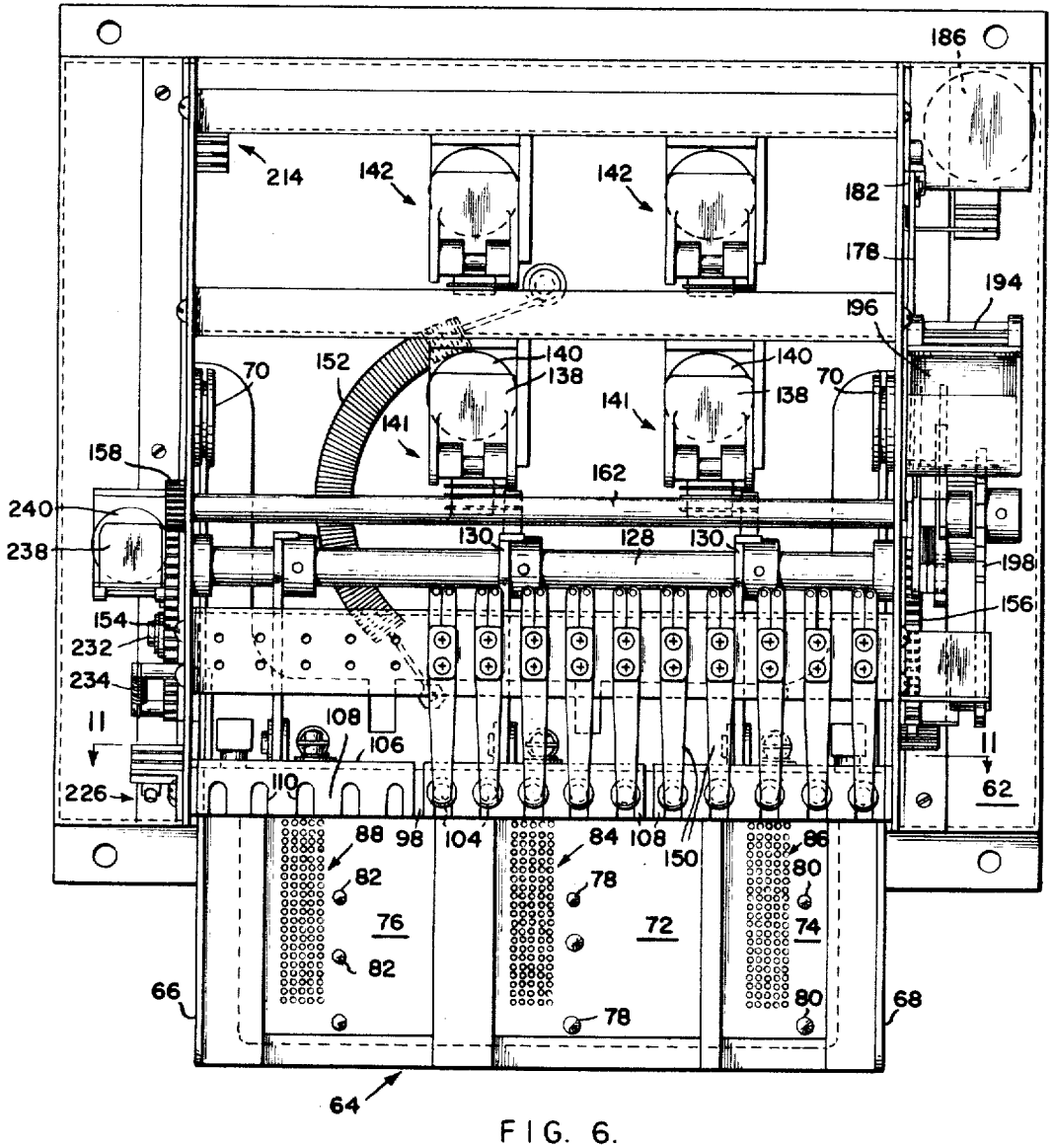
FIGURE 6 is a plan view of the same.

A single-pole double-throw switch 204 (FIGURE 5)

is arranged to be engaged by the tray 64 when it is in its extreme forward position. This switch, as will appear later, signals whether the tray 64 is in, or is not in, its extreme forward position, effecting suitable control actions.

A switch 206 and a switch 208 (FIGURES 7 and 8) have respective operating arms 210 and 212 engageable by the rear edges of cards inserted in the tray in the respective areas 72 and 74, i.e., a customer's credit card and a portion of a tag, the switches being closed when the tray containing the cards is in its extreme rearward position. (A similar switch may be provided if the machine is to have clerk's tokens located in the tray area 76 for reading thereof.)

A single-pole double-throw switch 214 (FIGURE 8) is provided with a leaf 216 arranged to be engaged by the tray 64 when the tray is in its extreme rear position. It signals that the tray is, or is not, in that position and effects controlling actions accordingly.

It is desirable to cover the tray during its forward stepping movements so as to prevent any manual interference therewith, and, accordingly, a cover 217 (FIGURE 4) is provided pivoted at 218 to the frame, which cover, when opened, permits access to the tray for the placement or removal of cards, but which, when closed, prevents access thereto. An arm 220 secured to the cover 217 is provided with a pin 224 engageable with a movable leaf of a switch 226 to provide contact for a circuit closure to signal that the cover 217 is closed. The arm 220 also provides latching at 226 by the provision of an upward extension 228 thereof engageable by the nose 230 of a detent lever 231 pivoted on a fixed pin at 232. A spring 234 normally urges the detent upwardly toward cover-releasing position. The latch is maintained, however, at proper times in latching position by reason of engagement of a tail portion thereof by a contact member 236 carried by the pivoted arm of an armature 238 which may be held by an electromagnet 240.

While the operation of the tag reader in connection with its control circuitry and its output circuitry will be described in greater detail hereafter a brief reference may be made to its general mode of operation.

Upon insertion of such card or cards that are to be read into the tray 64 the tray is pushed rearwardly manually and the cover 217 is lowered to grouped position. As the tray moves rearwardly the ratchet 198 is rotated in its reverse direction and when the tray reaches its rearmost position it is latched by action of the detent 168 dropping in front of a ratchet tooth. During operation of the reader the cover 217 is latched closed and the tray moves forwardly step by step under the action of spring 152 and under the control of the ratchet and detent mechanism, the action of which has already been described. Upon each stepping the sensing wires 90 are released to enter such holes as may be presented to them, being arrested by the corresponding cards where holes do not occur. Such wires as pass through the holes permit closures of their corresponding switches 146 to provide output signals. The successive rows of holes in the cards are thus sequentially scanned. As will appear more fully later, if all three types of cards were present, the clerk's token and customer's credit card, together, would be scanned simultaneously with the merchandise tag, the clerk's token being scanned, however, sequentially with the customer's credit card, the information from the two latter sharing some common electrical equipment. At the end of the scanning operation the tray will reach its extreme forward position whereupon, if desired, the cover may be opened and the cards removed. The foregoing operations involve various electrical interlocks and controls. By reason of the provision of a single row of feeler wires with sequential scanning of the rows of holes in the cards considerable simplification is afforded, the scanning operation, nevertheless, taking place very rapidly in a time which is only a very small fraction of that involved in a sales transaction.

Figure 16:
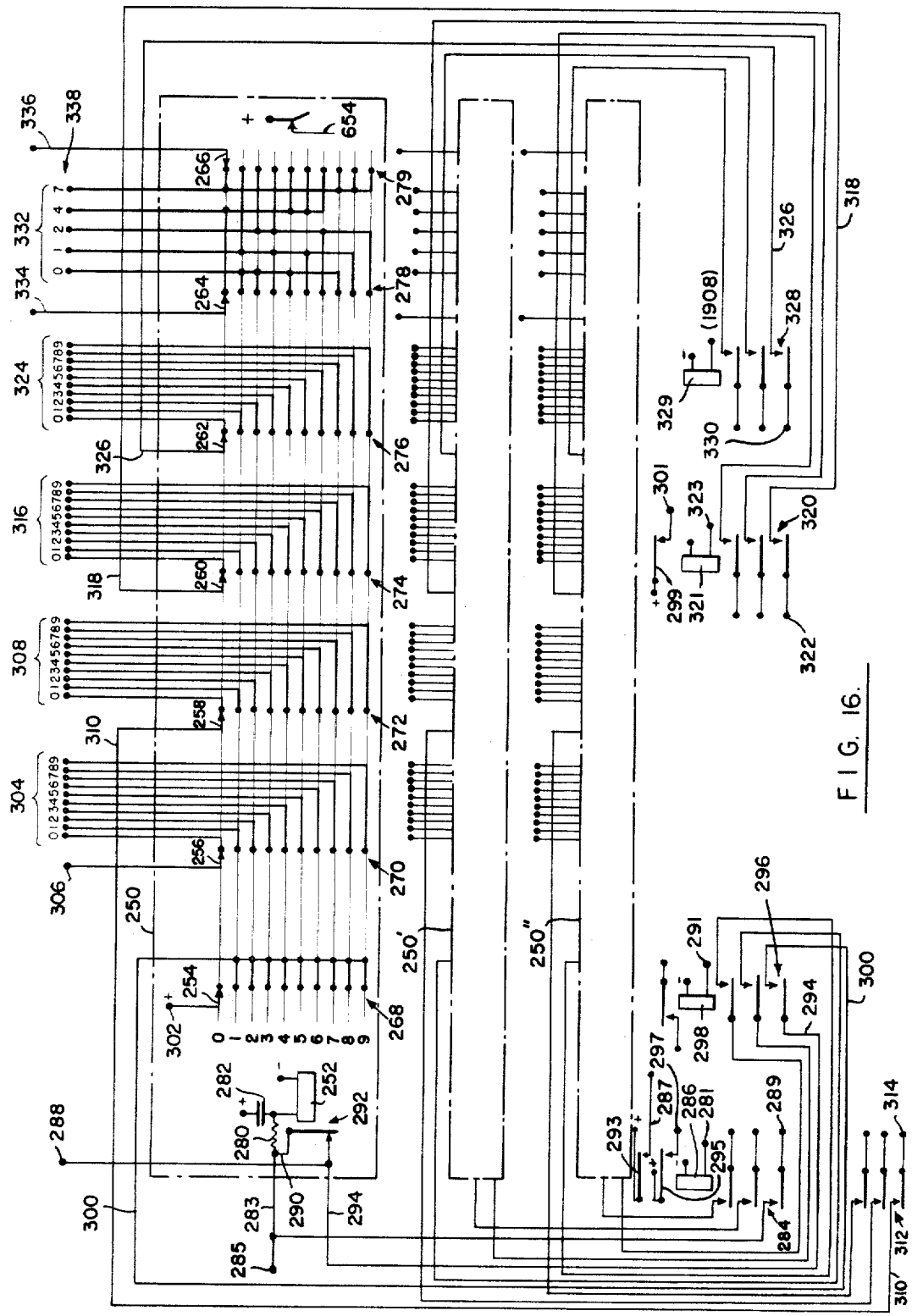
FIGURE 16 is a schematic electrical diagram which is illustrative of a typical stepping relay or switch used in the point of sale machine, together with various associated relays.

Consideration may now be given to FIGURE 16 which illustrates in the form of a wiring diagram a typical stepping relay and its associated parts as used in the present apparatus. As will appear, a considerable number of similar relays of this type are used, and it will be convenient to describe FIGURE 16 so that hereafter such relays may be simply represented merely as blocks in association with other circuitry, or may be otherwise referred to. In some cases less than the number of banks shown in FIGURE 16 may be used; in a few others, more may be provided as will become obvious. But in all cases operations are quite similar.

FIGURE 16 actually shows a plurality of relays to illustrate the fashion in which they are associated in a group, but one of these relays is indicated in detailed schematic diagram at 250, the others, which are similar, being indicated at 250' and 250''. The physical structure of the relay 250 is well known and need not be illustrated in detail. Typcially, such a relay is of rotary type involving banks of fixed contacts which are wiped by respective movable contact arms. In a typical case the fixed contacts of each bank may extend through an arc of 120° and there may be arranged to wipe them a triple set of electrically connected arms spaced 120° about so that as one arm ceases to act the next becomes operative, and so on. A single complete cycle of the relay thus occurs in the rotation of the arm through 120°. In such a relay the operation usually involves driving of the arm assembly by a pawl and ratchet mechanism electromagnetically operated, the energization of the stepping electromagnet effecting cocking of the pawl against the action of a strong spring which, upon deenergization of the electromagnet advances the arms one step. Conventionally, there are associated relays usually also energized by the stepping electromagnet and arranged to be wired for various purposes including homing of the stepping relay to a zero or start position. Relays of various such types are known and any suitable physical type may be used. For present purposes they are electrically simplified at 250 in FIGURE 16. Indicated by the horizontal lines in this FIGURE 1 and numbered 0 to 9 inclusive, are the successive contact positions, it being understood that after the position 9 is reached the next step brings the relay to the 0 contact position; i.e., the relay is continuously cyclical in its operation having 10 significant positions. (If relays having more than 10 actual positions are used, they may, of course, be provided with the proper circuitry which would step them rapidly through the excess positions back to the 0 position. The ten step switch or relay may be further considered as merely typical of similar devices having more, or less, steps; as will appear various such relays used herein have many more steps.)

The stepping electromagnet of the relay is indicated at 252 and, as stated, when energized cocks a driving pawl, a step advance being produced when this electromagnet is deenergized.

As illustrated in FIGURE 16, there are seven banks of fixed contacts in the 0 to 9 positions engageable by the respective wipers 254, 256, 258, 260, 262, 264 and 266. While for purposes of generality of description seven such banks are illustrated, all seven or even more banks may, in some cases be required, but usually, in most cases, less than seven are needed and it may be assumed that those which are unnecessary are unwired or corresponding stepping relays having less banks of contacts are used.

The wiper 254 is arranged to engage the fixed contacts 268 of a first bank, the fixed contacts of the succeeding banks being indicated, successively, at 270, 272, 274, 276, 278 and 279, engageable by the respective wipers previously mentioned.

At this point it may be remarked that in all of the electrical operations involved herein direct current is used for energization, and usually each electromagnet involved in a relay has one terminal returned to negative, energization being effected from a positive terminal.

The electromagnet 252 is energized through a protective resistance 280 associated with a capacitor 282 in the usual fashion. Through connection 283 and the contacts 284 of a relay which may be identified by its electromagnet 286, energized from line 281, energization may be effected as will later appear from a terminal 289. The left-hand terminal of resistance 280 is conneced at 290 to the normally closed contacts 292, arranged to be opened upon energization of the stepping electromagnet 252. Connection is made from the back contact through line 294 through the normally open contacts 296 of a relay 298, energized through line 291, to a connection 300 bridging all of the fixed contacts 268 in positions 1 to 9. A lead runs from connection 294 to an external terminal 288. The relay 298 may be conveniently referred to as a reset relay, its action being such that when energized this relay will connect the terminal 302 of wiper 254, whenever the wiper is in other than 0 position, to provide a circuit including the contacts at 292 to produce a "buzzer" action which will effect rapid stepping of the movable contacts back to their 0 position.

Each of the fixed contacts 270 of the second bank is connected to an individual terminal of the group 304, which terminals are numbered to correspond to the contact positions. In anticipation of future description this bank may be referred to as the stop bank of contacts. The wiper 256 of this bank is connected to terminal 306.

The wiper 258 of the third bank is connected at 310 through the normally opened contacts 312 of relay 286 to a terminal 314. The fixed contacts 272 of this bank are individually connected to the terminals of the group 308, the contacts of which group may be referred to as the compare contacts.

The wiper 260 of the next bank of fixed contacts 274 is connected at 318 through the normally opened contacts 320 of relay 321, energized through line 323, to a terminal 322. The fixed contacts 274 are individually connected to the terminals of the group 316. This bank of terminals may be referred to as the read bank, the relay 321 being a read relay.

The fixed contacts 276 are individually connected to terminals of the group 324, the contacts of this bank being referred to as the print contacts in view of the fact that they are involved in effecting printing of a sales slip. The movable wiper 262 for this bank of contacts is connected at 326 through the normally open contacts 328 of a relay 329 (the print relay) to a terminal 330. Energization of relay 329 is from a line which is, typically, indicated at 1908 hereafter more fully described.

The last two banks are for code transmission and their fixed contacts 278 and 279 are connected in various arrangements as illustrated to each other and to a set of five terminals 332. The respective wipers 264 and 266 are connected to terminals 334 and 336. The terminals 332 are respectively designated for convenience at 338 as having coded numerical values 0, 1, 2, 4 and 7.

The last two banks have the function of translating digital values into a two out of five code as follows:

It will be noted, for example, that when the stepping switch is in 0 position the wiper 264 is connected to the output terminal 332 having the value 4, and the wiper 266 is connected to the output terminal having the value 7. The decimal value zero is, in the code herein used, represented by 4, 7. Otherwise, in this code, each decimal value from 1 to 9, inclusive, is respectively represented by two values of the output code which numerically add to the decimal value. For example, when the stepping switch is in one position, the respective connections of wipers 264 and 266 are to 0 and 1 of the output terminals. In similar fashion, in the second position, representing the decimal value 2, the connections are to 0 and 2. Following the connection shown, it will be seen that this situation continues, 3 being represented by 1, 2; 4 is represented by 0, 4; 5 by 1, 4, etc. It will be obvious that if desired this adding relationship need not be adhered to but the two outputs may be quite arbitrarily permuted. The reason for the translation into a code is to simplify transmission as will appear more fully later, the same being true of the matter of reading in code with translation, as will shortly appear, to decimal values.

The showing in FIGURE 16 of the association of several stepping relays 250, 250' and 250" is to indicate the association of relays particularly in sets for numerical representation. For example the relays 250 may represent digits in a unit order; the relay 250' may represent digits in a tens order; the relay 250" may represent digits in a hundreds order, and on, and of course two lower orders may represent cents, and higher orders dollars. When a number of stepping relays are associated in this fashion they may have similar connections as illustrated to contacts of common relays such as 286, 298, 321 and 329. The contact connections for the three illustrated relays are shown in FIGURE 16 but need not be individually described.

The relays described have additional contacts for operation, and, anticipating later description of operation, various of these may be specially described. A normally open contact 295 of relay 286 is arranged to connect a positive supply terminal to a line or terminal 297. Another normally open contact 293 of this relay is arranged to connect the positive supply terminal to a line 287. Normally open contact 299 of relay 321 is arranged to connect the positive supply to line 301.

In brief, it may be said, as will shortly appear, that the point of sale machine involves sets of relays of the type just described which sets represent different items of information such as merchandise numbers, customer's charge numbers, and monetary matters such as prices or the like. As will also further appear, some of the accumulated numerical information may be transmitted as such, while other information is temporarily stored to be fed to computer devices.

Figure 17:
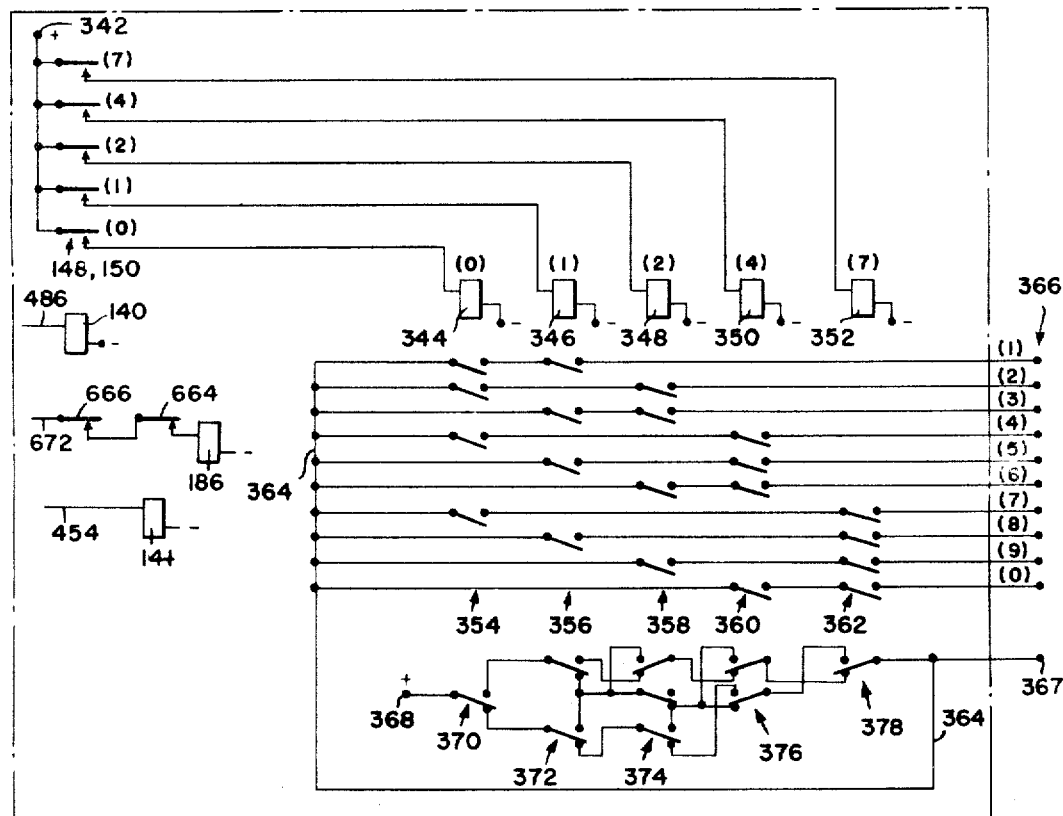
FIGURE 17 is a schematic diagram illustrating a translator for converting coded signals into decimal output signals.

Designated 340 in FIGURE 17 is a unit of the apparatus which is multiply used and which, accordingly, may be separately described. A positive input source terminal 342 is connected to corresponding elements of the switches 148, 150 of each set operated by the sensing wires for the cards as illustrated and described heretofore with reference to FIGURE 8 particularly. The switches in FIGURE 17 are designated by code values of the type previously referred to of a two out of five code. The function of each unit 340 is to translate these code values into decimal signals and to insure that the latter signals are provided when two, and only two, of the code signals are produced. For this purpose the respective switches are connected to energize corresponding relays 344, 346, 348, 350 and 352. These are provided with normally open translating contacts indicated at 354, 356, 358, 360 and 362, respectively. As will become evident from examination of FIGURE 17, upon energization of any two of the relays a circuit will be uniquely completed between a common connection 364 and one and only one of series of ten digital output terminals 366 which are marked with their respective digital values. This translation of the coded signal to digital output is, as will be obvious, the reverse of the translation effected by the last banks of the stepping relay shown in FIGURE 16. In other words, energization of the relays 344 and 346, corresponding to the switches representing 0 and 1 will provide an output to the terminal 366 having the digital value 1, etc. If only one of the relays is energized the described connection is not completed. However, if more than two of the relays were energized there would be multiple energization of the output terminals 366, and to avoid this there is provided the further array of contacts shown at the lower portion of this figure. A positive terminal 368 is connected to the movable contact 370 of relay 344 which contact is adapted to engage normally a lower fixed contact and is adapted to engage an upper fixed contact when the relay 344 is energized. At 372 there are indicated two movable contacts of relay 346. At 374 there are indicated three movable contacts of relay 348. 376 indicates a pair of movable contacts of relay 350, and 378 indicates a single movable contact of relay 352. This last movable contact is connected to the common connection 364 and also to an output terminal 367. All of the last mentioned movable contacts are normally, when the relays are deenergized, in their lower positions as shown. The various fixed and movable contacts are interconnected as illustrated.

By following the connections it will be evident that the common connection 364 running to the sets of upper contacts will be energized from the positive terminal 368 only when two of the relays are energized, the energizing being interrupted if more than two relays are energized. For example, assume that the first two relays 344 and 346 are energized. In that case it will be noted that a circuit is completed through the movable contact 370 engaging its upper fixed contact through the raised upper movable contact at 372, and then through the movable contacts of 374 and 376 (the uppermost one) and movable contact 378, all of which remain in their lowered positions. However, if any or all of the relays 348, 350 and 352 are energized, the last described connection is broken. By following the connections it will be noted that the same condition exists with respect to any other energized combination of the relays: if two, and only two, relays are energized a connection is provided between terminals 368 and the common connection 364. But if more than two relays are energized this connection does not exist. The same situation exists if only one of the relays is energized, but this situation is additionally taken care of in connection with the upper group of contacts, two of which must be closed in series to provide any output to the terminals 366.

In brief the translator indicated at 340 provides the proper translation from the coded signals to decimal signal outputs while preventing this from occurring in case of misoperation. One type of misoperation thus guarded against would be that resulting in the event that a card was torn so that one of the sensing wires penetrated a tear where there was not supposed to be a hole. Another type of misoperation might be involved in the event that a hole in a card became plugged with dirt or due to undue friction a sensing wire failed to descend. Various electrical misoperations may also prevent the existence of an output, as by failure of one of the switches to make good contact.

FIGURE 18 shows particularly that portion of the control system comprising a stepping switch which routes information from the tag reading element to the stepping switches associated therewith and previously described with reference to FIGURE 16. The stepping switch 380 is of the same general type previously described but involves 26 steps in its complete cycle of operation. The driving electromagnet is indicated at 382 and has associated with it the break contact arrangement 384, the fixed contact of which is connected to terminal 386 and, through resistor 388, to the driving winding, there being provided the usual capacitor 390. Rotary wiping contacts 392, 394, 396, 398, 400, 402, 404 and 406 are arranged to engage the fixed contacts of respective banks 408, 410, 412, 414, 416, 418, 420, and 422. The first bank 408 is provided for reset, and has its wiper 392 connected to the movable contact at 384. The fixed contacts numbered 1 to 25 are connected together and to a terminal 424. The contact at position 408 is connected to terminal 426.

The fixed contacts of the second bank are connected as illustrated alternately to the terminals 428 and 430, this being true of the contacts numbered 1 to 16. The contact numbered 17 is connected to a terminal 432. The wiper 394 of this bank is connected to terminal 434 and also to the fixed contacts of a pair 436, the movable contact of which is in normally closed position, connected to terminal 438, and adapted to be opened upon energization of the driving magnet 382. This second bank 410 is provided to insure proper synchronization of the steps of the tray with the steps of this relay. The reason for termination of the control action at the contact in position 16 is on the assumption that for complete reading of a tag only a limited number of steps of the tray is required, so that following this number of steps the reading action may be terminated, the full capacity of the tag reader not being utilized.

The third bank 412 and the sixth bank 418 are involved in detecting and indicating the presence of a bad tag or other circumstances, and their functions will be more clearly indicated hereafter. The wiper 396 of bank 412 is connected to a terminal 440, and the wiper 402 of bank 418 is connected to a terminal 474. The first ten contacts of bank 412 are connected together and through lead 442 to terminal 443. The contacts in positions 11 to 16, inclusive, are connected together and to a terminal 452. The seventeenth contact of this bank is connected to a terminal 456. The first sixteen contacts of bank 418 are connected together and to a terminal 476. The further connections of these terminals will be referred to hereafter.

The banks 414 and 416 are concerned with the reading of clerk's tokens (if used) and customer's credit cards. In connection with these reference will be made to their associations with the matters of FIGURES 16 and 17.

The wiper 398 of bank 414 is connected to terminal 458. The contacts in positions 6 to 9, inclusive, of bank 414 are connected to individual leads which are indicated at a group at 460. It may be assumed that the clerks of a store or of a system of stores may be represented numerically by numbers having four orders of digits, and to identify a clerk there will accordingly be used four stepping relays of the type illustrated in FIGURE 16, each of these stepping relays representing an order of the complete number. For simplicity of showing, only one of these relays, corresponding to unit order is shown at 462. The connection 460 running from the contact in position 6 is connected to this relay at the terminal designated 306 in FIGURE 16. As was already noted, clerk's tokens and customer's credit cards are read serially so as to utilize common portions of the apparatus. Accordingly, the contacts of banks 414 in position 11 to 16, inclusive, are connected to individual lines, grouped at 464, which, in accordance with what has just been described, are connected to the terminals 306 of customers step relays of the type shown in FIGURE 16, there being six of these, of which only one is illustrated at 466.

The wiper 400 of bank 416 is connected to terminal 468. As in the case of the preceding bank individual leads 470 and 472 run from the contacts, the group of leads 470 corresponding to orders of clerk's numbers and the group 472 to orders of customer's numbers. These leads 470 and 472 run to individual terminals 288 identifiable in FIGURE 16.

To round out this matter, there is indicated at 512 a translator of the type illustrated in FIGURE 17 which has connections 510, corresponding to 366 of that figure, running to the connections 304 shown in FIGURE 16 for the stepping relays.

The last banks 420 and 422 pertain to merchandise information but are connected in all respects similarly to the banks 414 and 416. The wiper 404 of bank 420 is connected to terminal 488. The contacts in the first five positions of this bank are connected individually to leads 490, the contacts in positions 6 to 11, inclusive, are connected individually to leads 492, and the contacts in positions 12 to 16, inclusive, are individually connected to leads 494. The five leads of the group 490 are individually connected to the terminals 306 of a set of stepping relays of which one is illustrated at 496. In similar fashion the leads of groups 492 and 494 are connected to sets of stepping relays of which 498 and 500 are representative of the respective sets. As will be evident from the foregoing, five orders of digits are used to indicate the department and class of the merchandise, six orders of digits are used to identify merchandise numbers, and five orders of digits are used to identify unit prices, the first two of these digits representing cents and the others dollars. In the bank 422, the wiper 406 is connected to terminal 502 while the fixed contacts are connected in groupings corresponding to those of the previous bank to the individual groups of leads 504, 506 and 508 which are individually connected to the terminals 288 of the stepping relays. As before, the terminals 304 of the stepping relays are connected as indicated at 514 to a merchandise translator 516 of the type shown in FIGURE 17, the connections being to the output terminals 366 of the translator.

The external terminals referred to will have their connections shown in conjunction with an overall control diagram.

Figure 19:
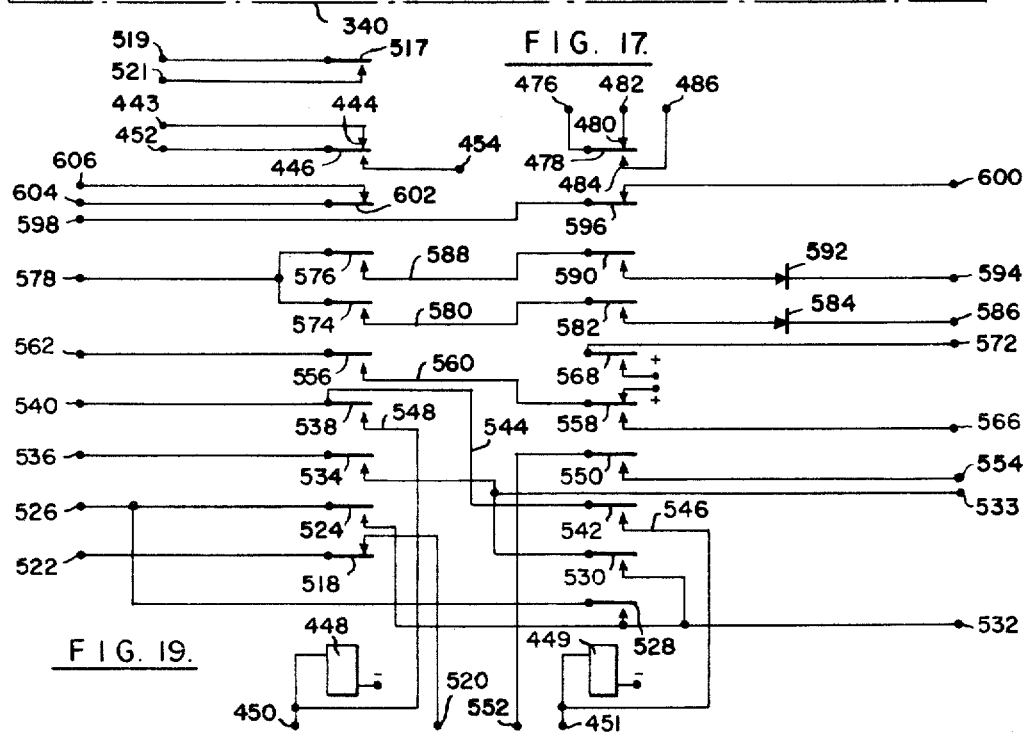
FIGURE 19 is a further diagram illustrating certain selective control relays.

A pair of relays 448 and 449 have rather elaborate interconnections and are closely associated with the matter shown in FIGURE 18 and are consequently shown as a unit in FIGURE 19. The uppermost contacts of these relays are directly associated with certain terminals heretofore referred to in FIGURE 18 and will be first described. All of the movable contacts are shown in the positions normally assumed when the relays are deenergized.

A movable contact 446 of relay 448 is connected to terminal 452 previously shown in FIGURE 18. Its upper fixed contact 444 is connected to terminal 443 previously shown. Its lower contact is connected to terminal 452, also previously shown.

The movable contacts 478 of relay 449 is connected to terminal 476, previously shown. Its upper and lower fixed contacts 480 and 484, respectively, are connected to the respective terminals 482 and 486.

The relays 448 and 449 are respectively energized from terminals 450 and 451.

Movable contact 518 is connected to terminal 522 and has its fixed contact connected to terminal 520.

Movable contact 524 of relay 448 is connected to terminal 526 as is also the movable contact 528 of relay 449. The corresponding fixed contacts are connected together and to a terminal 532. This terminal is also connected to the fixed contact engageable by movable contact 530 of relay 449. The movable contact 530 is connected to the fixed contact corresponding to movable contact 534 of relay 448, and is also connected to line 533. The movable contact 534 is connected to terminal 536. Movable contact 538 of relay 448 is connected to terminal 540 and also to the movable contact 542 of relay 449. The fixed contact corresponding to movable contact 538 is connected at 548 to terminal 450. The fixed contact corresponding to movable contact 542 is connected at 546 to terminal 451.

Movable contact 517 is arranged to connect terminals 519 and 521 when relay 448 is energized.

The movable contact 550 of relay 449 and its corresponding fixed contact are respectively connected to the terminals 552 and 554. Movable contact 556 of relay 448 is connected to line 562 and its corresponding fixed contact is connected at 560 to movable contact 558 of relay 449, the corresponding upper fixed contact being connected to the positive voltage source while its lower contact is connected to terminal 566. Movable contact 568 of relay 449 is adapted to connect the positive voltage terminal 570 to terminal 572 when the relay is energized.

Movable contacts 574 and 576 of relay 448 are connected to terminal 578, the fixed contact of the former being connected at 580 to the movable contact 582 of relay 449, the corresponding fixed contact of which is connected through diode 584 to terminal 586. In similar fashion the fixed contact corresponding to movable contact 576 is connected to the movable contact 590 of relay 449 having its fixed contact connected through diode 592 to terminal 594. The diodes are provided for isolation purposes as will become evident hereafter. Movable contact 596 of relay 449 is arranged to break a connection between terminals 598 and 600.

Movable contact 602 of relay 448 is arranged to break the circuit between terminals 604 and 606.

FIGURE 20 shows, in particular, a series of relays which are involved in the control and which are interconnected with relays and other electromagnetic elements and terminals heretofore discussed. Those elements having reference numerals less than 608 will be found, to a major extent, in the diagrams constituting FIGURES 17, 18 and 19, while the other numbers less than 608 have been described with reference to the earlier mechanical figures.

First referring to the various electromagnetic elements heretofore described, 196 is the tray stepping electromagnet shown in FIGURE 5 which also acts as a relay having a movable contact 656.

Figure 4:
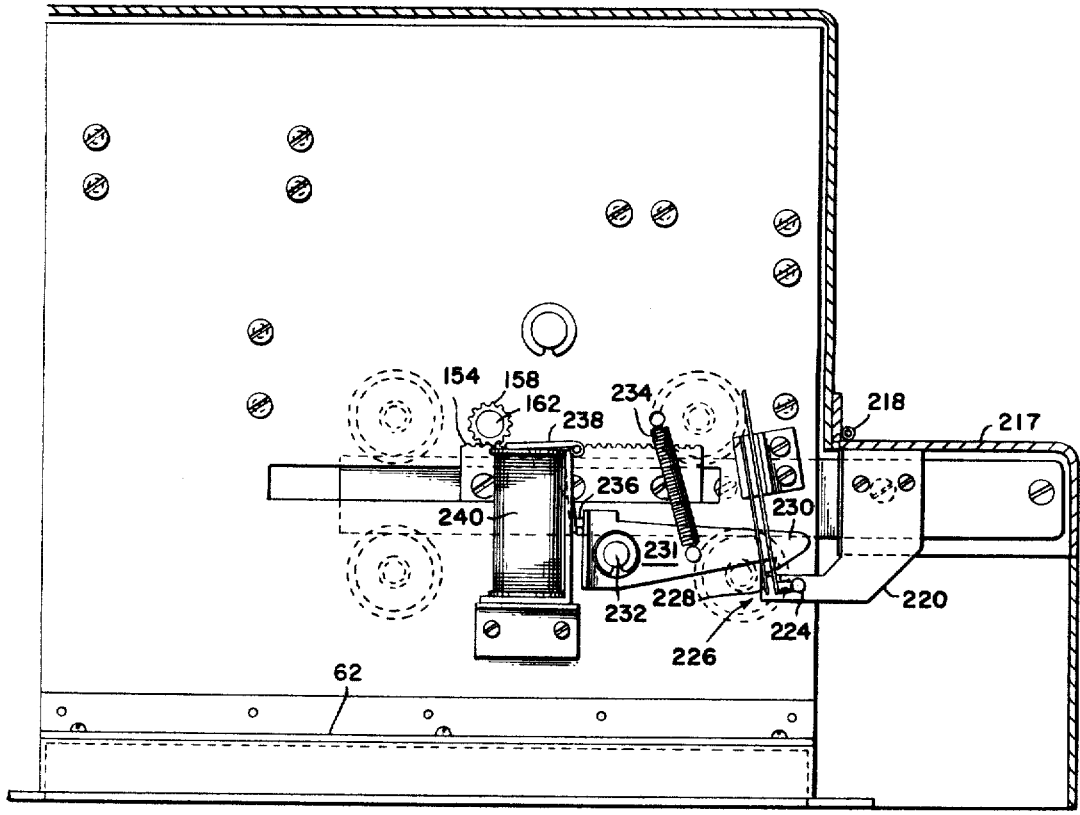
FIGURE 4 is an elevation of the left-hand side of the card reader mechanism.

240 is the cover-locking electromagnet shown in FIGURE 4.

Also shown on the diagram are various switches previously described, as follows:

202 shows the odd-even switch operated by the cam 198 in FIGURE 5.

204 is the switch shown in FIGURE 5 which indicates that the tray is not open, this switch being opened only when the tray is completely open.

Figure 7:
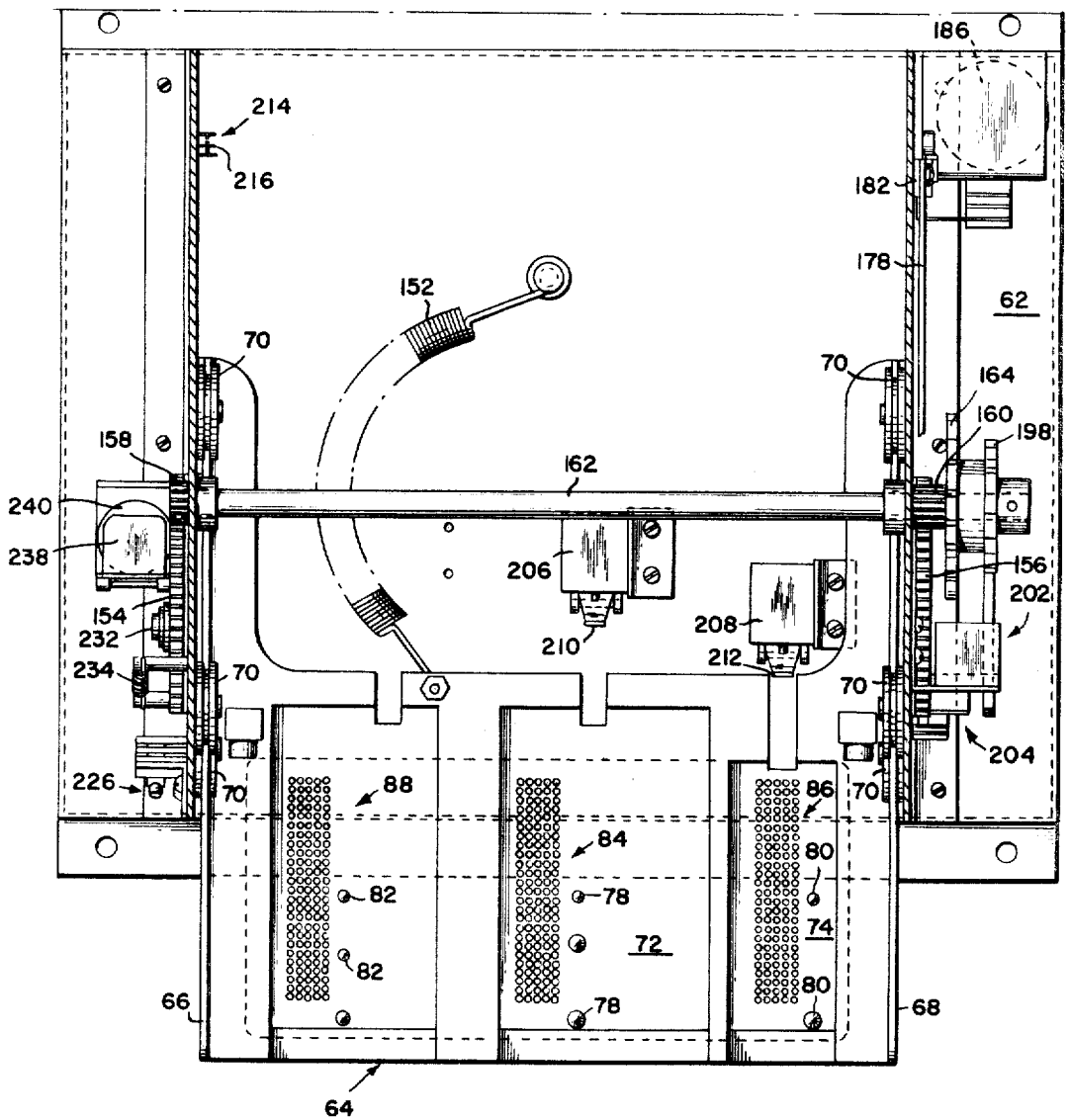
FIGURE 7 is a horizontal section taken on the surface indicated at 7—7 in FIGURE 3.

206 and 208 are the switches in FIGURE 7 which detect, respectively, the presence of a customer credit card and a merchandise tag when the tray is closed.

Figure 8:
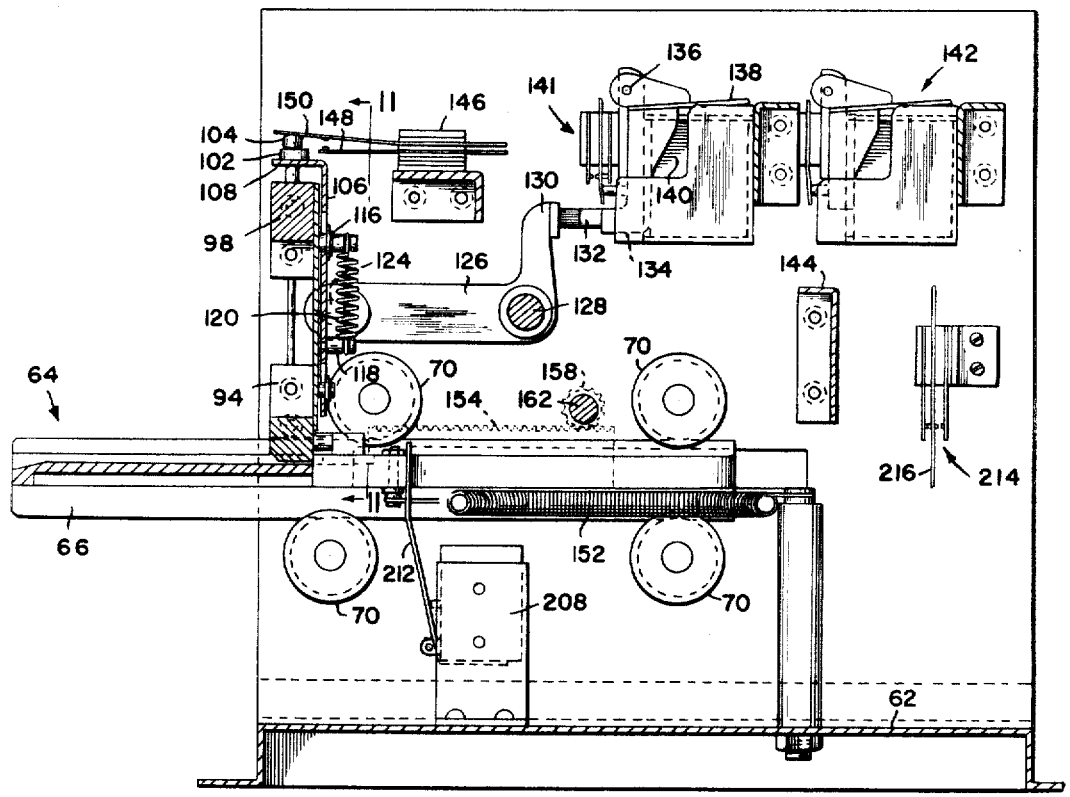
FIGURE 8 is a vertical section taken on the surface indicated at 8—8 in FIGURE 3.
Figure 11:
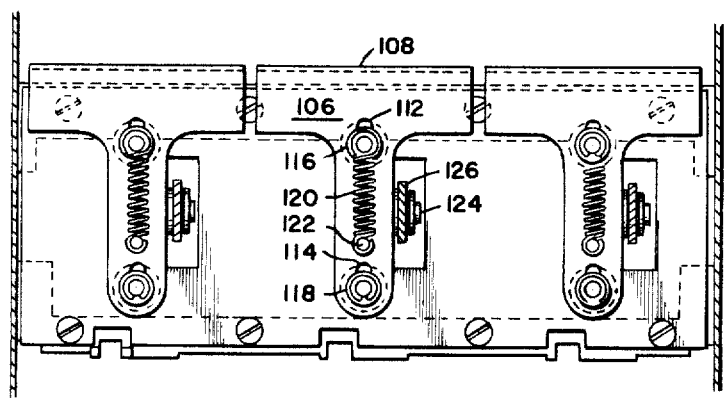
FIGURE 11 is a section taken on the surface indicated at 11—11 in FIGURES 6 and 8.

214 is the switch shown in FIGURE 8 which indicates either the tray is closed or not closed.

226 is the normally open switch shown in FIGURE 4 which is closed when the cover 217 is closed.

Reference is now made to those elements which are first shown in FIGURE 20. These are relays 608, 612, 614, 616, 618, 620, 622, 624, 626, 628 and 630 each of which is provided with one or more contacts of single-throw or double-throw type as shown in FIGURE 20. It will be noted that relay 610 does not appear in this figure, but rather, will be described with reference to FIGURE 36 wherein its function will best be understood. The aspects of the above mentioned contacts may be best made clear by referring to their interconnections hereafter. It will be noted that all of the contacts in FIGURE 20 are shown in the positions they normally occupy when their associated relays are deenergized.

Reference may now be made to the connections established by operation of the above-mentioned relays and their associated contacts. Normally closed contact 656 of relay 196 connects the positive power source through line 658 to switch 202 which alternatively contacts lines 428 or 430 previously recited. Line 658 is further connected to the positve terminal of the winding of relay 608 through switches 214, 226 and line 904. Line 658 is further connected through switch 204 and line 684 to movable contact 686 of relay 616 the winding of which is connected between line 456 and the negative supply terminal. Line 456 is also connected through fixed contact 804 and movable contact 802 of relay 616 to the fixed contact engageably by the movable contact 694 of relay 612 which is also connected to line 692. The fixed contact is also connected to line 432.

The positive terminal of relay 612 is connected through line 876 and movable contact 874 of relay 624 to the positive power source. Line 876 is also connected between contact 874 and the relay winding 612 to line 611, line 875 being connected to the latter. In turn, line 875 is connected to movable contacts 678 and 680 of relay 612. Contact 678 is connected through line 676 to movable contact 674 of relay 614 and through this contact to line 672. Line 682 interconnects movable contacts 680 and 686 as well as line 684 previously mentioned.

Relay 608 actuates two movable contacts 660 and 662 the first of which establishes a current path from line 632 through switch 206 to line 450 and the second of which establishes a current path from the positive power source through switch 208 to line 451.

In addition to the three movable contacts previously described, relay 612 actuates a fourth movable contact 696 which interconnects lines 718 and 540, the latter of which continues as line 868 through contact 866 of relay 624 to the positive power source.

The positive terminal of relay 614 is connected through line 800 and contact 798 of relay 616 to line 532. Contact 798 is also connected to line 746 and through contact 742 of relay 614 to lines 806 and 432 previously mentioned.

Relay 614 also actuates movable contact 748 and 772 the first of which is connected through diode 770 to line 438 and the second of which is connected through diode 792 to the same line. Relay 614 also actuates movable contacts 736, 732, 794 and 991. The last mentioned contact interconnects lines 990 and 3209 the functions of which will be hereinafter described. Contact 794 interconnects the positive power source and the winding of relay 630 through line 796, the negative relay terminal being connected to line 434. Contact 732 interconnects the positive power source through line 734 to the positive terminal of relay 240. Lastly, contact 736 is operative to alternatively connect the positive power source through line 738 and contact 740 of relay 616 to line 424, or, to interconnect the positive power source directly to line 426

In addition to actuating movable contacts 740, 802, 798 and 686 as previously described, relay 616 actuates movable contacts 812 and 908 the latter of which interconnects lines 552 and 650 when the relay is energized. Similarly, contact 812 is operative to interconnect lines 522 and 814 upon energization of the relay.

Reference is now made to relay 618 the positive terminal of which is connected through resistors 906 and 908 to line 443, line 458 being connected intermediate these resistors. Relay 618 actuates movable contact 840 so as to interconnect lines 468 and 367 when the relay is deenergized. Relay 618 also actuates movable contacts 822 and 830 the latter of which connects the positive terminal of relay 196 through resistor 838 and line 836 to movable contact 834 of relay 620 and thence to the positive power source. Contact 822 is operative to connect the positive power source through line 824 and movable contact 826 of relay 620 to line 386. Lastly, relay 618 actuates movable contact 754 so as to alternatively connect line 750 with line 756 or 758.

Reference is now made to relay 620 the positive terminal of which is connected through resistors 912 and 914 to line 482, the line 488 being connected intermediate these resistors. Relay 620 actuates movable contact 846 so as to interconnect lines 367 and 502 when the relay is deenergized. Relay 620 also actuates movable contact 776 so as to alternatively connect line 774 with line 780 or 782 the former of which is connected to line 482 and the latter of which is connected to movable contact 784 of relay 622. Of course, relay 620 also actuates contacts 826 and 834 as pointed out hereinabove.

Reference is now made to relay 622 the positive terminal of which is connected through line 702 to lines 704 and 708 which alternatively connect the relay to the positive power sources through movable contacts 706 and 710 respectively. Relay 622 actuates contact 700 which interconnects lines 698 and 702 when the relay is energized. Relay 622 also actuates contact 861 which interconnects the positive power source and line 862. Movable contact 784 is also actuated by this relay and is operative to alternatively connect line 782 with lamp 788 or line 786 which is connected to one terminal of relay 628, the other relay terminal being connected to line 474. Lastly, relay 622 actuates contact 762 so as to alternatively connect line 758 to lamp 766 or line 776 connected to the winding of relay 626 and thence to line 440.

Reference is now made to relay 624 the positive terminal of which is connected to line 856. Line 856 is also connected to the fixed contact associated with movable contact 852 connected to line 654. In addition to actuating contacts 874 and 866 as previously described, relay 624 actuates contacts 870, 918 and 816. Contact 870 connects the positive power source to line 640 when the relay is energized and, similarly, contact 918 connects the positive power source to line 652. Contact 816 connects line 520 with line 814 when the relay is deenergized.

In addition to actuating contact 706 as previously described, relay 626 actuates contacts 892 and 880 the latter of which connects the positive power source to line 882 containing delay capacitor 884. Contact 892 connects line 900 to relay 622 through resistor 896 in line 894.

Relay 628 actuates contact 710 so as to connect line 708 with the positive source when the relay is energized. Relay 628 also actuates contact 890 so as to alternatively connect line 888 with either line 900 or the positive power source.

Relay 630 actuates a single contact 712 which connects line 707 to the positive power source when the relay is energized.

FIGURE 21 is a block diagram provided to facilitate visualization of the complete point of sale machine. It indicates the unit elements thereof and, in particular, the duplications of stepping switches by their functions. It may be referred to in connection with the description of operation.

Figure 22B:
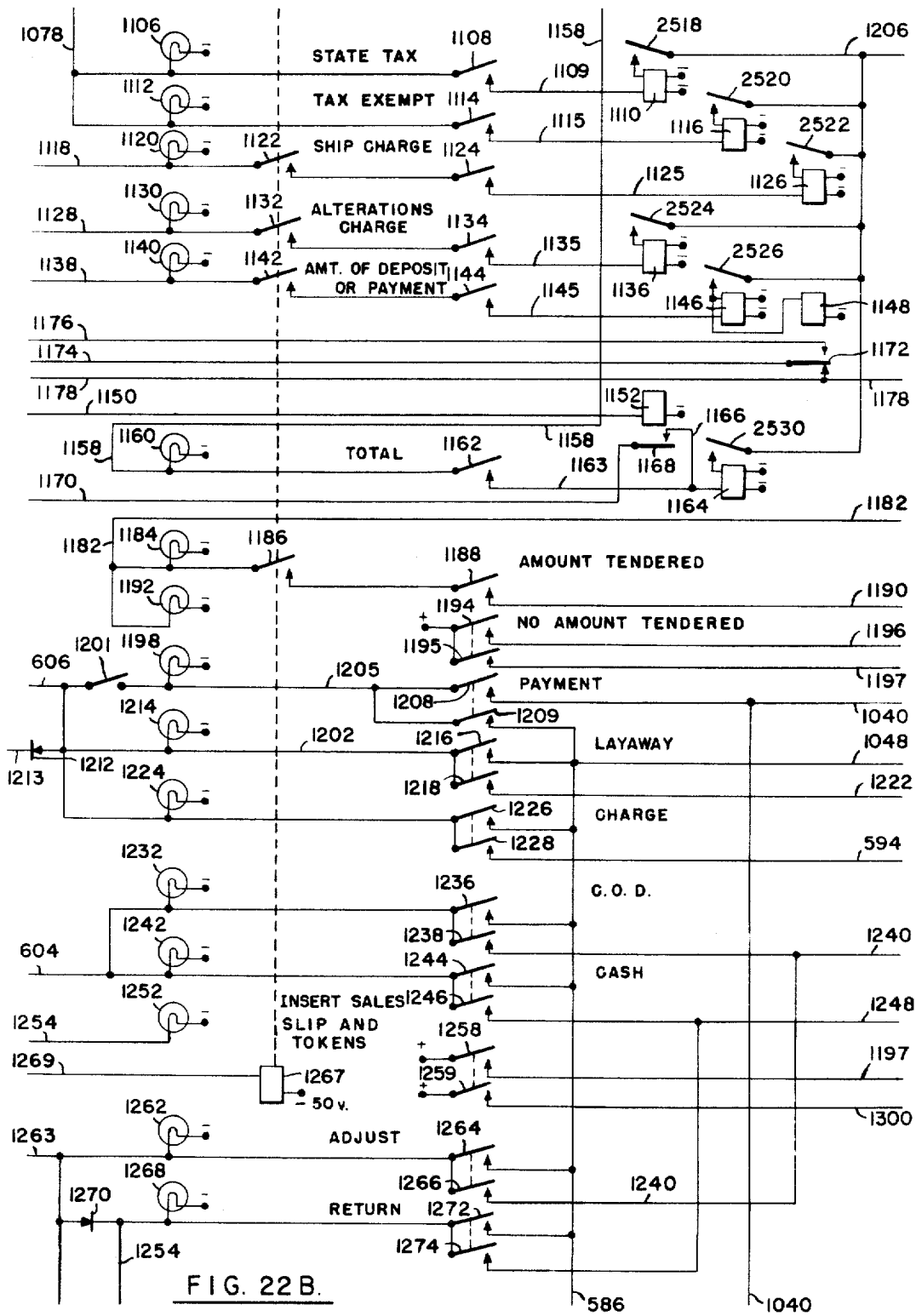
Figure 22C:
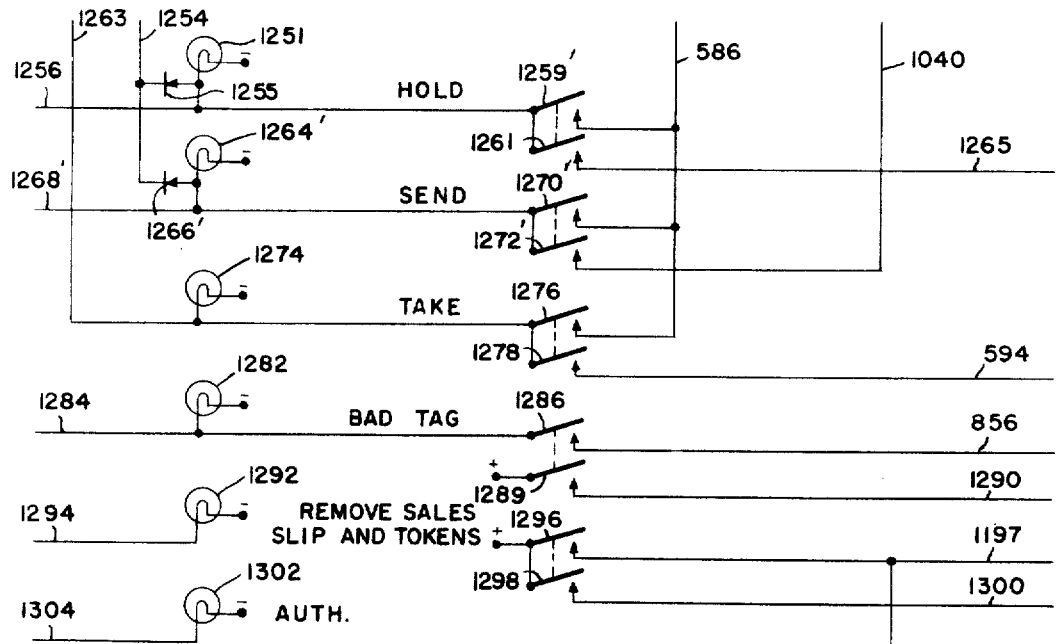

Reference will now be made to FIGURES 22A, 22B and 22C. These figures relate particularly to the keys of the bank 12 (see FIGURE 2). These keys are desirably formed of a translucent plastic material and carry legends which are called to the clerk's attention by lamps located individually below the keys for their illumination. As will hereafter appear more fully, the keys are illuminated either individually or in various groups. When individual keys are illuminated they may be considered as giving directions to the clerk, as in the case of the top left key which directs the clerk to insert a sales slip and tokens. Or alternatively a single illuminated key may ask a question, such as what is the clerk's number (assuming no clerk's token has been inserted) requiring the clerk to enter the appropriate number on the numerical keyboard 10. Similar questions are exemplified by the queries for the department and class, the merchandise number, etc. At other times several of the keys may be illuminated simultaneously, as for example the keys designated "Cash," "Charge," "C.O.D.," "Layaway" and "Payment." This group of keys asks a question as to the nature of the transaction. The clerk answers this question by depression of the appropriate key. Depending upon the key depressed, another question or direction is asked or given. For example, if the "charge" key is depressed, and a customer's charge plate has not been inserted in the tag reader, there will then be illuminated the key asking for the customer or layaway number, and the machine will not proceed in its operations unless a number is inserted in the numerical keyboard 10. The sequencing of these keys either singly or in groups will be referred to hereafter. At this point it will suffice to note that each key may be illuminated, and on depression, will operate in appropriate single or multiple-pole switch for control purposes. The keys are arranged in the conventional fashion of calculators so that each key is latched downwardly upon depression and is released upon depression of any other key. As will become evident from the circuitry, the depression of an inappropriate key will have no function. Keys may also be released by control solenoid operation. If such latching and control of keys is conventional it will be unnecessary to describe the usual mechanism therefore.

The keys are indicated in the diagrams only by the switches which they operate and by virtue of their associated lamps. The legends will be described as they appear in FIGURE 2.

A line 920 is connected to the clerk number lamp 922 and to the movable contact 924 of a relay the winding of which is illustrated at 1267 in FIGURE 22B. This relay which may be physically several relays, has a large number of contacts all of which are illustrated vertically below 924. To the fixed contact of 924, connection is made to the switch 926 which is operated by the clerk number key. The fixed contact of this switch connects with line 928.

Connection 930 runs to the lamp 932 which illuminates the key designated "Cust. or Layaway No." and to the movable relay contact 934, connection then running to the switch 936 operated by this key and to line 938.

The department-class key is illuminated by lamp 942 which is connected through relay contact 944 and the corresponding key operated switch 946 to the line 948.

A line 962 is connected to the merchandise number lamp 964 and through the relay contact 966 to the corresponding key operated switch 968 and thence to line 970.

A line 972 is connected to both the quantity multiply lamp 964 and to the quantity special price lamp 976. It is also connected through relay contact 978 to both the single-pole switch 980 operable by the quantity multiply key and to the double-pole switch 984, 988 connected to the quantity special price key. The switch 980 provides connection to line 982, the switch 984 provides connection to the line 986, and the switch 988 provides connection to the line 990.

Connection 598 runs to the unit price lamp 994 and through the relay contact 996 to the switch 998 operable by the unit price key to provide connection to the line 1000. Line 1002 is connected through the relay contact 1004 to the second switch 1006 operated by the unit price key to provide connection to the line 1008.

The line 1010 connects to the lamp 1012 of the extended amount key and through relay contact 1014 to the switch 1016 operable by the extended amount key to provide connection to the line 1018.

A line 1020 is connected to the line reset lamp 1022 and to the switch 1024 operable by the line reset key, providing connection to line 1026. The line 1020 is also connected to the employee's ten percent discount lamp 1028, and to the switch 1030 operable by the corresponding key to provide connection to the line 594. A second switch operable by the same key is indicated at 1034 and provides connection to 1044.

The employee's twenty percent discount lamp 1036 is connected to line 1020 and to the switch 1038 operable by the corresponding key to make connection to line 1040. A second switch 1042 operated by the same key provides contact with the connection 1044 and through diode 1046 to the line 586. Connection is also provided to the line 1050.

A diode 1052, polarized as shown, connects line 1020 with line 1054 and with the lamp 1056 of the manual federal tax entry key. The same connection runs through relay contact 1058 to the switch 1060 operable by the corresponding key to provide connection to line 1062. A second associated switch 1064 provides connection to line 1066. Also connected to line 1054 is the lamp 1068 of the federal tax ten percent key. The connection continues through switch 1070 connected to line 1072 and through switch 1074 connecting to line 1076, both of these switches being operated by the corresponding key.

A line 1078 is connected through the normally closed contact 1080 of a relay 1082 to the next item lamp 1086 and also to the normally open contact 1088 of a relay 1090. The latter is arranged to provide connection through switch 1094 and diode 1096 to line 1098, and through switch 1100 and diode 1102 to line 1104. The switches 1094 and 1100 are operated by the next item key. Relay 1082 is energized through line 1084, and relay 1090 is energized through line 1092.

Passing to FIGURE 22B, the line 1078 is also connected to the lamp 1106 of the state tax key, and to the corresponding switch 1108 operated by this key, the switch being provided to energize the relay 1110 which has a second winding energized from line 1206 through contact 2518 when the first winding is energized.

Line 1078 is also connected to the lamp 1112 of the tax exempt key and also to the switch 1114 operated by the same key. The fixed contact of switch 1114 is connected to one winding of a relay 1116, the second winding of which is arranged to be energized from the line 1206 through contact 2520 when the first winding is energized.

A line 1118 is connected to the lamp 1120 which illuminates the shipping charge key. Line 1118 also connects through relay contact 1122 to the switch 1124 operable by the same key and arranged to energize one winding of a relay 1126, the other winding of which is energized from line 1206 through contact 2522 when the first winding is energized.

The line 1128 is connected to the lamp 1130 of the alteration charge key and also through relay contact 1132 to the switch 1134 operated by that key, the connection continuing to one winding of a relay 136, the other winding of which is arranged to be energized from line 1206 through contact 2524 when the first winding is energized.

The line 1138 is connected to the lamp 1140 associated with the amount of deposit or payment key. Line 1138 also connects through the relay contact 1142 to the switch 1144 operable by the corresponding key. This switch provides connection to one winding of the double winding relay 1146. A second winding of this relay is arranged to be connected to the line 1206 through contact 2526 when the first winding is energized, and also energized with this second winding is the winding of the relay 1148.

The movable contact 1172 of the relay 1148 is connected to line 1174, and the upper and lower fixed contacts are respectively connected to the line 1176 and to the line 1178.

A line 1150 is connected to the winding of a relay 1152. The line 1158 is connected to the lamp 1160 of the total key and to the switch 1162 arranged to be closed by this key. This closure energizes one winding of the relay 1164, the other winding of which is connected to the line 1206 through contact 2530 when the former is energized. Connection is also provided at 1166 to the fixed contact engageable by the movable contact 1168 of relay 1152. The contact 1168 is connected to the line 1170.

It may be here noted that the various doubly wound relays 1110, 1116, 1126, 1136, 1146 and 1164 are of self-holding type by reason of the connection to the line 1206. The purpose of this arrangement will be described hereafter.

A line 1182 is connected to the lamp 1184 of the amount tendered key, and to the relay contact 1186 through which connection is provided to the switch 1188 of the corresponding key and to the line 1190. The lamp 1192 of the no amount tendered key is also connected to the line 1182. The last mentioned key operates a double-pole switch. The movable elements 194 and 195 of this switch are connected to a positive supply terminal, and the corresponding fixed contacts are connected to lines 1196 and 1197.

The lamp 1198 for the payment key is connected through a switch 1201 to the line 606. This switch is a toggle switch which may be opened to prevent acceptance of payments at a point of sale machine. The lamp is also connected at 1205 to the switch 1208 arranged to be actuated by the corresponding key to provide connection to the line 1040. A second contact 1209 is arranged to connect 1205 to line 586.

The line 606 is connected through diode 1212 to the line 1213.

Also connected to line 606 is the lamp 1214 of the layaway key, there being also connected to the line 1202 the switches 1216 and 1218 operable by the layaway key. These switches provide respective connections at 1220 to the line 1048 and to a line 1222.

Also connected to the line 606 is the lamp 1224 of the charge key and the switches 1226 and 1228 of the same key. These switches provide respective connections to the lines 586 and 594.

The lamp 1232 of the C.O.D. key is connected to line 604 which also connects to the two switches 1236 and 1238 operable by this key. The former of these makes connection to the line 586, and the latter to the line 1240.

The lamp 1242 of the cash key is also connected to the line 604, which is connected to the switches 1244 and 1246 operable by the cash key to provide respective connections to the line 586 and to the line 1248.

The lamp 1252 of the insert sales slip and tokens key is connected to the line 1254. The switch 1258 operable by this same key has its movable contact connected to the positive supply terminal and its fixed contact to the line 1197. This latter line is connected to the key release solenoid 1261 (see FIGURE 22C) which is arranged to release the keys of the first column. A second contact 1259 of the key is arranged to connect the positive terminal to line 1300.

The winding 1267 of the relay referred to above and which operates to close all of the contacts vertically thereabove is arranged to be energized from the line 1269.

The lamp 1262 for the adjust key is connected to the line 1263 which connects to the switches 1264 and 1266 operable by the same key to provide respective connections to the lines 586 and 1240.

The lamp 1268 for the return key is connected through diode 2170, polarized as indicated, to the line 1263. The last is also connected to the switches 1272 and 1274 operable by the return key to make respective connections to the lines 586 and 1248.

The lamp 1251 of the hold key is connected through diode 1255 to the connection 1254 to the lamp 1268 and also to the line 1256. The corresponding key is arranged to operate the switches 1259 and 1261 to provide respective connections to the lines 586 and 1265.

The lamp 1264 of the send key is connected through diode 1266 to the line 1254, and also to the line 1268 which is connected to the switches 1270 and 1272 of the corresponding key which are arranged to connect respectively to the lines 586 and 1040.

The lamp 1274 of the take key is connected to the line 1263, which also connects to the switches 1276 and 1278 operable by the take key and respectively providing connections to lines 586 and 594.

The lamp 1282 of the bad tag key is connected to the line 1284 which is connected to one of the switches 1286 operable by that key to provide connection to the line 856. The other switch 1289 operable by this key has its movable element connected to the positive supply terminal and its fixed element connected to line 1290.

The lamp 1292 associated with the remove sales slip and tokens key is connected to the line 1294. This key operates the switches 1296 and 1298, the movable elements of which are connected to the positive supply terminal, while the fixed elements are respectively connected to the lines 1197 and 1300 (FIGURE 22B).

The lamp 1302 associated with the authorization key is connected to the line 1304. This key cannot operate any switch. The lamp is illuminated if a customer's account number is on a watch list, and serves as a warning to the clerk.

A relay 1307 is connected to a line 1309. A normally open contact 1311 of this relay is arranged to connect the positive supply to the line 1197 (FIGURE 22B) and to the solenoid 1261 previously mentioned, the winding of which is shunted by the diode 1313. A second normally open contact 1315 of relay 1307 is arranged to connect the positive supply through line 1317 to solenoids, represented as 1263, for release of the number keys. A further normally closed contact 1319 of relay 1307 connects lines 1213 and 578.

It will be noted from the foregoing description that upon the illumination of certain keys questions are asked by the keys which, for reply, require the insertion of numbers. Examples of these are the questions as to clerk's, customer's or merchandise numbers, department and class, unit price, state tax, alteration charge, etc. The function of the relay 1267 and its contacts is to insure that the pertinent questions are answered by the insertion of numerical figures on the numerical keyboard 10. Until a number is inserted in such cases the contacts of the relay 1267 are open, and the corresponding keys are ineffective if depressed. But if a number is inserted, then the contacts are closed, and depression of the appropriate key will be effective. Of course other connections to be later described are also involved in achieving effectiveness of any key.

Figure 23:
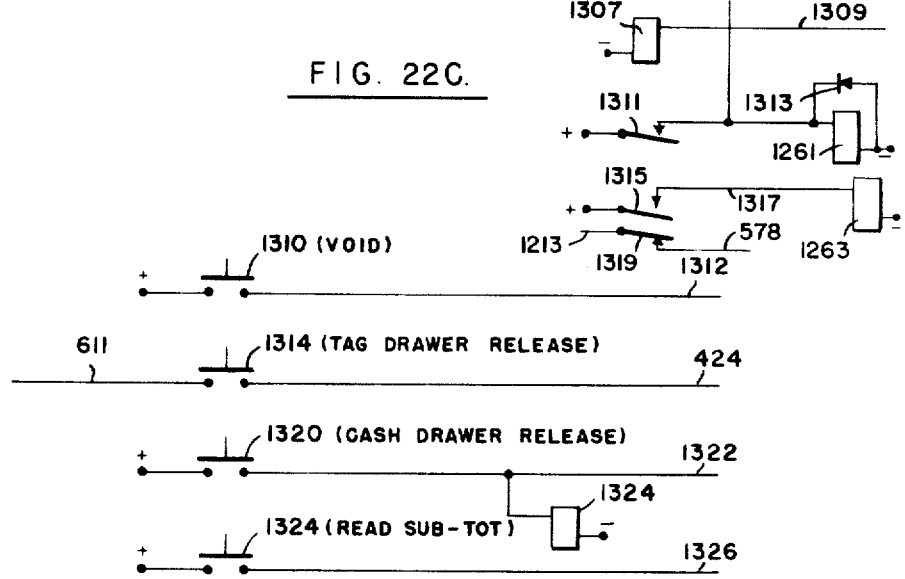
FIGURE 23 is a schematic diagram relating to a group of special control keys.

Reference may be made next to FIGURE 23 which shows the connections for the keys of the group 14. These are push-to-close keys which return as soon as released. The void key 1310 connects a line 1312 to the positive supply terminal.

The tag drawer release key 1314 provides interconnections between lines 424 and 611, previously mentioned.

The cash drawer release key 1320 connects the line 1322 to the positive supply terminal and also energizes the cash drawer release solenoid 1324. This provides ordinary locking in conventional fashion, releasable upon energization of the solenoid to permit opening of the cash drawer by action of the usual spring.

The read sub-total key 1324 connects the line 1326 to the positive supply terminal.

The electrical connections of the keys of the numerical keyboard 10 are illustrated in FIGURE 24. It will be understood that mechanically these keys are in a conventional keyboard arrangement in which, once depressed, they are latched down, with provision that if a key in any order is depressed the others in the same order will be simultaneously released. Provision is also made, as indicated above, for the instruction keyboard, for electromagnetic release of all depressed keys.

Figure 2:
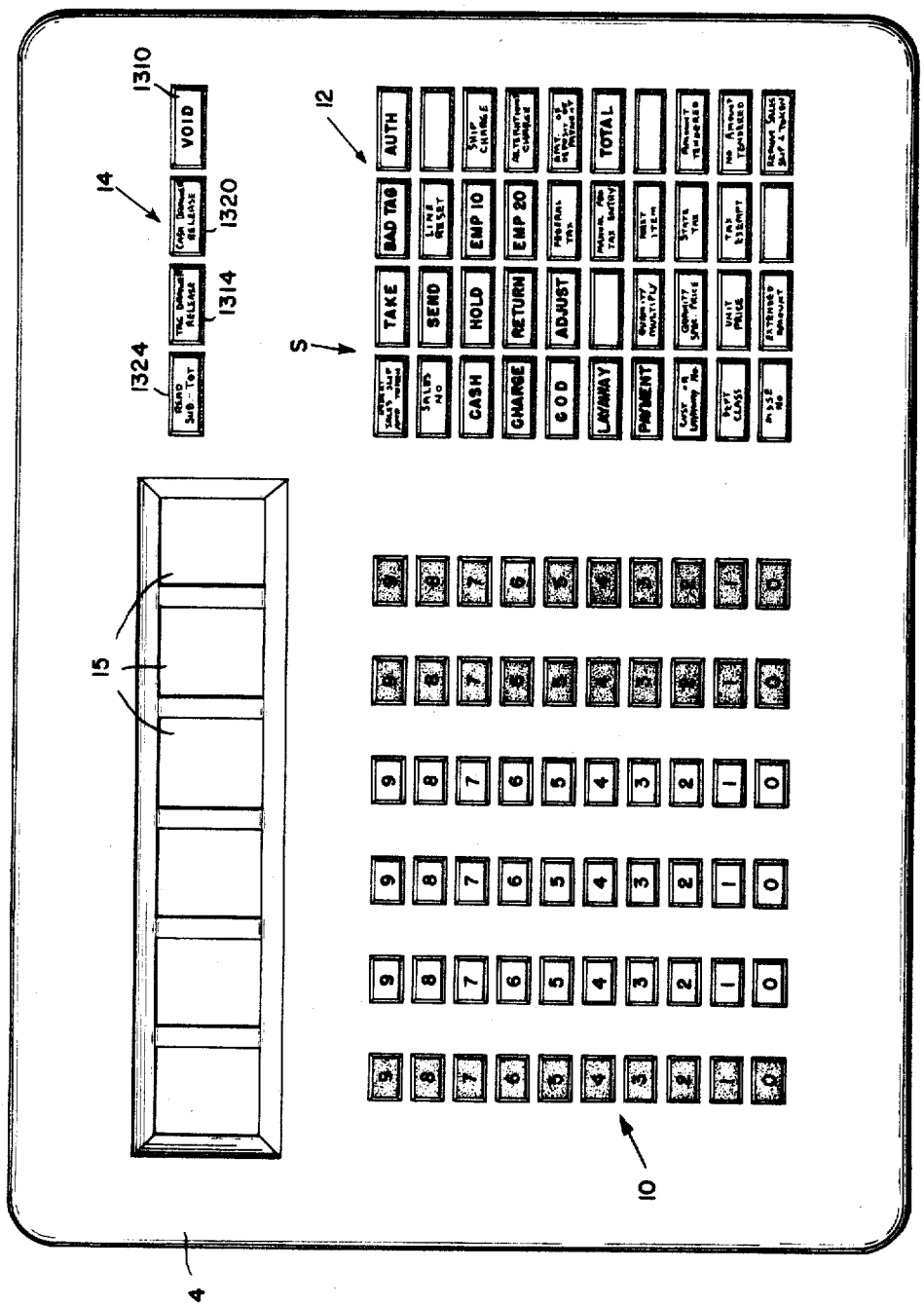
FIGURE 2 is a face view of the keyboard.
Figure 3:
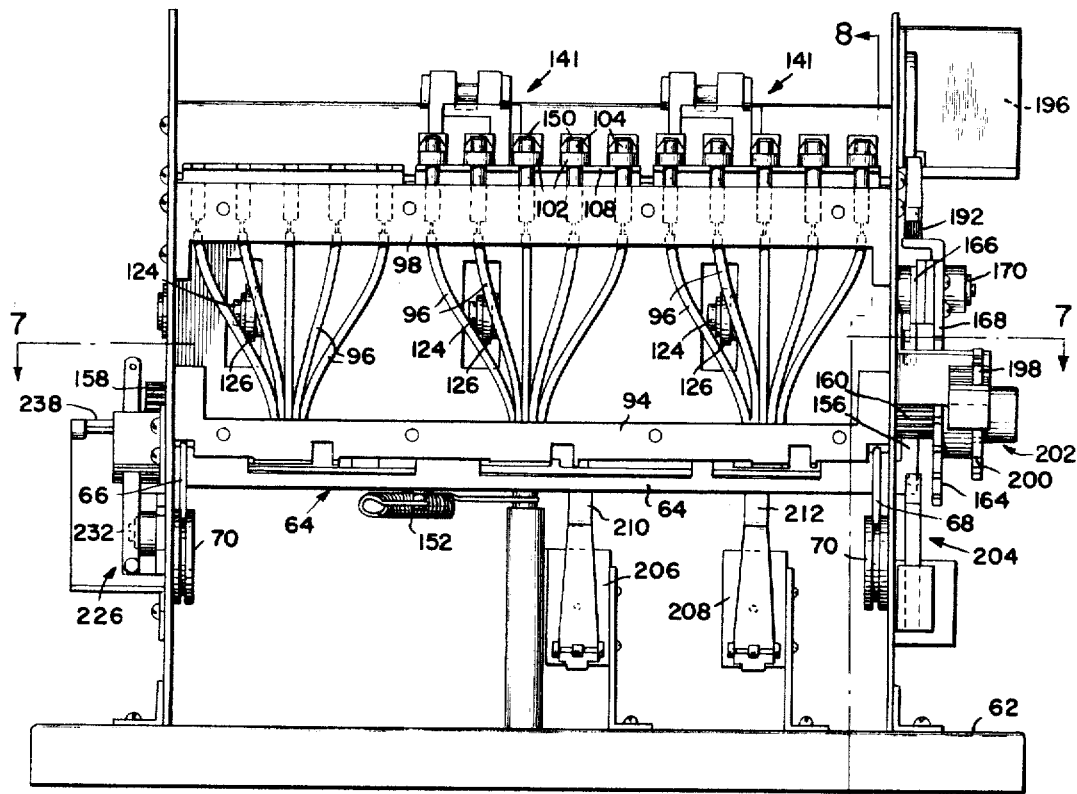
FIGURE 3 is a front elevation of the card reader mechanism.

While actually, as shown in FIGURE 2, six orders of keys are provided, the electrical connections are identical for all orders above the unit order, and the connections for the unit order are only slightly different from those of the higher order. Accordingly, in FIGURE 24, the connections for the unit order are indicated at 1328, and the connections for all of the higher orders are typified by what is shown at 1330. In each column the keys have the digital values running from zero to nine, as illustrated in FIGURE 2. With the exception of the keys corresponding to zero digital value, each key is associated with a triple-pole double-throw switch. In the case of the unit order, the key of zero digital value is associated with a double-pole double-throw switch. In the other orders the keys having zero digital values are associated with single-pole double-throw switches. The arrangement of the switches will be obvious from FIGURE 24.

The elements of the switches are arranged in triple columns in FIGURE 24, and for simplicity these elements will be referred to as switches, even though they are interdependent as already indicated. The movable elements of the right-hand column are designated 1332 except for that of zero digital value which is designated 1334. In the second column the respective corresponding designations are 1336 and 1338. In the left hand column they are designated 1340, there being no switch corresponding to zero digital value.

The switch element 1332 corresponding to digital value 9 is connected to a line 1342. The movable elements of the switches 1332 are connected in series through their normally closed contact as indicated at 1344. The normally closed contact of that corresponding to digital value unity is connected at 1346 to the normally closed contact of switch 1334. The movable element of 1334 is connected at 1348 through relay contact 1350 to a lamp 1352. Each of the other normally opened contacts 1354 of the right-hand column is connected through an individual lead of the group 1356 to an individual lamp 1358.

As already mentioned, in FIGURE 2 there are shown indicators 15 which are arranged, respectively, to display numerically the values entered in the various orders of the numerical keys, as well as other numerical values originating otherwise as will later appear. Each of these indicators is of conventional type in which upon the illumination of any one of ten lamps the corresponding digit is displayed. The lamps of the group 1352, 1358 are the lamps which effect such display in the units order indicator 15. These lamps have other connections indicated at 1394 for illuminating them selectively.

A connection 1360 from the line 1342 is provided to the lowermost element of the switches 1336. As in the case of the right-hand column of switches, those at 1336 are connected in series as shown through their normally closed contact, there being included in this series array the movable element of switch 1338. The normally closed contact of this last switch is connected to the line 1362. The normally open contacts are connected together at 1364, there being also connected with this group the normally open contact of switch 1334. The connection 1364 runs to the normally closed contact of a relay element 1366 which is connected to the positive supply terminal. The corresponding normally open contact is connected to line 1368.

Considering next the left-hand column of switches 1340, the lowermost movable element is connected to a line 1373 which through a normally open contact of relay 1371 is connected to line 1370. Relay 1371 is energized through a connection 3272, more fully identified hereafter. The remaining switches are connected in series through their normally closed contact, and the normally closed contact of the uppermost switch in position corresponding to unity digital value is connected to a line 1372 corresponding to a zero value. The normally open contact 1374 are connected to respective lines 1376.

The foregoing describes the connections for the units order. To the extent to which a higher order has corresponding elements, these are designated by the same reference numerals as those used in the units order but primed. It will be noted that there are only two basic differences between the connection for the higher orders and those for the units order. The switch corresponding to 1338 is missing, and the connection 1362' runs to the fixed contact of the switch 1336' corresponding to unity digital value. Instead of the connection from line 1342 to the lowermost switch element in the right-hand column, this is connected to the line 1362 previously mentioned.

Of the leads 1372 and 1376, those having corresponding digital values are connected together for all of the orders involved.

However, individual groups of lamps correspond to each order.

Reference may now be made to the left of FIGURE 24 which shows various relay connections. A relay 1378 has its winding connected at one end to a terminal 1380 which may be supplied from an alternating current transformer having its other transformer connected to the positive supply terminal. To the other end of the relay winding connections are made through diodes, a diode 1382 being connected to the line 1342, and a diode 1386 being connected through the normally open relay contacts 1384 to the line 1368' running from the switch assembly of the highest key order. The normally open movable contact 1388 of this relay is connected to the positive supply terminal, and its corresponding fixed contact is connected through the line 1269 to the relay 1267 previously mentioned and shown in FIGURE 22B.

Relays 1390 and 1392 are energized from the positive supply terminal by closure of the pushbutton switch 1324 designated "read sub-total" and already described with reference to FIGURE 23. The relay 1390 operates the contacts illustrated at 1366 and 1366', while the relay 1392 is arranged to open the contact at 1350 and 1350'.

The operation of the numerical key matter just described may be outlined as follows:

Assuming relays 1390 and 1392 deenergized, there will first be considered depression of a key of the group 1 to 9 in the units order. In such case the positive supply terminal is connected through relay contact 1366 and line 1364 through the switch 1336 of the middle group which has been depressed, down through the other switches of this group, through connection 1360 and up the right-hand column of switches 1332 to the one of these switches which is depressed and through the corresponding line 1356 to illuminate the appropriate lamp 1358. The connection is also provided through line 1342 for diode 1382 to energize relay 1378 which in turn energizes relay 1267 to close all the corresponding relay contacts in FIGURES 22A and 22B.

In the left-hand column, the line 1370 is connected to the corresponding contact 1374 and line 1376.

If the zero key in the units order is depressed, the same type of situation occurs in the right-hand and middle columns but in the left-hand column connection is made from line 1370 through the normally closed contact of unit digital value to the line 1372. It will be noted that this last connection exists even if no key is depressed in the units order.

In the case of a higher order similar operations occur. However there is a special condition which exists if the zero key in a lower order is not depressed, and this operation may be understood from consideration of the two orders shown. The positive connection through 1366' and 1364' runs down through the closed switch of the group 1336' and through those below it to the connection 1362, thence down through the switches 1338 and 1336 of the units (or next lower) order, and through connection 1360 to the line 1342 to energize the relay 1378. The connections as just mentioned may run through all of the lower orders. Additionally in each of these lower orders the connection is provided upwardly through the switches 1332, and connection 1346 to switch 1334 and line 1348 to the zero indicating lamp 1352. Thus zeros are indicated in all lower orders even though the zero key of these orders are not depressed. But the zero indicating lamps in higher orders will not be illuminated. For a proper and complete indication, therefore, it is not necessary to depress the zero keys.

Figure 25A:
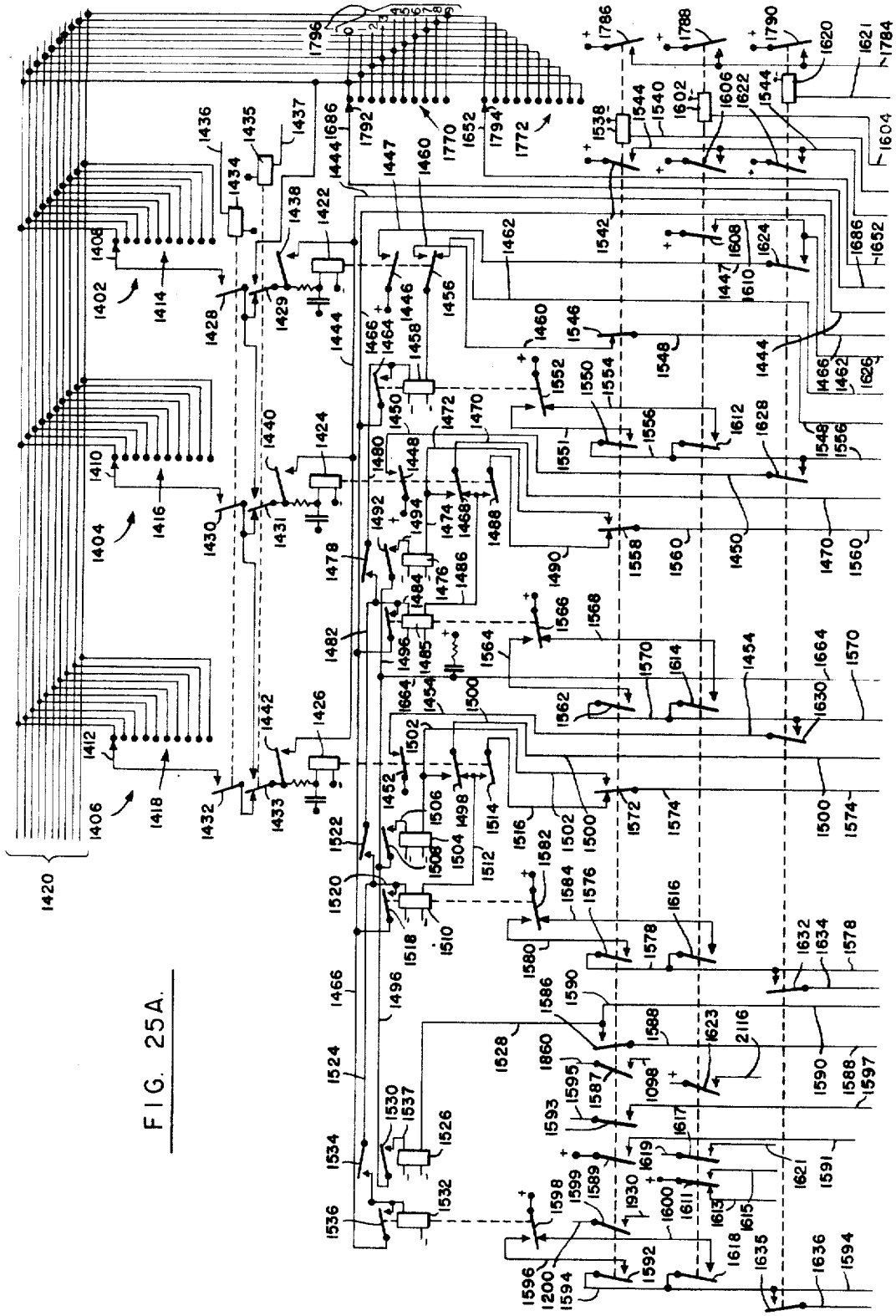

An addition-subtraction unit is illustrated in FIGURES 25A and 25B. In the circuit is as illustrated the arrangement, for simplicity, is provided to add a three digit number to a number which may have five digits to produce a five digit accumulation. For actual use, however, the number of orders involved would be greater, for example, typically, provision would be made to add a five digit number to as much as an eight digit number to provide an eight digit accumulation. But, as will appear, this merely involves duplication of some of the intermediate orders of the accumulator and the more limited circuit shown is typical in both construction and operation to systems of larger orders.

The number to be added or subtracted in the accumulator is set up, as hereafter described, in devices such as switches, relays, or the like, typified by the rotary switches 1402, 1404, and 1406, which are of the same type as those previously discussed multiply provided on the ma-

27 chine. Of these, 1402 represents units, 1404 represents tens, and 1406 represents hundreds. These are provided with the respective contact wipers 1408, 1410 and 1412 arranged to engage selectively the contacts of the groups 1414, 1416, and 1418, there being ten such contacts in each switch. The arrangement is cyclical, as previously stated, so that, from the electrical standpoint, it may be considered that when a wiper leaves the lowermost contact it immediately engages the uppermost of its group.

Ten lines 1420 are provided, each being connected to one contact of all of the switches. In other words, the contacts in unit position of all of the switches are connected together and to one of the lines 1420, all of the contacts representing digit 2 of all of the switches are connected together and to a second line 1420, and so on. Stepping of the switches is effected as already described but not shown in FIGURE 25A.

Relays corresponding to the various orders are respectively indicated at 1422, 1424, and 1426. Movable contacts are respectively provided at 1428, 1430 and 1432 arranged to be closed simultaneously by energization of the relay winding 1434, there being one such relay provided for each switch or key assembly for which 1402, 1404 and 1406 are typical. These relays determine which switch (or key) assembly is to provide input to the addition-subtraction unit, of which unit there is only one required in the point of sale machine. When the contacts are closed they connect the respective wipers to the normally closed contacts 1429, 1431 and 1433 of a relay 1435. The corresponding normally open contacts are connected as shown to the normally closed fixed contacts of preceding orders, that of units order being connected to the zero line 1420. The winding of each relay 1434 is energized through a connection such as 1436. The winding of relay 1435 is energized through lead 1437. Self-locking of the relays 1422, 1424 and 1426 is provided by the relay contacts 1438, 1440 and 1442 which are connected to the movable contacts at 1429, 1431 and 1433 and a line 1444 when the corresponding relays are energized. Each of the relays is provided with a second normally open contact, these being indicated at 1446, 1448 and 1452. When closed these connect a positive voltage source to the respective lines 1447, 1450 and 1454.

The relay 1422 also operates a double-pole contact 1456, the movable element of which is connected to one winding of a relay 1458. The upper, normally open contact is connected to line 1460, while the lower, normally closed, contact is connected to line 1462. The relay 1458 is provided with a movable contact 1464 which is connected to a line 1466. The corresponding stationary contact is connected to a second winding of the same relay.

The relay 1424 is provided with a movable contact 1468 of double-pole type. This movable contact is joined to the line 1470. The upper fixed contact is connected to line 1472 and, at 1474, to one winding of a relay 1476. This relay 1476 has an upper movable contact 1478 which is connected at 1480 to the second winding of the relay 1458. The corresponding fixed contact is connected to a line 1482, and, through connection 1484 to one winding of a relay 1485. A second winding of this relay is connected at 1486 to the lower fixed contact normally closed with respect to the movable contact 1468, and is also connected to a normally open contact engageable by the movable contact 1488 of relay 1424, this movable contact being connected to a line 1490.

A second movable contact 1492 of relay 1476 is normally open, and cooperates with a fixed contact connected at 1494 to a second winding of the relay 1476. The movable contact 1492 is connected to a line 1496.

Passing to the relay 1426, this is provided with a movable contact 1498 engageable with an upper fixed contact connected to a line 1502, the movable contact 1498 being connected to line 1500. The upper fixed contact is also connected to one winding of a relay 1504, which has a second winding connected at 1506 to a fixed contact en-

28 gageable, on energization of the relay, by movable contact 1508 which is connected to the line 1496.

Another relay 1510 has one of its windings connected at 1512 to the lower fixed contact engageable by movable contact 1498, and also to a fixed contact engageable by another movable contact 1514 operated by the relay 1426, which movable contact is connected to a line 1516.

The relay 1510 has a movable contact 1518 connected to the line 1466. The corresponding fixed contact is connected to a second winding of the relay 1510, and through connection 1520 to the fixed contact associated with a movable contact 1522 of the relay 1504, this movable contact being connected to the line 1482. The connection 1520 also runs to the line 1524.

A relay 1526 has one of its windings connected to the line 1528. A movable contact 1530 of this relay is connected to the line 1496 and is arranged to engage a fixed contact to complete a circuit through connection 1531 to a second winding of relay 1526. A relay 1532 has its winding connected to a fixed contact engageable by a movable contact 1534 of relay 1526, the contact 1534 being connected to the line 1524. A movable contact 1536 of relay 1532 is connected to the line 1466, and its corresponding fixed contact is connected to the winding of relay 1532. As will be noted from the diagram, the various windings of the relays described are returned to a negative potential terminal. This is also true of the windings of other relays hereafter described except as differently noted. Various of the relays just described have other contacts but these may be more logically referred to in what follows.

A relay 1538 is provided with a considerable number of contacts which are indicated horizontally related thereto. In this case and others parallel relays may be provided so that no single relay has too much of a contact load; however, for simplicity of showing and description, single relays are here and elsewhere indicated with all of the contacts associated therewith. The winding of the relay 1538 is connected to line 1540. There will now be described the various contacts of relay 1538 and their connections.

Contact 1542 is normally open, and when closed connects a positive voltage terminal to a line 1544.

Contact 1546 is normally closed to connect line 1460 to a line 1548.

Normally open contact 1550 is arranged so that when closed it connects a line 1551 to a line 1556. The relay 1458 has a movable contact 1552 which, when this relay is energized, engages an upper contact connected to line 1551 to connect this line to a positive supply terminal. When relay 1458 is deenergized, the same movable contact connects the positive supply terminal to line 1554.

1558 is a double pole contact which in the left-hand position shown connects line 1490 to line 1560, and in its right-hand position connects line 1472 to line 1560. Normally open movable contact 1562 is associated with a fixed contact connected at 1564 to an upper contact engageable by the movable contact 1566 of relay 1485. The corresponding lower fixed contact is connected to line 1568. The movable contact 1562 is connected to line 1570.

A double-pole contact 1572 in its left-hand position connects line 1516 to a line 1574, and in its right-hand position connects line 1502 to the same line 1574.

Normally open contact 1576 is connected to line 1578. Its corresponding fixed contact is connected at 1580 to an upper fixed contact engageable by the movable contact 1582 of relay 1516. The corresponding lower fixed contact is connected to line 1584. The movable contact 1582 is connected to the positive supply terminal.

Normally open movable contact 1586 is connected to line 1588. When closed it connects this line to the line 1528 which is shown as continued downwardly at 1590.

Normally open contact 1587 is arranged to connect line 1860 to line 1098.

Normally open contact 1589 when closed connects a line 1591 to the positive potential terminal.

For simplification there is indicated singly at 1593 a normally open movable contact connecting lines 1595 and 1597 when closed. This is representative of a plurality of similar contacts having similar functions and operated by relay winding 1538.

Movable contact 1599 is arranged to connect line 1200 to line 1930.

Movable contact 1592 is connected to a line 1594. When closed by energization of the relay, it connects this line 1594 through 1596 to an upper fixed contact co-operating with movable contact 1598 of relay 1532, which movable contact is connected to the positive supply terminal. The lower fixed contact normally engaged by 1598 is connected to line 1600.

The second relay 1602 of the right-hand group also has its contacts indicated in horizontal alignment therewith. Its winding is connected to the line 1604.

Normally open contact 1606 is arranged so that when closed it connects line 1544 to the positive supply terminal. Normally open contact 1608 is arranged, when closed, to connect the positive supply terminal to the line 1610.

Normally open movable contact 1612 is connected to line 1556, and when closed connects this line to the line 1554. Normally open movable contact 1614 is connected to line 1570, and when closed connects this line to the line 1568. In similar fashion the normally open movable contact 1616 is connected to line 1578, and when closed connects this line to line 1584. Again, in similar fashion, the normally open movable contact 1618 is connected to line 1594 and when closed connects this line to the line 1600.

A movable contact 1611 of relay 1602 is connected to the positive potential terminal. The contact 1611 normally engages a fixed contact, which is connected to a line 1613, and is movable to engage the normally open fixed contact which is connected to a line 1615.

For simplification there is indicated at 1617 a normally open movable contact connecting lines 1619 and 1621 when closed. This is representative of a plurality of similar contacts having similar functions and operated by relay 1602. A normally open contact 1623 is arranged to connect the positive supply terminal to line 2116.

Reference will be next made to relay 1620, the winding of which is connected to line 1621.

The normally open movable contact 1622 is connected to the positive supply terminal, and when this is closed connects this terminal to the line 1544.

Normally open movable contact 1624 is connected to line 1447. When closed it connects this line to line 1610 which is shown continued downwardly at 1626. The movable normally open contact 1628 is connected to line 1450, and when closed connects this line to the line 1556. Similarly, the normally open contact 1630 is connected to line 1454, and when closed connects this line to the line 1570. Normally open movable contact 1632 is connected to line 1634, and when closed connects this line to the line 1578.

Normally open contact 1635 is connected to line 1636 and when closed connects this line to line 1594. The next relay 1638 has its winding connected to line 1639. Its movable contact 1640 is normally open, and when closed connects the positive supply terminal to line 1642. The normally open contact 1644 is arranged to connect line 1540 to a line 1646 when closed. The movable normally open contact 1648 is connected to line 1544. When closed it connects this line to line 1649.

Normally open movable contact 1650 is connected to the positive supply terminal. When closed it connects this terminal to line 1652. Normally open contact 1654 is connected to the positive supply terminal and, when closed, connects this terminal to line 1444. In similar fashion the contact 1656 connects line 1466 to the positive supply terminal.

Normally open contact 1657 when closed connects line 1548 to line 1659.

Normally open contact 1658 is connected to line 1560 and when closed connects this line to line 1660.

Normally open contact 1662 is connected to the positive supply terminal. When closed it connects this terminal to a line 1664 which is connected to line 1496. The normally open contact 1666 is arranged, when closed, to connect line 1574 to a line 1668. In similar fashion a normally open contact 1670 is arranged to connect line 1588 to a line 1672.

The next relay to be considered is 1674 which has its winding connected to line 1675. The normally open contact 1676 is connected to the positive supply terminal and, when closed, connects this terminal to line 1642.

Normally open movable contact 1678 is connected to line 1604, and, when closed, connects this line to line 1646. Normally open contact 1680 is arranged to connect line 1544 to line 1682 when closed.

Normally open movable contact 1684 is connected to the positive supply terminal, and when closed connects this terminal to the line 1686.

Normally open contact 1688 is connected to the positive supply terminal, and when closed connects this terminal to line 1444. In similar fashion the normally open contact 1690 is arranged to connect the positive supply terminal to line 1466.

The normally open movable contact 1691 is connected to line 1462, and when closed connects this line to the line 1659.

The normally open movable contact 1692 is connected to line 1470, and when closed connects this line to the line 1660.

The normally open contact 1694 is arranged to connect, when closed, the positive supply terminal to line 1664.

The normally open movable contact 1696 is connected to line 1500, and, when closed, connects this line to line 1668.

Normally open contact 1698 is arranged, when closed, to connect the positive supply terminal to line 1634.

Normally open movable contact 1700 is connected to line 1590, and when closed connects this line to line 1672.

Normally open contact 1702 is arranged, when closed, to connect line 1636 to the positive supply terminal.

A further relay 1704 has its winding connected to line 1705. This relay is merely typical of a number of relays associated with the various stepping storage relays which properly and selectively route through their contacts, the results of the circuit being described. Normally open contact 1707 is arranged to connect the positive supply terminal to line 1709 connected externally of FIGURE 25B to line 1639, previously described. Normally open contact 1706 is arranged, when closed, to connect line 1626 to a line 1708. In similar fashion, the contact 1709 is arranged to connect line 1659 to a line 1710. Also in similar fashion, the contact 1712 is arranged to connect line 1556 to line 1714, and the contact 1716 is arranged to connect line 1660 to a line 1718.

Contact 1720 which is normaly open is arranged, when closed, to connect line 1570 to a line 1722, and contact 1724 is similarly aranged to connect line 1668 to line 1726. In similar fashion contact 1728 is arranged to connect line 1578 to line 1730. Further in similar fashion, 1732 is arranged to connect line 1672 to line 1734, and contact 1736 is arranged to connect line 1594 to line 1738.

A set of stepping switches of the same type as those described first in connection with this portion of the circuitry provide the accumulator. The one in units position is indicated at 1742 and comprises the set of fixed contacts engageable by the movable contact 1744, stepping being effected by the solenoid 1740 which is energized through line 1708. The wiper 1744 is connected to line 1710. The tens stepping switch 1748 has a wiper 1750 and operating solenoid 1746, the latter being connected to line 1714. The wiper 1750 is connected to line 1718. The next, 1754, in hundreds position has its operating solenoid indicated at 1752, connected to line 1722. Its wiper 1756 is connected to line 1726. The next 1760, in thousands position has its operating solenoid 1758 connected to line 1730, while its wiper 1762 is connected to line 1734. Finally there is the stepping switch 1766 having the operating solenoid 1764 connected to the line 1738. Its wiper is indicated at 1768.

The last mentioned set of stepping switches are merely typical of various groups into which the output of the addition-subtraction circuit may be entered. It will be understood that the addition-subtraction unit, by selective controls of its inputs and outputs may with great generality take inputs from an arbitrary source and deliver them to an arbitrary receiver. Since its functions in this are sequential, there is no interference in its functions intermediate various sources and receivers. The selective actions will become evident in considering later the operations of the machine.

At the right of FIGURES 25A and 25B there are shown the contact banks 1770, 1772, 1774 and 1776 of a stepping switch of the type already described having the operating electromagnet 1778. A normally closed movable relay contact 1780 is adapted to be opened when the electromagnet 1778 is energized, the normal closure connecting the line 1621 at 1782 with the fixed contacts of the bank 1774 in the first nine positions thereof. The fixed contact of this bank which is in the tenth position is connected to line 1646. The movable contact 1783 of this bank is connected to line 1642.

The driving electromagnet 1778 is energized through the line 1784, which may be selectively connected to the positive potential terminal through any one of the relay contacts 1786, 1788, 1790, respectively closed by the corresponding relays 1538, 1602 and 1620.

The movable contacts 1792 and 1794 of the respective first and second banks 1770 and 1772 are respectively connected to the lines 1686 and 1652 previously referred to. As indicated, the fixed contacts of these banks, are criss-cross connected so that in sequence, starting from rest position at zero, the fixed contacts of the first bank 1770 are in sequence from zero to nine, while those of the second bank 1772 are in the reverse order. Thus the wiper 1794 at any time engages a fixed contact which is the nine-complement of that simultaneously engaged by the wiper 1792. These individual contacts are connected to the lines 1796.

The movable contact 1798 of the lowermost bank 1776 is connected to the line 1682. The fixed contacts running from zero to nine are respectively connected to the corresponding fixed contacts of the banks 1742, 1748, 1754, 1760 and 1766, already described, in which it will be noted, however, that the sequence of contacts, starting with the rest positions of the movable contacts, is from one to zero.

The operation of the addition-subtraction unit just described is as follows, reference being first to an addition operation:

The position of the wipers 1774 to 1768 of the stepping switches 1742 to 1766 define a number to which it may be assumed that an input is to be added as defined by the position of the wipers 1408, 1410 and 1412 of the switches 1402, 1404 and 1406. As already indicated, these are exemplary only, and the quantity to be added may be otherwise defined, as by the switches of the numerical keyboard, sets of relays, or the like, defining, in general, particular numerical digits in the various orders. However, in various operations as hereafter described, the switches of the group 1742 to 1766 are initially in zero position, and while there is operatively an addition, the desired result is only the transfer of a number from the upper banks 1402, 1404 and 1406 to the lower banks.

By way of a concrete example, let it be assumed that 286 is to be added to 1815. Considering the accumulator, this would mean, that, as a result of a previous operation, the wiper 1744 in units position would be engaged with the fixed contact representing five, and the wipers in the respective succeeding positions would engage contacts representing 1, 8, 1 and 0 in that order. At the beginning of the operation the wipers 1408, 1410 and 1412 would be, respectively, in engagement with the fixed contact representing 6, 8 and 2. These last conditions would have been achieved by stepping (or electrically equivalent similar) operations previously taking place.

Operation is initiated by various types of programming operations as will be described hereafter, any such operation energizing the relays 1434 and 1704. The energization of relay 1704 will close the switch 1707 resulting, through 1709 and an external connection in energization of lead 1639 and relay 1638. 1638 may be conveniently referred to as the "add" relay. Relay 1620 which controls stepping through solenoid 1778 is now energized as follows:

Lead 1621 from relay 1620 may be followed through contact 1780 and lead 1782, wiper 1783 in its home position, lead 1642, and now closed contact 1640 connected to the positive supply terminal. The energization of relay 1620 through contact 1790 applies positive potential to line 1784 energizing solenoid 1778. This opens the contact at 1780, deenergizing relay 1620. The result is deenergization of solenoid 1778 and stepping advance of the switch. Since the first nine contacts of bank 1774 are connected together, this means that continuous stepping takes place bringing the wiper 1783 to the tenth (last) contact point. When this is reached the wiper 1783 applies positive potential to line 1646, and thence through closed contact 1644, to line 1540 energizing relay 1538 which may be referred to as the "add-carry" relay. This closes contact 1786 applying positive potential to line 1784 to effect further energization of solenoid 1778.

The energizing of relay 1538 also closes contact 1539 energizing, as previously stated, a key release solenoid which by release of a key deenergizes relay 1334. Relay 1704 is simultaneously deenergized, in turn deenergizing relay 1638 and relay 1538, the latter by the opening of contact 1634. The result is the return of the stepping switch to its first contact position, completing its cycle of operation.

The foregoing describes the cycle of stepping of the switch operated by the solenoid 1778, without going into the adding operation which results therefrom.

The energization of relay 1638, closes contact 1650 to apply positive potential through connection 1652 to the wiper 1794 of the switch bank 1772 which is basically involved in the adding operation. As will be evident, since the wiper 1794 is in the nine position initially, positive potential is applied to each fixed contact of the switches 1402, 1404 and 1406 in the nine position. As the aforedescribed stepping takes place, the positive potential is successively applied to the contacts occupying position 8, then position 7, and so on. Consider, now, the situation presented in the units bank 1402, wherein, in accordance with the assumption above, the wiper 1408 is engaged with the contact point 1414 representing the value 6. As the successive fixed contacts 1414 in the nine, eight and seven positions are rendered positive, nothing occurs. But when the fixed contact in position representing 6 is rendered positive, current flows through the closed contact 1428 and the closed contact 1429 (assuming relay 1435 deenergized) to effect energization of the relay 1422. This closes contact 1433 to provide self-holding of the relay 1422 in energized condition since line 1444 is connected to the positive supply terminal by contact 1654, closed by reason of the energization of relay 1638.

With 1422 thus energized, every time the step relay 1620 operates a path is closed from the positive supply terminal through contact 1446, connection 1447, contact 1624 of relay 1620, line 1626, closed contact 1706 of relay 1704, and connection 1708 to the driving winding 1740 of stepping switch 1742, whereby a step advance is effected each time this path is interrupted. The result of this is advance of the wiper 1744 by a number of steps equal to the digital entry in the switch 1402.

Corresponding operations occur in each of the other orders. The result, then, is the accumulation of the number 01091 in the accumulator at this stage. Carrying now takes place to complete the operation.

Positive potential is applied to the fixed contact of 1776 in the nine position from the positive terminal through contact 1622 of relay 1620, connection 1544, contact 1648 of relay 1638 and connection 1649. If the wiper 1744 of switch 1742 had passed through its nine position, i.e., had a step to zero in the operation already described (as it would have in the example considered), then a positive potential is delivered through wiper 1744, line 1710, closed contact 1709 of relay 1704, connection 1659, closed contact 1657 of relay 1638, connection 1548, normally closed contact 1546 of now deenergized relay 1538, connection 1460, and closed contact 1456 to energize the relay 1458, which locks up through contact 1464, connection 1466, and contact 1656 of relay 1638. In effect, relay 1458 by this energization remembers that a carry must be made.

Until the ninth step the relay 1538 was deenergized; but on the ninth step it is energized from the positive terminal through contact 1640 of relay 1638, connection 1642, wiper 1783, connection 1646, contact 1644 of relay 1638, and connection 1540.

When 1538 is thus energized, the positive supply through closed contact 1552 of relay 1458, connection 1551, contact 1550 of relay 1538, connection 1556, contact 1712 of relay 1704, and connection 1714 energizes the winding 1746. On deenergization of 1746 an additional step is imparted to the switch 1748 representing the carry to the tens order from the units order.

If, as would be the case in the example being considered, the tens switch 1748 was at this time in its nine position, the closure of contact 1542 of relay 1538 would, over connection 1544, apply positive potential on the ninth fixed contact of bank 1776 as before, and through connection 1718, contact 1716 of relay 1704, connection 1660, contact 1658 of relay 1638, connection 1560, contact 1558 of energized relay 1538, and connection 1472, the relay 1476 is energized. This relay 1476 becomes locked through its contact 1492, connections 1496 and 1664, and contact 1662 of relay 1638, the latter contact being connected to the positive supply.

Contact 1478 of relay 1476 now energizes relay 1485 by reason of its connection at 1480 through closed contact 1464 of relay 1458 to the energized line 1466. The energization of relay 1485 closes contact 1566 to connect the positive terminal through connection 1564, contact 1562 of relay 1538, connection 1570, contact 1720 of relay 1704, and connection 1722, to energize the winding 1752 of switch 1754 in the hundreds order, so that upon deenergization a step is imparted to this switch. In view of the foregoing description, it will not be necessary to detail other carries, both simple and multiple, which may be required in a particular addition. It will be evident from what has been described that all transfers or carries are simultaneously effected, the circuit arrangements for doing this being, as indicated in FIGURE 25A and 25B the same for the various orders. In the particular example given, it will be evident that carrying is effected into the tens, hundreds, and thousands orders, to provide the correct accumulation of 02101 as the sum.

At this point, to complete the matter of addition, though, as will be evident, this will apply to subtraction as well, the number inserted in the upper switches in FIGURE 25A could be, in effect, multiplied by ten before effecting the addition merely by energization of the relay 1435. As may be readily followed from the diagram, the resulting switching of its contacts 1429, 1431 and 1433 will effect the insertion of the digits into the respective next higher orders, the connection merely switching the system one order higher. It will be evident that the addition of another relay and corresponding contact could effect a further switch, and so on, so that, if desired, the number to be added could be multiplied by any desired power of ten.

Subtraction is carried out by complementary addition, and the procedure may be clarified by considering an example. Suppose 756 is to be subtracted from 1594 to obtain the difference 838. This may be carried out as follows:

To 1594 there is first added the nine complement of 0756, i.e., 9243, without carrying, to give 0737. To each order of this from which borrowing would not occur in the usual process of subtraction, a unit is added. But no unit is added in any order from which borrowing in the usual sense would have to occur. This means that to secure the proper result there would have to be added to 0737 the number 0101 to secure the result 0838.

The initial part of the operation is essentially similar to that involved in addition and need not be described in detail. The difference is that instead of add relay 1638 being energized, subtract relay 1674 is energized with the result that wiper 1792, rather than 1794, is energized by connection through lead 1686 and contact 1684 of relay 1674 to the positive supply terminal. It will be evident that as the wiper steps, it engages contacts in numerically increasing sequence in contrast with the engagement of contacts in numerically decreasing sequence in addition. It will be obvious, therefore, that the steps imparted to the accumulator stepping switches are, in number, the nines complements of the subtrahend digits. The first nine steps, for a given example, therefore result in accumulation of 0737 in the first four orders of the accumulator.

As in the case of adding, as the ninth step is reached a carry relay becomes energized, but in this case is relay 1602 rather than 1538, energization being from the positive terminal through contact 1676 of relay 1674, connection 1642, wiper 1783, lead 1646, contact 1678 of relay 1674, and connection 1604.

Considering the units order, positive potential is applied through contact 1608 of relay 1602, connections 1610 and 1626, contact 1706 of relay 1704 and lead 1708 to energize the driving coil 1740 of the units order switch 1742. Thus an additional step is always imparted to this switch.

Consider now the circuit running from the positive terminal through contact 1622 of relay 1620, connection 1544, contact 1680 of relay 1674, connection 1682, wiper 1798 of switch bank 1776, the zero lead, wiper 1744 of switch 1742, lead 1710, contact 1709 of relay 1704, lead 1659, contact 1691 of relay 1674, lead 1462 and contact 1456 of relay 1422 to relay 1458.

Since in the units order the digit to be subtracted (6) is greater than the digit in the minuend (4), a circuit will be completed as follows during the nines complement addition:

Positive potential is applied through contact 1622 of relay 1620, connection 1544, closed contact 1680 of relay 1674, connection 1682, wiper 1798 of switch 1776, and through the four lead of switch 1742, wiper 1744, connection 1710, contact 1709 of enrgized relay 1704, connection 1659, contact 1691 of energized relay 1674 connection 1462, closed contact 1456 of deenergized relay 1422 to energize relay 1458. This locks up through contact 1464 of energized relay 1458, connection 1456, and closed contact 1690 of energized relay 1674. Contact 1552 of now energized relay 1458 removes positive potential from the tens order coil 1746, thereby preventing an additional step in this order when the carry relay 1602 is energized.

If the situation had been reversed, i.e., the minuend digit had been greater than the subtrahend digit, the relay 1458 would not have been energized, because contact 1456 would be opened by energization of relay 1422, and consequently contact 1552 would have applied positive potential to coil 1746 when the carry relay 1602 was energized, thus producing an additonal step in the tens order, no borrow being required.

The situations described will occur if multiple borrowing had been required from one or more higher orders.

As will appear more fully hereafter, the addition-subtraction unit does not merely perform additions and subtractions in the usual sense of producing a sum or a difference of actual numbers; it also functions as an information transfer device for which purpose the receiver may originally read zero. As an example, it routes numbers from the numerical keyboard to storage relays so that the numerical keys may be used for the entering of items of numerical information of many different significances.

Another element of major significance is a sequence-controlling switch 1800 shown in FIGURE 26. Hereafter this will be referred to as the sequence switch.

This switch 1800 is of the rotary stepping type previously generally described, having the step-controlling electromagnet 1802, and provided with the switch banks 1804, 1806, 1808, 1810, 1812, 1814, 1816, 1818, 1820, 1822 and 1824. The various contact positions are indicated by the numerals at the left of this figure, there being 26 in all. The normal rest position of this switch involves the engagement of the contacts in position 26 by the wipers which, on the first step, move to the position 1. The lead numerals in this figure which are lower than 1826 have already been described.

Referring first to the fixed contacts in bank 1804, they are connected as follows:

The contact position 1 is connected to line 920. The contact in positions 2 to 7, inclusive are connected to a line 1826. Line 1828 connects to the contacts in positions 9 and 20. The contacts in positions 13 and 14 are connected to line 1830. The contacts in positions 15 and 16 are respectively connected to the lines 1832 and 1128 and are interconnected by diode 1833. The contact in position 19 is connected to lead 1154 which is connected through diode 1153 to line 1128. The contact in position 22 is connected to lead 1836. Those in positions 25 and 26 are respectively connected to the lines 1294 and 1254. The wiper 1838 of this bank is connected to line 1840. Referring next to bank 1806, its wiper 1842 is connected to a line 1844 and also to the normally closed contact 1846 which connects it to the line 1848, the contact 1846 being opened upon energization of the electromagnet 1802.

The contact in position 2 of this bank is connected to line 536. Line 1098 is connected to those in positions 3, 5 and 21. Lines 1852, 1854 and 1856 are respectively connected to the contacts in positions 6, 7 and 8. Line 1858 is connected to the contacts in positions 9 and 10. Lines 1866 and 1864 are respectively connected to the contacts in positions 13 and 14, while line 1860 is connected to the contacts in positions 15, 16 and 22. Line 1862 is connected to the contacts in positions 19 and 20.

In the next bank 1808, the contacts in positions 1 and 2 are connected to line 632. The respective lines 1870, 1092, 1872, 1874, 1876, 1878 and 1880 are connected to the contacts in the positions 4, 7, 8, 9, 10, 11, and 12. The lines 1882, 1884, 1886, 1888, 1890, 1892, 1098, 1896 and 1178 are respectively connected to the contacts in positions 13, 14, 15, 16, 19, 20, 21, 23 and 24. The wiper 1898 of this bank is connected through the normally closed contact 1900 of relay 1802 to the positive potential terminal.

The wiper 1902 of bank 1810 is connected to a line 1904. Line 1906 is connected to the first contact of this bank. Line 1908 is connected to the contacts in positions 3 and 5. Line 1910 is connected to the contact in position 7. Line 1912 is connected to the contacts in positions 8, 10, 19 and 21. Line 1914 is connected to the contact in position 9. Line 1916 is connected to the contact in position 13. Line 1918 is connected to the contacts in positions 14 and 20. Lines 1920 and 1922 are respectively connected to the contacts in positions 15 and 16. The contacts in positions 22 and 23 are connected to the line 1924.

The wiper 1926 of the next bank 1812 is connected to the normally closed contact 1928, the corresponding fixed contact being connected to the line 1930, and, through resistor 1932, to the winding of electromagnet 1802. In this bank the contact in position 2 is connected to line 520. Lines 1932 and 1934 respectively connect with the contacts in positions 7 and 8, while a line 1936 in connected to the contacts in positions 9 and 10. A line 1938 is connected to the contacts in positions 11 and 12. Lines 1940, 1942, 1944 and 1946 are respectively connected to the contacts in positions 13, 14, 15 and 16. The contacts in positions 17 and 18 are connected to the positive supply terminal. Line 1948 is connected to the contacts in positions 19 and 20. Line 1196 is connected to those in positions 22 and 23. Lines 1950 and 1952 are respectively connected to the contacts in positions 25 and 26.

The wiper 1954 of blank 1814 is connected to the positive supply terminal. Line 1200 connects with the contacts in positions 1 and 12 of this bank. Line 1956 connects with that in the second position. Line 1958 connects with the contacts in positions 3, 5, 6, 8, 15, 16, 22 and 23. Line 1960 connects with the contact in position 7. Line 1962 connects with the contact in positions 9 and 20. Lines 1964, 1966, 1968, and 1970 respectively connect with the contacts in positions 10, 11, 13 and 14. The contact in position 19 is connected to line 1198. That in position 21 is connected to line 1972.

The wiper 1974 of bank 1816 is connected to a line 1976. A line 1978 connects with the contact in positions 8, 10, and 19. The remaining active contacts in this bank in positions 9, 13, 14, 15, 16, 20, 21, 22 and 23 are respectively connected to the lines 1980, 1982, 1984, 1986, 1988, 1990, 1992, 1994 and 1996.

The wiper 1998 of bank 1818 is connected to a line 2000. Only two active fixed contacts are in this bank in positions 13 and 21, and are respectively connected to the lines 2002 and 2004.

The wiper 2006 of bank 1820 is connected to the positive supply terminal. A line 2008 connects with the contacts of this bank in positions 1, 13, 15, 16, 19, 21 and 22. A line 2010 connects with the contacts in the positions 2 to 12, inclusive, 14, 17, 18, 20 and 23. A contact in position 24 is connected to line 2012.

The wiper 2014 of bank 1822 is connected to the positive supply terminal. A line 2016 is connected to the contacts in positions 1 to 7, inclusive, 15, 16, 19, and 22. The contact in position 21 is connected to line 2018.

The wiper 2020 of the file bank 1824 is connected to a line 2022. A line 2024 connects with the contact in positions 9, 14, 19, 20 and 21. A line 2026 connects with the contact in position 13.

To complete the matter of FIGURE 26, the normally open movable contact 2028 operated by the electromagnet 1802 is arranged to connect lines 2030 and 2032, while the normally open contact 2029 is arranged to connect lines 2009 and 1309.

Figure 27:
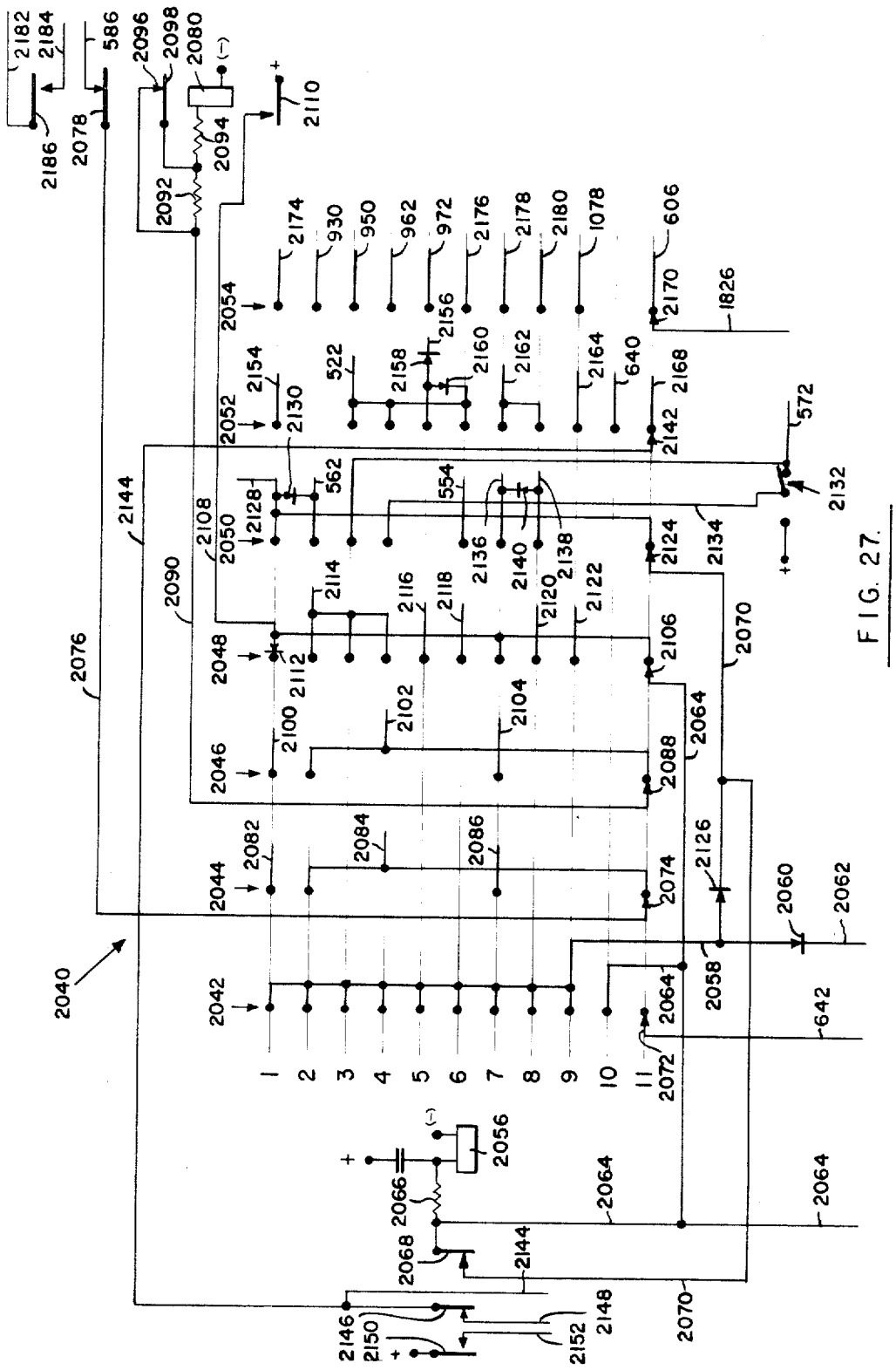
FIGURES 27 is a schematic diagram of another stepping switch hereinafter referred to as the line stepping switch.

FIGURE 27 shows another stepping switch 2040 which may be designated the line stepping switch. This comprises the contact banks 2040, 2044, 2046, 2048, 2050, 2052 and 2054, each of which has eleven contact positions. The rest position is with the wipers in engagement with the eleventh contact. The operating coil is indicated at 2056. The contacts of the first bank 2042 is positions 1 to 9, inclusive, are all connected to the line 2058 which is in turn connected through diode 2060 to line 2062. The contact in position 10 is connected at 2064 and through resistor 2066 to the winding 2056. The line 2064 is also connected to the movable contact 2068 associated in normally closed position with a fixed contact connected to the line 2070. The wiper 2072 of this bank is connected to the line 642.

The wiper 2074 of the second bank 2044 is connected through line 2076 to the normally closed contact 2078 of a relay 2080 which may be conveniently referred to as the stop relay. The corresponding fixed contact is connected to line 1048.

The contact of bank 2044 which is in the first position is connected to a line 2082. The contacts in the second and eleventh positions are connected to a line 2084. The contact in position 7 is connected to a line 2086.

The wiper 2088 of the bank 2046 is connected through a line 2090 and series resistors 2092 and 2094 to the winding of relay 2080. A normally closed movable contact 2098 of this relay is connected to the junction between the resistors, while the associated fixed contact 2096 is connected to the line 2090.

The first contact of bank 2046 is connected to a line 2100. The contact in positions 2 and 11 are connected to a line 2102. The contact in position 7 is connected to the line 2104.

The wiper 2106 of bank 2048 is connected to the line 2064. The contact of bank 2048 in the first position is connected through a diode 2112 to a line 2108 which may be connected to the positive supply terminal by the normally open contact 2110 of relay 2080. The line 2108 is directly connected to the contacts in positions 7 and 11. A line 2114 is connected to the contacts in positions 2, 3 and 4. The contact in position 5 is connected to line 2116, and that in position 6 to line 2118. The contacts in positions 8 and 9 are respectively connected to the lines 2120 and 2122.

The wiper 2124 of bank 2050 is connected to the line 2070. This line is connected through diode 2126 to the line 2058. The first and eleventh contacts of bank 2050 are connected to a line 2128, and through diode 2130 to the line 562 which is connected to the contact in position 2. The contact in position 3 is connected to line 572. The contact in position 4 is connected at 2134 to the movable contact of a single-pole double-throw switch 2132. The right hand pole of this switch is connected to line 572. The left-hand pole is connected to the positive supply terminal. The contact in position 6 is connected to line 554. The contact in position 7 is connected to a line 2136, and to a line 2138 connected to the contact in position 8 through the diode 2140.

The wiper 2142 of bank 2052 is connected through line 2144 to the normally closed contact 2146 which connects it to the line 2148. To complete the contacts associated with the winding 2056 there may be mentioned the normally open contact 2150 which, when closed, connects the positive supply terminal to a line 2152.

The first contact in bank 2052 is connected to a line 2154. The third, fourth and sixth contacts of this bank are connected to the line 522. The contact in position 5 is connected to a line 2156 through diode 2158, and through diode 2160 to the line 522. The contacts in positions 7 and 8 are connected to lines 2162. The contacts in positions 9, 10 and 11 are respectively connected to the lines 2164, 2166 and 2168.

The wiper 2170 of the last bank 2054 is connected to line 1826. The first contact of this bank is connected to line 2174. The contacts in positions 2 to 9, inclusive, are respectively connected to lines 930, 950, 962, 972, 2176, 2178, 2180 and 1078. The contact in position 11 is connected to line 606. The relay 2080 is provided with a normally open contact 2186, which, when closed, connects lines 2182 and 2184.

FIGURE 28 illustrates a further pair of stepping switches playing a major part in the control. The first of these indicated at 2190 may be referred to as the payment switch. It comprises the contact bank 2192, 2194, 2196, 2198, 2200, 2202, 2204, and 2206. Its stepping coil is indicated at 2208, and is connected through resistor 2211 to the normally closed switch element 2210, connecting to the line 2084, previously referred to. The switch element 2210 is also connected to a line 2212. A second switch element 2214 is normally closed to connect the positive supply terminal to a line 2216.

The wiper 2218 of the first bank 2192 is connected to a line 1836. The contacts in positions 1, 2, 4 and 6 to 10, inclusive, are connected to the line 1174. The contact in position 3 is connected to a line 2224. The contact in position 5 is connected to the line 1176, previously referred to.

The wiper 2226 of bank 2194 is connected to the line 2102. The first, third, fourth, fifth, sixth and seventh contacts of this bank are respectively connected to the lines 594, 1040, 2228, 2230, 2232 and 2234.

The wiper 2236 of bank 2196 is connected to a line 2238. The first two contacts of this bank are connected to a line 1980. The third is connected to a line 1986, the fifth to a line 1978, the sixth to a line 2246, and the seventh to a line 2248.

The wiper 2250 of the bank 2198 is connected to the last mentioned line 2248. The first three contacts of this bank are connected to a line 2252. The fifth contact is connected to a line 2254. The sixth and seventh contacts are connected to a line 2256. The contacts in positions 8, 9 and 10 are connected to a line 2258.

The wiper 2260 of the next bank 2200 is connected to a line 2262. The first contact of this bank is connected to the line 2256 previously mentioned. The second and sixth contacts are connected to a line 2264. The third and fifth contacts are connected to the line 2258 which is continued as a line 2266. The contacts in positions 7, 8, 9 and 10 are connected to the line 2254 which is shown as continued at 2268. The wiper 2270 of the bank 2202 is connected to a line 2174. The first, second and fifth contacts of this bank are directly connected to the line 1263, and through diode 2272 to the contact in position 4. This, in turn, is connected through the respective diodes 2274 and 2276 to the contact in positions 6 and 7. The contact in position 6 is connected to line 1268, and that in position 7 is connected to line 1256. The wiper 2278 of bank 2204 is connected to the line 1154. Its contacts in positions 1, 2, 3, 6 and 7 are connected to line 1138. Its contacts in positions 4, 5, 8, 9 and 10 are connected to line 1150.

The wiper 2280 of bank 2206 is connected to the line 2216. The contact in position 1 is connected to line 2282, and through diode 2284 to the contact in position 2 and to the line 566. The contact in position 3 is connected to line 954. The contacts in positions 5 and 6 are connected to a line 2288.

The second stepping switch illustrated in FIGURE 28 and designated 2290 may be referred to as the delivery switch. It comprises the contact banks 2292, 2294, 2296, 2298, 2300 and 2302. Like the switch 2190, it involves ten contact positions, the rest positions of the wipers being similarly on the contacts in position 10. The driving coil for switch 2290 is shown at 2304, and is connected through resistor 2306 to the normally closed contact 2308 which provides connection to the line 2082. The wiper 2312 of bank 2292 is connected to line 1176. The contact in positions 1, 2, 3, 6, 7, 8 and 9 are connected to the line 2224. The contacts in positions 4 and 5 are connected to line 1178.

The wiper 2314 of bank 2294 is connected to the line 2100. The first five contacts of this bank are respectively connected to the lines 594, 1040, 2228, 2230 and 2232.

The wiper 2316 of bank 2296 is connected to a line 2318. The contact in position 1 is connected to line 1996. Those in positions 2, 3 and 4 are respectively connected to the lines 1978, 2246 and 1986, previously referred to. The contact in position 5 is connected to line 2321.

The wiper 2320 of the bank 2298 is connected to a line 2322. Its contacts in positions 1 and 5 to 10, inclusive, are connected to the line 2266. The contacts in positions 2, 3 and 4 are connected to the line 2256.

The wiper 2324 of bank 2300 is connected to a line 2326. The contacts of this bank in positions 1 and 4 are connected to the line 2268. Those in positions 2 and 5 are connected to the line 2252. Those in positions 3 and 6 to 10, inclusive, are connected to the line 2264.

The wiper 2328 of the bank 2302 is connected to a line 1832. Only two contacts of this bank are active, these being in the positions 2 and 4 and connected to the line 1118.

FIGURE 29 shows a further stepping switch 2332 which may be called the discount switch. This comprises the contact banks 2334, 2336, 2338, 2340, 2342, 2344, 2346 and 2348. Ten contact provisions are involved, and the rest positions of the wipers is on the contacts in the tens position. The driving winding is indicated at 2350 and is connected through resistor 2352 to the normally closed contact 2354 which provides connectin to the line 2086.

The wiper 2356 of the first bank 2334 is connected to this same line 2086. All of the contacts of the first nine positions are connected to a line 2358.

The wiper 2360 of the bank 2336 is connected to line 2104. The first two contacts of this bank are connected respectively to lines 1032 and 1040.

The wiper 2362 of the third bank 2338 is connected to a line 2364. The first two contacts of this bank are connected respectively to the lines 2244 and 2240.

The wiper 2366 of bank 2340 is connected to the line 1990. The first three contacts of this bank are connected to a line 2368. All of the remaining contacts are connected to a line 2370.

The wiper 2372 of bank 2342 is connected to line 2374. The first and second contacts of this bank are connected respectively to lines 2252 and 2254. The remaining contacts are connected to line 2266.

The wiper 2376 of bank 2344 is connected to a line 2378. The first three contacts of this bank are respectively connected to lines 2380, 2382 and 2384. The contact in position 10 is connected to a line 2386.

The wiper 2324 of bank 2300 is connected to a line 2390. The first three contacts of this bank are connected to the line 2386. The contact in the tenth position of this bank is connected to line 2392.

The wiper 2394 of bank 2348 is connected to a line 2396. The first contact of this bank is connected to the line 2392. The second contact is connected to the line 2398.

The stepping switch 2400 shown in FIGURE 30 may be designated the line feed and item count switch. It has the contact bank 2402, 2404, 2406, 2408, 2410, 2412, 2414 and 2416. Eleven contact positions are involved and the wipers are normally in position 4.

The operating coil is indicated at 2418, and is connected through resistor 2420 to a line 2422 and the normally closed contact 2424 which provides connection to a line 2426. A second normally closed contact 2428 provides connection between the positive terminal and a line 2148.

The wiper 2432 of the first bank 2402 is connected to the line 2426. All of the contacts with the exception of that in position 4 are connected to the line 2434.

The wiper 2436 of bank 2404 is connected to line 1870. The contact in position 1 is connected to line 1930. Those in positions 4 to 11, inclusive, are connected to line 2440.

The wiper 2442 of bank 2406 is connected to a line 2444. The successive contacts of this bank from 1 to 9 are connected respectively to the lines 1978, 1980, 2246, 1984, 2242, 1988, 2321, 2446 and 1994. The contacts in positions 10 and 11 are connected to line 2319.

The wiper 2448 of bank 2408 is connected to a line 2450. The contacts in positions 1, 2, 4 and 7 are connected to the line 2252. The contacts in positions 3, 5 and 8 are connected to line 2256. The contact in positions 6 and 9 are connected to line 2264. The contacts in positions 10 and 11 are connected to line 2254.

The wiper 2452 of bank 2410 is connected to a line 2454. The first contact of this bank is connected to line 2256. The second and third contacts are connected to line 2264. The next three contacts are connected to line 2254. The remaining contacts are connected to line 2266. The wiper 2456 of bank 2412 is connected to line 1856. The first contact of this bank is connected to line 2460. The contacts in positions 2 to 6, inclusive are connected to line 1098.

The wiper 2462 of bank 2414 is connected to the positive supply terminal. There is only one contact in this bank in position 6, connected to line 1084.

The wiper 2464 of bank 2416 is connected to the positive supply terminal. All of the contacts of this bank with the exception of that in position 4 are connected to a line 2466.

FIGURES 31A, 31B, 31C and 31D collectively show a group of relays and their connections functioning in the control operation. FIGURE 31B forms a continuation of the lower portion of FIGURE 31A and FIGURES 31C and 31D form continuations, respectively, of FIGURES 31A and 31B. In all cases the contacts associated with the individual relays are in vertical alignment therewith, as indicated by dash lines. In all instances the movable contact elements are to be considered as pulled toward the relays when the relays are energized. Various of the relays are about to be described for the first time; others have already been described, at least in part, but the figures now under discussion illustrate their full complements of contacts. Those previously referred to will be recognized by their relatively lower numbered numerals. Reading across 31A and 31C, the relays shown are, in sequence, 2468, 1110, 1116 1126, 1136, 2470, 1146, 2472, 1164, 2474 (at the lower left of FIGURE 31D), 2476, 2478, 2480 and 2482. Another relay 2484 having a single-pole double-throw contact is shown at the lower left at FIGURE 31B.

The relay 2468 is connected in series with the normally closed movable contacts 2486, 2490, 2492, 2493 and 2494 and the normally open movable contact 2496, the contacts mentioned being, respectively, of relays 1110, 116, 1126, 1136, 1146 and 1164. As will be evident from these connections when any one of the relays just mentioned is energized the corresponding contact thereof just mentioned will apply positive potential to the relay 2468 to energize it. The movable contact 2490 is connected to the line 1938. It is also connected through the normally closed contact 2498 of relay 1116 to the line 1940. Movable contact 2493 is connected to line 1944. Movable contact 2494 is connected to line 1946. Movable contact 2496 is connected to line 1948. The line 1948 continues to the movable contact 2500 of relay 2474, and when this relay is energized connects it to the line 1962.

The line 1942 is connected to the contact normally closed by the movable contact 2502 of relay 2478, which is connected to the positive supply terminal. The corresponding normally open contact is connected at 2504 to the normally movable contact 2506 of relay 1126, which when closed provides connection through the line 2508 to the relay 2472. The line 2504 is also connected to the fixed contact normally engaged by the movable contact 2510 of relay 1126, which is in turn connected to the movable contact 2511 of relay 1136, which engages a fixed contact connected to the line 2508. Contact 2510 is also connected to the normally closed fixed contact engaged by the movable contact 2512 of relay 1136 which is connected to the movable contact 2514 of relay 1146 which, when closed, can be connected to the line 2508. Both movable contacts 2510 and 2512 connect to the positive supply terminal when their relays are energized. The line 2508 also connects with the fixed contact engageable by the normally open movable contact 2516 of relay 2472, which movable contact is connected to the line 1206.

The line 1206 is also connected to the movable contacts 2518, 2520, 2522, 2524, 2526, 2528 and 2530 of the respective relays 1110, 1116, 1126, 1136, 2470, 1146 and 1164, being arranged, when each of these relays is otherwise energized by a main winding to energize a second winding to hold the relays locked. The main windings of these relays are connected in sequence to the lines 1109, 1115, 1125, 1135, 2532, 1145 and 1163. This winding of relay 2470 is also connectable to a line 2168 through the normally open contact 2534 of relay 2468.

The line 1872 is adapted to be connected to the line 2542 through the parallel arrangement of contact 2538 and 2540, both normally open of the respective relays 2476 and 2478. Line 1934 is connected to the line 2460 through the normally closed contact 2544 and 2546, in series, of the respective relays 2476 and 2480. Line 1936 is connected to the line 2550 through the normally closed contact 2548 of relay 2476.

The positive supply terminal is ararnged to be connected to the normally open contact 2552 of relay 2468 to the line 2554 running to the movable contact 2556 of relay 2470. The corresponding normally open contact is connected to line 2558. The normally closed contact is connected to the movable contact 2560 of relay 1146 which normally makes connection to the line 2562, the latter being connectable through the normally open contact 2564 to the line 2566. The contact 2560 is connected to line 2568 running to the normally open contact at 2570 affording connection to the line 2562.

The line 1876 is connectable through the normally open contact 2572 of relay 1110 to the line 2574 which is connectable through the normally open contact 2576 of relay 2476 to the line 2578.

The line 1894 is connected to the movable contact 2582 of relay 2470. The associated normally open contact is connected at 2584 to the movable contact 2586 of relay 1146. The normally closed contact at 2582 is connected through 2588 to the line 2578. The normally open contact at 2586 is also connected to this line, while the normally closed contact is connected to line 2590 which runs to the movable contact 2592 of relay 2480. The corresponding closed contact runs to line 2578. The corresponding normally open contact is connected to line 2594. The line 1890 is connected to the movable normally open contact 2596 of relay 1146, the cooperating fixed contact being connected at 2598 to the movable contact 2600 of relay 2470. The corresponding normally open contact is connected to line 2602 which runs to the movable contact 2604 of relay 2480. The normally open contact of this is connected to line 2594, while the normally closed contact is connected to the winding of relay 2482 and also to the line 1062. The normally closed contact at 2600 is connected at 2606 to the movable contact 2608 of relay 2472. The corresponding normally open contact is connected to line 2578, while corresponding normally closed contact is connected to the line 1062.

Line 2152 is connected through normally closed contact 2610 of relay 2468 to line 2612. Lines 2614 and 2616 are respectively connected to the normally open and normally closed contact engageable by the movable contact 2618 of relay 2468, which movable contact is connected to line 2620.

Line 1888 is connected to the normally open contacts at 2622 of relay 1136, through which connection may be made to the movable contact 2624 of relay 2470. The corresponding normally open contact is connected to line 2626, while the normally closed contact is connected to line 2606. Line 1886 is connected to the normally open contact 2628 of relay 1126, in series with the movable contact 2632 of relay 2470. The corresponding normally closed contact is connected to line 2606. The corresponding normally open contact is connected to line 2634.

The relay 2482 has a series of normally open contacts 2638, 2640, 2642, 2644, 2646, 2648, 2650 and 2652. When closed the contact 2638 connects the positive supply terminal to line 1956. The others in sequence connect pairs of lines as follows: 2454 to 2656; 2658 to 2660; 2662 to 2664; 2666 to 2668; 2670 to 2672; 2674 to 2676; and 2678 to 2680.

A line 2682 is connected to the normally closed contact 2684 of relay 2468 to a line 2686 which is connected to the winding of relay 2476. A normally open movable contact 2688 of this relay is connected to its coil and is arranged to engage a fixed contact connected to the line 2682. A line 2690 is connected through the normally closed contact 2691 of relay 2470 to the line 2692 connected to the winding of relay 2480. The line 2692 is also connected through the normally closed contact 2694 of relay 2468 to the line 2696 which is connected to the winding of relay 2478. The relays 2478 and 2480 are provided with the normally open contacts 2698 and 2700 which, when closed, connect the line 2696 to the line 2692. The connection between these contacts is joined to a line 2702 which is connected to the line 2690. The line 1916 is connected through the normally closed contact 2704 of relay 1116 to a line 2706.

Lines 2002 and 1982 are respectively connected to the normally open and normally closed fixed contacts engageable by a removable contact 2708 of relay 1116, which is connected to the line 2710.

Line 1882 is adapted to be connected through the normally open contact 2712 of relay 1110 to the line 2714 which connects with the normally open contact 2716 of relay 2476, the associated fixed contact being connected to line 1874.

The line 1866 is connected to the movable normally open contact 2718 of relay 1110, the corresponding fixed contact being connected to a line 2720. A parallel connection is provided through the normally open contact 2722 of relay 1116. The line 2720 is connected to the normally open contact 2724 of relay 1146 in turn connected to line 2726 which runs to the normally closed contact 2728 of relay 2474, these contacts connecting with the line 1862. A line 2730 connects with line 2720 and runs to the normally open contact 2732 of relay 2478, the connections of these contacts continuing to line 1864. Line 1089 also connects with line 2720. Connection 2734 runs from line 2730 to the normally open contact 2736 of relay 2476, which contacts are connected with the line 1858.

Line 1854 is connected to the movable contact 2738 of relay 2468. The normally open contact engageable thereby is connected through the line 2740 to the movable contact 2742 of relay 2474, the normally closed contact of which is connected to the line 2730, while its normally open contact is connected to line 1932. The normally closed contact engaged by movable contact 2738 is connected to line 2744.

Next will be considered FIGURES 31B and 31D.

The line 1968 is connected to the movable contact 2746 of relay 1116. The normally closed fixed contact engageable thereby is connected to line 1595. The normally open contact is connected through line 2750 to the movable contact 2752 of relay 2470 which, when closed, provides connection with line 2754. Line 2750 also connects with line 2756. Line 2026 connects to line 2750 through the normally closed contact 2758. Line 1960 is connected to the fixed contact engageable by the normally open movable contact 2760 of relay 2468 which is connected at 2761 to line 2750, and is also connected to line 1958.

Line 1864 is connected through normally closed contact 2762 of relay 1110 to line 2764 which may be connected to line 2756 upon closure of the normally open contact 2766 of relay 2476. Line 1864 is also connectable through normally open contact 2768 of relay 2470 to line 2770.

Lines 2772 and 2774 are connectable through the normally open contact 2776 of relay 2468.

Line 1848 is connected to the movable contact 2786 of relay 2468, the cooperating normally closed fixed contact of which is connected to line 2144. The corresponding normally open contact is connected through line 2790 to the movable contact 2792 of relay 2474. The corresponding normally open contact is connected to line 2148, while the normally closed contact is connected to the positive supply terminal. The line 1878 is connectable through the normally open contact 2794 of relay 1110 to the line 2796. The line 1880 is connectable through the normally open contact 2800 of relay 1110 to the line 2802.

The line 2804 is connected to the normally open fixed contact engageable by the movable contact 2808 of relay 2468 which is connected to line 2806. The corresponding normally closed contact is connected to line 2810. The line 2804 is connected to the fixed contact normally closed by the movable contact 2812 of relay 2476 which connects with line 2164. The corresponding normally open contact is connected with line 2814.

The line 2816 is connected through the normally closed contact 2818 of relay 1146 to line 2820. The line 1892 is connected to the normally open fixed contact engageable by the movable contact 2822 of relay 1146. The corresponding fixed contact is connected to line 2816. Movable contact 2822 is connected to line 2824. This line is connected to line 1884 by closure of the normally open contact 2826 of relay 2478.

Line 298 is connectable to line 2832 upon closure of the normally open contact 2830 of relay 2468.

Line 2252 is connected to the normally open contact engageable by the movable contact 2834 of relay 1146. Line 2256 is connected to the normally open fixed contact engageable by the movable contact 2836 of relay 1136. Line 2264 is connected to the normally open fixed contact engageable by the movable contact 2838 of relay 1126. The corresponding normally closed contact is connected at 2840 to the movable contact 2836, and its normally closed contact is connected at 2842 to the movable contact 2834. Connection 2842 also runs to the normally open fixed contact engageable by movable contact 2844 of relay 2470. This movable contact is connected to a line 2846. The normally closed fixed contact engaged by 2844 is connected through line 2848 to the movable contact 2850 of relay 2480. The corresponding normally open contact is connected to line 2266. The corresponding normally closed contact is connected at 2852 to the movable contact 2838. A movable contact 2854 of relay 2468 is connected to line 2856 which runs to the fixed contact 2858 associated with relay 2470. The normally open corresponding fixed contact is connected at 2860 to the normally closed fixed contact engaged by 2834. The movable contact 2858 is connected to a line 2862.

The normally open fixed contact engageable by 2854 is connected at 2864 to the movable contact 2866 of relay 2484. The normally open contact of 2868 is connected to line 2264, as is also the normally closed contact at 2866. The corresponding normally open contact is connected to line 2254. The contact normally engaged by 2868 is connected to line 2266. The line 2870 running from the movable contact 2868 is connected to the fixed contact normally engageable by the movable contact 2872 of relay 2476, which movable contact is connected to the line 2874. The corresponding normally open fixed contact is connected to the line 2256.

Line 1190 is connected to the normally open contact 2876 of relay 2470 in turn connected to line 2878. Line 1920 is connected to the movable contact 2880 of relay 2470, the normally open fixed contact of which connects with a line 2882, while its normally closed fixed contact is connected to line 1918. Line 1910 is connected through diode 2884 to a line 2888 into the normally open fixed contact engageable by the movable contact 2886 of relay 2470, which movable contact is connected to line 1922. The contact normally closed by 2886 is connected to line 1918.

Line 1174 is connected to the movable contact 2890 of relay 1146. The corresponding normally open fixed contact is connected to line 1176, while the normally closed fixed contact is connected to line 1178.

Returning now to FIGURE 31D, the line 2000 is connected to the movable contact 2892 of relay 2474. The corresponding normally closed contact is connected to line 2894, while the normally open fixed contact is connected to line 2896. The line 2212 is connectable to the line 2900 through the normally open contact 2898 of relay 2474. Line 950 is connected to the movable contact 2902 of relay 2474. The normally closed contact is connected to line 940, while the normally open contact is connected to line 1154. Line 1158 is connected through normally closed contact 2904 with the line 1154. The positive supply terminal is connected through normally closed contact 2906 to a line 2908.

Line 1198 is connected through diode 2910 to the line 1970. It is arranged to be connected to the line 1200 by closure of the normally open contact 2912 of relay 2474. Line 533 is arranged to be connected to the line 532 by closure of the normally open contact 2914 of relay 2474. Line 2154 is arranged to be connected to the line 2064 upon closure of the normally open contact 2916 of relay 2474.

Figure 32:
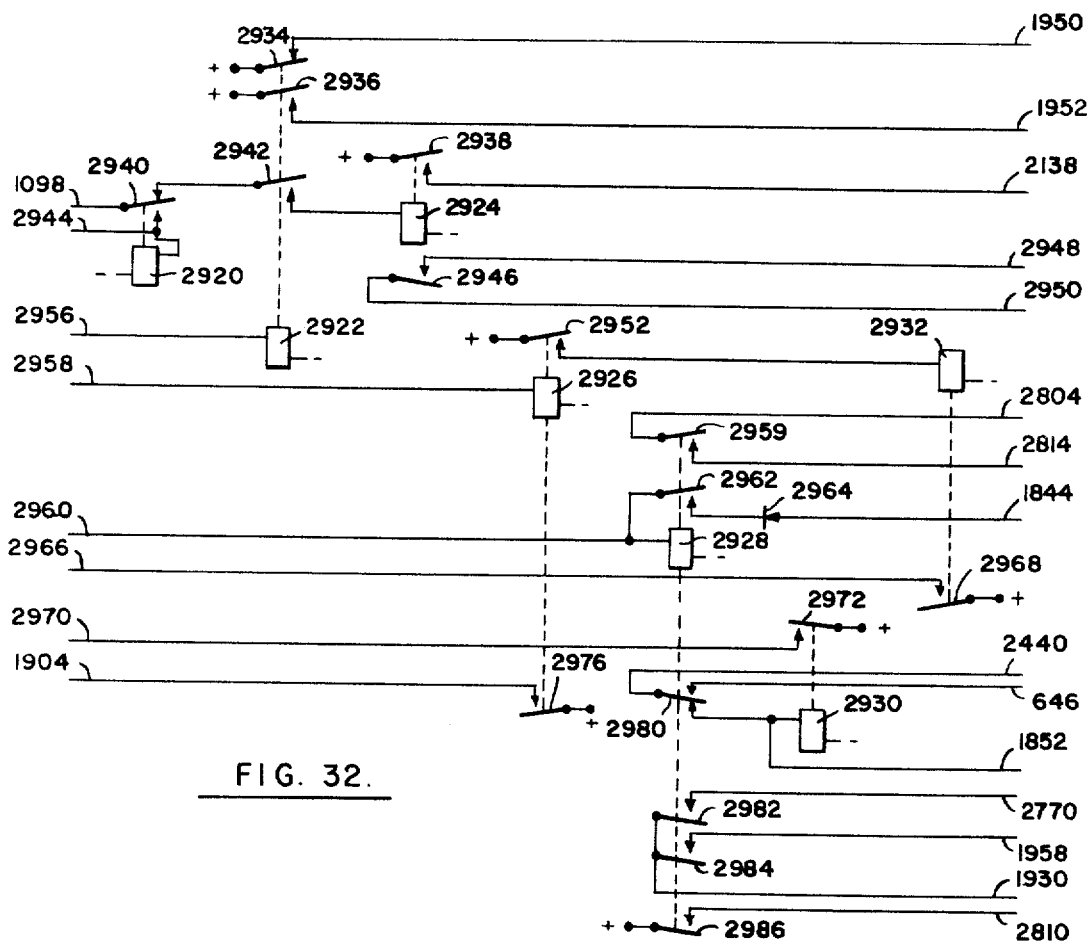

FIGURE 32 shows a series of relays 2920, 2922, 2924, 2926, 2928, 2930, and 2932 and their connections, all forming a further part of the control circuit. The positive supply terminal is connected through the normally closed contact 2934 of relay 2922 to the line 1950. The positive supply is also connectable through the normally open contact 2936 of relay 2922 to the line 1952. The positive supply terminal is connected through normally open contact 2938 of relay 2924 to the line 2138.

Line 1098 is connected to the movable contact 2940 of relay 2920. The normally closed contact of this is connectable through normally open contact 2942 of relay 2922 to the winding of relay 2924. The normally open contact connects with the winding of relay 2920 and to the line 2944.

A normally open contact 2946 of relay 2924 is arranged to connect lines 2943 and 2950. The positive supply terminal is connectable through normally open contact 2952 of relay 2926 to the winding of relay 2932.

A line 2956 is connected to the winding of relay 2922.
A line 2958 is connected to the winding of relay 2926.
A normally open contact 2959 of relay 2928 is adapted to connect lines 2804 and 2814.

A line 2960 is connected to the winding of relay 2928, and through the normally open contact 2962 of this relay and through the diode 2964 to the line 1844.

A line 2966 is connected through the normally open contact 2968 of relay 2932 to the positive supply terminal. A line 2970 is similarly connected through the normally open contact 2972 of relay 2930, and the line 1904 is also similarly connected through the normally open contact 2976 of relay 2926.

A line 2440 is connected to the movable contact 2980 of relay 2928. The corresponding normally open contact is connected to line 646. The corresponding normally closed contact is connected to the winding of relay 2930 and to the line 1852. Lines 2770 and 1958 are respectively connected through the open contacts 2982 and 2984 of relay 2928 to the line 1930. The positive supply terminal is connected through the normally open contact 2986 of relay 2928 to the line 2810.

Figure 34:
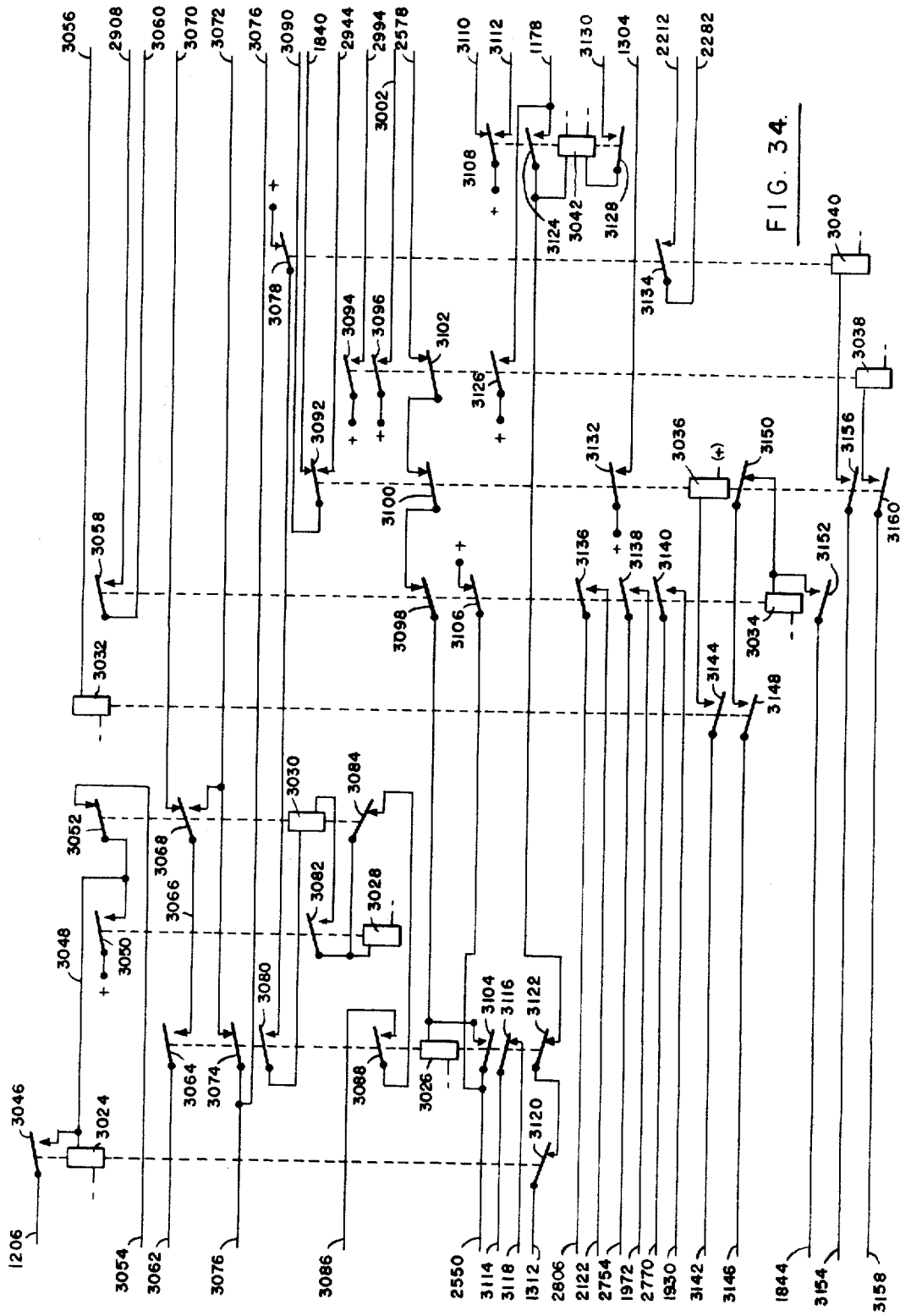

FIGURE 34 shows a further set of control relays and 2990 and their connections. Their windings are respectively connected to the lines 1904 and 1910. The line 2894 is connected through the normally open contacts 2992 of relay 2988 to line 2994, and through the normally open contact 2996 of relay 2990 to the line 2998. The line 2896 is connected through the normally open contact 3000 of relay 2988 to the line 3002, and through the normally open contact 3004 of relay 2990 to the line 3006. The line 1976 is connected through the normally open contact 3008 of relay 2988 to a line 3010, and through the normally open contacts 3012 of relay 2990 to the line 3014.

Lines 3018 and 2444 are adapted to be connected through the normally open contact 3016 of relay 2990, and lines 3022 and 2318 are adapted to be connected through the normally open contact 3020 of the same relay.

FIGURE 34 shows a further set of control relay and their connections. The control relays in this figure are 3024, 3026, 3028, 3030, 3032, 3034, 3036, 3038, 3040 and 3042.

The line 1206 is connected through the normally open contact 3046 of relay 3024 to its winding, and to line 3048 which is connectable to the positive supply terminal through normally open contacts 3050 of relay 3028. Line 3048 is also connected through the normally closed contact 3052 of relay 3030 to a line 3054.

A line 3056 is connected to the winding of relay 3032. Line 2908 is connectable to a line 3060 through the normally open contact 3058 of relay 3034.

A line 3062 is connected through the normally open contacts 3064 of relay 3026 and connection 3066 to the movable contact 3068 of relay 3030. The normally closed contact of this is connected to a line 3070. The normally open contact is connected to a line 3072. This last line is connected through the normally closed contact 3074 of relay 3026 to a line 3076. The positive supply terminal is connected through the normally closed contacts 3078 of relay 3040 and through the normally open contacts 3080 of relay 3026 to the winding of relay 3030. The other end of the winding of this relay is connected through the normally open contact 3082 to the winding of relay 3028, and this winding is connected through the normally closed contact 3084 of relay 3030 and the normally open contacts 3088 of relay 3026 to the line 3086.

A line 3090 is connected to the movable contact 3092 of relay 3036. The corresponding closed contact is connected to line 1840, while the corresponding normally open contact is connected to the line 2944. The positive supply terminal is connectable through the normally open contacts 3094 and 3096 of relay 3038 to the respective lines 2994 and 3002.

The winding of relay 3026 is connected through the normally closed contact 3098 of relay 3034, the normally closed contact 3100 of relay 3036 and the normally closed contact 3102 of relay 3038 to line 2578. This winding is also connected through its own normally open contact 3104 to the line 2550 which is also connected through the normally closed contact 3106 of relay 3034 to the positive supply terminal.

The positive supply terminal is connected to the movable contact 3108 of relay 3042, and its corresponding normally closed contact is connected to line 3110 while its normally open contact is connected to the line 3112.

Line 3114 is connected through the normally closed contact 3116 of relay 3026 to a line 3118. Line 1312 is connected through the normally closed contact 3120 of relay 3024 and the normally closed contact 3122 of relay 3026 to one winding of relay 3042. This same winding is connected through its normally open contacts 3124 to line 1178, which line is connectable to the positive supply terminal through the normally open contacts 3126 of relay 3038. A second winding of relay 3042 is connectable through its normally open contacts 3128 to a line 3130.

The positive supply terminal is connected through normally open contacts 3132 of relay 3036 to the line 1304. Lines 2212 and 2282 are adapted to be connected through the normally open contacts 3134 of relay 3040.

Normally open contacts 3136, 3138 and 3140 of relay 3034 are adapted to interconnect, in pairs, the lines 2806 and 2122, the lines 2754 and 1972, and the lines 2770 and 1930.

Line 3142 is adapted to be connected to the winding of relay 3036 through the normally open contact 3144 of relay 3032. It will be noted that the other end of the winding of this relay 3036 is connected, as indicated, to the positive supply terminal, this being an exception to the usual arrangement involving connections of windings to negative.

Line 3146 is connectable through the normally open contact 3148 of relay 3032 and the normally closed contact 3150 of relay 3036 to the winding of relay 3034, which winding is also connectable through its own normally open contact 3152 to the line 1844.

Line 3154 is connectable through the normally open contact 3156 of relay 3036 to the winding of relay 3040. Line 3158 is connectable through the normally open contacts 3160 of relay 3036 to the winding of relay 3038.

Figure 35:
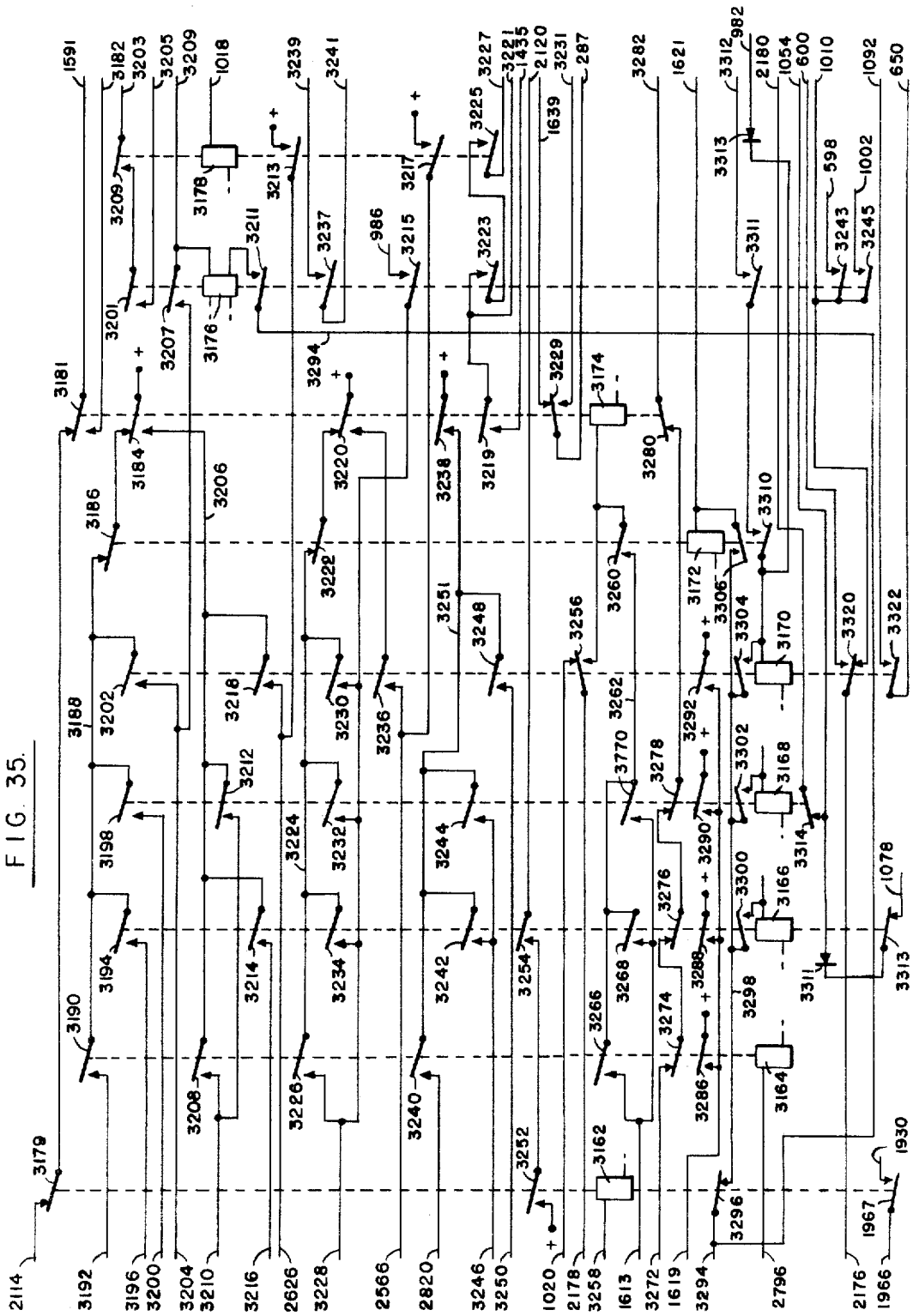

FIGURE 35 shows further relays and connections involved in control. The relays are 3162, 3164, 3166, 3168, 3170, 3172, 3174, 3176 and 3178.

Line 2114 is connected through the normally closed contact 3179 of relay 3162 to the contact normally closed by the movable contact 3181 of relay 3174. The normally open contact is connected to line 3182, while the movable contact is connected to line 1591. The positive supply terminal is connected to the movable contact 3184 of relay 3174. The normally closed contact of this is connected through the normally closed contact 3186 of relay 3172 to the line 3188 which is connected through the normally open contact 3190 of relay 3164 to the line 3192. The line 3188 is connected through the normally open contact 3194 of relay 3166 to the line 3196. Line 3188 is also connected through the normally open contact 3198 of relay 3168 to the line 3200. It is also connected through the normally open contact 3202 of relay 3170 to the line 3204.

A line 3203 is connectable to a line 3205 through the normally open contacts 3201 and 3209 of the respective relays 3176 and 3178. Line 3204 is connected through the normally open contacts 3207 of relay 3176 to one of the windings thereof and to line 3209. The winding of relay 3178 is connected to line 1018.

The normally open contact associated with movable contact 3184 is connected to line 3206, which is connectable to a line 3210 through the normally open contact 3208 of relay 3164 or the normally open contacts 3212 of relay 3168. Line 3206 is connectable to line 3216 through the normally open contact 3214 of relay 3166. Line 3206 is also connected through the normally open contact 3218 of relay 3170 to the line 2626.

The second winding of relay 3176 is connectable through its normally open contact 3211 to a line 3294, more logically referred to hereafter. Line 2626 is connectable to the positive supply terminal through the normally open contacts 3213 or relay 3178.

The positive supply terminal is connected to the movable contact 3220 of relay 3174. The corresponding normally closed contact is connected through normally closed contact 3222 of relay 3172 to a line 3224. This line is connectable to a line 3228 by any of the normally open contacts 3230, 3232, 3234 or 3226 of the respective relays 3170, 3168, 3166 and 3164. The normally open contact at 3220 is connected through normally open contact 3236 of relay 3170 to the line 2566. Line 3228 is connected through the normally open contact 3215 of relay 3176 to line 986. Line 2566 is connectable through the normally open contact 3217 of relay 3178 to the positive supply terminal.

Normally open contacts 3237 of relay 3176 are adapted to connect lines 3239 and 3241.

Line 1435 is adapted to be connected through normally open contact 3219 of relay 3174 to a line 3221, which line is connectable to a line 3227 through the normally open contact 3223 and 3225 of the respective relays 3176 and 3178.

Line 287 is connected to the movable contact 3229 of relay 3174. The corresponding normally closed contact is connected to line 1639, while the normally open corresponding contact is connected to 3231.

The positive supply terminal is connected through normally open contact 3238 of relay 3174 to a line 3251 which is in turn connectable to line 2820 through the normally open contact 3240 of relay 3164. The line 3251 is also connectable through contact 3242 and 3244 of the respective relays 3166 and 3168 to a line 3246. Line 3251 is connectable to a line 3250 through the normally open contact 3248 of relay 3170.

The positive supply terminal is connectable through normally open contact 3252 of relay 3162 and through the normally open contact 3254 of relay 3166 to the line 2120.

Line 2178 is connected to the movable contact 3256 of relay 3170. The corresponding closed contact is connected to line 1020, while the corresponding open contact is connected to the winding of relay 3174.

A line 3258 is connected to the winding of relay 3162.

The line 1613 is connectable through the normally open contacts 3266, 3268 or 3270 of the respective relays 3164, 3166 and 3168 to the line 3262 which is in turn connectable through the normally open contact 3260 of relay 3172 to the winding of relay 3174.

A line 3272 is connected through the normally closed contacts 3274, 3276, 3278 and 3280 of the respective relays 3164, 3166, 3168 and 3174 to the line 3282.

The line 1619 is connectable to the positive supply terminal through the normally open contact 3286, 3288, 3290 and 3292 of the respective relays 3164, 3166, 3168 and 3170.

Line 3294 is connected through the normally closed contact 3296 of relay 3162 to a line 3298, which line is connectable to the windings of relays 3166, 3168, 3170 and 3172 through the respective normally open contacts 3300, 3302, 3304 and 3306 of these relays. The winding of relay 3170 is also connectable through the respective normally open contacts 3310 and 3311 of relays 3172 and 3176 to the line 3312. It is also connected to line 982 through diode 3313.

The winding of relay 3172 is also connected to line 1621.

Line 2796 is connected to the winding of relay 3164.

Lines 2180 and 1054 are connetced through the normally closed contact 3314 of relay 3168.

Line 2176 is connected to the movable contact 3320 of relay 3170. The corresponding normally open contact is connected to line 600. The corresponding normally closed contact is connected to the line 1010.

This line 1010 is connectable through the normally open contacts 3243 and 3245 to the respective lines 598 and 1002. The normally open contact 3322 of relay 3170 is adapted to connect the lines 1092 and 650.

Line 1966 is connectable to line 1930 through the normally open contacts 1967 of relay 3162.

Figure 36:
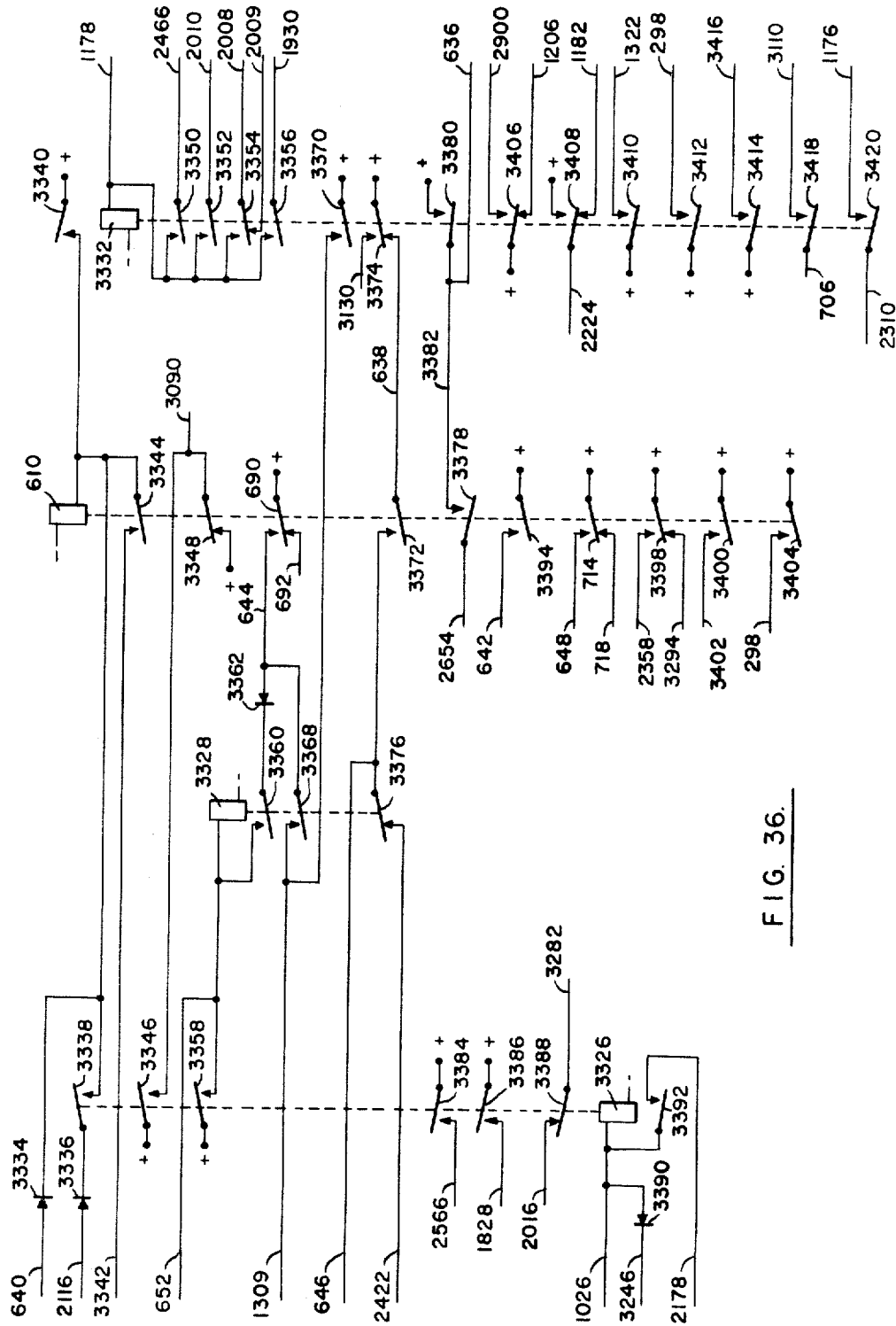

FIGURE 36 shows further relays and their connections, the relays being 3326, 3328, 610 and 3332.

Line 640 is connected through diode 3334 to the winding of relay 610. Line 2116 is connected through diode 3336 and the normally open contact 3338 of relay 3326 to the same winding. The positive supply terminal is connected through normally open contact 3340 of relay 3332 to the same winding, and line 3342 is connected to the same winding through the normally open contact 3344 thereof.

The positive supply terminal is connectable through the normally open contact 3346 of relay 3326, and is connected through the normally closed contact 3348 of relay 610 to the line 3090.

The respective normally open contacts 3350, 3352, 3354 and 3356 of relay 3332 are adapted to connect its winding to the respective lines 2466, 2010, 2008 and 1930. A normally closed contact at 3354 is connected to line 2009.

Line 652 connects with the winding of relay 3328, and with the positive supply terminal through the normally open contact 3358 of relay 3326. The movable contact 690 of relay 610 is connected to the positive supply terminal. The corresponding normally open contact is connected at 644 through diode 3362 and the normally open contact 3360 of relay 3328 to the winding of this relay. It is also connected through the normally open contact 3368 of the same relay to the line 1309. Line 1309 is adapted to be connected to the positive supply terminal through the normally open contact 3370 of relay 3332. The normally closed contact 690 connects the positive supply terminal to the line 692.

Line 646 is connectable through the normally open contact 3372 of relay 610 to the line 638. The positive supply terminal is connected to the movable contact 3374 of relay 3332. The corresponding normally open contact is connected to line 3130, while the normally closed contact is connected to line 638. Line 646 is connected to line 2422 through the normally closed contact 3376 of relay 3328.

Line 2654 is connectable through the normally open contact 3378 of relay 610 to the line 3382 which is in turn connectable through the normally open contact 3380 of relay 3332 to the positive supply line. Line 3382 is connected to line 636.

The positive supply terminal is connectable to the lines 2566 and 1828 through the respective normally open contacts 3384 and 3386 of relay 3326. A normally closed contact 3388 of this same relay connects lines 2016 and 3282. Line 1026 is connected to the winding of relay 3326. Lines 1026 and 3246 are connected through a diode 3390. Line 2178 is connectable to the winding of relay 3326 through the normally open contact 3392 thereof.

The movable contact 714 of relay 610 is connected to the positive supply terminal. The normally open and normally closed contacts thereof are connected respectively to the lines 648 and 718.

The movable contact 3398 of relay 610 is connected to the positive supply terminal, and the normally open and normally closed contacts thereof are connected to the respective lines 2358 and 3294. The positive supply terminal is connectable through the normally open contact 3400 of relay 610 to the line 3402. The positive supply line is connectable through the normally open contact 3404 of the same relay to line 298.

The movable contact 3406 of relay 3332 is connected to the positive supply line, and its respective open and closed contacts are connected to the lines 2900 and 1206.

Line 2224 is connected to the movable contact 3408 of relay 3332, and its normally open and normally closed contacts are connected respectively to the positive supply terminal and line 1182.

The respective normally open contacts 3410, 3412 and 3414 of relay 3332 are adapted to connect the lines 1322, 298 and 3416 to the positive supply terminal.

Normally open contacts 3418 of relay 3332 are adapted to connect lines 706 and 3110, while the normally open contact 3420 is adapted to connect the lines 2310 and 1176.

FIGURE 37 shows a pair of stepping switches and associated circuitry involved in effecting multiplication by successive additions. The first stepping switch indicated at 3422 has three contact banks 3424, 3426 and 3428. The second stepping switch 3430 has also three banks of contacts 3432, 3434 and 3436. Each of the banks of both switches has ten contact points. The operating coil of the upper switch 3422 is shown at 3437, while that of the lower switch is shown at 3438. The upper switch controls multiplication by units, and the lower controls multiplication by tens. Normally closed movable contacts 3440 and 3442 are controlled by the coil 3447, while similar contacts 3444 and 3446 are controlled by coil 3448. Associated relays are shown at 3448 and 3450. The former is energized through line 298, while the latter is energized through line 3228.

A normally open contact 3454 of relays 3450 is arranged to connect the positive supply terminal with the line 1675. A line 3227 is arranged to be connected to a line 3458 by the normally open contacts 3460 of relay 3450. The line 3227 is connected to the coil 3448 through resistor 3462. Connection of line 3227 is made through 3464 to the connected contact points of bank 3434. It may be noted that at each of the contact banks all of the points are connected except for that in the first rest position. The line 3227 is connected through the normally open contact 3466 of relay 3448 to the line 3221 and the connected contacts of bank 3432.

A line 3470 is connected through the normally open contact 3472 of relay 3450 to the line 3204. This line is connected through the normally open contact 3474 of relay 3448 to the line 3203 and the connected contact of bank 3424. Line 3204 is also connected through resistor 3476 to the coil 3437. It is also connected through line 3478 to the connected contact of bank 3426.

The positive supply terminal is connected through contacts 3440 to the wiper 3480 of bank 3424, while the positive supply terminal is connected through contacts 3444 to the wiper 3482 of bank 3432.

The wiper 3484 of bank 3426 is connected by lead 3486 to the first contact of bank 3434. The corresponding wiper 3488 is connected to line 3182.

Line 3231 is connected through the contacts 3446 to the line 3490 which connects through contacts 3442 with the wiper 3492 of bank 3436. The first contact of this bank is connected at 3494 to the wiper 3496 of bank 3428. The connected contact of the bank 3428 and 3436 are connected to the line 1639. The first contact of bank 3428 is connected to line 3258.

FIGURE 38 shows the elements and circuitry involved in printing in the point of sale machine.

A stepping switch 3500 has three contact banks 3502, 3504 and 3506. Each of these banks has eleven contacts. The respective wipers are illustrated in home position at 3508, 3510 and 3512. The last two are connected to the positive potential terminal. The stepping control coil 3514 is energized through resistor 3516 from line 2966. A ribbon feed electromagnet is shown at 3518 and is energized from line 2948. It also acts as a relay having normally open contacts 3520 arranged to connect the positive supply terminal to the line 2966.

A detent controlling electromagnet 3522 is energized from the line 2958 which also connects to the contacts of bank 3502 in the second to eleventh positions. The contact in the first position of this bank is connected to line 2950.

A line feed electromagnet 3524 is energized from line 2970 which also connects with the eleventh contact of bank 2504. The contacts of this bank in positions 8, 9 and 10 are connected to line 2944. Electromagnet 2924 has normally open contacts 3526 arranged to connect the positive supply terminal to line 2960. Electromagnet 3528 is energized through line 1300.

The second to eleventh contacts of bank 3506 are connected to leads 324 of storage elements of the type already described.

Also indicated in FIGURE 38 are the printing magnets 3530 which will be hereafter more fully referred to in connection with the printer. There are twenty-six of these electromagnets which are individually connected to lines 330 controlling their operations.

Also shown in FIGURE 38 is a microswitch 3532 which senses the introduction of sales slips. In its respective rest and sensing positions it connects the positive supply terminal to the lines 1950 and 2956.

FIGURE 39 shows a transmitting stepping switch and its connections. The switch 3534 has three contact banks 3536, 3538 and 3540, each having contacts in fifty-two positions. The respective wipers are shown at 3541, 3542 and 3544, and are in position 52 when at rest. Each of these wipers is connected to the positive supply terminal. The coil 3546 controls stepping and is energized through resistor 3548 from line 3076. It is associated with normally closed contacts at 3550 and 3552. The latter connects the positive supply terminal to line 3070.

The first fifty contacts of bank 3536 are strapped together as indicated at 3554 and are connected to line 3114. This line is connected through contact 3550 to line 3072. The contact of bank 3536 in position 51 is connected to line 3118, while that in position 52 is connected to line 3086.

In the case of the second bank 3538, the contact in positions 1 to 8, inclusive, are connected to individual lines 334. That in position 9 is connected to 2862. Those in positions 10, 11 and 12 are also connected to lines 334. Those in positions 13 and 14 are respectively connected to lines 2874 and 2846. Those in positions 15 to 50, inclusive, are connected to individual lines 334.

In the case of banks 3540, the contact in positions 1 to 8 are connected to lines 336. This is also true of the contact in positions 10, 11, 12 and 15 to 50, inclusive. The contact in position 9 is connected to line 2252. Those in positions 13 and 14 are respectively connected to the lines 2266 and 2253. The contact in position 51 is connected to lines 3056.

FIGURE 40 shows a further set of relays and their connections. Relays 3197, 3201 and 3193 are, respectively arranged to be energized from lines 3196, 3200 and 3192. A line 3531 representing "tens" is arranged to be connected to line 2378 through the normally open contacts 3533 of relay 3197. It is also arranged for connection through the normally open contacts 3539 of relay 3201 to a line 3537. It is also arranged to be connected through the normally open contacts 3535 of relay 3193 to connection 3541 running to the adjustable arm 3543 of the manual selection switch 3545. The arm 3543 may be manually connected to any one of ten fixed contacts of this switch connected respectively to the lines 1420 previously described.

A line 3547, representing "units" is connectable, respectively, to the lines 2390, 2396 and 3537 through the normally open contacts 3549, 3551 and 3553 of the respective relays 3197, 3201 and 3193.

The line 3537 is connected to the fixed contact of switch 3545 which represents zero. The function of what is shown in FIGURE 40 will be described hereafter.

The construction of the printer of the point of sale machine is shown in FIGURES 41 to 47, inclusive. It is designated generally at 3556 and comprises a frame mounting its parts including a sales slip guide 3558 continued as an upwardly curved portion 3560. It will be understood that the sales slip may comprise a number of connected sheets provided with carbon backings or interleaved with carbon paper to provide duplicate copies. Such copies may be distributed in accordance with the practice of the user of the machine. It may be here noted that although the point of sale machine has major utility in providing transmission of recorded matter to a central unit, it is self-sufficient in itself as a highly improved cash register. In use in such fashion, one copy of the sales slip resulting from a transaction may well be used as a permanent record. If desired, the matter printed on a sales slip may be duplicated on a paper strip fed from a supply in the machine and delivered to a receiving roll or other receptacle therein. As illustrated, however, the manifold sales slip is introduced into the machine and removed after the completion of operation. Step by step feed of the sales slip is provided by a rubber covered roller 3562. The sales slip is held in contact with this roller by a transverse rod 3564 carried by a bell crank 3566 mounted on a shaft 3568 and urged by a spring 3570 to bring the rod 3564 in contact with the sales slip. To provide for insertion and ultimate release of the sales slip the shaft 3568 is connected to the armature of the electromagnet 3528, previously referred to. This electromagnet is energized at the beginning of operation so that the sales slip may be freely inserted, and it is later energized to release the sales slip at the end of the printing operation.

The shaft 3572 of the roller 3562 is geared at 3574 to a shaft 3576 to which is secured the ratchet 3578 arranged to be advanced by a spring pawl 3580 connected to the armature of electromagnet 3524. A spring detent 3582 prevents reverse rotation.

The location of the sales slip in proper initial position is detected by a feeler 3584 projecting through the guide 3560, this feeler being mounted on a shaft 3586 carrying an arm 3588 arranged to operate the microswitch 3532. An inked ribbon is provided at 3590 which is advanced by conventional mechanism, not shown, operated by electromagnet 3518.

A type wheel 3592 is carried by a shaft 3594, the type wheel carrying type arranged in adjacent circles with axial alignment of the characters. The shaft 3594 is geared at 3596 to the shaft of the stepping switch 3500 shown in FIGURE 38. The arrangement is such that each of the eleven rows of type may be brought into printing position as the switch steps to its respective eleven positions. The shaft 3594 also carries a ratchet 3598 engageable by a detent 3600 connected to the armature of the electromagnet 3522. This detent insures proper alignment of the type with printing hammers when the successive printing operations are to occur. The gearing at 3596 is such that the type wheel 3592 makes a complete revolution in eleven steps of the switch 3500. This switch, like those previously described, having multiple movable contact arms which replace each other in operation.

Hammers 3602 are provided, one for each of the circular series of type. These hammers are individually pivoted on a transverse rod 3606 and are urged to inactive positions by springs 3607. Each hammer is provided with an impact producing end 3604.

Each hammer has a depending portion engageable in a notch 3609 of an individual bar 3608, there being provided freedom for overrun by the elongation of the notches 3609 so that, in operation, as its bar 3608 is moved rearwardly, the hammer may overrun to provide a sharp impact on the sales slip. Each of the bars 3608 is movable by engagement with the armature of an individual electromagnet 3530 (FIGURE 38). The bars 3608 are guided for sliding movement by combs 3612 and 3614.

The printing operation is carried out by the imparting of eleven steps to the type roller 3592. At each of these steps the appropriate hammer or hammers are operated to provide impact. Thus a complete line of printing is accomplished in the eleven steps of the type roller.

The arrangement of type on the type wheel is diagrammed in FIGURE 48 in the form in which it would effect printing, the type, of course, being reversed. The eleven rows are indicated at 3618, while the columns printed are indicated at 3620.

Columns 1 and 2 indicate the type of transaction. Column 3 numbers the items in a transaction. Columns 4 and 5 are used to identify the department and columns 6, 7 and 8 are used to identify the class. Columns 9, 10 and 11 are used to identify quantity. Columns 12 to 16, inclusive, are used to identify unit price. The first three may identify dollars and the last two cents. Similar columns 17 to 21, inclusive, may be used to identify extended amounts. Columns 21 and 23 contain code designations pertinent to the items or transactions. It will be noted that columns 1, 22 and 23 are wider than the others, and for the printing of these the hammers have extended impact ends. It will be obvious that the arrangement of the type is quite arbitrary and may be made to suit the desires of the user of the machine. The sales slips are preprinted with columns headed by appropriate legends so that the significance of the entered matters will be apparent, dollars will be separated from cents, etc. At this point it may be noted that the legends in columns 1, 2, 22 and 23 are, in effect, coded in the machine in terms of numbers so that numbered steps on storage switches may represent either actual numbers or other information. The eleventh row is somewhat special in its significance as will be brought out later.

A watch list is provided so as to be automatically consulted to determine whether a customer's account is bad or subject to credit limitation. If the status of the account is unsatisfactory, the contemplated transaction will be interrupted pending clearance by authorization from the credit department. As will be evident, the watch list could additionally take care of the matter of supplying a warning if an article ordered by a customer was out of stock; or it could give warning to a clerk that while the transaction could be completed no other transactions involving the same article should be made. For purposes of the present description, however, the watch list will be considered as applying to the status of customers' accounts.

While the watch list may take various forms it will be convenient to describe it as provided by an assemblage of cards arranged for selection to give a warning of an unsatisfactory situation. The watch list is illustrated in FIGURES 49 and 50 in a generally schematic form since, except for the signalling means, it is of a conventional and well-known type. It comprises a container, not shown in detail, including a pair of support rails 3622 and 3624 on which the lower corners of cards 3626 are supported. These cards may contain data concerning the customer and the status of his account, there being one card for each customer subject to question. The lower edges of the cards are provided with tabs 3628 which are selectively removable to permit automatic card selection. When the cards are in their rest position, the notches between tabs are in vertical alignment with bars 3630 pivoted to links 3632 and 3634 which are mounted at their lower ends in the frame. The bars individually correspond to the numbers of the code already described and, in groups, represent the various digits of the customer's account number. Arranged to cooperate with each bar 3630 to swing it upwardly and toward the left as viewed in FIGURE 50, is a pin 3636 of a group slidable in a pivoted frame 3638 arranged to be rocked in a clockwise direction as viewed in this figure. Each pin 3636 is arranged to be moved lengthwise by a Bowden wire 3640 projectible to move the pin downwardly by the action of a solenoid 3641 energized through a connection hereafter described.

3642 indicates the core of an electromagnet arranged, when energized, to attract the left-hand edges of cards 3626 which are formed of magnetic material, so that those cards which are free to move toward the left as viewed in FIGURE 49 may do so to project their lower left-hand edges over a bar 3644 arranged to be moved upwardly to lift such cards. A lamp 3646 projects a beam of light along a path 3650 upon the sensitive surface of a photocell 3648 so that the beam will be interrupted if a card is lifted to an intercepting position.

Except for the photoelectric detection arrangement, what has just been outlined is quite conventional for the selection of cards utilizing a coded system. Operation is effected by a motor 3803 which will be more fully described in connection with FIGURE 51. In brief, the sequence of operation is as follows:

The motor is arranged to effect a single cycle of operation. In accordance with input signals the proper solenoids 3641 are energized to provide selective projection of the pins 3636. The frame 3638 rocks so that the selected pins engage and raise the bars 3630. Electromagnet 3642 is then energized by means of a switch operated by a motor and a card of the group 3626 is thus moved toward the left as viewed in FIGURE 49. The card thus moved is one which will have its tabs 3628 missing at the right hand side of the upwardly selected bars 3630. All other cards which should have tabs in at least one of such positions will be prevented from moving toward the left. The card which is moved toward the left is then raised by the upward movement of bar 3644 acted upon by a cam driven by the motor, and this action projects the selected card into position to intercept the beam at 3650 thus giving a response from the photocell 3648. A momentary interruption of this beam is all that is required, and the motor completes its cycle operating a level (not shown) to move the selected card back to its normal position after the electromagnet 3642 is deenergized and the bar 3644 lowered. At this same time the frame 3638 swings back to its normal position to release the bars 3630 and the solenoids 3641 will be then or thereafter deenergized so that the pins 3636 are withdrawn to their rest positions under spring action.

In brief what is of consequence is that this apparatus upon receipt of proper coded signals provides an output signal by interruption of the beam if the customer's account is questionable so that his card has been selected.

While, as already pointed out, the point of sale machine is complete in itself, and may be used alone, it has special utility in providing its accumulated information to a central unit for further processing. This central unit may print the data for each transaction, may punch cards or provide magnetic records usable for billing, inventory, etc., make tax records, or the like. When such a central unit is used, it is also involved in referring to the watch list, and it provides signals back to the reporting point of sale machines. Hence, to provide a background for a complete description of operation there is illustrated in FIGURE 51 so much of a point of sale machine as is directly affected by, or affects, the operation of point of sale machines. As will be described, the central unit stores the supplied information; but there will not be herein described the ultimate utilization of this information.

FIGURE 51 shows relays for various control operations at 3653, 3654, 3674, 3676, 3677, 3679, 3694, 3692 and 3720. Storage relays are shown as a group 3690. These last relays are illustrated only to the extent of their self-locking contacts. It will be understood that each of them will be provided with contacts which they operate upon energization for utilization of the information which they store.

3656 is the operating coil of a stepping relay 3657 provided with the banks of contacts illustrated at 3658, 3660, 3662, 3664, 3666, 3668, 3670, 3672 and 3814. The respective movable contacts of these banks are indicated at 3698, 3756, 3712, 3758, 3760, 3762, 3764, 3766 and 3812. Each of the banks is provided with a number of active fixed contacts corresponding to the number of point of sale machines connected to the central unit. In the present description it will be assumed that the point of sale machine which has been described is numbered one and consequently the connections are shown to the first fixed contacts of the respective banks, it being understood that similar connections are made from other point of sale machines to other corresponding contacts. This individual showing will also be understood with respect to elements connected to the number one contacts, such as the relay 3654 which is merely representative of a number of relays, each corresponding to an individual point of sale machine.

From each point of sale machine there run eight leads to the central unit. These are indicated at 3054, 3076, 3062, and as the group 332 of five leads corresponding, as indicated, to the 0, 1, 2, 4 and 7. These eight leads are connected to the number 1 contacts of the upper eight banks. From the wipers of these banks there extend the leads 3700, 3732, 3714, 3768, 3770, 3772, 3774 and 3776. The last five of these leads are connected to the wiper 3778, 3780, 3782, 3784, and 3786 of the respective banks 3680, 3682, 3684, 3686, and 3688 of another stepping relay 3769 the operating coil of which is shown at 3678. This relay 3769 has a further bank 3790 having a wiper 3788 connected to the positive supply terminal.

Each bank, except the last, of the last mentioned relay 3769 has contacts in fifty-two positions corresponding to the fifty-two positions of contact of the transmitting relay 3534 of FIGURE 39. As will appear, the two stepping relays are controlled to operate in synchronism.

Each contact of each bank (if all are used) is connected to an individual relay of the group 3690. In FIGURE 51 there are illustrated three vertical columns of such relays, those in the first column being connected to the points 1 of the banks, those in the second column to points 2 and those in the third column to points 3. It will be understood that this arrangement is repeated for all of the contact points. As an example, considering the first number to be transmitted, the relays of the first column may represent, in coded form, the first digit, those in the scond column the second digit, and so on, each column accordingly representing a single transmitted digit, the term "digit" being used either in a numerical or coded sense. As already remarked, these relays contain numerous contacts which are not of interest here, being used for other purposes in the central unit. Illustrated, however, are the normally open locking contacts exemplified at 3691 which connect the relay windings to the line 3708. During transmission this line is connected to the positive supply terminal to effect locking. When relay clearing is required, this line is deenergized. A similar locking and clearing line is indicated at 3709.

Consideration may now be given to the controlling connections shown in FIGURE 51.

Relay 3653 is energized from line 3054 through diode 3696. While not illustrated, this same relay is energizable from a corresponding line 3054 of any other point of sale machine, diodes such as 3696 being provided for isolation. The normally open contact 3738 of relay 3653 is arranged to connect the positive supply terminal to line 3740 which runs to the normally closed contacts 3742 arranged to be broken upon energization of the energizing coil 3656 of the stepping relay 3657. From contacts 3742 the connection runs through the normally closed contacts 3746 of relay 3674 and thence through connection 3748 and the normally closed contacts 3750 of relay 3676 to line 3752 through which energization of coil 3656 is provided.

The wiper 3698 of bank 3658 of stepping relay 3657 is connected at 3700 to the winding of relay 3674. Positive potential may be applied through the normally open contacts 3702 of relay 3674 to the winding of relay 3676. The positive end of this wiring is also connectable through the normally open contacts 3706 of relay 3676 to the line 3708.

Positive potential is applicable through the normally open contacts 3730 of relay 3720 through line 3732 to the wiper 3756 of the bank 3660 of stepping relay 3657.

The positive supply terminal is connectable through normally open contacts 3734 of relay 3720 and connection 3736 to the winding of relay 3768.

Positive potential is applied through the normally closed contacts 3754 of relay 3768 to the normally open contacts 3724 of relay 3720 and thence to the fixed contact engageable by movable contact 3722 of relay 3720 which runs to the winding of this relay. A connection runs from this winding through the normally closed contacts 3716 of relay 3768 to the normally open contacts 3710 of relay 3676 and thence through line 3714 to the wiper 3712 of bank 3662 of stepping relay 3657. A connection also runs from the fixed contact at 3722 to the fixed contact at 3710.

Two push button switches 3827 and 3829 are provided, the former having the normally open contacts 3828 and normally closed contacts 2830 while the latter has the normally open contacts 3831 and the normally closed contacts 3832. The winding of relay 3654 is connected through its normally open contact 3818 to the normally closed contacts 3832 and through them to the normally closed contacts 3820, the connection then running to the line 332 having the coded digital value 4. It may be here noted that the relay 3654 and push button switches 3827 and 3829 are individual to a point of sale machine, and he relay 3654 has a second winding connected to the proper point, in this case number 1, of the bank 3814 of stepping relay 3657. The positive supply terminal is connectable through normally open contact 3828 of switch 3827 and the normally open contact 3820 of relay 3654 to the connection 3824 running to the line 332 corresponding to the coded digit 2.

In similar fashion the positive supply terminal is connectable through the normally open contact 3831 of switch 3829 and the normally open contact 3822 of relay 3654 to the line 3826 running to the line of the group 332 corresponding to coded numeral 1. Positive potential is applicable through the normally open contact 3808 of relay 3692 to the line 3818 running to the wiper 3812 of bank 3814 of stepping relay 3657. Through the normally closed contact at 3808 the positive potential is applied through connection 3816 to the fixed contact in position 51 of bank 3688 of stepping relay 3769.

The positive supply terminal is connected to the wiper 3788 of bank 3790 of stepping switch 3769. The ninth fixed contact point of this bank is connectable through the normally open contacts 3792 of relay 3677 and the normally open contacts 3796 of relay 3679 to the winding of relay 3694.

The winding of relay 3677 is connected so as to be energized from the positive supply terminal through the closure of any normally open contacts (not shown) associated with all of the relays of the group 3690 in the first column, i.e., those associated with the first contact point of the stepping relay 3769. The winding of relay 3679 is similarly energizable from any of a group of contacts associated with any of the relays 3690 in the second column, i.e., connected to the second points of the stepping relay 3769.

The positive supply terminal is connectable through the normally open contacts 3798 of relay 3694 to the line 3802 which runs to the motor 3803 of the watch list mechanism to effect operation thereof. The positive supply terminal is also connectable through the normally open contact 3800 of relay 3694 to the line 3804 which runs to normally open contacts of those relays of the group 3690 which correspond to the customers' numbers. Through these last contacts the solenoids 3641 are energized to operate the Bowden wires 3640 and thus project the proper pins 3636 into operating positions.

The watch list photocell 3648 is connected to any conventional photocell relay 3649 suitable to the type of cell involved, and this relay connects the positive supply terminal to the winding of relay 3692 to energize the same. Upon energization the normally open contact 3806 is closed to lock the relay 3692 in energized condition from the locking line 3709. In the operation of the watch list the photocell 3648 will have its illumination cut off only momentarily. It may be noted that the arrangement used involves a safety factor in that any interruption of illumination of the photocell due to any cause will energize the relay 3692 and give a transaction-stopping signal so that no transaction may be completed unless the watch list has been consulted and properly operated. This is due to the cutting off of potential from the fifty-first contact of bank 3688 of the stepping relay 3769.

The operation of the machine will now be considered.

First, as will be already evident, the machine is capable of carrying out in appropriate but diverse ways many different types of transactions with which a clerk may be presented. Instead of discussing at this point the many arbitrary courses of transactions which may occur, it will be more informative to consider the operations involved in a single transaction chosen of such type as to present typical examples of the types of operational steps involved. These types of steps are relatively limited in number, and from the example which will be given similar operations of rather different steps will be understood. At the end of this discussion of a typical example reference may then be made to the divergent transactions which may be carried out.

Throughout the following discussion it will be helpful for the reader to keep before him the more general FIGURES 2, 16, 21, 22A, 22B, 22C, 24, 25A, 25B and 26, with special reference to the other figures as they appear in the description. As a reminder of what these figures represent, FIGURE 2 is a view of the keyboard providing an index of the instruction, questioning, and program control keys; FIGURE 16 shows a typical storage stepping switch and an assemblage of such switches such as is used for the storage of multiple digit numbers; FIGURE 21 shows the unit elements of the machine including particularly the identities of the storage switches; FIGURES 22A, 22B and 22C show the illuminating lamps for the keys and the switches operable thereby; FIGURES 25A and 25B show the addition-subtraction unit which is repeatedly used to interconnect the information storage stepping switches; and FIGURE 26 shows the sequence stepping switch which progressively advances during the operation and has a major function in the proper routing of information and the effecting of controls. FIGURE 27 which will be referred to as the line stepping switch also has a repeated and important function in the operation.

When the machine is at rest, the parts, generally, occupy the positions illustrated. The initial conditions of the various parts will become clearer as they are described in entering into the operations. However, with reference to FIGURES 22B, 26, 27, 34 and 36, certain initial conditions may be described. The wipers of the sequence stepping switch 1800 (FIGURE 26) are in position 26, while the wipers of the line stepping switch 2040 (FIGURE 27) are in position 11. Lamp 1252 is illuminated to light the key directing the insertion of a sales slip and tokens. The current path for illumination of this lamp may be traced through lead 1254 (FIGURE 26) through wiper 1838 and lead 1840 (FIGURE 34) through the closed contact at 3092 of deenergized relay 3036, through lead 3090 (FIGURE 36) and through closed contact 3348 of deenergized relay 610 to the positive supply terminal.

In its rest condition the machine is ready to receive the sales slip. For this purpose the key associated with lamp 1252 is depressed to close the contacts 1258 and 1259 (FIGURE 22B).

Reference may now be made to FIGURES 22B, 22C, 26, 32, 38, 42 and 44. The closing of the contacts at 1259 provides positive potential to line 1300 which (FIGURE 38) energizes the solenoid 3528 which is shown in FIGURE 44. This lifts pin 3564 (FIGURE 42) to clear the chute for the insertion of the sales slip.

As the sales slip engages the feeler 3584, the microswitch 3532 (FIGURE 38) is operated to supply positive potential to line 2956 (FIGURE 32) to energize the relay 2922. Energization of this relay closes contacts 2936 to provide positive potential to the line 1952 which (FIGURE 26) is connected to the point 26 of bank 1812 of stepping relay 1800. Through wiper 1926 and closed contact 1928 this effects energizing of operating coil 1802. Upon energization of this coil, contact 1928 is opened, deenergizing the coil 1802 to provide stepping to position 1. Wiper 1926 now engages point 1 which is without a connection. Accordingly, only a single step occurs.

The circuit previously described energizing the lamp 1252 is now open.

Simultaneously, with the closing of the contacts 1259 contacts 1258 (FIGURE 22B) are also closed to provide positive potential to line 1197 (FIGURE 22C). This energizes the relay 1261 which, as described previously, releases the depressed key to permit it to rise when the operator's finger is removed.

At this point it may be remarked that lead 1840 (FIGURE 26) has a positive potential applied to it from the connections already described, and this condition remains until, as described below, the positive potential is removed.

Lead 1840 now provides positive potential to line 920 which (FIGURE 22A) effects lighting of lamp 922. The lamp 922 illuminates the key which asks for the clerk's number, the key carrying the marking "Sales No."

For greater generality of description of the operation, it will be assumed that a clerk's token is not entered, so that the clerk's identification number will have to be entered on the numerical keyboard, but that a customer's credit card and merchandise tag are inserted in the card reader. Insertion of the latter has not yet been effected, the instruction to insert the sales slip and tokens will now be completed by the insertion of the customer's credit card and the merchandise tag in the drawer 64 (FIGURE 6) these being inserted in the proper locations as already described. The drawer 64 is then fully closed, and the cover 217 is also closed. This controls the various switches heretofore described and which will appear as the operation of the card reader is discussed.

Let it be assumed that the clerk's number is 12. Reference may now be made particularly to FIGURES 16, 22A, 22B, 24, 26, 35 and 36.

Referring to FIGURE 24, a circuit may now be traced from the negative six volt terminal 1380 through relay 1378, diode 1382, lead 1342, connection 1360, the series of closed contacts 1336, the operated contact 1336, lines 1364 and the normally closed contact at 1366 to the positive supply terminal. This effects energization of the relay 1378, which closes contacts 1388 to provide positive potential through lead 1269 to energize relay 1267. The line 1267 and relay 1267 are again shown in FIGURE 22B. It will be noted that the negative return of the relay is to −50 volts, this high negative potential being used because of the considerable contact load of this relay. The relay 1267 when thus energized closes contact 924 (FIGURE 22A) to extend the positive potential existing on line 920 to the contact 926 operable by the clerk's number key. Depression of this key will then provide the positive potential to line 928.

It is now to be remembered that FIGURE 16 was described as showing, in detail 1 and in assembly a plurality, of storage stepping switches which take care of temporary storage of fed-in information. At this present phase of this discussion of operation, FIGURE 16 may be taken to represent the storage for the clerk's number. The line 928 just described is connected to the terminal 281 of FIGURE 16 and affects energization of relay 286. This relay provides for access of information to the storage stepping switch. This same relay 286 is also equivalent to relay 1704 of FIGURE 25B. It will be recalled that, as previously described, relay 1704 is merely one of a large number arranged to route information from the addition-subtraction circuit to the storage relays, and still continuing the specific matter, 1704 may be considered the relay providing access to the storage for the clerk's number.

A circuit may now be traced from the positive potential terminal through wiper 2014 of bank 1822 of stepping relay 1800 (FIGURE 26) through the fixed contact point in position 1, line 2016 (FIGURE 36) through normally closed contact 3388 of relay 3326, thence through line 3282 (FIGURE 35), through the normally closed contacts 3280, 3278, 3276 and 3274 of relays 3174, 3168, 3166 and 3164, to line 3272 (FIGURE 24) to energize the relay 1371. This relay is the equivalent of the relay 1434 in FIGURE 25A, the "read" relay of which one is provided corresponding to each source of information to be introduced into the addition-subtraction circuit. In this case the input is from the numerical keys rather than from any of the storage stepping relays.

Referring to FIGURES 16, 25B and 35, relay 286, energized as described, closes contact 293 to provide positive potential to line 287 (FIGURE 35) and thence through the normally closed contact 3229 of relay 3174 to line 1639 (FIGURE 25B) to energize relay 1638, the "add" relay.

An addition operation then takes place as previously detailed; but in this case the "addition" is merely to a zero value in the receiving storage for the clerk's number. Consequently the addition-subtraction unit is merely functioning as a transfer device to take information from a source to a receiver, the source in this case being the numerical keys. The operation just described is typical of quite a number of other operations in which information is thus transferred without any more elaborate arithmetical computation, and, accordingly, in what follows, this transferring procedure will be only briefly described, with the understanding that it is carried out as just detailed.

At the end of the addition operation, the add-carry relay 1538 (FIGURE 25A) is energized providing a signal that the addition (transfer) cycle is completed. This effects operation as follows:

Starting with FIGURE 26, positive potential is applied to wiper 1954 of bank 1814 of stepping relay 1890 and thence to line 1200 (FIGURE 25A) to line 1930 (FIGURE 26) to energize the coil 1802.

Key release is then affected. Position potential is applied through wiper 2006 of bank 1820 of stepping relay 1800 to line 2008 (FIGURE 36) through normally closed contact 3354 to line 2009 (FIGURE 26), now closed contact 2029, thence through line 1399 (FIGURE 22C) to energize the key release relay 1307. This closes its contacts 1311 and 1315 to energize the key release solenoids 1261 and 1263.

The release of the clerk's number key opens switch 926 to remove potential from line 928. This line as previously described had effected energization of the add relay 1638 (FIGURE 25B) and when this is deenergized it also deenergizes the add-carry relay 1538 by releasing and opening its contact 1644. As already described, the add-carry relay had been energizing the coil 1802 of the stepping switch 1800. As a result of the above the key release relay is deenergized and a step of switch 1800 occurs to point 2.

It may be here noted that when the numerical keys were depressed the indicator lamps (FIGURE 24) were illuminated as previously described to provide visual indication of the entry. Such display of the number entered is provided in each instance in which the numerical keys are operated, and provides to the clerk the opportunity of making corrections before controlling entry of the number in a storage receiver. The actual entry is only accomplished by the depression of a control key.

In the sample transaction being described, it was assumed that the customer's credit card and a merchandise tag had been inserted in the card reader.

Referring to FIGURE 20, normally closed contact 656 applied positive potential at 658 to the series arrangement of contacts 214 and 226 which are connected at 904 to the relay 608. Contact 214 was closed when the card drawer was closed, and contact 226 was closed when the cover was closed. The stepping switches for the customer's credit card and merchandise tag, respectively indicated at 206 and 208 will now also be closed. Since relay 608 is now energized, contact 662 provides positive potential to line 451. This runs (FIGURE 19) to relay 449 which is, accordingly, energized. Referring to FIGURE 26, positive potential is applied through the normally closed contact 1900 to the wiper 1898 of bank 1808 of stepping relay 1800. This being at its second point, the positive potential is delivered to line 632 (FIGURE 20) and through now closed contact 660 and closed contact 206 to line 450 (FIGURE 19) to energize relay 448.

Positive potential applied on lead 1840 (FIGURE 26) as previously described is extended through wiper 1838 of bank 1804 of relay 1800 to line 1826 which (FIGURE 27) is connected to wiper 2170 of bank 2054 of the line stepping relay 2040. This being in its original position at point 11, positive potential is delivered through line 606 (FIGURE 22B) through diode 1212 and to lead 1213. Lead 1213 (FIGURE 22C) is connected through normally closed contact 1319 of relay 1307 to line 578 which (FIGURE 19) is connected through the now closed contacts 576 and 574 of energized relay 448 through the respective lines 588 and 580 and the now closed contacts 590 and 582 of relay 449, and through the respective diodes 592 and 584 to the lines 594 and 586.

Lead 586 (FIGURE 27) is connected through the normally closed contacts 2078 of relay 2080 and line 2076 to the wiper 2074 of bank 2044 of relay 2040. Connection continues to lead 2084. This lead is connected (FIGURE 28) through normally closed contact 2210 operable by the coil 2208 which energized the stepping relay 2190. This coil, when energized, opens contacts 2210 and this relay starts running in self-interrupted fashion.

Lead 594 (FIGURE 19) is connected to the first contact point of bank 2194 (FIGURE 28). When contact is there made, the positive potential appearing on line 594 is extended through wiper 2226 and out on lead 2102 which (FIGURE 26), the stepping switch 2040 still being on point 11, connects through wiper 2088 of bank 2046 and line 2090 and normally closed contact 2096 of relay 2080 to energize this relay through resistor 2094. When energized this relay opens the contact 2078 in the path, previously described, and the stepping operation of switch 2190 (FIGURE 28) stops. Energization of relay 2080 continues, even though it opens contact 2096, because of energization through the series arrangement of resistors 2092 and 2094, the former of these limiting the current. It now closes contact 2110 to apply positive potential through connection 2108 and point 11 of bank 2048 through wiper 2106, lead 2064 and resistor 2066 to energize the coil 2056. When thus energized the coil 2056 closes the contacts 2150 to apply positive potential to line 2162. This lead (FIGURE 31A) provides the positive potential through the normally closed contact 2610 of relay 2468 to line 1309. This (FIGURE 23) extends to the relay 1307 to energize it. This opens contact 1319 to break the connection between lines 1213 and 578. These elements were involved in the provision of positive potential to secure self-interrupted operation of the stepping switch 2190 and energization of relay 2080. Relay 2080 will accordingly be deenergized so that the contact 2110 will open, deenergizing coil 2056, in turn opening contact 2150 to remove positive potential from lead 2152 thereby deenergizing relay 1307. The line stepping switch 2040 accordingly steps to point 1.

Reference may now be made to FIGURES 22B, 22C, 27 and 28. Positive potential on lead 1826 is applied through wiper 2170 of bank 2054 of stepping relay 2040 to line 2174 (FIGURE 28), wiper 2270 of bank 2202 of stepping relay 2190, now on point 1. Positive potential is accordingly applied through lead 1263 and diodes 2272 and 2276 to lead 1256, and also through diode 2274 to lead 1268.

These leads 1263, 1268 and 1256, are respectively effective (FIGURES 22B and 22C) to light the lamps 1262, 1268, 1251, 1264 and 1274. These lamps, respectively, illuminate the keys designated "Adjust," "Return," "Hold," "Send," and "Take." It may be here noted that while the first illuminated key gave a direction (to enter a sales slip and tokens) and the second key, in effect, asks a single question (What is the clerk's number?), there is at this time presented, in effect, a question as to the nature of the transaction with the keys giving a multiple choice of answers. The questions here asked have nothing to do with the type of transaction so far as financial arrangements are concerned.

For the purposes of the present example it will be assumed that the transaction is to involve sending of the merchandise, and consequently the next operation would be the depression of the "Send" key by the clerk. This closes the contacts 1270 and 1272. The closure of contacts 1270 and 1272 provide positive potential to the lines 586 and 1040.

Considering lines 586 (FIGURE 27) this is connected through the closed contact 2078 of relay 2080 and line 2076 to the wiper 2074 of bank 2044 of stepping relay 2040. This provides positive potential through lead 2082 and the normally closed contact 2308 to energize the driving coil 2304 of stepping relay 2290. The energization of this coil opens the contact 2308 and this relay starts stepping in self-interrupted fashion.

Returning to the positive potential applied by key depression to lead 1040, this lead (FIGURE 28) is connected to point 2 of bank 2294 of stepping switch 2290. When the corresponding wiper 2314 reaches this point, the positive potential will be extended to lead 2100 which is connected (FIGURE 27) through contact point 1 of bank 2046 of stepping relay 2040 through wiper 2088 over lead 2090 and through resistor 2094 and the normally closed contact at 2098 to energize the stop relay 2080. This will energize and close contact 2120 to connect positive potential through lead 2108 and diode 2112 to the first contact in bank 2048 and thence through wiper 2106 and connection 2064 to energize the driving coil 2056. Key release is effected as previously described. The release of the "Send" key will disconnect the leads 586 and 1040 from the positive supply to deenergize the relay 2080. As before, this action results in deenergizing the driving coil 2056 so that the relays step to point 2. The key release is also deenergized.

Reference may now be made to FIGURES 19, 22A, 27 and 28. Stepping switch 2040 is now on point 2. Referring to FIGURE 28, positive potential is now applied through normally closed contact 2214 operable by coil 2208 through line 2216 to the wiper 2280 of bank 2206 of stepping switch 2190. This being in position 1, the positive potential is applied through diode 2284 to line 566 (FIGURE 19) and then through the contact 558 of energized relay 449 through connection 560 and the closed contact 556 of energized relay 448 to line 562 (FIGURE 27) to the contact point in position 2 of bank 2050 of stepping relay 2040. Through the wiper 2124 of this bank it passes through connection 2070 and the normally closed contact 2068 to energize the coil 2056. Energization of this coil opens contact 2068 to step the stepping switch 2040 to point 3.

Considering now FIGURE 19, positive potential is applied through closed contact 568 of relay 449 to line 572 (FIGURE 27) to the third contact of bank 2050 of stepping relay 2040. It is also applied through toggle switch 2132 to point 4 of the same bank. Through the wiper 2124 it is applied through line 2070 to the coil 2056. The breaking of contact 2068 of this coil produces successive steps to points 4 and 5.

Positive potential is now applied through line 1826 and wiper 2170 of bank 2054 to point 5 of this bank and to line 972 (FIGURE 22A) to effect lighting of lamps 974 and 976. These lamps illuminate the keys which correspond to quantity multiply and quantity special price.

At this point the description may be interrupted to turn to the matter of the card reader which starts its operaion as the sequence stepping switch 1800 reaches point 2.

Reference may now be made to FIGURES 8, 9, 17, 18, 19, 20, 26, 27, and 30 and 31B.

Referring to FIGURE 30, positive potential is applied through the normally closed contact 2428 to line 2148 (FIGURE 27), thence through the normally closed contact 2146 to line 2144 (FIGURE 31B) and through the normally closed contact 2786 of relay 2468 to line 1848 (FIGURE 26) through normally closed contact 1846 operable by coil 1802 of stepping relay 1800, and connection 1844 to the wiper 1842 of bank 1806 of this stepping switch. From this it is through line 536 (FIGURE 19) through the closed contact 534 of relay 548 and closed contact 530 of energized relay 449 to line 532 (FIGURE 20), and through the normally closed contact 798 of relay 616 and connection 800 to energize relay 614. This last relay is the one which initiates card reading.

The energization of relay 614 closes its contact 736 to apply positive potential to line 426 (FIGURE 18) which is connected to the point in position 26 of bank 408 of stepping relay 380 with which the wiper 392 is connected when this stepping relay is at rest.

Through the wiper 392 the positive potential is applied to the normally closed contact 384 to energize the operating coil 382 of this stepping switch. The energization of this coil 382 opens contact 384 to provide stepping to point 1.

Referring to FIGURE 20, normally closed contact 656 of relay 196 applies positive potential through switch 202, now in its lower position, to line 428 (FIGURE 18) to point 1 of bank 410 of stepping switch 380, and through wiper 394 and normally closed contact 436 to the lead 438. From this (FIGURE 20) the positive potential is applied to the two diodes 792 and 770. From diode 792 the positive potential is applied through contact 772 of energized relay 614 and connection 774 through the normally closed contact 776 of relay 620 and through the normally closed contact 784 of relay 622 and connection 786 to energize the relay 628, the positive potential then being applied through line 474 (FIGURE 18) to the wiper 402 of bank 418 of stepping switch 380. From this it passes through connection 476 (FIGURE 19) and through the now closed contact 478 of energized relay 449 to line 486. From this (FIGURE 17) it energizes solenoid 140.

The energizing of solenoid 140 (FIGURE 8) effects lowering of the member 108 so that the pressure of the springs 150 will lower the sensing wires 90 either to engage the tokens in the card reader where holes are absent, or to project through the holes where they are present.

Where holes are present, contacts are made between springs 148 and 150 as indicated in FIGURE 17.

Referring to the last mentioned figure, the selected contacts thus made energize the respective relays of the group 344, 346, 348, 350 and 352. The operation of the translator has already been described, and its operation is to provide outputs on one of the lines of the group 366. These outputs are of positive potential. The outputs as already described in connection with FIGURE 18 effect positioning of the appropriate storage stepping switches which, as already stated, are typified by FIGURE 16.

Referring to FIGURE 17, positive potential is applied through line 367 (FIGURE 20) and normally closed contact 846 of relay 620, thence through line 502 (FIGURE 18) to the wiper 406 of bank 422 of stepping relay 380. Since the wiper is on point 1 the positive potential extends through connection 288 and the normally closed contact 292 to energize the coil 252 of the typical stepping relay of FIGURE 16. The energization of coil 252 opens contact 292 to provide self-interrupted running of the storage stepping relay. Considering FIGURE 16, when the wiper of bank 270 arrives at the point which has positive potential applied through a connection 304, this positive potential is applied through the wiper 256 to line 306 (FIGURE 18) of bank 420 of stepping relay 380 then through wiper 404 and connection 488 (FIGURE 20) to energize relay 620.

The energization of relay 620 closes contact 776 locking this relay through resistors 912 and 914 from line 774 through contact 772 of energized relay 614 and diode 792 which, as previously stated, has positive potential applied to it.

The energization of relay 620 opens its contact 846 thereby opening the circuit which has been causing the storage stepping relay to operate in self-interrupted fashion.

Continuing reference to FIGURE 20, positive potential is applied through lead 750 to the normally closed contact 754 of relay 618 and through connection 758 and the normally closed contact 762 of relay 622 to line 776. Thence it is applied through relay 626 and connection 440 (FIGURE 18) to the wiper 396 of bank 412 of stepping relay 380 which is on point 1. From this connection is provided through line 443 (FIGURES 19 and 20) and resistors 908 and 906 to energize the relay 618 which locks itself as previously described.

Relays 618 and 620 are now both energized. Positive potential is applied through the closed contact 834 of relay 620, the closed contact 830 of relay 618, and line 836 to energize the drawer stepping coil 196 (FIGURE 5).

Also since contacts 822 of relay 618 and contacts 826 of relay 620 are closed, positive potential is applied through line 386 (FIGURE 18) to energize the coil 382 of the stepping relay 380. The energization of this coil opens the contact 436 to remove positive potential from line 438, opening the locking circuit of relay 618 and 620. The deenergization of these relays opens the contacts 834 and 830 to deenergize relay 196. Contacts 822 and 826 are also open to remove positive from the line 386 (FIGURE 18) resulting in deenergization of coil 382 and accordingly the stepping switch 380 advances to point 2.

The drawer of the card reader has now also advanced to point 2 and the positive potential previously on contact 656 (FIGURE 20) is now transferred to line 430 (FIGURE 18) to point 2 of bank 410 of the stepping relay 380. Accordingly positive is applied to wiper 394 and through closed contact 436 to line 438 (FIGURE 20) to repeat the reading process for point 2 in the same fashion as for point 1. As will now be obvious, the lines 428 and 430 keep the drawer and stepping relay 380 in step.

The procedure outlined now continues repeating until step 11 is reached whereupon the customer's credit card is also read. The overall result is the reading from the merchandise tag of department and class, the merchandise number and then the unit price. In the case of the customer's number the reading is simultaneous. It has been assumed that no clerk's token has been entered so that the steps 6 to 9, inclusive, which would normally effect reading of a clerk's token are passed without effect.

The reaching of point 17 is an indication that all of the cards have been read, and reference may now be made to FIGURE 36.

Positive potential is applied through the normally closed contact 690 of relay 610 and through line 692 (FIGURE 20) and closed contact 694 of relay 612 to line 432 (FIGURE 18) to point 17 of bank 410 of stepping relay 380. Through the wiper 394 it is then applied through normally closed contact 436 of coil 382 of stepping relay 380 to line 438 (FIGURE 20) from which it is applied through diode 770 to the closed contact 748 of relay 614, from this the potential is applied through line 750, the normally closed contact 754 of relay 618, the closed contact 762 of relay 622 and through relay 626 to line 440 which (FIGURE 18) extends to wiper 396 of bank 412 of stepping relay 380 which is on point 17. The positive potential is thus extended to line 456 (FIGURE 20) to energize relay 616 which is the relay indicative of finish of card reading.

The energization of relay 616 opens its contact 798 removing positive from line 800 and deenergizing relay 614, the relay which started the tag reading. Stepping relay 380 now remains on point 17 until it is reset.

In the tag reader, the drawer is now fully out having only been pushed inwardly to the extent of sixteen steps. This limit of inward movement is, in this case, adopted because only sixteen reading steps are involved. If more than sixteen steps of reading were required the drawer has the capacity of being able to read twenty-six steps.

Referring to FIGURE 30, positive potential is provided through normally closed contact 2428 of coil 2418, line 2148 (FIGURE 27), normally closed contact 2146 operable by coil 2056, line 2144 and then at 2142 to bank 2052 of stepping relay 2040 which is now on point 5.

Positive potential is now applied through wiper 2142 and diode 2160 to line 522 (FIGURE 20) and thence through closed contact 812 of relay 616, line 814, closed contact 816 of relay 624, line 520 (FIGURE 26) to point 12 of bank 1812 of stepping relay 1800. Through wiper 1926 it is then applied through normally closed contact 1928 of coil 1802, line 1930, and resistor 1952 to the coil 1802. Energization of this opens contact 1928 causing stepping to point 3 to initiate the printing operation.

Positive potential is applied at 1842 to bank 1806 of stepping relay 1800 which is on point 3. It is then applied through line 1098 (FIGURE 2) through normally closed contact 2940 of relay 2920, through closed contact 2942 of energized relay 2922 to line 1098 to relay 2924 which is the relay controlling start of printing.

Positive potential is now applied through normally closed contact 3515 operable by the coil 3514 of stepping relay 3500 through wiper 3508 to line 2950 and thence through the now closed contact 2946 of relay 2924 to line 2948 (FIGURE 38) to energize solenoid 3518 which controls ribbon feed. This solenoid closes its contact 3520 extending positive potential to energize coil 3514 which energizes the stepping relay 3500 controlling printing.

This stepping relay is mechanically connected through gearing to the printer wheel as described previously.

The energizing of coil 3514 removes positive potential from lead 3500, wiper 3508 of bank 3502 of stepping relay 3500, and lead 2950, resulting in deenergization of relay 3518. This opens its contact 3520, deenergizing coil 3514.

The printer's stepping relay 3500 is now at point 1, and contact 3514 is closed. Positive potential is then applied through wipers 3508 to energize the detent solenoid 3522 which locks the printing wheel in place.

Line 2958 is now positive (FIGURE 32) and energizes relay 2926 which closes its contact 2976 to extend positive to line 1904 (FIGURE 33) to energize relay 2988. Also (FIGURE 26) line 1904 is connected to wiper 1902 of bank 1810 of the sequence stepping relay 1800 which is on position 3. Accordingly, positive potential is applied through line 1908 (FIGURE 16) to the typical storage stepping relay unit lead 1908 to energize relay 329. The sequence stepping relay is now effective to operate selectively the various storage units to print out the required information.

Referring to FIGURE 38, positive potential on the wiper 3512 extends through bank 3506 of stepping relay 3500 to the zero lead of the group 324, this group being also shown in FIGURE 16. Bank 276 is now on the point energized positive and this potential is extended through wiper 262, line 326, closed contact 328 of relay 329, and line 330 (FIGURE 38). Various storage relays are connected to the lines 330 as required for effecting printing of their respective information. Each line 330 energizes the appropriate printing hammer solenoid 3530 to operate its hammer (FIGURE 41). The type now facing the hammers will be zero, and accordingly zeros are printed where required.

When relay 2926 (FIGURE 32) was energized, contacts 2952 applied positive potential to energize relay 2932. This closed contacts 2968 to provide positive potential to line 2966 (FIGURE 38) to energize coil 3514. This opens contact 2515 removing positive potential from 3508. Through contacts 3502 this releases the detent solenoid and also removes positive potential from line 2958 to deenergize relay 2926 (FIGURE 32). This deenergizes the relays 2932 and 329 of FIGURE 16.

The deenergization of relay 2932 releases contact 2968 removing positive potential from 2966 (FIGURE 32) to deenergize coil 3514 (FIGURE 38) so that the stepping relay 3500 advances to point 2.

The foregoing operations are repeated through point 10.

When the stepping relay 3500 is on point 10, positive potential is applied through wiper 3510 and through bank 3504 to line 2970 which energizes the solenoid 3524. This closes contact 3526 to extend the positive potential to line 2960 (FIGURE 32) to energize relay 2928.

We may now return to what happened during the steps 7, 8 and 9, considering bank 3504 on FIGURE 38. This had received positive potential from wiper 3510 through line 2944 connected (FIGURE 32) to coil 2920. The function of this is to prevent a second revolution of the type wheel until proper finish operations are completed.

The energization of relay 2920 opens contact 2940 deenergizing coil 2924. The relay 2920 has been locked up through its contact 2940 to line 1098 still having positive potential on it as previously described. Also, as previously described, relay 2928 was also locked through its contacts 2962, diode 2964 and lead 1844 which (FIGURE 26) is connected to wiper 1844 which has a positive potential originating through 1846 and coil 1802 of FIGURE 26.

Referring now to FIGURE 32, when relay 2928 was energized, the closure of contact 2984 provided the following circuit:

Positive potential (FIGURE 26) was applied through wiper 1954 of bank 1814 of stepping relay 1800, now on point 3, through line 1958 (FIGURE 32) and contact 2984 of relay 2928, line 1930, and resistance 1932 to energize the coil 1802 of stepping relay 1800. The energization of coil 1802 opens contact 1846 to remove positive potential from line 1844 involved in the locking circuit of the print stepping relay. It also removes positive potential (FIGURE 26) from wiper 1842 of bank 1806, point 3, deenergizing line 1098 which locks relay 2920, which is thus now deenergized.

Referring to FIGURE 32, when the relay 2928 is deenergized the coil 1802 is also deenergized to step the relay 1800 to point 4. The foregoing will make clear the operation of the solenoid 3524 (FIGURE 38) which feeds the sales slip.

In the foregoing described operation there was printed on the sales slip a line giving the point of sale number, the transaction number, the date, the customer's number, and also the clerk's number. No special reference to the first two has been made, but it may be remarked that the point of sale number is set manually in the machine in effectively the same way as if number keys had been depressed, and the transaction number is introduced merely by a sequential stepping switch arrangement which need not be specially described, corresponding merely to a set of stepping relays of the type previously detailed, arranged to be advanced by one numerical unit in each operation of the machine.

The sequence stepping switch now being on point 4, operations proceed as follows:

Referring to FIGURE 26, positive potential is applied through normally closed contact 1900 operated by the coil 1802, through wiper 1898 and point 4 of bank 1802, line 1870 (FIGURE 30) wiper 2436 of bank 2404 of stepping relay 2400 which is in its normal rest position on point 4, line 2440 (FIGURE 33), normally closed contact 2980 of relay 2928, to energize relay 2930. The energization of relay 2930 closes its contact 2972 and accordingly positive potential is applied through line 2970 (FIGURE 38) energizing the solenoid 2524.

Beside feeding the paper one line space, the solenoid 3524 closes its contact 3526 providing positive potential through line 2960 (FIGURE 32), to energize relay 2928. This relay locks itself through its contact 2962, diode 2964, line 1844 (FIGURE 26) normally closed contact 1846 of relay 1802, line 1848 (FIGURE 31B) normally closed contact 2786 of relay 2468, line 2144 (FIGURE 27), normally closed contact 2146 of coil 2056, line 2148 (FIGURE 30), and normally closed contact 2428 of coil 2418 to the positive potential supply.

The energization of relay 2928 switches contact 2980 to deenergize relay 1930 and provide positive potential through 646 (FIGURE 36) normally closed contact 3376 of relay 3328, line 2422 (FIGURE 30) to energize the coil 2418 of stepping relay 2400.

This opens contact 2428 which locks relay 2928. When contact 2428 is deenergized the coil 2418 is deenergized and the stepping relay 2400 steps to point 5.

The foregoing operations are repeated for steps through step 10, stepping relay 2400 going finally to point 1.

When point 1 is reached, positive potential is applied through line 1870 and wiper 2436 of bank 2404 to line 1930 and (FIGURE 26) through resistor 1932 to energize coil 1802. This opens its contact 1900 removing positive potential from wiper 1898 of bank 1808 and from line 1870. As a result the stepping relay 1800 goes to point 5.

The operation is now the same as described for point 3, and the same information is again printed. The relay 1800 then steps to point 6. The sales slip printer now gets an additional step in the same fashion as before, but without printing, and relay 1800 steps to point 7.

At this point the quantity multiply and the quantity special price lamps 974 and 976 have been lit over the circuit 972, FIGURE 22A. It may now be assumed that the purchaser desires two of the articles purchased, and this is recorded by the units key 2 to cause the circuit of FIGURE 24 to take part in the following:

Positive potential is supplied through the contact 1336 operated by the key 2 of the units order and through line 1342, diode 1382 to energize relay 1378. This closes its contact 1388 energizing relay 1267 (FIGURE 22A). This closes contact 978 to connect line 972 and contact 980 of the quantity multiply key. The depression of this key closes contact 980 applying positive potential to line 982 (FIGURE 35) and diode 3313 to energize the quantity multiply relay 3170. When relay 3170 is energized contact 3202 is closed. Positive potential is then applied through normally closed contact 3184 of relay 3174, normally closed contact 3186 of relay 3172, closed contact 3202, line 3204 (FIGURE 16), and line 281 to energize relay 286. This is the access relay for the numerical quantity.

Also (FIGURE 35) positive potential is applied through normally closed contact 3220 of relay 3174 normally closed contact 3222, normally closed contact 3230 of relay 3170, line 3228 (FIGURE 37) to energize relay 3450, the multiplier access relay.

Energizing of relay 3450 closes contact 3454 to apply positive potential to line 1675 (FIGURE 25B) to energize the subtract relay 1674.

To summarize the foregoing, the subtract relay 1674, the multiply and quantity access relays and the read relay (FIGURE 25A) are energized to start a subtraction operation. This operation takes place as already described in detail.

This culminates in the operation of the subtract-carry relay 1602.

Because of subtraction rather than addition of the amount of the input, the quantity storage stepping relays are wired in reverse as compared with the others. In the example under consideration, entering the numeral 2 for the quantity, the quantity stepping relay will go to point 8 as a result of the foregoing.

When the relay 602 is energized at the end of the operation, it closes contact 1617 completing a circuit as follows:

Referring to FIGURE 35, positive potential is applied through the closed contact 3292 of their energized relay 3170, line 1619 (FIGURE 25A), closed contact 1617 of relay 1602, and line 1621 to energize relay 3172 (FIGURE 35).

The relays 3170 and 3172 are both locked over line 3298 through normally closed contact 3296 of relay 3162, line 3294 (FIGURE 36), and through normally closed contact 3398 of relay 610 to the positive supply terminal.

The energizing of relay 3172 opens contacts 3186 and 3222. The opening of contact 3186 opens the circuit previously described to line 1304 which operated the quantity access relay 286 (FIGURE 16).

The opening of contact 3222 opens the circuit previously described which operated the multiply access relay 3450 over line 3228.

The subtract-carry relay 1602 closes contact 1623 and as a result positive potential is applied through line 2116 (FIGURE 27) to point 5 of bank 2048 of stepping relay 2040, through wiper 2106, and line 2064 and through resistor 2066 to energize the operating coil 2056 of the line stepping relay 2040.

This closes contact 2150 to put positive potential on line 2152 to operate the key release relay 1306 which releases the numerical key or keys which have been depressed and also releases the quantity multiply program key.

Returning to the deenergization of relay 3450, this opens contact 3454 removing positive potential from line 1675. This was connected (FIGURE 25B) to operate relay 1674. The deenergization of relay 1674 releases the subtract-carry relay 1602 which in turn opens contact 1623 to deenergize the coil 2056 (FIGURE 27) which opens the contact 2150 restoring the key release system to normal.

The stepping relay 2040 will now be on point 6.

In summary, what occurred when the line stepping relay was on point 5 was that the quantity, 2, placed into the numerical keys was recorded in two places of storage: the quantity storage stepping relay and the multiplier storage stepping relay, each of these being now on point 8.

With the line stepping relay 2040 (FIGURE 26) on point 6, the following occurs:

Positive potential is applied through normally closed contact 1900 of coil 1802 through wiper 1898 of bank 1808 of the stepping relay 1800 to point 7 of this bank and line 1092 (FIGURE 35) and closed contact 3322 of energized relay 3170, thence on line 650 (FIGURE 20) through closed contact 908 of energized relay 616, lines 552 (FIGURE 19) closed contact 550 of energized relay 449, line 554 (FIGURE 27) to point 6 of bank 2060 of stepping relay 2040, wiper 2124, line 2070, normally closed contact 2068 and resistance 2066 to energize relay coil 2056.

The energization of relay 2056 opens contact 2068 stepping relay 2040 to point 7.

Summarizing the operation at point 6, since the tag was used and the unit price was read therefrom and also since on point 5 the quantity multiply key was selected which inferred that it was desired to multiply the quantity by the price on the tag, there was no need to stop at point 6 either to put in a new unit price or an extended amount.

The stepping relay 2040 being on point 7, positive potential on lead 1826 is fed through wiper 2170 of bank 2054 and line 2178 (FIGURE 35) through closed contact 3256 of energized relay 3170 to energize relay 3174. This closes contact 3184 to line 3206 through closed contact 3218 of relay 3170, through line 2626 (FIGURE 16) to energize the access relay 286 of the storage stepping relay.

Contact 3220 was also closed providing positive potential through closed contact 3236 of energized relay 3170, line 2566 and a connection equivalent to that to relay 286 in a second storage group.

Closed contact 3238 of relay 3178 and closed contact 3248 put positive potential on line 3250 which is connected to the equivalent of relay 321 in FIGURE 16.

Summarizing this three circuits have resulted from the energization of relay 3174, energizing the extended amount access, the subtotal access, and the read unit price of stepping relays similar to that of FIGURE 16.

Also energized is relay 3174 which opens contact 3280 releasing the key read relay previously operated through contact 3280 of relay 3174.

Referring to FIGURE 16, relay 286 is energized and this provides positive potential to lead 287 (FIGURE 35) through closed contacts 3229 of relay 3174, line 3231 (FIGURE 37) through normally closed contact 3446 of the multiply tens stepping relay coil 3438, line 3490, normally closed contact 3442 operated by coil 3447, wiper 3492 of bank 3436 of stepping relay 3430. This is on zero so that positive potential is applied through 3494 and wiper 3496 of bank 3428 of stepping relay 3422. This being on point 8, positive potential is applied through line 1639 (FIGURE 25B) to energize relay 1638.

Referring now to FIGURES 25A and 25B, there are energized relays 1638, a subtotal access relay and an extended amount access relay and the add operation may be started to perform to culminate in the operation of the add-carry relay.

When the add-carry relay 1538 operates it closes contact 1589 to apply positive potential through 1591 and contact 3181 of relay 3174, line 3182 (FIGURE 37) through wiper 3488 of bank 3434 of stepping relay 3430, now on point zero, through line 3486, wiper 3484 which is on point 8 of bank 3426 of stepping relay 3422, thence through line 3474 and resistor 3476 to energize relay 3437.

The energization of coil 3437 opens contact 3442 which was energizing relay 1638 (FIGURE 25B). When relay 1638 is deenergized this in turn deenergizes relay 1538. This removes positive potential which has been applied through contact 1589, lead 1591 (FIGURE 35), closed contact 3181 of relay 3174, line 3182 (FIGURE 37), wiper 3488 of bank 3434 of stepping relay 3430, wiper 3484 of bank 3426 of stepping relay 3422 and line 3478 to relay 3437. The deenergizing of the last relay closes contact 3442 to close the circuit through lead 1639 to reenergize the relay 1638.

The multiply units stepping switch is now on point 9. Since the adding operation will now be repeated, a second step of the units stepping relay 3422 takes place, which will bring it to point 10. When coil 3437 is deenergized contact 3442 recloses so that the positive potential on lead 3231 extends through closed contact 3446 of relay 3430, line 3490, closed contact 3442 of relay 3422 to bank 3436 of stepping relay 3430. The wiper 3496 extends this through line 3258 to energize relay 3162 (FIGURE 35). This opens contact 3296, the locking contact for the relays 3172 and 3170. Connection here was through line 3294 and contact 3296 of relay 3162 (FIGURE 36), line 3294 being conected through normally closed contact 3298 of relay 610 to the positive potential.

Referring to FIGURE 35, deenergization of relay 3170 opens this contact 3218 removing positive potential from line 2626 which is connected to the access relay of the extended amount storage, this relay corresponding to 286 of FIGURE 16.

Also positive potential is removed from line 2566 by the opening of contact 3236 of relay 2566 which is the subtotal access relay corresponding to relay 286 of FIGURE 16. The opening of contact 3248 removes positive from 3250 which is equivalent to the read relay 321 of FIGURE 16.

The opening of contact 3256 interrupts the circuit to the relay 3174.

The release of the extended amount access relay on line 2626 removes positive from line 287 (FIGURE 16) continued in FIGURE 35, this removing positive potential operating the multiply finish relay 3162. This is over the following circuit:

Positive potential was removed from 287 by the deenergization of relay 286. Considering FIGURE 35, 287 had been connected through contact 3229 of relay 3174 to line 3231 (FIGURE 37) and then through the normally closed contacts 3446 and 3442, bank 3446 of stepping relay 3430 (now on point 10), bank 3428 of stepping relay 3422, also on point 10, and line 3258 energizing relay 3162. In view of the foregoing this relay is now deenergized.

Referring to FIGURE 27, the line stepping relay 2040 is still on point 7. Accordingly, positive potential on line 1826 is applied through wiper 2170 of bank 2054 and line 2178 (FIGURE 35) through contact 3256 of deenergized relay 3170 and line 1020 (FIGURE 22A) to light lamps 1022, 1028, 1036, 1056 and 1068. These lamps are respectively those illuminating the keys designated line reset, employee's 10% discount, employee's 20% discount, manual federal tax entry and federal tax.

In addition the lead 1020 is connected through diode 1052, line 1054 (FIGURE 35) diode 3311, normally closed contact 3313 of relay 3166, line 1078 (FIGURE 22A) and normally closed contact 1080 of deenergized relay 1082 to light the lamp 1086 associated with the key designated next item. Line 1078 is also connected (FIGURE 22B) to light the lamp 1106 associated with the state tax key and lamp 1112 associated with the tax exempt key.

To summarize, and to indicate what may happen at this stage, there are now illuminated the eight keys as just indicated. The functions of these are as follows:

Operation of the line reset key can reset the information now stored in the machine, this information being the department, class, merchandise number, quantity, unit price, extended amount and subtotal. The only information that would be retained if the reset key were actuated at this time would be the clerk's number, the customer's account number, the type of delivery (which in the example has been selected as "Send"), and the type of payment which was selected as "Charge" in accordance with what has been already said.

The employee 10% and 20% discount keys associated with the last 1028 and 1036 would automatically calculate and store a 10% or 20% discount in the discount storage stepping relay.

The manual federal tax key associated with lamp 1056 would permit the entry through the numerical keys of an amount other than the assumed standard 10% federal tax, if required.

The federal 10% tax key associated with lamp 1068 would permit the automatic calculation of a 10% tax on the item being sold and would store this amount in the central tax storage relay.

The next item key associated with lamp 1086, if depressed, would start two operations: first, a printing of the item including all of the information now in storage, and, secondly, it would start a transmission to send all of the information to the central control unit. If the signals sent to the central control unit were all acceptable then an answer would be signalled back which would reset this line of information and the line stepping switch 2040 would be restored to point 3 for the reception of new information relating to the second item in the transaction.

The state tax key associated with lamp 1106 would signal that all of the items of the described transaction were complete and that a state tax should now be calculated.

The tax exempt key associated with lamp 1112 also signals that all of the items are complete as to the existing transaction.

The foregoing indicates various alternatives of operation which are available at this point.

However, we will still adhere to the idea of a typical transaction which, followed through, will contact all of the elements of functioning so that analogous ones will be evident. For example, there are steps involving multiplication, and one of these involving multiplication of unit price by quantity has already been detailed. Other computations involving multiplication are carried out similarly. For example, such multiplications involve matters of discount, application of percentage of a state tax, and the like. Finally, in certain cases addition is required to secure a total, while in other cases, as in discount, subtraction is involved. The alternatives of addition and subtraction have already been considered. What will now be discussed is continuation of the transaction already detailed.

It will be assumed that no state tax is payable on the item involved in the considered transaction. The depression of the state tax key will close contact 1108 in FIGURE 22B producing the following results:

Positive potential from line 1078 extends through the contact 1108 to line 1109 to energize relay 1110. Next referring to FIGURE 31A, relay 1110 is duplicated thereon to show its connection more completely. On energization it closes contact 2518 so that it is locked over line 1206 (FIGURE 36) and normally closed contact 3406 of relay 3332 from the positive potential terminal. The energization of relay 1110 also closes contact 2486 to energize relay 2468 which controls printing. This last provides positive potential on lead 1848 (FIGURE 26) for the remainder of the transaction as follows:

Considering FIGURE 31D, positive potential is applied through contact 2792 of relay 2474 to line 2790 (FIGURE 31B) and thence through closed contact 2786 of relay 2468 to line 1848 (FIGURE 26). The positive potential on line 1848 is applied through normally closed contact 1846 of relay 1802, wiper 1842, now a point 7 of bank 1806 of stepping relay 1800, line 1854 (FIGURE 31A), through closed contact 2738 of relay 2468, line 2740 (FIGURE 31C), normally closed contact 2742 of relay 2474, line 2730 (FIGURE 31A), line 2720, line 1098 (FIGURE 32), normally closed contact 2940 of relay 2920 and normally closed contact 2942 of relay 2922 to energize relay 2924 which controls the start of printing. This closes contact 2938 to extend the positive potential through line 2138 (FIGURE 27), diode 2140, line 2136, point 6 of bank 2050 of stepping relay 2040, wiper 2124, line 2070, and normally closed contact 2068 to energize its associated coil 2056 which operates the line stepping relay 2040.

Figure 33:
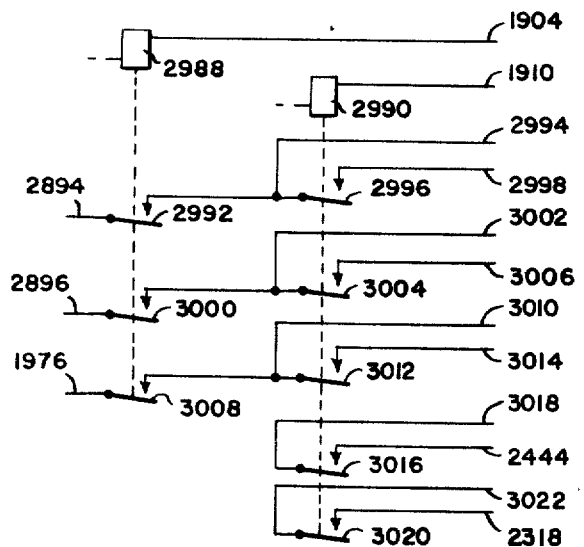

Energization of coil 2056 opens contact 2068 producing extent of the line stepping relay to point 8. Line 2138 remains energized to apply positive potential through wiper 2124 to again energize the coil 2056 which again opens contact 2068 to provide stepping to point 9. Referring to FIGURE 33, relay 2924, besides functioning as last described, closes contact 2946 connecting line 2948 to 2950 (FIGURE 38). This will start a print operation as has been previously described, the end result being the operation of the relays (FIGURE 32) 2920 and 2928. The matter printed at this time consists of the item entered in the transaction as already discussed.

The energization of relay 2928 locks it up through its contact 2962, diode 2964, line 1844 (FIGURE 26) normally closed contact 1846 operable by coil 1802, and line 1848 which, as stated, has positive potential on it.

The energization of relay 2928 also provides positive potential through wiper 1954 of bank 1814 of stepping relay 1800, now on point 7, through line 1960 (FIGURE 31D), contact 2760 of relay 2468, line 1958 (FIGURE 32), closed contact 2984 of relay 2928 and line 1930 (FIGURE 26) to energize the sequence stepping relay coil 1802.

The energization of coil 1802 opens contact 1846 removing positive potential from 1844, in the locking circuit for relay 2928 (FIGURE 32).

Additionally, positive potential is removed from wiper 1842 now on point 7 of bank 1806 of stepping relay 1800, removing positive potential from line 1854 (FIGURE 31A) previously described as providing the locking circuit for relay 2920 (FIGURE 32).

When relay 2928 is deenergized, it opens contact 2984 breaking the circuit to coil 1802 (FIGURE 26), this resulting in the stepping of the stepping relay 1800 to point 8.

This last action provides positive potential through line 1848, normally closed contact 1846 operable by coil 1802, wiper 1842 of bank 1806 of stepping relay 1800, line 1856 (FIGURE 30), wiper 2456, now on point 1 of bank 2412 of stepping relay 2400, line 2460 (FIGURE 31C), normally closed contact 2546 of relay 2480, normally closed contact 2544 of relay 2476, line 1934 (FIGURE 26), point 8 of blank 1812 of stepping relay 1800, wiper 1926 and normally closed contact 1928 to energize the coil 1802. This opens contact 1846 deenergizing the coil 1802 so that stepping relay 1800 advances to point 9.

If required, the sequence stepping relay 1800 when on point 8 would have provided the following function:

If there had been more than one item in the transaction there would be printed a subtotal. In addition, if a discount or a federal tax had been involved, there would have been checked the carries for additional entry of one cent provided there had been a half cent or more in the tenths of cents storage for either of these items. The type of carry referred to will be described in connection with the operations involved in step 12, involving the carrying in connection with a state tax.

Considering FIGURE 4, the stepping relay 1800 being on point 9, positive potential is provided through the normally closed contact 3106 of relay 3034, line 2550 (FIGURE 31C), normally closed contact 2548 of relay 2476, line 1936 (FIGURE 26), which is connected to points 9 and 10 of bank 1812, through wiper 1926 and normally closed contact 1928 to energize the coil 1802. This opens contact 1928 producing a step to point 10, and then the same operation occurs to produce a step to point 11.

Had it been required, the positions of the stepping relay 1800 on points 9 and 10 would have effected the following:

On point 9 the amount of discount in the discount storage would have been printed, and also the amount of discount would have been subtracted from the subtotal.

On step 10 the new subtotal resulting would have been printed.

Considering now FIGURE 26, with stepping relay 1800 point 11, positive potential is applied through normally closed contact 1900, wiper 1898 of bank 1808, line 1878 (FIGURE 31B), closed contact 2794 of energized relay 1110 and line 2796 (FIGURE 35) to energize the relay 2164.

Energization of relay 3164 effects the following: referring to FIGURE 35:

Positive potential is applied through normally closed contact 3184 of relay 3174, closed contact 3186 of relay 3172, line 3188, contact 3190 of relay 3164 and line 3192 (FIGURE 40) to energize relay 3193, the relay which effects reading of the percentage state tax.

Relay 3164 also closes the following circuit:

Referring to FIGURE 35, positive potential is applied through normally closed contacts 3220 and 3222 of relays 3174 and 3172, closed contact 3226 of relay 3164 and line 3228 (FIGURE 37) to energize relay 3450, the multiply access relay.

The relay 3450 closes contact 3454 to extend positive potential through line 1675 (FIGURE 25B) to energize relay 1674, the subtract relay. This sets up conditions for a subtraction operation which, as previously described, results in operation of relay 1602 (FIGURE 25A). Relay 1602 energizes the following circuit:

Positive potential is applied through closed contact 3286 of energized relay 3164, line 1619 (FIGURE 25A), closed contact 1617 of relay 1602, and line 1621 (FIGURE 35) to energize relay 3172. This in turn closes contact 3306, locking itself.

The energization of relay 3172 opens its contact 3186 thereby opening the circuit which energized relay 3193 (FIGURE 40). Contact 3222 is also open deenergizing relay 3450. The deenergization of relay 3450 opens contact 3454 deenergizing the relay 1674, which in turn deenergizes relay 1602 (FIGURE 25A). This opens contact 1617 through which relay 3172 was previously energized; but relay 3172 is locked through its contact 3306.

The deenergization of relay 1602 effects the following: positive potential is applied through contact 1611, line 1613 (FIGURE 25A), closed contact 3266 of energized relay 3164, line 3262 and closed contact 3260 of relay 3172 to energize the relay 3174 which controls the start of a multiplying operation.

It should be now noted that the units stepping relay 3422 is on point 7 because a 3% state tax was assumed and the sequence of stepping was of reverse type as described previously.

Referring to FIGURE 35, the energization of relay 3174 applies positive potential through closed contact 3184, line 3206, closed contact 3208 of relay 3164, and line 3210 which is connected to a line corresponding to 281 of FIGURE 16 to energize a relay 286 which, in this case, would be the state tax access relay.

Also positive potential is applied through closed contact 3238 of relay 3174, line 3251, contact 3240 of relay 3164 and line 2820 which is connected to a relay corresponding to 321 of FIGURE 16, the relay in this case controlling reading of a subtotal.

Referring to FIGURE 16, the energization of relay 286 provides positive potential through line 287 (FIGURE 35), closed contact 3229 of relay 3174, line 3231 (FIGURE 37), normally closed contact 3446 operated by coil 3438 of stepping relay 3430, and then through line 3490 and normally closed contact 3442 of coil 3437 to wiper 3492 of bank 3436 of stepping relay 3430 which is now on the step zero.

Positive potential on wiper 3436 is extended through line 3494, wiper 3496 which is on point 7 of bank 3428 of stepping relay 3422, and line 1639 (FIGURE 25B) to energize the added relay 1638.

Conditions are now those for addition. Energized are the relays to read a subtotal, provide state tax access (equivalent to 1704 of FIGURE 25B), and add relay 1638. Addition then takes place as previously described, at the end of which the add-carry relay 1538 (FIGURE 25A) is energized.

This closes contact 1589 to extend positive potential through line 1591 (FIGURE 35), contact 3181 of relay 3174, line 3128 (FIGURE 37), wiper 3488 now on point 0 of bank 3434 of stepping relay 3430, line 3486, wiper 3484 on point 7 of bank 3426 of stepping relay 3422, line 3478 and resistor 3476 to energize coil 3437 of stepping relay 3422.

This opens contact 3442 and the circuit previously described energizing the relay 1638. Deenergization of relay 1638 deenergizes relay 1538, opening contact 1589 with resulting deenergization of coil 3437 so that stepping relay 3422 moves to point 8, reclosing contact 3442.

This operation is repeated two more times until stepping relay 3442 reaches zero so that positive potential is applied through line 3231, normally closed contact 3446, contact 3442, banks 3436 and 3428 and line 3258 (FIGURE 35) to energize relay 3162 which signals the finishing of a multiplying operation.

The energization of relay 3162 provides positive potential (FIGURE 26) through wiper 1954, which is on point 11 of bank 1814 of stepping relay 1800, line 1966 (FIGURE 35), closed contact 1967 of relay 3162 and line 1930 (FIGURE 26) to energize coil 1802 of stepping relay 1800. This opens contact 1900 removing positive potential from wiper 1898 and line 1878 to deenergize relay 3164.

Referring to FIGURE 35, relay 3162 opens contact 3296 resulting in deenergization of relay 3172 the multiplication recording relay. Both relays 3172 and 3164 being deenergized, the relay 3174 is also deenergized. Deenergization of relay 3164 opens contact 3208 deenergizing the state tax access relay. Also contact 3226 is opened to deenergize the relay 3162 signalling the finish of a multiplication operation. The ultimate result of these deenergizations is to deenergize the coil 1802 advancing the stepping relay 1800 to point 12.

What occurred when stepping relay 1800 was on point 11 is that the subtotal, the amount of sale less a discount if there had been any, was multiplied by the percentage of stage tax, 3% in the example described, and the tax was recorded for printing an addition to the subtotal. In the case of the latter, there will be read only the significant figures, starting with the units of cents, though the amount recorded will include tenths and hundredths of cents. It will be evident in a case such as this in which division by multiples of ten is involved, in this case one hundred, the division is effected merely by providing connections from particular orders of the transmitting system to properly chosen orders of the receiver. For example, for division by one hundred, the shift of connection is of two orders.

Various states and communities differ greatly in the fashion in which taxes are computed. It will be evident, therefore, that the example given of computation merely as a percentage must be considered only representative of one type out of many methods of computing tax, and, if required, special connections may be provided to determine the proper tax for a given transaction, including, in some cases, the use of tax table memory means which will not be described. In other instances, fractions of a cent require the addition of a full cent, or other rounding of figures may be required. This may be done merely by a comparison arrangement which will add a further step in the units accumulating stepping relay. Step 12 of the stepping relay 1800 is here reserved for such purpose.

At the end of the tax computation, whatever its nature, the relay 1800 is stepped to point 13, and the discussion will now be continued on the assumption that the relay 1800 is on this step.

Referring to FIGURE 26, positive potential is applied through normally closed contact 1900, wiper 1898 of bank 1808, line 1882 (FIGURE 31A), closed contact 2712 of relay 1110 and line 2714 (FIGURE 16) to energize a relay equivalent to 321, which in this case would be the read state tax relay. This closes contact 299 putting positive potential on line 301 connected to line 281 to operate a relay 286, in this case the subtotal access relay. Relay 286 closes contact 293 to provide positive potential on line 287 (FIGURE 35) and through normally closed contact 3229 and line 1639 to energize relay 1638, the add relay.

Conditions are now such as to provide an adding operation to add the state tax to the subtotal, this operation terminating in the energization of the add-carry relay.

Printing also takes place as follows:

Referring to FIGURE 26, positive potential from line 1848 is applied through normally closed contact 1846 operable by coil 1802, wiper 1842 of bank 1806 of stepping relay 1800, line 1866 (FIGURE 31A), closed contact 2718 of relay 1110, line 1098 (FIGURE 32), normally closed contact 2940 of relay 2920 and closed contact 2942 of relay 2922 to energize relay 2924 to start the printing operation.

Relay 2924 closes contact 2946 connecting line 2948 and 2950 (FIGURE 38).

This effects printing as previously described resulting eventually in the energization of relays 2920 and 2928 (FIGURE 32).

Relay 2920 locks itself through connection 2940 and line 1098, and relay 2928 locks itself through contact 2962, diode 2964 and line 1844.

At the completion of the addition operation the add-carry relay and also relay 2928, the print step relay, are energized. The combination of these effect the following:

Referring to FIGURE 26, positive potential is applied through wiper 1954 of bank 1814, line 1969 (FIGURE 31B), normally closed contact 2746 of relay 1116, line 1595 (FIGURE 25A), closed contact 1593 of energized relay 1538, the add-carry relay, line 1597, connected to line 1958 (FIGURE 32), closed contact 2984 of energized relay 2928 and line 1930 (FIGURE 26) to energize the coil 1802 of stepping relay 1800. This opens the normally closed contacts 1946 and 1900.

The opening of contacts 1846 deenergizes relay 2928 (FIGURE 32) by opening its locking circuit. Relay 1846 also removes positive potential from wiper 1842, deenergizing relay 2920.

The opening of contact 1900 removes positive potential from wiper 1898 deenergizing relay 321 (FIGURE 16). This opens contact 299, removing positive potential from lines 301 and 281, deenergizing relay 286 which, in turn, deenergizes the add relay 1638, this producing deenergization of the add-carry relay 1538. The circuit to coil 1802 is thus opened, and relay 1800 steps to point 14.

Considering FIGURE 31C, positive potential is applied through contact 2502 of relay 2478, line 1942 (FIGURE 26), point 14 of bank 1812, wiper 1926 and normally closed contact 1928 to energize coil 1802. The resulting break causes a stepping of stepping relay 1800 to point 15.

If point 14 had been used it would have added the federal tax to the subtotal, this being the result if the federal tax had been recorded.

Referring now to FIGURE 26, positive potential on line 1840 is applied through wiper 1838 on point 15 of bank 1804 through line 1832, diode 1833, connection 1128, and diode 1153 to line 1154.

Line 1832 is also connected (FIGURE 28) through wiper 2328 which is on point 2 of bank 2302 of stepping relay 2290, line 1118 (FIGURE 22B) to light lamp 1120 illuminating the shipping charge key.

Line 1128 also lights the lamp 1130 illuminating the alteration charge key in FIGURE 22B.

Referring to FIGURE 28, line 1154, energized as just described, is connected through wiper 2278 on point 1 of bank 2204 of stepping relay 2190, line 1138 (FIGURE 22B) to light lamp 1140 of the deposit or amount of payment key.

Line 1154 also (FIGURE 31D) through normally closed contact 2904 of relay 2474, and line 1158 (FIGURE 22B) lights the lamp 1160 of the total key.

In resume of what has just been described, the following lamps are now lit: 1120, shipping charge, 1130, alteration charge, 1140, amount of deposit, and 1160, total.

There may now be selection of any or all of the keys associated with these lamps, providing, however, that if they are to be used they must be depressed in the sequence just given. Such depressions of any of the first three must, of course, be preceded by entry of the proper numerical amount from the numerical keyboard.

Depressing the deposit key will automatically actuate the total after the deposit functions are completed. If the alteration key were to be selected it would automatically extinguish the shipping charge lamp and perform only the alteration charge, at the completion of which the remaining lamps illuminated would be those indicating deposit and total. It will be assumed for the present example that since the transaction originated as a "send" transaction, there will be a shipping charge of some amount. In such case the numerical keys in FIGURE 24 corresponding to the amount of shipping charge to be recorded would be operated. Then, through normally closed contact 1366, positive potential would be applied to line 1364 and thence through the operated key contact 1336 to line 1342 to operate relay 1378.

Energization of relay 1378 closes contact 1388 and through line 1269 energizes relay 1267.

Referring to FIGURE 28, relay 1267 closes contact 1122 applying positive potential from line 1118 to the shipping charge key contact 1124. Depression of this key extends the positive potential through line 1125 to energize relay 1126.

Referring to FIGURE 31, relay 1126 closes contact 2522 locking itself to the line 1206 which is positive through normally closed contact 3406 of relay 3332 (FIGURE 36).

Referring to FIGURE 26, positive potential is applied to normally closed contact 1900, wiper 1898, which is on point 15 of bank 1808, line 1896 (FIGURE 31A), closed contact 2628 of energized relay 1126, line 2630, normally closed contact 2632, line 2606, normally closed contact 2608 and line 1062 (FIGURE 31C), to energize relay 2482.

Relay 2482 is equivalent to relay 286 of FIGURE 16, an access relay. Because of the non-overlap of functions, the storage stepping switch for the shipping charge may be the same as that for the federal tax. Relay 2482 (FIGURE 31C) shifts the output to cents when, for the tax, it would be tenths of a cent, etc. Relay 2482 also closes contact 2638 applying positive potential to line 1956 to operate a relay typified by 286 in FIGURE 16. The amount of the shipping charge will be so entered both into the shipping charge storage and the subtotal storage.

Referring to FIGURE 31A, if a federal tax had been recorded prior to the placing of a shipping charge in the storage, a relay 2472 would have been operated to effect transmission before entry. Lead 1886 would then put positive potential on lead 1062 through contact 2608 so that the lead would be connected to lead 2578 to cause the start of a transmission. The transmission would have sent all of the information in the machine at this time to the central control unit, and thereupon the return signal that the transmission was satisfactory, the federal tax category would have been reset and then the relay 1146 would be energized so that a shipping charge could be put into the central tank storage group. The matter of transmission will be referred to more fully hereafter. What has just been mentioned is in the nature of a premature transmission involved to simplify the apparatus.

The energization of relay 286 provides positive potential through contact 293 on line 287 which, over line 1639 energizes the relay 1638 of FIGURE 25B as previously described. The energization of relay 1638 again produces an adding operation, the read relay in this case effecting reading of the numerical keys as previously described. Adding takes place as already detailed, but this time, as stated, into two storage units.

As usual the addition terminates in energization of the add-carry relay 1538. Referring to FIGURE 26, the positive potential on line 1848 is applied through normally closed contact 1846 to wiper 1842 now on point 15 of bank 1806 of stepping relay 1800, thence through line 1860 (FIGURE 25A), the closed contact 1587 of relay 1538, line 1098 (FIGURE 32) normally closed contact 2940 of relay 2920, and closed contact 2942 of relay 2922 to energize relay 2924 which is the relay which starts the printing operation.

Energization of relay 2924 closes contact 2946 connecting lines 2948 and 2950 (FIGURE 38). This starts the printing operation. At the end of this, relay 2920 (FIGURE 32) is energized and self-locked. The printing operation prints the amount of the shipping charge.

Since relay 2928 is energized, the following takes place, with reference to FIGURE 26:

Positive potential is applied through wiper 1954 on points 15 of bank 1814 of stepping relay 1800, through line 1958 (FIGURE 32) closed contact 2984 of relay 2928 and line 1930 (FIGURE 26) to energize the coil 1802.

Coil 1802 opens the normally closed contact 1846 removing positive potential from 1844 which is in the locking circuit of relay 2928 so that this is deenergized.

Also the positive potential on wiper 1842 is removed from line 1860. This unlocks the relay 2920.

Deenergization of relay 2928 opens contact 2984 deenergizing the coil 1802 to step the relay 1800 to point 16.

The positive potential on wiper 1836 of bank 1804 is now removed from line 1832; but positive potential is retained through diode 1833 and line 1153 on lines 1128 and 1154. Removal of the positive potential from line 1832 extinguishes the shipping charge lamp. But the positive potential on lines 1128 and 1154 maintains illuminated the alteration charge, deposit and total lamps.

The shipping charge key and the number keys were released in the foregoing operation by the key release rotary in the fashion already described.

There is now the option of entering an alteration charge, if desired, and the operation to do this would be identical to the operation just described for the input of the shipping charge, Further, if it was desired at this time to show a deposit on account of this transaction, the operation would again be identical to what was described for the input of the shipping charge except that instead of addition to the deposit amount to the subtotal it would be subtracted.

If at the time of entering a deposit the stepping relay 1800 was on point 15 or 16, the arrangement is such that stepping would first be effected to point 19, and the function of entering the deposit would then take place. The operations for this will be evident from what has already been described, and they need not be here detailed.

In the particular assumed transaction it will now be considered that the total key is to be operated.

The depression of the total key (FIGURE 22B) closes contact 1162 applying positive potential through line 1158, closed contact 1162 and line 1163 to energize relay 1164.

Referring to FIGURE 31A, the energization of relay 1164 closes contact 2530 to cause it to lock itself.

Energization of relay 1164 also closes contact 2496 so that positive potential is applied through normally closed contact 2494 of relay 1148 to line 1946. It is also applied through contact 2496 to line 1948.

Line 1946 is connected (FIGURE 26) to point 16 of bank 1921 of stepping relay 1800 and thence through wiper 1926 and normally closed contact 1928 to energize coil 1802. This opens contact 1928 so that the sequence stepping relay 1800 steps to point 17. Bank 1812 of this stepping relay has its points 17 and 18 directly connected to positive potential and accordingly the stepping continues to points 18 and 19.

Line 1948 is connected to points 19 and 20 of bank 1812 of stepping relay 1800 so that this is now stepped continuously to point 21.

Then positive potential is connected through normally closed contact 1900, line 1526, wiper 1898 of bank 1808 of stepping relay 1800, line 1894 (FIGURE 31A), normally closed contact 2582 of relay 2470, line 2588, line 2578 (FIGURE 34) and the normally closed contacts 3102, 3100 and 3098 of respective relays 3038, 3036 and 3034 to energize relay 3026. Relay 3026 locks itself through contact 3104 and provides the following circuit:

Referring to FIGURE 39, positive potential is applied through wiper 3141, now in the initial point 52 of bank 3536 of the transmitting stepping relay 3534, lines 3086 (FIGURE 34), closed contact 3088 of relay 3026 and normally closed contact 3084 of relay 330 to energize relay 3028.

Energization of relay 3028 closes contact 3050 and as a result positive potential is applied through line 3048 to energize relay 3024 which locks through connection 3046 to line 1206 which was previously described as a locking circuit.

Energizing of relay 3024 opens the circuit to relay 3042, a relay which is provided for voiding a transaction. Assuming that the transaction has been entered satisfactorily so that there is no desire to void it, relays 3028, after closing contact 3050 provide positive potential through closed contact 3052 of relay 3030 to line 3054 (FIGURE 51), and through diode 3696 to energize relay 3653 in the central unit.

Referring to FIGURE 51, line 3054 is also connected to point 1 of bank 3658 of stepping relay 3657, and connection is provided through the wiper 3698 of this bank and line 3700 to the stop relay 3674. If the wiper 3698 was on a point other than 1, no potential would be applied to energize relay 3674 so that start relay 3653 would close contact 3738 to energize a circuit over line 3740, normally closed contact 3742 operable by coil 3656, line 3744, normally closed contact 3746 of relay 3674, line 3748, normally closed contact 3750 of relay 3676 and line 3752 to energize the coil 3656. Due to the opening of contact 3742 when relay 3656 is energized, stepping switch 3657 will run self-interrupted until it reaches an energized point which is number 1 in the example. When it reaches the energized point positive potential is provided on line 3054 which will energize relay 3674 opening contact 3746 to stop the stepping.

Also relay 3674 closes contact 3702 providing positive potential to line 3704 to energize relay 3676, the "busy" relay. Relay 3676 opens contact 3750 maintaining the interruption of the stepping circuit of relay 3657 and locking itself through line 3706 and line 3708 until completion of the transmission.

Referring to FIGURE 39, positive potential is provided through normally closed contact 3552 of relay 3534 operable by coil 3546, line 3070 (FIGURE 34), closed contact 3068 of relay 3030, line 3066, closed contact 3064 of energized relay 3026, line 3602, wiper 3712 which is on point 1 of bank 3662 of stepping relay 3657, line 3714, closed contact 3710 of relay 3676, normally closed contact 3716 of relay 3768 and line 3718 to energize relay 3720.

Energized relay 3720 closes contact 3722 locking itself over line 3726 to closed contact 3710 of relay 3676. This shunts the break contact 3716 of stepping relay 3679. Also relay 3720 closes contact 3724 providing an additional locking circuit through line 3728 and normally closed contact 3754 which is operable by coil 3678.

Energization of relay 3720 also closes contact 3734 and through line 3736 energizes coil 3678. Positive potential is applied through contact 3730 of relay 3720, line 3732, wiper 3756 on point 1 of bank 3660 of stepping relay 3657 and line 3076 (FIGURE 39) energizing coil 3546 of the transmitting stepping relay 3534.

When coil 3546 is energized it opens normally closed contact 3552 removing positive potential from line 3070 (FIGURE 34) which is connected through normally closed contact 3068, line 3066, and closed contact 3064 of relay 3026 to line 3062 which (FIGURE 51) runs to point 1 of bank 3662, wiper 3712, line 3714, closed contact 3710 of relay 3676 and to the locking contact 3722 of relay 3720. This opens part of the locking circuit of relay 3720.

When coil 3678 is energized, it opens contact 3754 removing positive potential from lines 3728 and contact 3724 previously described as also part of the locking circuit of 3720. Accordingly the relay 3720 is deenergized, opening contacts 3734 and 3730. These contacts were involved in the energization of coil 3678 of stepping relay 3679 and also (FIGURE 39) of coil 3546 of stepping relay 3534. Both of these stepping relays, accordingly, step to their point 1.

Referring to FIGURE 39, positive potential is applied to wiper 3542 of bank 3538 of stepping relay 3534, and through point 1 and line 334 (FIGURE 16) connection is provided to wiper 264 of bank 278. This wiper is in one of the ten positions and will continue positive potential on one of the five leads grouped at 332.

Again referring to FIGURE 39, positive potential is applied through wiper 3544 on point 1 of bank 3540 of stepping relay 3534 and through connection 336 (FIGURE 16) to wiper 266 of bank 279. This wiper 266 is also on one of the ten points and transmits positive potential on another of the five leads grouped as 332. Accordingly two of the five leads 332 are energized. These leads 332 (FIGURE 51) are respectively connected to the banks 3664, 3666, 3668, 3670, and 3672 of the stepping relay 3657. Since the point of sale machine being considered has been assumed to be connected to point 1 of these banks, they are connected through their respective wipers 3758, 3760, 3762, 3764 and 3766 through the corresponding leads to the wipers 3778, 3780, 3782, 3784 and 3786 of the successive banks of the stepping relay 3769. Since the last mentioned wipers are all on the point 1 of stepping relay 3769 they are connected respectively to the five relays of the group 3690 which are associated with these leads and these provide storage for the first digit being transmitted. Two relays of five of each group will be energized and lock up until the transmission has been recorded in its entirety and, in fact, until use is made of the energization of these relays in the central until, remembering that, as stated previously, the relays of the group 3690 are provided with other contacts (not shown) to make use of what they record by their energization.

Referring to FIGURE 39, stepping relay 3534 being on point 1 positive potential on wiper 3541 is now removed from lead 3086, considering the connection of this lead (FIGURE 34) through normally closed contact 3084 to relay 3028.

Negative potential from coil 3028 goes through closed contact 3082 to one side of coil 3030. The other side is connected to closed contact 3080 of relay 3026, extending to normally closed contact 3078 of relay 3040 and then to positive potential. This allows relay 3030 to be energized and operated in series with relay 3028 already energized and it will remain so until required to be released.

Referring to FIGURE 39, positive potential is applied through normally closed contact 3552 operable by coil 3546, line 3070 (FIGURE 34) to contact 3068 operated by the energization of relay 3030 to open the circuit.

Instead of energization by this circuit, positive potential is applied from wiper 3541 on point 1 of bank 3546 of stepping relay 3534 through lead 3554 and lead 3114, normally closed contact 3550, also operated by coil 3546, line 3072 (FIGURE 34) closed contact 3068 of relay 3030, line 3066, closed contact 3064 of relay 3026, line 3062, point 1 of bank 3662 of stepping relay 3657, wiper 3712 and lead 3714 to closed contact 3710 of relay 3676. Coil 3678 having been deenergized, contact 3716 is closed, and accordingly positive potential is applied through connection 3718 to energize relay 3720.

Relay 3720 when energized again locks itself as previously described and again operates both of the stepping relay 3679 and 3534 in the fashion previously described.

Energization of coil 3546 of stepping relay 3534 opens one part of the locking circuit of relay 3720 and energization of coil 3678 opens the other part of the locking circuit, so that relay 3720 is deenergized, causing stepping of both of the stepping relays to point 2. The described actions insure simultaneous stepping of both of these relays.

Again, a digit is transmitted as previously described, this time to the second storage set of relays 3690.

The foregoing stepping and transmission actions continue at each point through point 51 of each of the stepping relays so that fifty digits stored in the point or sale machine are transmitted sequentially into corresponding sets of relays 3690, where the information is stored in a two out of five system. By reason of the other mentioned, but not shown, contacts of the digit relays, which contacts remain closed awaiting further instructions as to their use, operations are carried out to punch cards, to print a record on a sales journal to be used to add the various amounts concerned in the transaction and keep running totals of sales, the taxes, the total amounts of charge sales, the total amounts of cash sales, etc.

Additionally a special group of these contacts of relays 3690 are associated with the watch list and have been closed to be energized when the stepping relay 3769 reaches point 9. Reference for this may be made to bank 3790 in FIGURE 51. Wiper 3788 of this bank 3790 is connected to the positive supply terminal and at point 9 provides positive potential through closed contact 3792 if the transaction is a charge transaction. This positive potential is carried through the closed contact 3796 of relay 3679. If this is the first transmission for the transaction, both relays 3677 and 3679 being energized under these conditions, (the relays being closed, as previously described, by energization through closed contacts of relays of group 3690 in the first two columns corresponding to the first and second digits). The described circuit energizes relay 3694 which is the relay initiating operation of the watch list mechanism. Energization of relay 3694 will close contact 3798 and also contact 3800. Contact 3798 provides current through lead 3802 to operate the watch list motor 3803. Contact 3800 extends the positive potential to lead 3804 connected to energize contacts of relays 3690 involved in storage of customer's number. The energized contacts of these relays are connected to the solenoids 3641 (FIGURE 50) to effect driving of the bars 3630 in selective fashion to latch the non-pertinent customer number cards. In the cycle of operation of the watch list, as previously described, the electromagnet 3642 will move a card which is not latched by the bars 3630. Such a card would correspond to the number of a customer whose account is unsatisfactory. If this happens, the illumination on the photocell 3648 will be interrupted to operate the relay 3649 and energize the relay 3692. This locks itself through its contact 3808 connected to the locking line 3709. Positive potential is then applied to line 3818 and, through wiper 3812 to point 1 of bank 3814 of stepping relay 3657 to energize relay 3654, which closes its contacts 3818, 3820 and 3822.

First, let it be assumed that the transaction is acceptable, i.e., that the customer's card is not in the watch list. In this case relay 3692 is not energized and positive potential is provided through contact 3808 in its normal position, point 51 of bank 3688 of stepping relay 3769, line 3776, wiper 3766 of bank 3672 of stepping relay 3657, and point 1 of this bank to line 7 of group 332.

Referring to FIGURE 39, positive potential is provided through wiper 3544 which is on point 51 of bank 3540 of stepping relay 3534, through line 3056 (FIGURE 34) to energize relay 3032. The energization of relay 3032 closes contact 3148. This allows the positive potential from point 1 of bank 3672 of stepping relay 3657 to feed through lead 3146 (FIGURE 34) contact 3148 of relay 3032 and normally closed contact 3150 of relay 3036 to energize relay 3034 which signals a satisfactory transmission.

Energization of relay 3034 closes contact 3152 to line 1844 which has positive potential on it providing locking of this relay. The connection of line 1844 is (FIGURE 26) through closed contact 1846 energizable by coil 1802 to line 1848.

Energize relay 3034 opens contact 3098 and 3106 in the locking circuit for relay 3026. Accordingly, relay 3026 is deenergized with the following results:

Referring to FIGURE 39, positive potential is applied through wiper 3541 on point 51 of bank 3536 of stepping relay 3534 to line 3118 (FIGURE 34), and thence through normally closed contact 3116 of deenergized relay 3026, line 3114 (FIGURE 39) normally closed contact 3550 operable by coil 3546, line 3072 (FIGURE 34) closed contact 3074 of relay 3206, and line 3076 (FIGURE 39) to energize the coil 3546 of stepping relay 3534. This opens contact 3550 deenergizing itself and effecting stepping of relay 3534 to point 52, its home position.

Referring to FIGURE 34, the deenergization of relay 3026 opens contact 3880 removing positive potential at contact 3078 which was feeding relay 3030 and 3028. These are accordingly deenergized.

Referring to FIGURE 39, wiper 3544 which was connected to point 31 of bank 3540 of stepping relay 3534 through line 3056 to hold relay 3032 energized, produces deenergization of this relay on the step to point 52. This leaves the relay 3034 the only one energized in FIGURE 34. Referring to FIGURE 26, at the start of the transmission there was completed a circuit from a positive supply terminal through normally closed contact 1846 operable by coil 1802, wiper 1842 on point 21 of bank 1806 of stepping relay 1800, line 1098 (FIGURE 32), normally closed contact 2940 of relay 2920 and closed contact 2042 of relay 2922 to energize the relay 2924 which is the relay controlling start of printing.

The energization of relay 2924 closes contact 2946 connecting the lines 2948 and 2950 (FIGURE 38) starting a printing operation as already described. The printing at this time is of the total of the entire transaction.

At the end of the printing operation the following takes place:

Referring to FIGURE 32, relays 2920 and 2928, the former was locked through its contact 2940 to line 1098, and the latter was locked through its contact 2962 and diode 2964 to line 1844.

Relay 3034 (FIGURE 34) remains energized. Under these conditions the following occurs:

Referring to FIGURE 30, positive potential is applied through normally closed contact 2428 operable by coil 2418, line 2148 (FIGURE 27), normally closed contact 2146 operable by coil 2056, line 2144, wiper 2142 on point 9 of bank 2052 of stepping relay 2040, line 2164 (FIGURE 31D). The normally closed position of contact 2812 of relay 2476, line 2804 (FIGURE 31B), closed contact 2808 of relay 2468, line 2806 (FIGURE 34), line 2806, closed contact 3136 of relay 3034, line 2122 (FIGURE 27) point 9 of bank 2048 of stepping relay 2040, wiper 2106 and line 2064 to energize coil 2056 of stepping relay 2040.

The energization of coil 2056 opens contact 2146 deenergizing itself and producing a step of relay 2040 to point 10.

Deenergizing of coil 2056 closes contact 2146 restoring positive potential to line 2144, which, through wiper 2142 on point 10 of bank 2052 of stepping relay 2040, line 640 (FIGURE 36) and diode 3334 energizes relay 610, the line reset relay. The energizing of relay 610 resets all of the storage stepping relays which contained information pertinent to the described transaction. This is because contacts 3404 of relay 610 provide positive potential through line 298 (FIGURE 16) to energize relay 298 of all of the storage stepping relays.

Referring to FIGURE 36, energization of relay 610 closes contact 3394 and accordingly positive potential is applied through line 642 (FIGURE 27) wiper 2072 on point 10 of bank 2042 of stepping relay 2040, and line 2026 to energize coil 2056. The energizing of this coil opens contact 2146 removing positive potential and deenergizing relay 610. This opens contact 3394 deenergizing the coil 2056 so that stepping relay is advanced to point 11.

When coil 2056 is deenergized, positive potential is applied through line 2146, wiper 2142, on point 11 of bank 2052, line 2168 (FIGURE 31A) and closed contact 2534 of relay 2468 to energize relay 2470 which signals the finish of the last transmission.

The energization of relay 2470 closes contact 2546 and locks through line 1206 (FIGURE 36) and normally closed contact 3406 of relay 3332 to the positive potential supply. Energization of relay 2470 applies positive potential to wiper 1954 on point 21 of bank 1814 of stepping relay 1800, line 1972 (FIGURE 34), closed contact 3138 of energized relay 3034, line 2754 (FIGURE 31B), and closed contact 2752 of energized relay 2470 to lines 2750, 2761 and 1958.

From line 1958 (FIGURE 32) and closed contact 2984 of relay 2928, positive is supplied through line 1930 (FIGURE 26) to energize coil 1802 of stepping relay 1800. This opens contact 1846 removing positive potential from line 1844 and wiper 1842. Line 1844 being in the locking circuit of relay 2928 (FIGURE 32) and relay 3034 (FIGURE 34) these relays are deenergized.

Wiper 1842 on point 21 removes positive potential from line 1098 which (FIGURE 32) was holding relay 2920 energized. This is also now deenergized.

Deenergizing of the relays just mentioned opens line 1930 deenergizing coil 1802 and producing stepping of relay 1800 to point 22.

Referring to FIGURE 26, positive potential is applied through line 1840, wiper 1838 on point 22 of bank 1804 of stepping relay 1800, line 1836 (FIGURE 28), wiper 2218 on point 1 of bank 2192 of stepping relay 2190, line 1174 (FIGURE 31B), normally closed contact 2890 of relay 1146 and line 1178 (FIGURE 36) to energize relay 3332 which is the sale reset relay. This restores all of the remaining stepping relays to normal including the sequence stepping relay 1800 which is stepped to point 25 to light the lamp 1292 (FIGURE 21C) on the program keyboard directing removal of the sales slip and tokens. Depression of the associated key releases the sales slip by energization of solenoid 3528 which lifts the rod 3564 previously holding the sales slip in engagement with the feeding roller.

At this point reference may be made to the operations involved in connection with the skipped points 22, 23 and 24. These have the following functions if required in connection with a cash sale:

Point 22 is for the entry of an amount tendered. If required this lights lamp 1184 and also lamp 1192 (FIGURE 22B), the latter indicating no amount tendered. The corresponding keys are also energized. If an amount of cash has been presented in excess of the amount of the transaction, the amount tendered is entered in the numerical keyboard, and upon depression of the keys corresponding to the lamp 1184 energization is effected through line 1190 to initiate a subtraction operation to calculate the change due to the customer. This is controlled by step 23, the amount of change being printed. The sequence stepping relay then steps to point 24 following this and automatically operates the sale reset relay 3332 to effect operations as described above.

When the sales slip is removed, a step of the sequence stepping relay takes place to point 26 this being its home position, and lamp 1252 (FIGURE 22B) is lit indicating to the clerk that the machine is ready for another transaction.

This terminates a complete cycle with all of the elements of the mechanism now in their initial positions.

Returning now to the conditions which would exist if a customer's card was in the watch list, as already described this would result in energization of relay 3034 (FIGURE 34). Negative potential from relay 3654 (FIGURE 51) is applied through contact 3818 to lead 4 of group 332 which is permanently connected to line 3142 (FIGURE 34) and through contact 3144 of relay 3032 this effects energization of the hold relay 3036, the winding of which, as will be noted, is returned to positive potential. Then positive potential is applied through contact 3132 of relay 3036, line 1304 (FIGURE 22C) and line 1304 to light the lamp 1302 indicating authorization is required to go on with the transaction. With relay 3036 activated the point of sale machine is rendered inactive, normal position of the contacts of this relay being required to proceed.

The clerk must now communicate by phone with the credit authorizer to determine whether or not the transaction is to be accepted or rejected.

The action of relay 3036 in stopping the transaction is effected by opening of contact 3100 which deenergizes the relay 3026 which controls the start of transmission of information. Deenergization of relay 3026 causes stepping of the transmitting relay 3534 to its initial point 52. Contact 3092 of relay 3036 is operated to remove positive potential from line 1840, this having been positive from line 3090.

Line 1840 (FIGURE 26) connects with wiper 1838 of bank 1804 of stepping relay 1800 which controlled all of the lamp circuits through the sequence stepping relay 1800 and also through the line stepping relay 2040, all of these circuits being connected to points of bank 1804.

Relay 3036 also closes contacts 3156 and 3160 providing circuits to the retransmit relay 3040 and reject relay 3038. The leads 3154 and 3158 connected respectively to these are connected to leads 2 and 1, respectively, of group 332 and to contacts 3820 and 3822 of realy 3654 in the central control unit (FIGURE 51). Contact 3820 is connected to contact 3828 of push button 3827 which, on depression, operates the relay 3040, for retransmission.

Contact 3822 is connected to contact 3831 of push button 3829 to operate the reject relay 3038.

If relay 3040, the retransmit relay, is energized, it starts a new transmission to transmit the same information again to the central control unit so that it may be accepted and stored, the information previously therein being erased by opening of the holding line 3708 in the central control unit.

On the other hand, if relay 3038, the reject relay, is energized, it operates relay 3322 (FIGURE 36), the sale reset relay, which resets the point of sale machine to its initial condition for another transaction. In addition it also operates directly the printer to print the word "reject" on the sales slip.

A typical sales slip such as produced in the point of sale machine is illustrated in FIGURE 52 at 3836. The sales slip may be preprinted in any suitable fashion. For example it may contain a serial number indicated at 3840, as is usual with such slip. Areas such as 3842 and 3844 are desirably provided in which the customer's name and address may be written or printed in conventional fashion through utilization of the embossings on the charge card. Headings such as 3846 and 3848 may be provided for lined columns in which the point of sale machine will print the pertinent information of the transaction.

The type of first printing indicated in the foregoing is illustrated at 3850, and this is repeated, as described, at 3852. The matters relating to the transaction, as printed by the machine, are shown at 3854. Any number of duplicates of the sale slip may be made through the use of carbon backings or interleaved carbon sheets. The form of the sales slip is, of course, at the option of the store using the machine.

Reference may be next made to FIGURE 21 which illustrates, in block diagram, and consistent with the particular machine which has been described, its various component elements, particularly the array of stepping relays used for the accumulation of information.

FIGURE 21 shows at 3860 the storage stepping relays which are typified in FIGURE 16. These are identified by the types of information stored therein. The number of relays in each group is indicated in parentheses. In general the multiplicity of relays in a group corresponds to the orders of digits which are to be stored therein, for example in the case of the clerk number four stepping relays are involved to indicate numbers from 1 to 9999. In the case of unit price the amount which might be recorded ranged from 1¢ to $999.99. The merchandise number, which can be recorded to the extent of six digits, could be coded by the store in terms in which various digits might represent sizes, colors, or the like, so that the available numbers could be used for inventory purposes.

As indicated at 3860, certain of these stepping relay groups may be used for several different purposes. This is possible since the uses for different purposes are equential and without overlap.

At this point it may be remembered that by virtue of the routing relay contacts already described in connection with the addition-subtraction circuit, information may be read from one of these relays into others, singly or in combinations.

Besides the automatically stepping relays indicated at 3860 there are storage manual switches indicated at 3862 which have the same form as the stepping relays but are manually set rather than stepped automatically. In these are stored fixed data not requiring change for each sale. The date may be set daily manually to include month and day. Uses of these have already been indicated, and essentially their information is transferred in the same general fashion as from the number keys. The matter of using a percent tax has already been outlined.

At 3864 there are indicated the other elements of the point of sale machine, with reference to their numerals, where comprehensive numerals have been used, and also with reference to the figures of the drawings in which they appear. In the group referred to as control relays are to be considered those numerous figures which show relays and their connections.

Included in FIGURE 21 for completeness there are indicated at 3866 the watch list mechanism of FIGURES 49 and 50 and the inlet portion of a central unit indicated in 51 with reference to the stepping relays 3657 and 3769 appearing therein. The watch list may, of course, be remote from the other central unit, and would normally be in the accounting department of the store.

In the description of the operation there have been referred to typical types of operation which may be involved.

One of the simplest operations is that of making merely a choice without numerical significance, e.g., the choice as to whether a sold article is to be taken by the customer, sent, or held or whether the transaction involved a return of an article.

Another type of typical operation involves not only a choice but the entry of some numerical value. This is involved in the case of entry of a clerk's number, a merchandise number, department and class, unit price, shipping charge, alteration charge, or the like. In such case the numerical keyboard is used together with the appropriate programming key of the group 12.

In still other cases, multiplication is effected automatically, as in the case of employee's discount or in the case of a fixed federal tax or state tax. The amount of a state tax may also, if desired, be entered from the appropriate manual switch rather than from the keyboard, the manual switch in such case substituting for the keyboard.

In other instances multiplication must be effected by a number which varies according to the transaction, as in the case of the determination of the cost of a plurality of articles the unit price of which is given.

The items entered may be added or subtracted in an accumulator as required, taxes being added, and discounts subtracted.

Additionally there is the option of entering certain numerical data either from the numerical keyboard or from the tag reader.

There has been described reference to the watch list of customers' accounts. As has already been indicated, a similar watch list may be supplied to which merchandise numbers may be referred to determine whether certain articles are available in stock.

The reading of information to be transmitted to the central unit has been described. The particular information which is to be thus transmitted is, of course, at the option of the store and the transmitting stepping relay may be connected in various fashions to transmit whatever information is desired from the storage stepping relays and the storage manual switches.

Reference will now be made to FIGURES 53A, 53B and 53C. FIGURE 53A and its continuations, FIGURES 53B and 53C constitute a chart indicating general operations which are tied up most closely with the steps of the sequence stepping relay 1800 (FIGURE 26) and of the line stepping relay 2040 (FIGURE 27). This chart represents the total of the general operations which may be performed by the point of sale machine, but omits details previously described. As will be understood from the example of an operation, in any particular transaction various of the possible operations are omitted. In such cases and as typically described, the stepping relay 1800 may pass through steps which are not required. Under these conditions flashing of irrelevant lamps may momentarily occur, but the flashing is so rapid that no confusion of the clerk can occur.

In particular in this chart there are indicated in quotation marks "instructions" (i.e., signal instructions or requests for answers) given by lamps which are illuminated at the various steps of operation. Also indicated are various operations including printing operations, etc. In addition there are indicated such operations as addition and subtraction which occur in the machine but are not apparent to the clerk except through their results exhibited by printing or exhibition on the display devices 15. It may be noted that, as described, the steps 3 to 7, inclusive, of the stepping relay 1800 may be repeated before this relay goes into the later numbered steps from an effective standpoint. This repetition is, of course, effected by a rapid forward stepping of this relay through step 26 and back to 3. Such action is achieved by depression of the "next item" key.

To make clearer the matter of alternative transactions involving the skipping of irrelevant ones, FIGURES 54A, 54B, 54C and 54D provide jointly a flow diagram of operation which will be self-explanatory. The connections running from one figure to another are designated correspondingly in the several figures by the letters M, N, P, Q, R and S. The connecting arrows in these figures indicate the forward progress of the handling of a transaction. The blocks indicating the sequential steps are provided with legends so as to be self-explanatory. The flow diagram is not exhaustive but indicates the results of typical selections and what may follow therefrom.

While a complete machine has been disclosed capable of a very wide range of alternative transaction handling, it will be evident that a machine of this type may be provided either of a type to handle only simpler transactions or of a type to handle even more complex transactions, the latter being by further extension of the principles herein set forth.

It is to be understood therefore that the invention is not to be regarded as limited except as required by the following claims.

What is claimed is:

1. In combination,
    means identifying a first group of choices subject to individual selection;
    means manipulable to make a selection from said first group of choices;
    means identifying a second group of choices subject to individual selection;
    means identifying a third group of choices different, as a group, from said second group, and also subject to individual selection;
    means controleld by said manipulable means selectively identifying one or the other of said second or third group of choices in dependence upon the selection made from the first group of choices;
    means manipulable to make a selection from either of said second or third group of choices; and
    means recording the choices made by at least one of said manipulable means.

2. In combination,
    means identifying a first group of choices subject to individual selection;
    means manipulable to make a selection from said first group of choices;
    means identifying a second group of choices subject to individual selection;
    means identifying a third group of choices different, as a group, from said second group, and also subject to individual selection;
    means controlled by said manipulable means selectively identifying one or the other of said second or third group of choices in dependence upon the selection made from the first group of choices;
    means manipulable to make a selection from either of said second or third group of choices; and
    programming means selectively controlled by operation of the last mentioned manipulable means in accordance with selection made from said second or third groups of choices.

3. In combination,
    means identifying a first group of choices subject to individual selection;
    means manipulable to make a selection from said first group of choices;
    means identifying a second group of choices subject to individual selection;
    means identifying a third group of choices different, as a group, from said second group, and also subject to individual selection, each of said second and third group of choices involving at least one choice not in the other;
    means controlled by said manipulable means selectively identifying one or the other of said second or third group of choices in dependence upon the selection made from the first group of choices;
    means manipulable to make a selection from either of said second or third groups of choices; and
    means recording the choices made by at least one of said manipulable means.

4. In combination, means identifying a first group of choices subject to individual selection;
    means manipulable to make a selection from said first group of choices;
    means identfying a second group of choices subject to individual selection;
    means identifying a third group of choices different, as a group, from said second group, and also subject to individual selection, each of said second and third group of choices involving at least one choice not in the other;
    means controlled by said manipulable means selectively identifying one or the other of said second or third group of choices in dependence upon the selection made from the first group of choices;
    means manipulable to make a selection from either of said second or third groups of choices; and
    programming means selectively controlled by operation of the last mentioned manipulable means in accordance with selection made from said second or third groups of choices.

5. In combination,
    means identifying a group of operation-identifying choices subject to individual selection;
    means manipulable to make a selection from said group of choices and effect an operation;
    additional means operable to enter numerical information;
    means inhibiting further operation as the effect of manipulation of at least one manipulable means until numerical information is entered by said numerical information entering means; and
    means recording the numerical information entered and the selection associated therewith.

6. In combination,
    means for entering numerical information;
    a plurality of separate storage means for reception of such numerical information;
    a plurality of manipulable means subject to choice; and
    means controlled by selection of said manipulable means to store such numerical information in alternative ones of said separate storage means depending upon selection by said manipulable means.

7. In combination,
    a numerical keyboard manipulable by an operator and set up in a decimal system to provide an output;
    a device for reading numerical information from a token and providing an output in a coded non-decimal numerical system;
    information storing means set up to receive and store information in one of said numerical systems;
    selecting means for routing the outputs from either said keyboard or said device to said information storing means; and
    means for translating to the numerical system of said storing means the output from that one of the keyboard or device which is set up in other than the numerical system of said storing means to provide its output to the storing means.

8. In combination,
a numerical keyboard manipulable by an operator and set up in one numerical system to provide an output;
a device for reading numerical information from a token and providing an output in a numerical system differing from the first mentioned numerical system;
information storing means set up to receive and store information in one of said numerical systems;
selective means for routing the outputs from either said keyborad or said device to said information storing means, and
means for translating to the numerical system of said storing means the output from that one of the keyboard or device which is set up in other than the numerical system of said storing means to provide its output to the storing means.

9. In combination,
a numerical keyboard manipulable by an operator and set up in a decimal system to provide an output;
a device for reading numerical information from a token and providing an output in a coded non-decimal numerical system;
information storing means set up to receive and store information in a decimal system;
selecting means for routing the outputs from either said keyboard or said device to said information storing means; and
means for translating to the decimal system of said storing means the output from said device to provide its output to the storing means.

10. In combination,
a numerical keyboard manipulable by an operator to provide outputs;
a device for reading a plurality of tokens related to different classes of information to provide individual outputs from the token read;
a plurality of information receiving and storing means, one for each such class of information;
means for routing selectively to said storing means outputs either from said keyboard or said device; and
means preventing routing to said storing means from said keyboard an output of information of a class corresponding to that of a token read by said device, but effecting routing to said storing means from said keyboard an output of information of any class not corresponding to a read token.

11. In combination,
a numerical keyboard manipulable by an operator to provide outputs;
a device for reading simultaneously a plurality of tokens related to different classes of information to provide individual outputs from the tokens read;
a plurality of information receiving and storing means, one for each such class of information;
means for routing selectively to said storing means outputs either from said keyboard or said device; and
means preventing routing to said storing means from said keyboard an output of information of a class corresponding to that of a token read by said device but effecting sequential routing to said storing means from said keyboard outputs of information of any classes not corresponding to a read token.

12. In combination,
a numerical keyboard manipulable by an operator to provide outputs;
a device for reading a plurality of tokens related to different classes of information to provide individual outputs from the tokens read;
a plurality of information receiving and storing means, one for each such class of information;
means for routing selectively to said storing means outputs either from said keyboard or said device; and
means indicating to an operator classes of information not read from a token, thereby asking for keyboard entry of such classes of information.

13. In combination,
a numerical keyboard manipulable by an operator to provide outputs;
a device for reading a plurality of tokens related to different classes of information to provide individual outputs from the tokens read;
a plurality of information receiving and storing means, one for each such class of information;
means for routing selectively to said storing means outputs either from said keyboard or said device;
means indicating to an operator classes of information not read from a token, thereby asking for keyboard entry of such classes of information;
further storing devices;
programming means controlling entry of further information in the last mentioned storing devices; and
means preventing operation of said programming means until an operator enters into said keyboard information of the classes indicated by said indicating means.

14. In combination,
means providing successive information outputs;
a plurality of information receiving and storing means of accumulating type; and
programming means for routing, in a cycle of operation, outputs from said providing means in sequential fashion to said information storing means, with certain information routed to a single storing means which, in such cycle, had not previously received and cannot later receive information, and with other information routed to a storing means which, in such cycle, had previously received information.

15. In combination,
means providing successive information outputs;
a plurality of information receiving and storing means of accumulating type; and
programming means for routing, in a cycle of operation, outputs from said providing means in sequential fashion to said information storing means, with certain information routed to a single storing means which, in such cycle, had not previously received and cannot later receive information, with other information routed to a storing means which in such cycle, had previously received information, and with still other information routed simultaneously to a plurality of said storing means.

16. In combination,
means providing successive information outputs;
a plurality of information receiving and storing means of accumulating type; and
programming means for routing, in a cycle of operation, outputs from said providing means in sequential fashion to said information storing means, with certain information routed to a single storing means which, in such cycle, had not previously received and cannot later receive information, and with other information routed to a storing means which, in such cycle, had previously received information with accumulation of the new information selectively additively or substractively with said previously received information.

17. In combination,
means providing successive information outputs;
a plurality of information receiving and storing means of accumulating type; and
programming means for routing, in a cycle of operation, outputs from said providing means in sequential fashion to said information storing means, with certain information routed to a single storing means which, in such cycle, had not previously received and cannot later receive information, with other information routed to a storing means which, in such cycle, had previously received information with accumulation of the new information selectively additively or substractively with said previously received information, and with still other information routed simultaneously to a plurality of said storing means.

18. In combination,
means providing successive information outputs;
a plurality of information receiving and storing means; and
programming means, including a keyboard manipulable by an operator, for routing outputs from said providing means in sequential fashion to said information storing means, said programming means including means for determining various different program continuations in accordance with, and dependent on, preceding portions of the program as determined by manipulation of said keyboard.

19. In combination,
means providing successive information outputs;
a plurality of information receiving and storing means; and
programming means, including a keyboard manipulable by an operator, for routing outputs from said providing means in sequential fashion to said information storing means, said programming means including means for determining various different program continuations in accordance with, and dependent on, preceding portions of the program as determined by manipulation of said keyboard, the last mentioned means effecting its results by rendering certain of the keys opeartive upon manipulation and by rendering others of the keys inoperative under attempted manipulation.

20. In combination,
means providing successive information outputs including a device for reading tokens;
a plurality of information receiving and storing means; and
programming means, including a keyboard manipulable by an operator, for routing outputs from said providing means in sequential fashion to said information storing means, said programming means including means for determining various different program continuations in accordance with, and dependent on, preceding portions of the program as determined by manipulation of said keyboard and by operation of said device for reading tokens.

21. In combination,
means providing successive information outputs including a device for reading tokens;
a plurality of information receiving and storing means; and
programming means, including a keyboard manipulable by an operator, for routing outputs from said providing means in sequential fashion to said information storing means, said programming means including means for determining various different program continuations in accordance with, and dependent on, preceding portions of the program as determined by manipulation of said keyboard and by operation of said device for reading tokens, the last mentioned means effecting its results by rendering certain of the keys operative upon manipulation and by rendering others of the keys inoperative under attempted manipulation.

22. In combination,
means providing successive information outputs;
a plurality of information receiving and storing means of accumulating type;
programming means for routing, in a cycle of operation, outputs from said providing means in sequential fashion to said information storing means, with certain information routed to a single storing means which, in such cycle, had not previously received and cannot thereafter receive information, and with other information routed to a storage means which, in such cycle, had previously received information; and
means for printing the information stored in said information storing means.

23. In combination,
means providing successive information outputs;
a plurality of information receiving and storing means of accumulating type;
programming means for routing, in a cycle of operation, outputs from said providing means in sequential fashion to said information storing means, with certain information routed to a single storage means which, in such cycle, had not previously received and cannot thereafter receive information, and with other information routed to a storage means which, in such cycle, had previously received information; and
means for transmitting sequentially to a remote receiver the information stored in said information storing means.

24. In combination,
means identifying a group of operation-identifying choices subject to individual selection, said means presenting the choices in a sequential array;
means manipulable to make multiple selections from said group of choices;
interlocking means operative when a choice is made to prevent an effective subsequent selection of a preceding choice of said sequential array; and
programming means variously selective in accordance with one or more selections of choices from said sequential array.

25. In combination,
means identifying a first group of operation-identifying choices subject to individual selection, said means presenting the choices in a sequential array;
means manipulable to make multiple selections from said first group of choices;
interlocking means operative when a choice is made to prevent an effective subsequent selection of a preceding choice of said sequential array;
means identifying a second group of choices subject to individual selection;
means identifying a third group of choices different, as a group, from said second group, and also subject to individual selections;
means controlled by said manipulable means selectively identifying one or the other of said second or third group of choices in dependence upon the selection made from the first group of choices;
means manipulable to make a selection from either of said second or third group of choices; and
means recording the choices made by at least one of said manipulable means.

26. In combination, means identifying a first group of choices subject to individual selection; means manipulable to make a selection from said first group of choices; at least one second manipulable means; at least one third manipulable means; means controlled by operation of said first manipulable means selectively identifying one or the other of said second or third manipulable means depending upon the selection made from the first group of choices; and means controlled by operation of the second and third manipulable means to record the selected choice of operation of the second or third manipulable means.

27. The combination of claim 26 in which the means selectively identifying the second and third manipulable means includes lights respectively associated therewith.

References Cited

UNITED STATES PATENTS

| | | | |
|---|---|---|---|
| 3,018,042 | 1/1962 | Nettleton | 235—61.6 |
| 3,035,764 | 5/1962 | Beman | 235—61.9 |
| 3,061,192 | 10/1962 | Terzian | 340—172.5 |

ROBERT C. BAILEY, *Primary Examiner.*

G. D. SHAW, *Assistant Examiner.*